US008365072B2

(12) United States Patent
Mansfield et al.

(10) Patent No.: US 8,365,072 B2
(45) Date of Patent: Jan. 29, 2013

(54) IDENTIFICATION OF COMPOUND GRAPHIC ELEMENTS IN AN UNSTRUCTURED DOCUMENT

(75) Inventors: Philip Andrew Mansfield, Vancouver (CA); Michael Robert Levy, Vancouver (CA)

(73) Assignee: Apple Inc., Cupertino, CA (US)

( * ) Notice: Subject to any disclaimer, the term of this patent is extended or adjusted under 35 U.S.C. 154(b) by 570 days.

(21) Appl. No.: 12/479,844

(22) Filed: Jun. 7, 2009

(65) Prior Publication Data
US 2010/0174982 A1     Jul. 8, 2010

Related U.S. Application Data

(60) Provisional application No. 61/142,329, filed on Jan. 2, 2009.

(51) Int. Cl.
G06F 17/00 (2006.01)
(52) U.S. Cl. .................. 715/273; 715/243; 715/277
(58) Field of Classification Search .................. 715/276, 715/243, 277
See application file for complete search history.

(56) References Cited

U.S. PATENT DOCUMENTS

| | | | |
|---|---|---|---|
| 4,757,549 A | 7/1988 | Machart et al. | |
| 4,962,472 A | 10/1990 | Seki et al. | |
| 5,335,290 A | 8/1994 | Cullen et al. | |
| 5,390,259 A | 2/1995 | Withgott et al. | |
| 5,619,629 A | 4/1997 | Yutaka | |
| 5,680,478 A | 10/1997 | Wang et al. | |
| 5,724,494 A * | 3/1998 | Politis | 345/592 |
| 5,784,487 A | 7/1998 | Cooperman | |
| 5,841,900 A | 11/1998 | Rahgozar et al. | |
| 5,848,186 A | 12/1998 | Wang et al. | |
| 6,014,680 A | 1/2000 | Sato et al. | |
| 6,263,122 B1 | 7/2001 | Simske et al. | |
| 6,377,285 B1 | 4/2002 | Doan et al. | |
| 6,504,544 B1 | 1/2003 | Hollingsworth et al. | |
| 6,562,077 B2 | 5/2003 | Bobrow et al. | |
| 6,577,777 B1 | 6/2003 | Yoshino et al. | |
| 6,687,404 B1 | 2/2004 | Hull et al. | |
| 6,928,610 B2 | 8/2005 | Brintzenhofe et al. | |
| 7,046,848 B1 | 5/2006 | Olcott | |
| 7,254,270 B2 * | 8/2007 | Simske | 382/224 |
| 7,295,711 B1 * | 11/2007 | Ahuja et al. | 382/225 |
| 7,313,754 B2 | 12/2007 | McLure et al. | |
| 7,324,120 B2 | 1/2008 | Curry et al. | |
| 7,386,789 B2 | 6/2008 | Chao et al. | |

(Continued)

FOREIGN PATENT DOCUMENTS

JP 2005/149269 6/2005
WO WO 2010/078475 7/2010

OTHER PUBLICATIONS

Chao, Hui, et al., "Layout Content Extraction for PDF Documents," 2004, attached, pp. 1-12.*

(Continued)

Primary Examiner — Doug Hutton, Jr.
Assistant Examiner — Andrew McIntosh
(74) Attorney, Agent, or Firm — Adeli & Tollen, LLP

(57) ABSTRACT

Some embodiments provide a method of analyzing an unstructured document. The method receiving the unstructured document that includes a number of primitive graphic elements, each of which is defined as a single object in the unstructured document. The unstructured document has a drawing order that indicates the order in which the primitive graphic elements are drawn when the unstructured document is displayed. The method identifies positional relationships between successive primitive graphic elements in the drawing order. Based on the positional relationships, the method defines a single structural graphic element from several of the primitive graphic elements.

39 Claims, 67 Drawing Sheets

U.S. PATENT DOCUMENTS

| | | | |
|---|---|---|---|
| 7,392,473 | B2 | 6/2008 | Meunier |
| 7,428,541 | B2 | 9/2008 | Houle |
| 7,433,517 | B2 | 10/2008 | Kato et al. |
| 7,441,186 | B2 | 10/2008 | Kasperkiewicz et al. |
| 7,526,128 | B2 | 4/2009 | Koubaroulis et al. |
| 7,809,195 | B1 | 10/2010 | Greene |
| 8,091,030 | B1 | 1/2012 | Ballagh et al. |
| 2001/0012400 | A1 | 8/2001 | Wang et al. |
| 2002/0194379 | A1 | 12/2002 | Bennett et al. |
| 2003/0046318 | A1 | 3/2003 | Schohn et al. |
| 2004/0145593 | A1* | 7/2004 | Berkner et al. ............... 345/619 |
| 2004/0146199 | A1 | 7/2004 | Berkner et al. |
| 2004/0194035 | A1 | 9/2004 | Chakraborty |
| 2004/0227758 | A1 | 11/2004 | Curry et al. |
| 2006/0104511 | A1 | 5/2006 | Guo et al. |
| 2006/0248070 | A1 | 11/2006 | Dejean et al. |
| 2006/0271847 | A1* | 11/2006 | Meunier ...................... 715/517 |
| 2006/0282769 | A1 | 12/2006 | Bronstein |
| 2006/0288278 | A1 | 12/2006 | Kobayashi |
| 2007/0038927 | A1 | 2/2007 | Dallett et al. |
| 2007/0250497 | A1* | 10/2007 | Mansfield et al. ................ 707/5 |
| 2007/0256010 | A1* | 11/2007 | Blackmon et al. ............ 715/517 |
| 2007/0291308 | A1* | 12/2007 | Miyamoto .................... 358/1.18 |
| 2009/0284780 | A1 | 11/2009 | Kitora et al. |
| 2010/0174732 | A1 | 7/2010 | Levy et al. |
| 2010/0174975 | A1 | 7/2010 | Mansfield et al. |
| 2010/0174976 | A1 | 7/2010 | Mansfield et al. |
| 2010/0174977 | A1 | 7/2010 | Mansfield et al. |
| 2010/0174978 | A1 | 7/2010 | Mansfield et al. |
| 2010/0174979 | A1 | 7/2010 | Mansfield et al. |
| 2010/0174980 | A1 | 7/2010 | Mansfield et al. |
| 2010/0174983 | A1 | 7/2010 | Levy et al. |
| 2010/0174985 | A1 | 7/2010 | Levy et al. |

OTHER PUBLICATIONS

Invitation to Pay Additional Fees and Partial International Search Report for PCT/US2009/069885, Oct. 6, 2010 (mailing date), Apple Inc.

Chao, Hui, et al., "Layout and Content Extraction for PDF Documents," Lecture Notes in Computer Science: Document Analysis Systems VI, Sep. 8-10, 2004, pp. 213-224, vol. 3163/2004, Springer-Verlag Berlin Heidelberg.

Lovegrove, William S., et al., "Document Analysis of PDF Files: Methods, Results and Implications," Electronic Publishing, Jun. & Sep. 1995, pp. 207-220, vol. 8(2&3), John Wiley & Sons, Ltd.

International Search Report and Written Opinion for PCT/US2009/069885, Feb. 18, 2011, Apple Inc.

Beusekom, Joost Van, "Diploma Thesis: Document Layout Analysis," Image Understanding and Pattern Recognition Group, Department of Computer Science, Month Unknown, 2006, pp. 1-67, Technische Universität Kaiserslautern.

Hassan, Tamir, et al., "Table Recognition and Understanding from PDF Files," Ninth International Conference on Document Analysis and Recognition (ICDAR), Sep. 23-26, 2007, pp. 1143-1147, IEEE.

U.S. Appl. No. 12/479,852, filed Jun. 7, 2009 Levy, Michael R., et al.

U.S. Appl. No. 12/479,843, filed Jun. 7, 2009, Mansfield, Philip A., et al.

U.S. Appl. No. 12/479,849, filed Jun. 7, 2009, Mansfield, Philip A., et al.

U.S. Appl. No. 12/479,850, filed Jun. 7, 2009, Mansfield, Philip A., et al.

U.S. Appl. No. 12/479,847, filed Jun. 7, 2009, Mansfield, Philip A., et al.

U.S. Appl. No. 12/455,866, filed Jun. 7, 2009, Levy, Michael R., et al.

U.S. Appl. No. 12/479,848, filed Jun. 7, 2009, Mansfield, Philip A., et al.

U.S. Appl. No. 12/479,842, filed Jun. 7, 2009, Mansfield, Philip A., et al.

U.S. Appl. No. 12/479,845, filed Jun. 7, 2009, Levy, Michael R., et al.

Updated portions of prosecution history of U.S. Appl. No. 12/479,852, Aug. 15, 2011, Levy, Michael Robert, et al.

Updated portions of prosecution history of U.S. Appl. No. 12/479,848, Aug. 26, 2011, Mansfield, Philip Andrew, et al.

Khramov, Yuri, et al., "Extracting Semantic Knowledge from PDF publications," XML 2001 Conference Paper, Dec. 2001, pp. 1-7, SchemaSoft, Vancouver, British Columbia, Canada.

Updated portions of prosecution history of U.S. Appl. No. 12/479,852, Sep. 21, 2011, Levy, Michael Robert et al.

Updated portions of prosecution history of U.S. Appl. No. 12/479,843, Oct. 7, 2011, Mansfield, Philip Andrew, et al.

Updated portions of prosecution history of U.S. Appl. No. 12/479,849, Oct. 6, 2011, Mansfield, Philip Andrew, et al.

Updated portions of prosecution history of U.S. Appl. No. 12/479,850, Nov. 4, 2011, Mansfield, Philip Andrew, et al.

Updated portions of prosecution history of U.S. Appl. No. 12/479,847, Nov. 3, 2011, Mansfield, Philip Andrew, et al.

Updated portions of prosecution history of U.S. Appl. No. 12/455,866, Oct. 7, 2011, Levy, Michael Robert et al.

Updated portions of prosecution history of U.S. Appl. No. 12/479,848, Oct. 28, 2011, Mansfield, Philip Andrew, et al.

Updated portions of prosecution history of U.S. Appl. No. 12/479,842, Oct. 31, 2011, Mansfield, Philip Andrew, et al.

Updated portions of prosecution history of U.S. Appl. No. 12/479,845, Oct. 7, 2011, Levy, Michael Robert et al.

Updated portions of prosecution history of U.S. Appl. No. 12/479,843, Jun. 11, 2012, Mansfield, Philip Andrew, et al.

Updated portions of prosecution history of U.S. Appl. No. 12/479,849, Jun. 12, 2012, Mansfield, Philip Andrew, et al.

Updated portions of prosecution history of U.S. Appl. No. 12/479,850, Apr. 13, 2012, Mansfield, Philip Andrew, et al.

Updated portions of prosecution history of U.S. Appl. No. 12/479,847, Jun. 15, 2012, Mansfield, Philip Andrew, et al.

Updated portions of prosecution history of U.S. Appl. No. 12/455,866, Jun. 15, 2012, Levy, Michael Robert et al.

Updated portions of prosecution history of U.S. Appl. No. 12/479,842, Jun. 15, 2012, Mansfield, Philip Andrew, et al.

Updated portions of prosecution history of U.S. Appl. No. 12/479,848, Apr. 5, 2012, Mansfield, Philip Andrew, et al.

Updated portions of prosecution history of U.S. Appl. No. 12/479,845, Mar. 28, 2012, Levy, Michael Robert, et al.

Portions of prosecution history of U.S. Appl. No. 12/479,852, May 13, 2011, Levy, Michael Robert, et al.

Portions of prosecution history of U.S. Appl. No. 12/479,850, Aug. 4, 2011, Mansfield, Philip Andrew, et al.

Portions of prosecution history of U.S. Appl. No. 12/479,847, Jul. 19, 2011, Mansfield, Philip Andrew, et al.

Portions of prosecution history of U.S. Appl. No. 12/455,866, Jul. 19, 2011, Levy, Michael Robert, et al.

Portions of prosecution history of U.S. Appl. No. 12/479,848, Jul. 26, 2011, Mansfield, Philip Andrew, et al.

Portions of prosecution history of U.S. Appl. No. 12/479,845, Jul. 20, 2011, Levy, Michael Robert, et al.

International Preliminary Report on Patentability for PCT/US2009/069885, Jul. 14, 2011 (mailing date), Apple Inc.

Altamura, Oronzo, et al., "Transforming Paper Documents into XML Format with Wisdom++," Month Unknown, 2001, International Journal on Document Analysis and Recognition, pp. 2-17.

Breuel, Thomas M., "High Performance Document Layout Analysis," Proceedings of Symposium on Document Image Understanding Technology, Apr. 9-11, 2003, University of Maryland, Maryland, USA.

Updated portions of prosecution history of U.S. Appl. No. 12/479,852, Jan. 23, 2012, Levy, Michael Robert et al.

Updated portions of prosecution history of U.S. Appl. No. 12/479,843, Feb. 20, 2012, Mansfield, Philip Andrew, et al.

Updated portions of prosecution history of U.S. Appl. No. 12/479,849, Mar. 12, 2012, Mansfield, Philip Andrew, et al.

Updated portions of prosecution history of U.S. Appl. No. 12/479,850, Jan. 17, 2012, Mansfield, Philip Andrew, et al.

Updated portions of prosecution history of U.S. Appl. No. 12/479,847, Feb. 1, 2012, Mansfield, Philip Andrew, et al.

Updated portions of prosecution history of U.S. Appl. No. 12/455,866, Jan. 30, 2012, Levy, Michael Robert et al.

Updated portions of prosecution history of U.S. Appl. No. 12/479,848, Jan. 30, 2012, Mansfield, Philip Andrew, et al.

Updated portions of prosecution history of U.S. Appl. No. 12/479,842, Jan. 30, 2012, Mansfield, Philip Andrew, et al.
Updated portions of prosecution history of U.S. Appl. No. 12/479,845, Mar. 6, 2012, Levy, Michael Robert et al.

* cited by examiner

2700

2705

2830

2825

Lorem ipsum dolor sit amet, consectetur adipisicing elit, sed do eiusmod tempor incididunt ut labore et dolore magna aliqua. Ut enim ad minim veniam, quis nostrud exercitation ullamco laboris.

Liqua. Ut enim ad minim veniam, quis nostrud exercitation ullamco laboris nisi ut aliquip ex ea commodo consequat. Duis aute irure dolor in reprehenderit in voluptate.

2810

Nisi ut aliquip ex ea commodo consequat. Duis aute irure dolor in repre henderit in voluptate velit esse cillum dolore eu fugiat nulla pariatur. Excep teur sint occae cat cupid atat non proi dent, sunt in.

Duis autem ure dolor in reprehenderit in volup tate velit esse cillum dolore nulla pariatur excepteur Velit esse cillum dolore eu fugiat nulla pari atur. Excepteur sint occaecat cupidatat non proident, sunt in culpa qui officia dese runt mollit anim id est lab orum. Lorem ipsum dolor sit amet, cons

2820

2815

Culpa qui officia deserunt mollit anim id est laborum. Lorem ipsum dolor sit amet, consectetur adipisicing elit, sed do eiusmod tempor incididunt ut labore et dolore magna.

ectetur adipisicing elit, sed do eiusmod tempor incididunt ut labore et dolore magna aliqua. Ut enim ad minim veniam, quis nostrud exercitation ullamco laboris nisi ut aliquip ex ea.

*Figure 28*

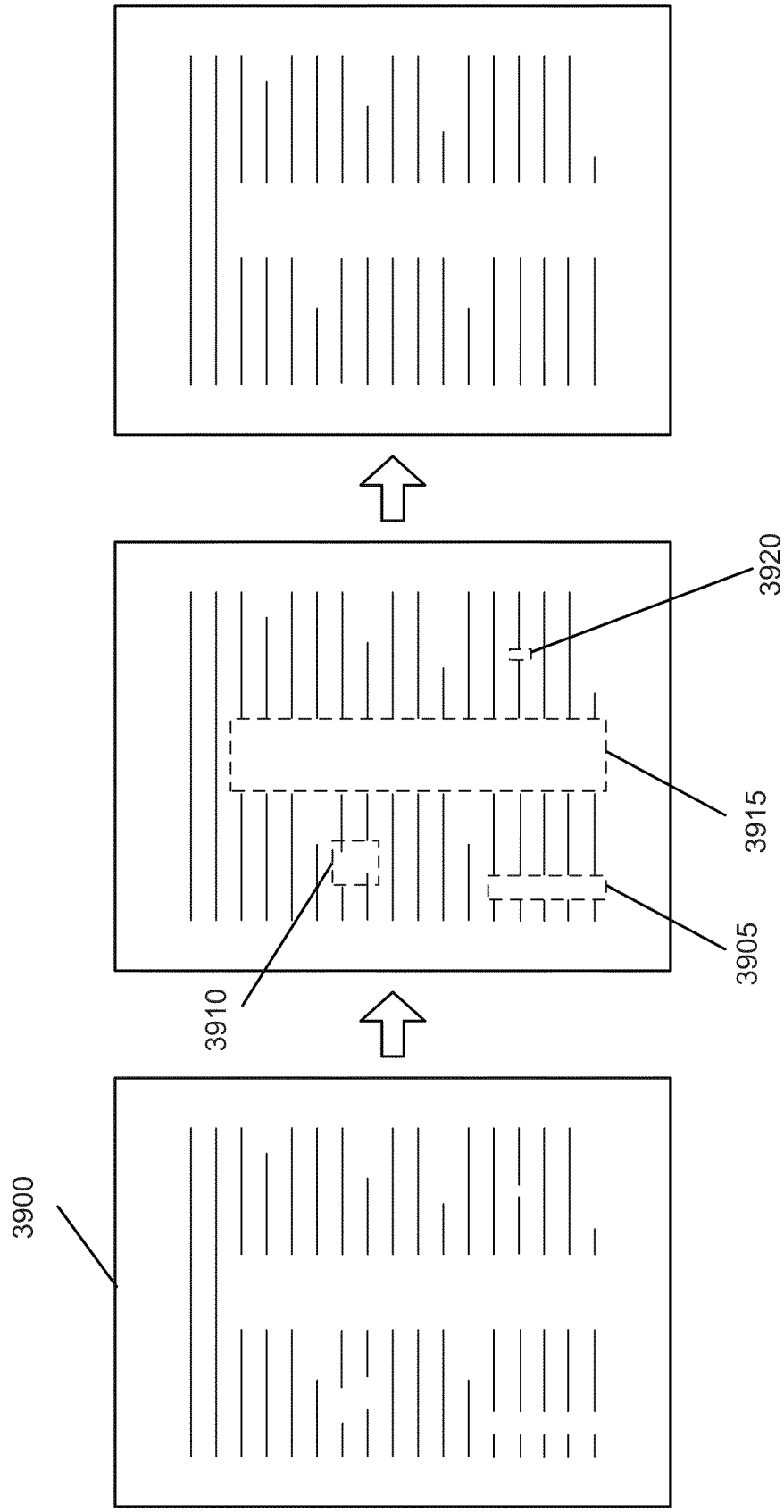

IDENTIFICATION OF COMPOUND GRAPHIC ELEMENTS IN AN UNSTRUCTURED DOCUMENT

CLAIM OF BENEFIT TO PRIOR APPLICATION

This application claims the benefit of U.S. Provisional Application 61/142,329, entitled "Methods and System for Document Reconstruction", filed Jan. 2, 2009, which is incorporated herein by reference.

CROSS REFERENCE TO RELATED APPLICATIONS

This application is related to the following applications: U.S. patent application Ser. No. 12/479,852, now published as U.S. Patent Publication 2010/0174732, filed Jun. 7, 2009; U.S. patent application Ser. No. 12/479,843, now issued as U.S. Pat. No. 8,261,186, filed Jun. 7, 2009; U.S. patent application 12/479,849, now published as U.S. Patent Publication 2010/0174979, filed Jun. 7, 2009; U.S. patent application Ser. No. 12/479,850, now published as U.S. Patent Publication 2010/0174980, filed Jun. 7, 2009; U.S. patent application Ser. No. 12/479,847, now published as U.S. Patent Publication 2010/0174978, filed Jun. 7, 2009; U.S. patent application Ser. No. 12/455,866, now published as U.S. Patent Publication 2010/0174958, filed Jun. 7, 2009; U.S. patent application Ser. No. 12/479,848, now published as U.S. Patent Publication 2010/0174975, filed Jun. 7, 2009; U.S. patent application Ser. No. 12/479,842, now published as U.S. Patent Publication 2010/0174976, filed Jun. 7, 2009; and U.S. patent application Ser. No. 12/479,845, now published as U.S. Patent Publication 2010/0174983, filed Jun. 7, 2009.

FIELD OF THE INVENTION

The invention is directed towards document reconstruction. Specifically, the invention is directed towards methods for defining a structured document from an unstructured document, for improving the efficiency of such processes, and for improving display of and interaction with structured documents.

BACKGROUND OF THE INVENTION

Documents are often defined as nothing more than a collection of primitive elements that are drawn on a page at defined locations. For example, a PDF (portable document format) file might have no definition of structure and instead is nothing more than instructions to draw glyphs, shapes, and bitmaps at various locations.

A user can view such a document on a standard monitor and deduce the structure. However, because such a file is only a collection of primitive elements, a document viewing application has no knowledge of the intended structure of the document. For example, a table is displayed as a series of lines and/or rectangles with text between the lines, which the human viewer recognizes as a table. However, the application displaying the document has no indication that the text groupings have relationships to each other based on the rows and columns because the document does not include such information. Similarly, the application has no indication of the flow of text through a page (e.g., the flow from one column to the next, or the flow around an embedded image), or various other important qualities that can be determined instantly by a human user.

This lack of knowledge about document structure will not always be a problem when a user is simply viewing the document on a standard monitor. However, it would often be of value to a reader to be able to access the file and edit it as though it were a document produced by a word processor, image-editing application, etc., that has structure and relationships between elements. Therefore, there is a need for methods that can reconstruct an unstructured document. Similarly, there is a need for methods that take advantage of such reconstructed document structure to idealize the display of the document (e.g., for small-screen devices where it is not realistic to display the entire document on the screen at once), or to enable intelligent selection of elements of the document.

In the modern world, more and more computing applications are moving to handheld devices (e.g., cell phones, media players, etc.). Accordingly, document reconstruction techniques must be viable on such devices, which generally have less computing power than a standard personal computer. However, document reconstruction often uses fairly computation and memory intensive procedures, such as cluster analysis, and the use of large chunks of memory. Therefore, there is further a need for techniques that allow for greater efficiency in document reconstruction generally, and cluster analysis specifically.

SUMMARY OF THE INVENTION

Different embodiments of the invention use different techniques for analyzing an unstructured document to define a structured document. In some embodiments, the unstructured document includes numerous primitive elements, but does not include structural elements that specify the structural relationship between the primitive elements and/or structural attributes of the document based on these primitive elements. Accordingly, to define the structured document, some embodiments use the primitive elements of the unstructured document to identify various geometric attributes of the unstructured document, and then use the identified geometric attributes and other attributes of the primitive elements to define structural elements, such as associated primitive elements (e.g., words, paragraphs, joined graphs, etc.), tables, guides, gutters, etc., as well as to define the flow of reading through the primitive and structural elements.

As mentioned, some embodiments use primitive elements to identify various geometric attributes. For instance, some embodiments provide a method that identifies boundaries between sets of primitive elements and regions bounded by the boundaries. The method uses the identified regions to define structural elements for the document, and defines a structured document based on the primitive elements and the structural elements. In some embodiments, defining structural elements includes analyzing each region separately to create associations between sets of primitive elements in the particular region. In some embodiments, defining the structured document includes identifying hierarchical relationships between the identified regions.

Some embodiments provide a method that analyzes an unstructured document that includes numerous words, where each word is an associated set of glyphs and each glyph has location coordinates. The method identifies clusters of location values, where each location value is associated with one word, is a basis for word alignment, and is derived from the location coordinates of the glyphs of that word. Based on the identified clusters of location values, the method defines a set of boundary elements for the words that identify a set of alignment guides for the words. The method defines a structured document based on the glyphs and the defined boundary elements. Some embodiments also define at least one region of white space between a pair of boundary elements and further define the structured document based on the region of white space. Some embodiments identify the clusters of location values by using density clustering.

Some embodiments use the identified geometric attributes and other attributes of the primitive elements to define structural elements as well as to define the flow of reading through the primitive and structural elements. For instance, some embodiments provide a method that analyzes an unstructured document that includes numerous glyphs, each of which has a position in the unstructured document. Based on the positions of glyphs, the method creates associations between different sets of glyphs in order to identify different sets of glyphs as different words. The method creates associations between different sets of words in order to identify different sets of words as different paragraphs. The method defines associations between paragraphs that are not contiguous in order to define a reading order through the paragraphs. In order to create associations between different sets of words in order to identify different sets of words as different paragraphs, some embodiments create associations between different sets of words as different text lines, and create associations between different sets of text lines as different paragraphs.

Some embodiments provide a method that identifies boundaries between sets of glyphs and identifies that several of the boundaries form a table. The method defines a tabular structural element based on the table that includes several cells arranged in several rows and columns, where each cell includes an associated set of glyphs. Some embodiments identify that the boundaries form a table by identifying a set of boundaries that form a larger rectangular shape and several rectangular shapes contained within the larger rectangular shape. In some embodiments, at least some of the identified boundaries are inferred based on positions of the associated sets of glyphs that form the cells.

Some embodiments provide a method for analyzing an unstructured document that includes numerous primitive graphic elements, each of which is defined as a single object. The document has a drawing order that indicates the order in which the primitive graphic elements are drawn. The method identifies positional relationships between successive primitive graphic elements in the drawing order. Based on the positional relationships, the method defines a single structural graphic element from several primitive graphic elements. Some embodiments identify a positional relationship between a first and second primitive graphic element that are subsequent in the drawing order by calculating a size of a structural graphic element that includes the first and second primitive graphic elements.

Some embodiments provide methods to make geometric analysis and document reconstruction more effective. For instance, some embodiments provide a method that provides a default set of document reconstruction operations for defining a structured document that comprises a plurality of primitive elements. The method provides a hierarchical set of profiles, each profile including (i) a set of document reconstruction results and (ii) results for modifying the document reconstruction operations when intermediate document reconstruction results match the potential document reconstruction results for the profile. Instructions from a profile at a lower level in the hierarchy override instructions from a profile at a higher level. In some embodiments, the instructions for a particular profile include a subset of profiles at a lower level in the hierarchical set of profiles that should be tested when the intermediate document reconstruction results match the potential document reconstruction results for the profile.

Once a structured document is defined, some embodiments provide various techniques for idealizing user interaction with the structured document. For instance, some embodiments provide a method for displaying a structured document that includes a hierarchy of structural elements constructed by analyzing an unstructured document. The method displays the structured document on the device (e.g., a small-screen device). The method receives a position of interest in the document, and identifies a structural element within the hierarchy as a region of interest based on the position of interest. The method modifies the display of the document to highlight the identified region of interest. Some embodiments identify the structural element by identifying a structural element at the lowest level of the hierarchy that includes the position of interest, and identifying structural elements at higher levels of hierarchy that include the structural element identified at the lowest level until a structural element qualifying as a region of interest is reached. Some embodiments also receive an input to move from the region of interest and modify the display of the document to highlight a structurally related region of interest.

Some embodiments provide a method for defining a selection of text in an unstructured document that includes numerous glyphs. The method identifies associated sets of glyphs and a reading order that specifies a flow of reading through the glyphs. The method displays the document and receives a start point and end point for a selection of text within the displayed document. The method defines the selection of text from the start point to the end point by using the identified sets of glyphs and intended flow of reading. In some embodiments, the associated sets of glyphs are paragraphs and the reading order specifies a flow of reading from a first paragraph to a second paragraph that are not contiguous.

Some embodiments provide methods that enhance the efficiency of the geometric analysis and document reconstruction processes. Some embodiments use cluster analysis for geometric analysis and/or document reconstruction, which can be a computing-intensive process. Accordingly, some embodiments provide a method that defines structure for an unstructured document that includes numerous primitive elements that are defined in terms of their position in the document. The method identifies a pairwise grouping of nearest primitive elements and sorts the pairwise primitive elements based on an order from the closest to the furthest pairs. The method stores a single value that identifies which of the pairwise primitive elements are sufficiently far apart to form a partition. The method uses the stored value to identify and analyze the partitions in order to define structural elements for the document.

Some embodiments also provide methods for making use of efficient data structures. For instance, some embodiments provide several different processes for analyzing and manipulating an unstructured document that includes numerous primitive elements. Some embodiments also provide a storage for data associated with the primitive elements. At least some of the data is stored in a separate memory space from the processes and is shared by at least two different processes. The processes access the data by use of references to the data. The data is not replicated by the processes.

BRIEF DESCRIPTION OF THE DRAWINGS

The novel features of the invention are set forth in the appended claims. However, for purpose of explanation, several embodiments of the invention are set forth in the following figures.

FIGS. 27-29 illustrate the identification of a gutter on a page.

FIG. 39 illustrates a sequence showing the identification of where to split lines of text on a page.

DETAILED DESCRIPTION OF THE INVENTION

Figure 1:
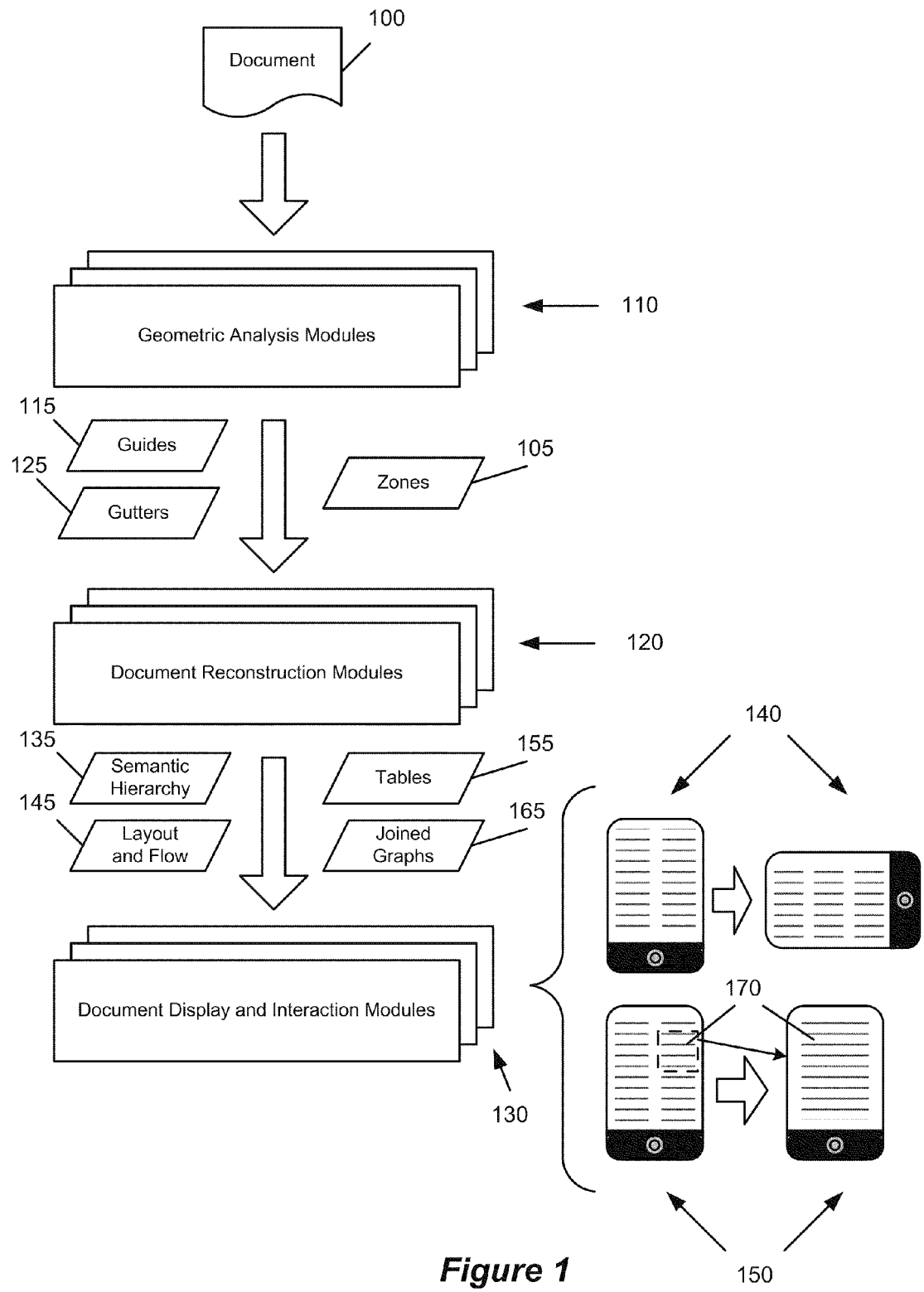
FIG. 1 illustrates the overall reconstruction flow of some embodiments.

In the following description, numerous details are set forth for purpose of explanation. However, one of ordinary skill in the art will realize that the invention may be practiced without the use of these specific details. For instance, in some cases, the techniques described below are described as taking place in a specific order. However, in some embodiments, the techniques are performed in an order different from that described. Furthermore, while the techniques are described for languages that are read left-to-right (e.g., English), one of ordinary skill will recognize that the techniques are easily adapted for right-to-left languages.

I. Overview

Some embodiments of the invention provide novel methods for defining a structured document from an unstructured document. In some embodiments, an unstructured document is a document defined to include only primitive elements such as shapes (e.g., vector graphics), images (e.g., bitmaps), and glyphs. In some embodiments, a glyph is a visual representation of a text character (e.g., a letter, a number, a punctuation mark, or other inline character), collection of characters, or portion of a character. In some embodiments, a glyph may be a pre-specified collection of scalable vector graphics including path definitions for the outline of the glyph. In some embodiments, a glyph may be a pre-specified raster image or collection of raster images optimized for various sizes. As an example, the character "i" could be represented by a single glyph that is a path with two sub-paths, one for the outline of the dot and one for the outline of the lower portion. As another example, the combination of three characters "ffi", when occurring in sequence, are sometimes represented by a single glyph called a ligature, drawn in a slightly different manner than the characters occurring individually. As a third example, accented characters such as "ê" are sometimes represented by more than one glyph (e.g. one for the character and one for the accent) and are sometimes represented by a single glyph (combining accent with character).

The unstructured document of some embodiments does not specify any relationship or association between the primitive elements, while in other embodiments it specifies a minimum amount of such relationships and associations. In some embodiments, the unstructured document may have some amount of structure, but the structure is unrecognizable or not relied upon. In some embodiments the unstructured document has an unknown structure or is assumed to be unstructured.

Some embodiments generate, from the unstructured document, a structured document that includes associations and relationships between the primitive elements, groupings and orderings of the primitive elements, and properties of the groups of primitive elements. For instance, some embodiments use the primitive elements of the unstructured document to identify various geometric attributes of the unstructured document and use these identified geometric attributes (along with other attributes of the primitive elements) to define structural elements. Structural elements of some embodiments include associated primitive elements (e.g., words, paragraphs, joined graphs, etc.), guides, gutters, text flow, tables, etc. These structural elements are related in a hierarchical manner in some embodiments (e.g., a paragraph includes text lines, a text line includes words, and a word includes primitive glyphs). In some embodiments, the structured document serves two purposes—it identifies associated elements (e.g., the elements making up a table) and it identifies a flow order through the primitive elements (i.e., the order in which a human would be expected to read through the primitive elements in the document).

Upon receiving an unstructured document, some embodiments first parse the document into its constituent elements (e.g., primitive elements and their associated information such as coordinate locations, drawing order, etc.). For instance, a large block of text might be defined in the unstructured document as a number of character glyphs, each having x- and y-coordinates at which their anchors are placed on a particular page along with a scale factor determining the size of each glyph (and any other linear transforms that are to be applied), each glyph to be drawn on the page in a particular order (relevant to the compositing operation performed when one glyph overlays another). Some embodiments then perform geometric analysis on the primitive elements to define geometric attributes of the document. For example, some embodiments analyze the primitive elements to identify boundaries between primitive elements and regions bordered by the boundaries.

FIG. 1 illustrates the overall flow of some embodiments. As shown, a document 100 is initially (after parsing to identify the primitive elements, in some embodiments) analyzed by the geometric analysis modules 110. Geometric analysis modules 110 analyze a document to identify geometric attributes such as boundaries and regions bordered by the boundaries. In some embodiments, the regions include zones that are bordered by primitive elements such as straight lines and narrow rectangles (i.e., particular primitive shapes and images).

Figure 2:
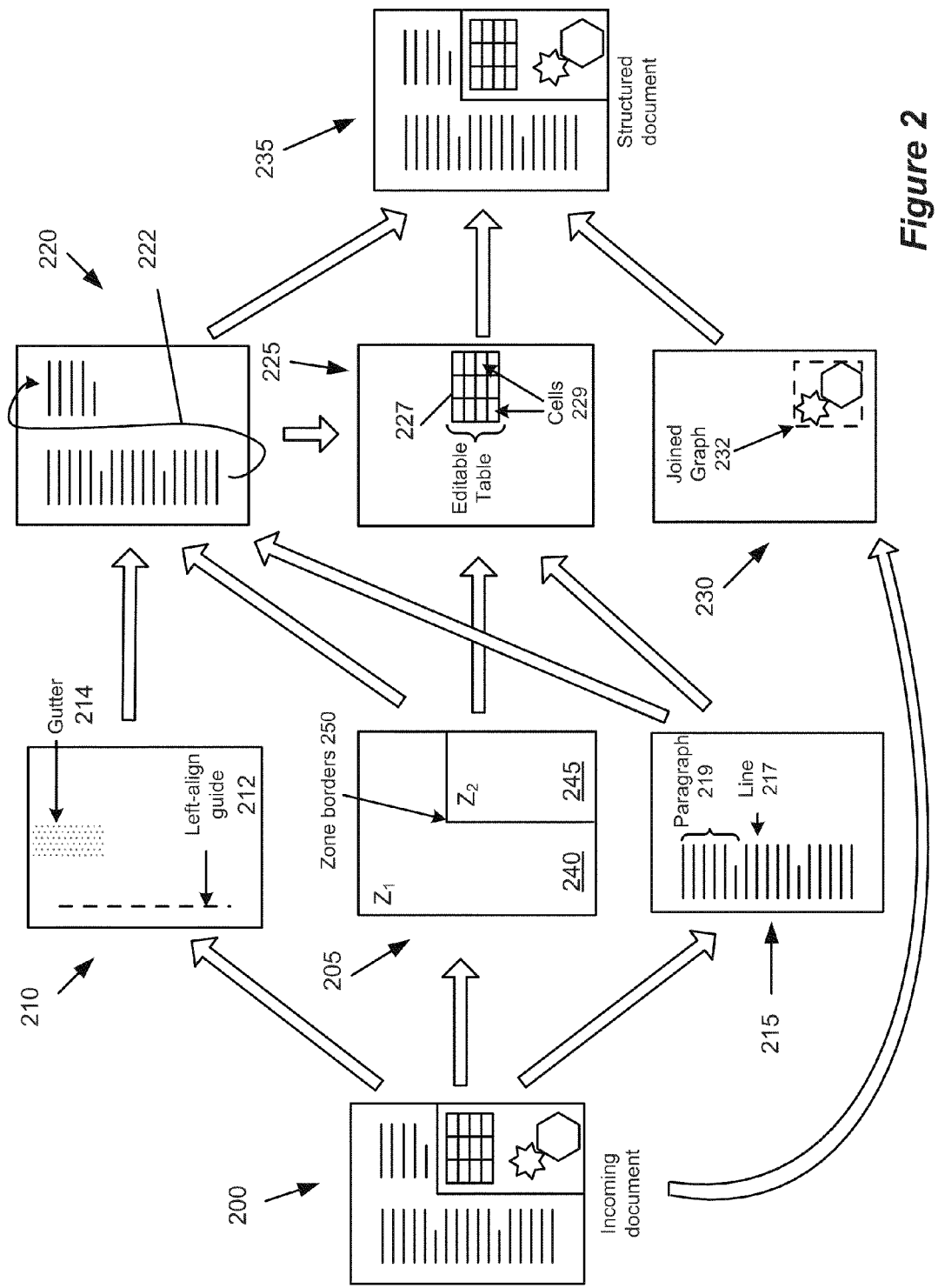
FIG. 2 illustrates a page of a document and various results from geometric analysis and document reconstruction of some embodiments being performed on the page.

FIG. 2 illustrates a page 200 of an incoming document and various results from geometric analysis and document reconstruction. The incoming document is an unstructured document that has a collection of primitive elements that a human viewing the document would recognize as text, borders, a table, and a graphic object. Analysis result 205 illustrates that the geometric analysis modules 110 have recognized two zones $Z_1$ 240 and $Z_2$ 245 separated by boundaries 250 in document 200.

In some embodiments, the boundaries identified by geometric analysis modules 110 also include alignment guides. In some embodiments, an alignment guide is a vertical edge formed by the beginning or end of words (e.g., at the left edge of a column of left-aligned text). Similarly, in some embodiments, the regions identified by geometric analysis include gaps of unfilled white space between groups of glyphs (e.g., between guides). These gaps are called gutters in some embodiments.

Analysis result 210 illustrates a left-alignment guide 212 at the left edge of the first column of text and a gutter 214 spanning the white space between the two columns of text (for simplicity, the other guides and the columns of text are not shown). As illustrated in FIG. 1, the output of the semantic analysis modules 110 of some embodiments is zones 105, guides 115, and gutters 125.

The data output from geometric analysis modules 110 is sent to document reconstruction modules 120. Document reconstruction modules 120 continue the process of analyzing the unstructured document to define a structured document. In some embodiments, document reconstruction modules 120 create associations between primitive elements in order to define contiguous structural elements such as text, tables, and shapes. Some embodiments also define a hierarchy of the structural elements and relationships between the structural elements.

For instance, in some embodiments, the document reconstruction modules 120 create associations between glyphs, sets of glyphs, sets of sets of glyphs, etc. Some embodiments associate individual glyphs into words, words into text lines, text lines into paragraphs, etc. Analysis result 215 illustrates that individual lines 217 and paragraphs 219 are identified within the first column of text.

The document reconstruction modules 120 also identify the layout of glyphs in order to define the text flow through the glyphs. Specifically, to define the text flow, some embodiments identify a reading order through the glyphs (or through the sets of glyphs), which represents the order in which a human would be expected to read through the glyphs on a page (e.g., from the bottom of a first column to the top of a second column, then skipping a separated text box in the center, etc.) Analysis result 220 illustrates that two columns are identified within the document 200 and that the reading flow 222 runs from the bottom of the first column to the top of the second column. In some embodiments, the identification and definition of layout and flow makes use of the zone results 205, the guide and gutter results 210, and the glyph association results 215.

The document reconstruction modules 120 also define other structural elements in a document that are associations between primitive elements other than glyphs or between structural elements. For instance, in some embodiments, document reconstruction modules 120 identify tables in a document as associations between regions identified by geometric analysis modules 110 as well as the glyphs and sets of glyphs within the regions. For example, some embodiments associate regions as cells of a table, and the glyphs inside each region as the table information. Analysis result 225 illustrates the identification of a table 227 with nine cells 229 in document 200 by document reconstruction modules 120. Some embodiments associate the primitive elements that form the table by defining a tabular structural element. Whereas in the initial document, what was viewed as a table was defined as an unassociated collection of primitive elements (lines and glyphs), after reconstruction the cells are identified in the tabular structural element as table cells and are individually or collectively editable. As further illustrated, in some embodiments, the table identification and reconstruction uses zone results 205, glyph association results 215, and layout and flow results 220.

Some embodiments also identify when two or more primitive graphic elements or graphic objects (e.g., shapes, images, photographs, bitmaps, etc.) in the document should be grouped as one structural graphic element. For instance, two objects that mostly overlap may be one element that is defined as two shapes or images in the unstructured document. The document reconstruction modules 120 join these two objects as one object. Analysis result 230 illustrates that the two primitive shapes (a star and a hexagon) from the initial document 200 have been joined as one graphic 232 by the document reconstruction modules 120.

As illustrated in FIG. 1, examples of the output of the document reconstruction modules 120 include semantic hierarchy data 135 (i.e., associations of glyphs), layout and flow data 145, table data 155, and joined graph data 165. Furthermore, in some embodiments, some of this information is also passed between the several document reconstruction modules 120. FIG. 2 illustrates that all of this information is used to define a structured document 235. Structured document 235 has the same appearance as unstructured document 200, but the structured document 235 includes information about the structural elements and the associations, relationships, and hierarchy of elements, thereby enabling editing, more intuitive display, etc.

The data from the document reconstruction modules 120 (as well as, in some embodiments, data from the geometric analysis modules 110) is used by document display and interaction modules 130. Document display and interaction modules 130 enable a user to view, edit, scroll through, etc. a document. For example, sequence 140 illustrates a document displayed as two columns of text on a handheld device that is held upright. When the handheld device is rotated on its side, the text in the two columns is rearranged into three columns. This rearrangement cannot be done with an unstructured document, because it relies upon the associations between elements, especially the flow of text through glyphs that is not part of the unstructured document.

In some embodiments, document display and interaction modules 130 can also recognize a structural element (e.g., a paragraph, graphic object, etc.) that has been selected by a user and intelligently zoom to display the selected element. In some embodiments, the user selects a position of interest (i.e., a particular location in a displayed document), and the display and interaction modules 130 identify a qualifying structural element in the hierarchy of structural elements. Some embodiments define particular types of structural elements as qualifying structural elements. The qualifying structural element is used to define a region of interest that is highlighted in the display in some embodiments.

Sequence 150 illustrates a selection of a paragraph 170 (e.g., by a selection of a position of interest of interest within the paragraph) and the subsequent intelligent display of the paragraph and nearby text. Document display and interaction modules 130 also provide other features such as intelligent selection of text and graphic objects, intelligent scrolling through a document, etc.

Some embodiments use hierarchical profiling to modify how geometric analysis and document reconstruction are performed on the fly, using intermediate analysis and reconstruction results. Some embodiments check the intermediate results against profiles that indicate what type of content a document includes and alter the reconstruction processes accordingly. In some embodiments, the hierarchical profiles can instruct the analysis and reconstruction modules to perform more or less processes, perform processes differently, or re-perform processes. For instance, if intermediate analysis results indicate that a document is one page long, has one column of text, and no shapes or images, then some embodiments will only perform processes to associate the glyphs into words, lines, and paragraphs. Table identification, for instance, will not be performed.

Some embodiments employ various novel efficiency techniques for more efficient memory and processing usage. For instance, some embodiments perform some of the above described processes by using cluster analysis, which is a technique used to identify groups of elements that are closely spaced in some way relative to other elements. Some embodiments use cluster analysis to identify guides based on numerous words starting at, ending at, centered on or otherwise aligned with the same or nearly the same x-coordinate. Some embodiments use cluster analysis to recognize different size gaps between glyphs so as to identify gaps between words and gaps larger than those between words. Some embodiments also use cluster analysis to identify primitive graphics (e.g., shapes, images) that should be joined into single graphics.

Some embodiments perform cluster analysis efficiently by using ordered data (e.g., primitive element position data) that references unsorted data, and by storing partitions of the data using a single value. A partition, as this term is used in the present invention, divides a sequence, or linearly ordered set, into subsequences, which are subsets of the sequence with the same order relation. Furthermore, a partition has the properties that (i) every member of the original sequence is contained in exactly one of the partition's subsequences, and (ii) given two of the partition's subsequences S and T, either all the members of S are less than all the members of T or all the members of T are less than all the members of S, according to the order relation. Storing a partition as a single value enables various cluster analysis functions, such as examining multiple partitions, to be performed more efficiently in some embodiments.

Some embodiments also gain efficiency in the document reconstruction process by using an application programming interface (API) that minimizes the amount of copying of data while appearing to the user of the API (e.g., a programmer or a software application using the API) as though the data is freely modifiable. Some embodiments store data in a randomly ordered array, then define a sorted array of references to the data and share this sorted array among numerous collection objects (e.g. character sequence objects, which are collections of character data) to optimize the usage of memory and processing. Both of these efficiency enhancements, as well as others, are used in some embodiments to enable document reconstruction to be performed on a limited-resource device, such as a cell phone, media player, etc. (e.g., an iPhone®).

Although the above-described overview of some embodiments was provided by reference to the examples illustrated in FIGS. 1 and 2, one of ordinary skill will realize that these examples were meant only as exemplary embodiments that introduced the features and operations of some embodiments of the invention. One of ordinary skill will realize that many embodiments have features and operations that are different than those illustrated in FIGS. 1 and 2. For instance, although geometric analysis has been described as one set of modules 110, one of ordinary skill would recognize that some embodiments do not necessarily identify all geometric attributes at once. For example, some embodiments do a subset of geometric analysis first (e.g., region analysis to identify one or more zones in the document) and then guides and gutters are identified on a zone-by-zone basis.

More detailed examples of some embodiments will be described below. Section TI describes the identification of regions (i.e., zones) of a document based on boundary primitive elements and the definition of a hierarchical structure (e.g., a document object model) that forms the framework of a structured document. Section III then describes the identification of boundary elements for glyphs (e.g., alignment guides) and particular empty spaces between alignment points (gutters). Next, Section IV details the creation of associations between glyphs and sets of glyphs to define structural elements such as words, text lines, paragraphs, columns, etc., as well as the definition of a flow order through these structural elements (as well as other elements such as graphics, tables, etc.). Section V describes the identification of primitive graphic elements that should be grouped together and the creation of associations between such primitive elements to define compound graphic elements.

Section VI then describes various methods for improving the efficiency of cluster analysis techniques, which (among other uses) are used for identification of alignment guides, words and glyph spacing, and compound graphics in the document reconstruction process. Next, Section VII details methods and data structures that enable more efficient parsing and analysis of a document. These data structures illustrate one manner of creating associations between glyphs (e.g., to form words, text lines, paragraphs, etc.) that can be used in the document reconstruction process. However, one of ordinary skill in the art will recognize that many other ways of creating associations between primitive elements (e.g., glyphs, graphic elements, etc.) to define structural elements (e.g., paragraphs, tables, compound graphics, etc.) are possible, as is well known in the art. Next, Section VIII describes the software architecture of a document reconstruction application of some embodiments, and Section IX describes a computer system that implements some embodiments of the invention.

II. Zone Analysis

When there are multiple articles, sections or categories of information on a page, these are often delineated by lines, images or shapes. Although a human can easily identify the manner in which graphical cues are intended to indicate how the page is broken up into zones, this is a nontrivial problem for a computer (particularly in the presence of a mixture of graphic primitive elements, some of which are intended as page content while others are intended to delineate content zones).

Some embodiments of the invention provide methods for identifying boundaries and the regions bordered by those boundaries (e.g., zones) based on the primitive elements (e.g., the shapes and images) of an unstructured document. In some embodiments, the regions are used in subsequent reconstruction of the document as well as for compartmentalization of further reconstruction processes. Some embodiments generate a region graph (i.e., hierarchical structure such as a tree) that is populated with content and enables the association of content with the region in which the content is located. Some embodiments perform the region identification on a page-by-page basis.

Figure 3:
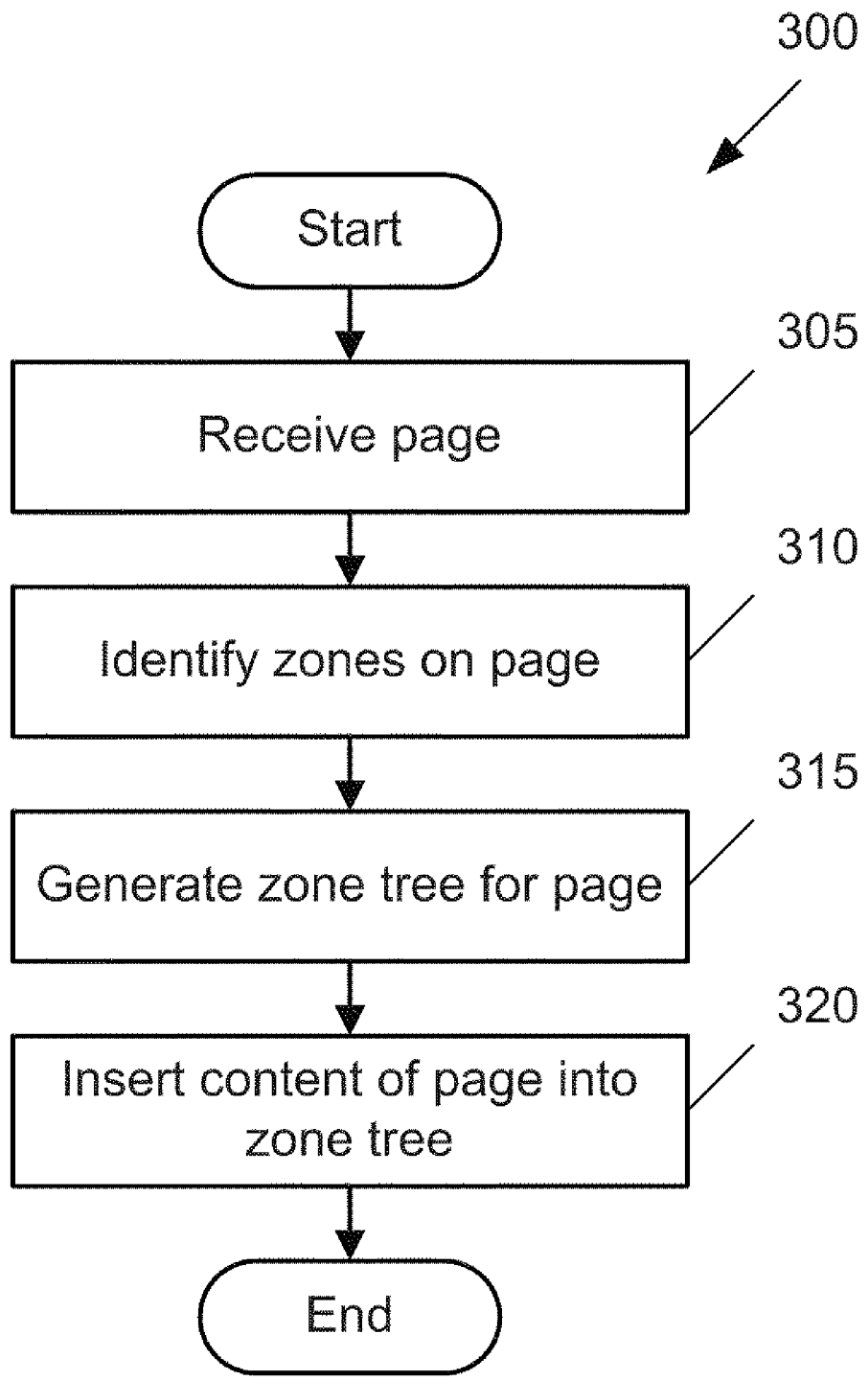
FIG. 3 conceptually illustrates a process of some embodiments for identifying zones of a page of a document and generating a zone tree for the page.
Figure 4:
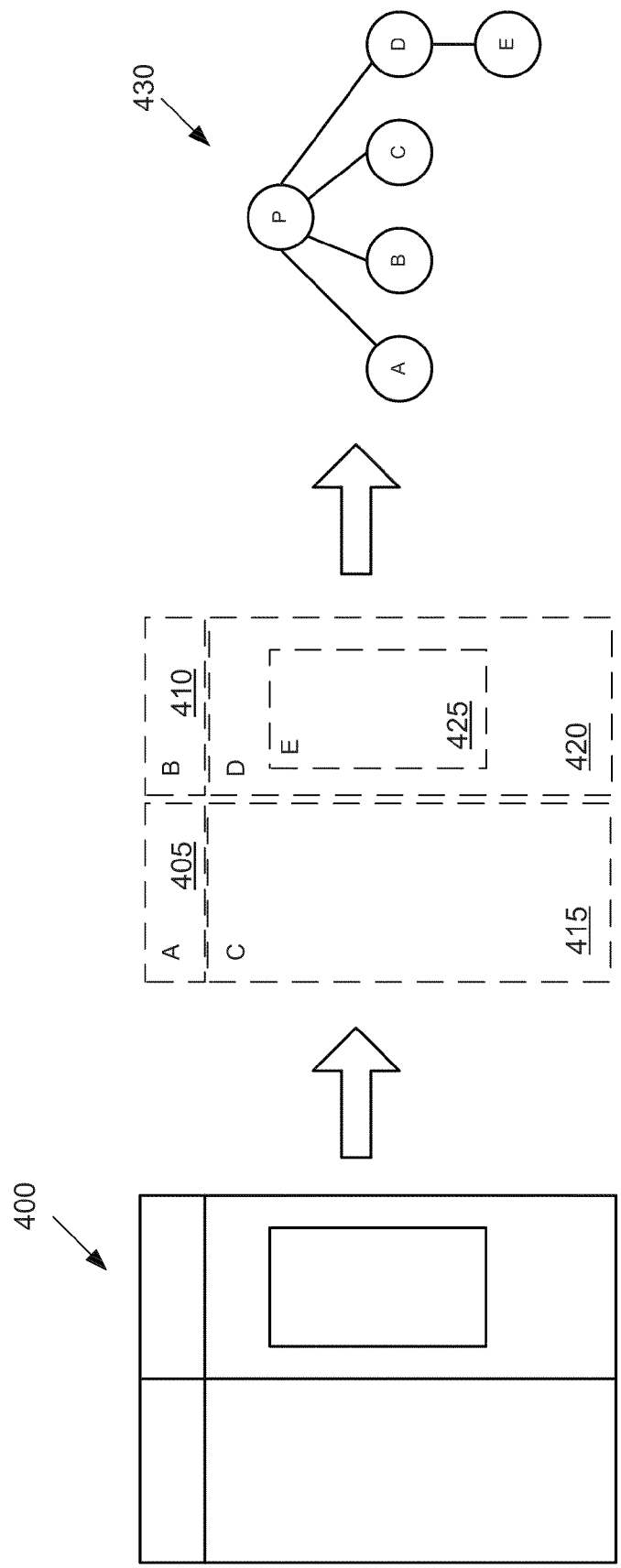
FIG. 4 illustrates a page and a sequence of identifying zones of the page and generating a zone tree for the page in some embodiments.

FIG. 3 conceptually illustrates a process 300 for identifying zones of a page of a document and generating a zone tree for the page in some embodiments. Process 300 will be described in conjunction with FIG. 4. FIG. 4 illustrates a page the sequence of identifying zones of a page 400 of a document and generating a zone tree 430 for the page according to some embodiments. As shown in FIG. 3, process 300 begins by receiving (at 305) a page of a document. In some cases a document includes numerous pages (e.g., an e-book), whereas in other cases a document will only be one page (e.g., an advertisement flyer).

Next, the process identifies (at 310) zones on the page. In some embodiments, the identification of zones includes identifying zone borders and intersections and then traversing the zone borders to identify the zones. Referring to the example of FIG. 4, process 300 identifies that page 400 includes five zones: zones A 405, B 410, C 415, D 420, and E 425.

After identifying the zones, process 300 generates (at 315) a zone graph (i.e., hierarchical structure such as a tree) for the page. The zone graph illustrates the hierarchy of the zones. For instance, zone tree 430 illustrates that a zone for the page (node P) includes four zones A, B, C, and D. Furthermore, zone D includes zone E, as zone E is fully within zone D. In some embodiments, a first zone is the parent of a second zone when the second zone is wholly within the first zone. A parent and a child can share one or more borders in some embodiments.

After generating the zone graph, process 300 inserts (at 320) the content of the page into the zone graph. The process then ends. In some embodiments, a page includes text, graphics, or other content. Each particular content grouping (e.g., an image, paragraph, column, etc.) is placed as a child of the smallest zone that fully contains the particular content grouping. In some embodiments, the insertion of content objects into the zone graph is performed later in the document reconstruction process, once the content has been further analyzed (e.g., grouping text into paragraphs, identifying tables, etc.). Furthermore, as document reconstruction is performed, some embodiments update the zone graph with content subtrees for each zone.

A. Terminology

Figure 5:
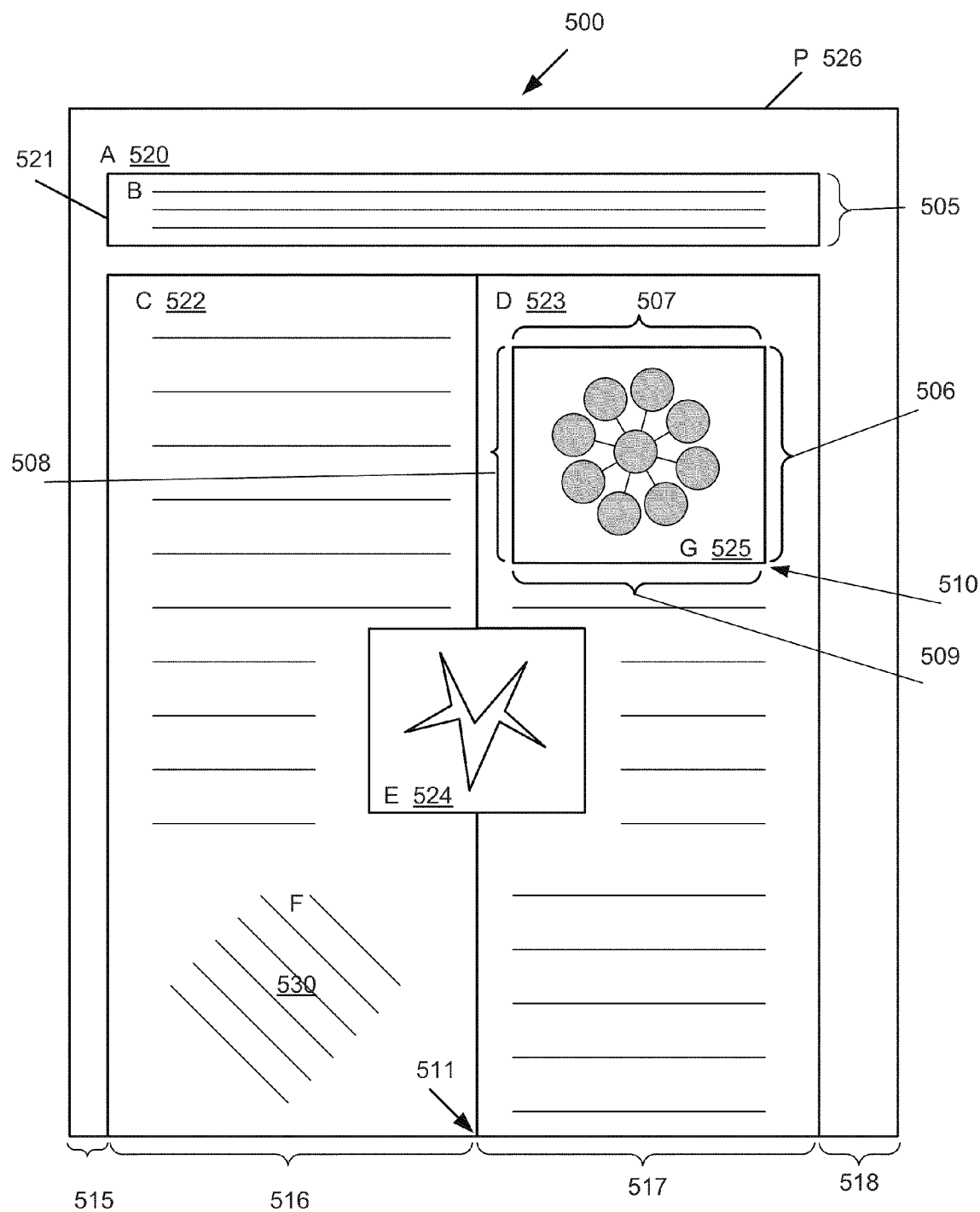
FIG. 5 illustrates a page of a document that includes several zones.

FIG. 5 illustrates a page 500 of a document that includes several zones. Page 500 includes numerous zone borders, including zone borders 505-509. Zone borders, in some embodiments, are horizontal or vertical (i.e., rectilinear) strips with a thickness defined by the zone border graphics that contribute to the zone border. The thickness of a zone border, in some embodiments, is the width, in its narrow direction, of an upright bounding box of the zone border graphics that contribute to the zone border. In some embodiments, an upright bounding box for a particular element or set of elements is the smallest upright rectangle (in the coordinate system being analyzed) that fully envelops the element or set of elements.

Zone border graphics are graphic objects (e.g., shapes, images, lines) on a page that either are narrow rectangles or have an upright bounding box that is a narrow rectangle For instance, zone borders 505-509 are all lines with a particular (relatively narrow) thickness. In some embodiments, zone border graphics include relatively narrow objects, all or part of the rendering of which fills all or part of a zone border. In some embodiments, zone border graphics also include objects whose boundary contributes to a zone border (e.g., one side of a filled polygon can indicate all or part of a zone border even though the polygon itself is not narrow and does not fit in the border bounds).

Figure 6:
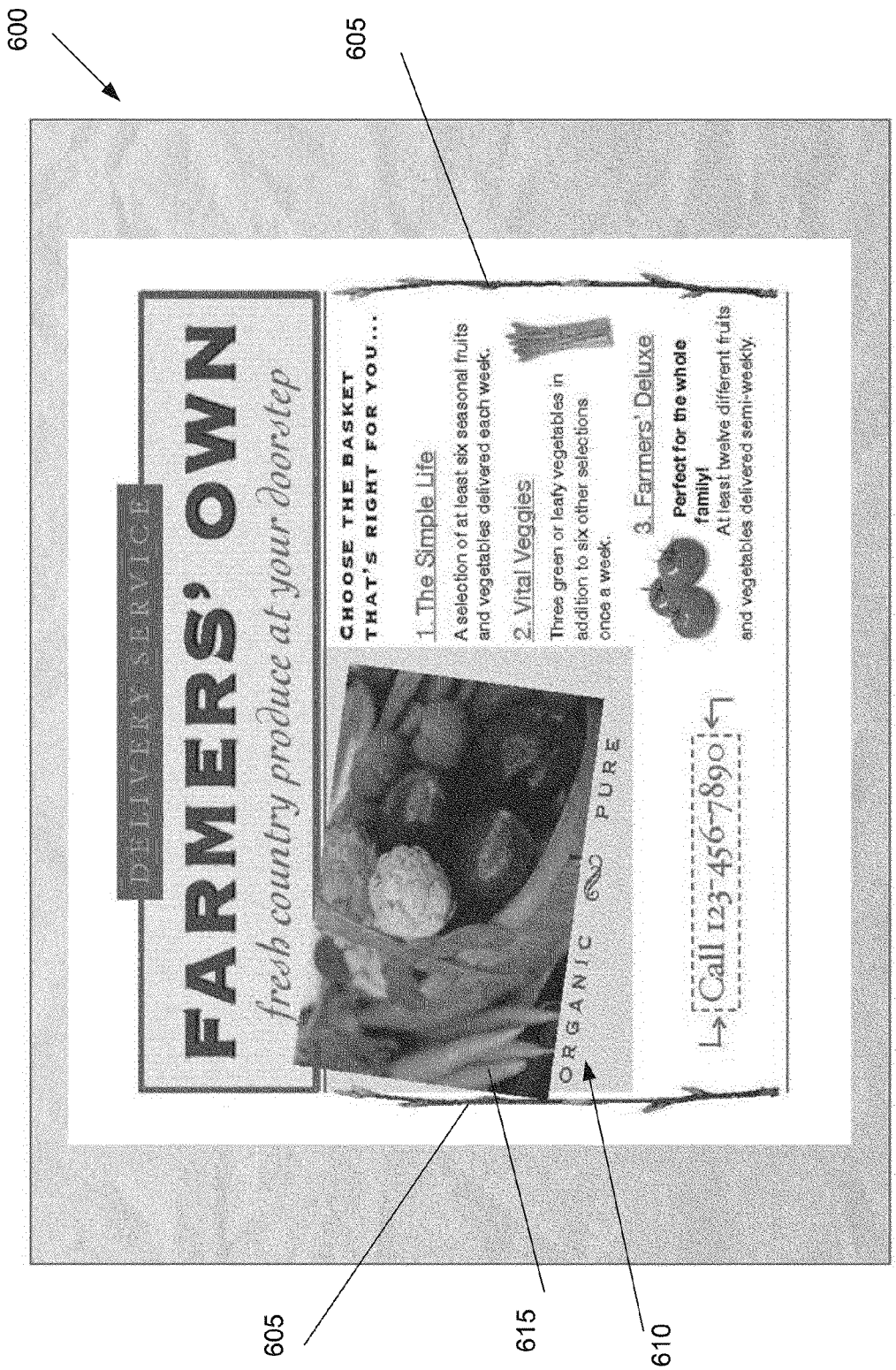
FIG. 6 illustrates a page that includes zone border graphics and multiple zones, including rotation groups.

Zone borders graphics, however, need not be perfectly straight lines or perfectly rectilinear. For instance, FIG. 6 illustrates a page 600 that includes zone border graphics 605. Zone border graphics 605 are not perfectly vertical strips: instead they are images of twigs that are aligned very close to vertically. Some embodiments will recognize the graphic as a zone border graphic, whereas some embodiments will not.

Page 500 of FIG. 5 also includes numerous zone border intersections, such as intersections 510 and 511. In some embodiments, a zone border intersection is a rectangular intersection of a horizontal zone border with a vertical zone border. As intersection 511 illustrates, a zone border intersection need not be at the end of a zone border. Zone border intersections in the middle of a zone border break the zone border into one or more zone border intervals, in some embodiments. For instance, the bottom zone border of page 500 is broken into zone border intervals 515, 516, 517, and 518.

A zone, therefore, is a closed region bounded by a collection of zone border intervals that form an upright rectilinear shape in some embodiments. Upright rectilinear shapes are any polygons that can be formed by horizontal and vertical line segments, including but not limited to upright rectangles, which are rectangles formed from horizontal and vertical line segments. Each zone has an upright rectilinear outer bound which is a shape formed from the outer sides of its zone border bounding rectangles. Each zone also has an upright rectilinear inner bound, which is a shape formed from the inner sides of its zone border bounding rectangles.

Page 500 includes zones P 526 (the page bounds), A 520 (an arch-shaped zone that includes the thin strips on the left and right side as well as the area above zones C and D), B 521, C 522 (the left zone that shares borders with zone E), D 523 (the right zone that is a mirror image of zone C), E 524, and G 525. Zones have outer bounds and inner bounds in some embodiments, defined by the outer and inner sides of the zone borders.

Figure 7:
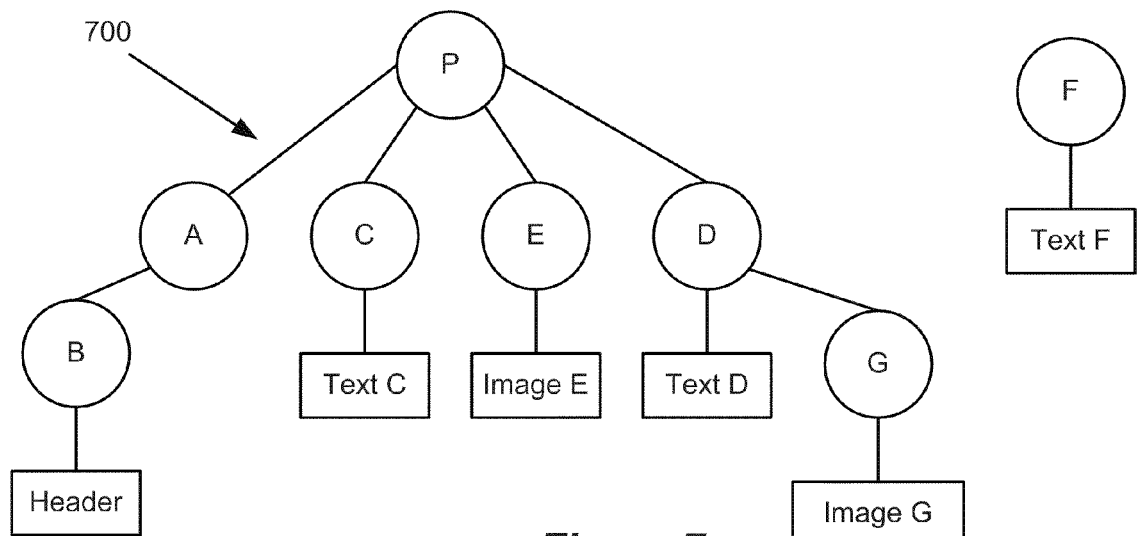
FIG. 7 illustrates a zone tree of some embodiments for the page from FIG. 5

FIG. 7 illustrates a zone tree 700 for page 500, with zone P (the page borders) a parent of zones A, C, E, and D; zone B a child of zone A; and zone G a child of zone D. Zones B, E and G are examples of islands. An island is a zone that does not share a border interval with its parent zone. Although zone E shares its border intervals with zones C and D, because neither of those zones actually encloses zone E, neither of them is a parent of zone E. The zone tree also illustrates that the nodes have been populated by the content that they include. In some embodiments, the portion of a document object model (DOM) for each page is built on the nodes of the zone tree of the page. A document object model is a representation of a document as a graph whose nodes are objects. In some embodiments, this graph is a tree, its leaf nodes represent primitive elements, and its non-leaf nodes are structure objects that express the relationships between their child nodes as well as the properties that those child nodes have as a group. In some embodiments, the order of the children of a node represents the reading order of those children. In some embodiments, the root node is a document node, its children are page nodes, the zone tree descends from each page node, a flow tree (including nodes representing structures such as tables, text boxes, layouts, columns, paragraphs, lists, and text lines) descends from some of the zone nodes, and nodes representing primitive elements (such as glyphs, shapes and images) are the children of some of the nodes in the flow tree. In some embodiments the structure nodes include properties that express relationships between nodes in addition to the relationships expressed by the tree's parent-child relationships (its directed graph edges). For example, the paragraph that starts a new column may be a continuation of the paragraph that ends a previous column, without a paragraph break between the two. In this case, there would be two paragraph nodes in the tree, each with a different column node parent, but they would have properties pointing to one another to indicate that they are two nodes representing parts of a single, common paragraph. A DOM, in some embodiments, is a hierarchical representation of a document that includes all the structural elements of the document. Some embodiments define content to be a child of a particular zone when the content is located entirely inside the outer bound of a particular zone and is not located entirely inside the outer bound of any child of the particular zone. As such, zone B includes header text, zones C and D include standard text, and zones E and G include images.

B. Rotation Groups

Figure 8:
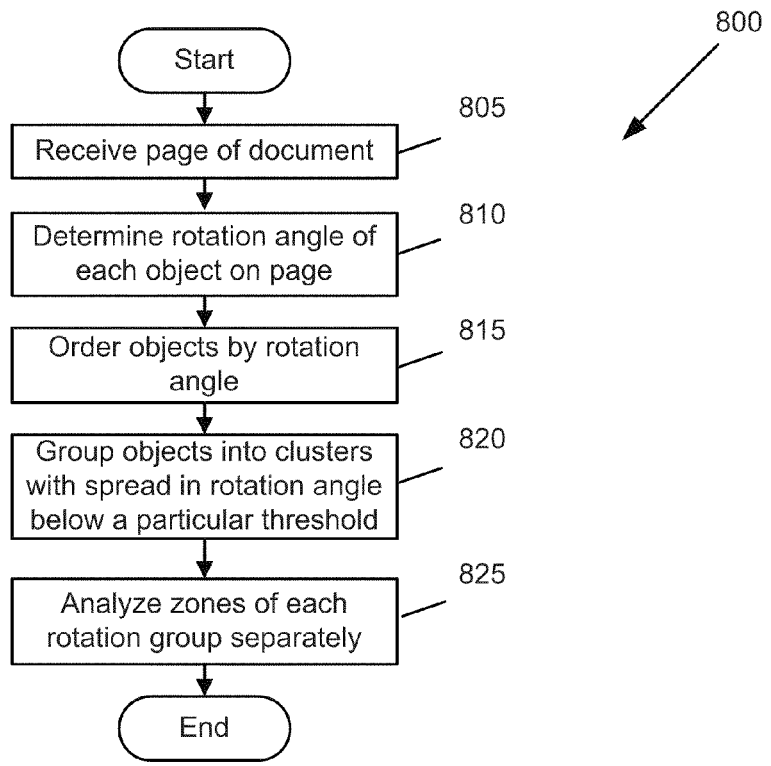
FIG. 8 conceptually illustrates a process of some embodiments for defining rotation groups on a page.

Some embodiments define several rotation groups on a page and analyze the zones and content of each rotation group separately. In some embodiments, rotation groups are similar to zones except that they do not have any zone borders. Instead, a rotation group is defined to include all content that is rotated by the same angle (or nearly the same angle to within a particular threshold that is sufficiently small as to be difficult for a human viewer to distinguish). FIG. 8 conceptually illustrates a process 800 of some embodiments for defining rotation groups on a page. As shown, process 800 receives (at 805) a page of a document. In some cases, the page is the only page of the document, whereas in other cases the page is one of multiple pages. Some embodiments perform rotation group analysis for a multi-page document (or a multi-page section) all at once, rather than page-by-page.

The process then determines (at 810) the rotation angle of each object on a page. In some embodiments, irregularly-shaped images are assumed to have a rotation angle of zero.

For instance, the image in zone E of page 500 is irregularly shaped, and would not be given a non-zero rotation angle. Horizontally-aligned text also has a rotation angle of zero, while text that is aligned off the x-axis is given a rotation angle. For example, the text in region F 530 of page 500 would have a rotation angle of approximately −45 degrees. Similarly, the text 610 ("Organic" and "Pure") in page 600 would have its own rotation angle. In embodiments that also place graphic objects into rotation groups, the rectangular image 615 above text 610 would have the same rotation angle as text 610.

Next, process 800 orders (at 815) the objects by rotation angle. The process then groups (at 820) the objects into clusters with a spread in rotation angle that is below a particular threshold. In some embodiments, the spread that is compared to the particular threshold is the smallest rotation angle in the group subtracted from the largest rotation angle in the group. The use of a non-zero threshold allows the grouping to account for minor errors in the content definition in the initially received document (e.g., a line of text that is very slightly off of horizontal).

Process 800 then analyzes (at 825) each rotation group separately. The process then ends. On most pages, most of the analysis will involve the upright (zero angle) group. Some embodiments do not perform zone analysis for groups other than the upright group, and instead simply classify the content of the rotated groups as children of the page as a whole. In some embodiments, each rotation group has a coordinate system in which its content appears upright. In such embodiments, each rotation group has its own zone tree with content that fits into the DOM for the document. Some embodiments define one rotation group for each distinguishable angle by which content on the page is rotated. The analysis on each group is described in detail below.

C. Identifying Zone Borders and Intersections

Figure 9:
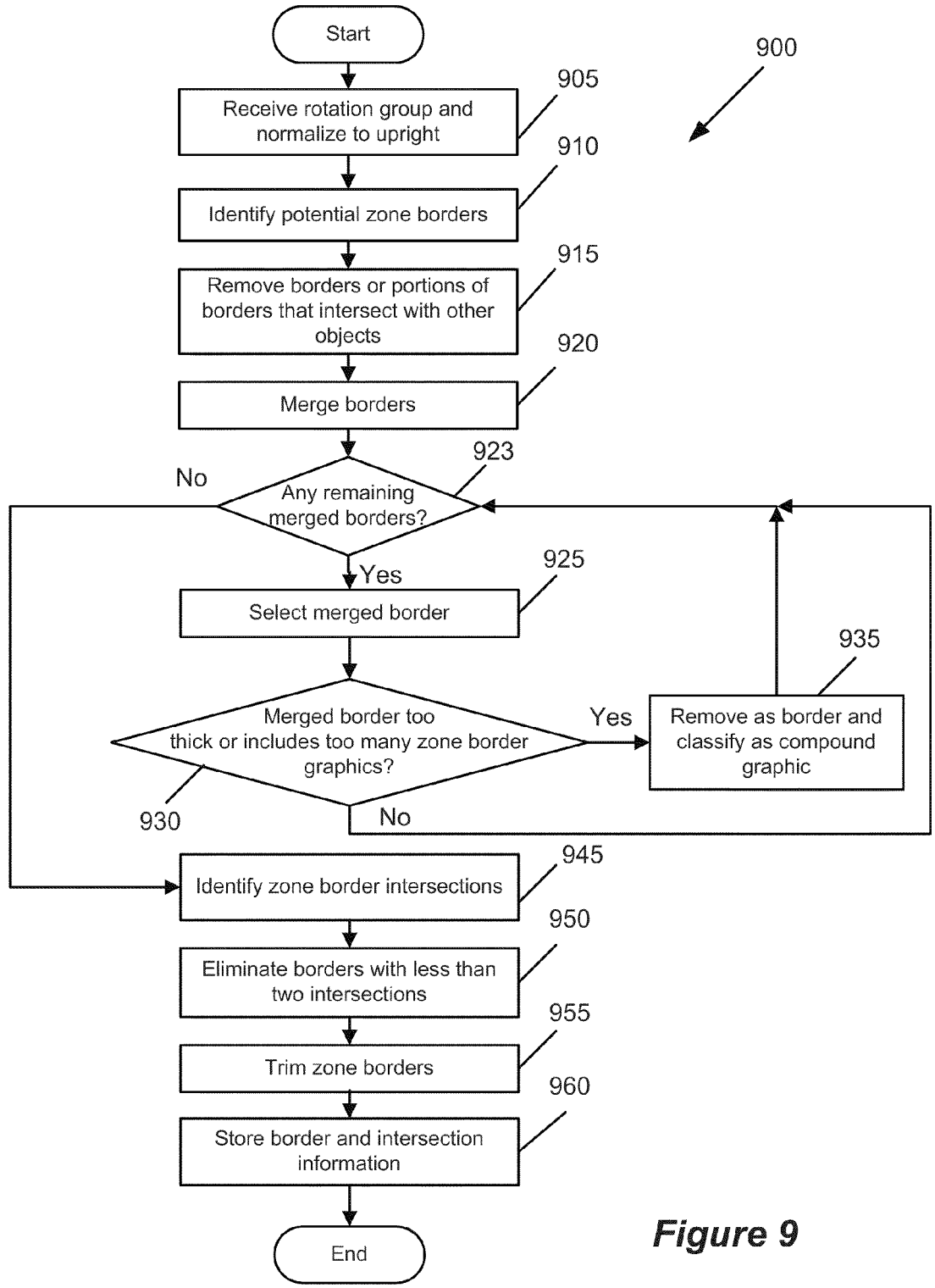
FIG. 9 conceptually illustrates a process of some embodiments for identifying zone borders and intersections.
Figure 10:
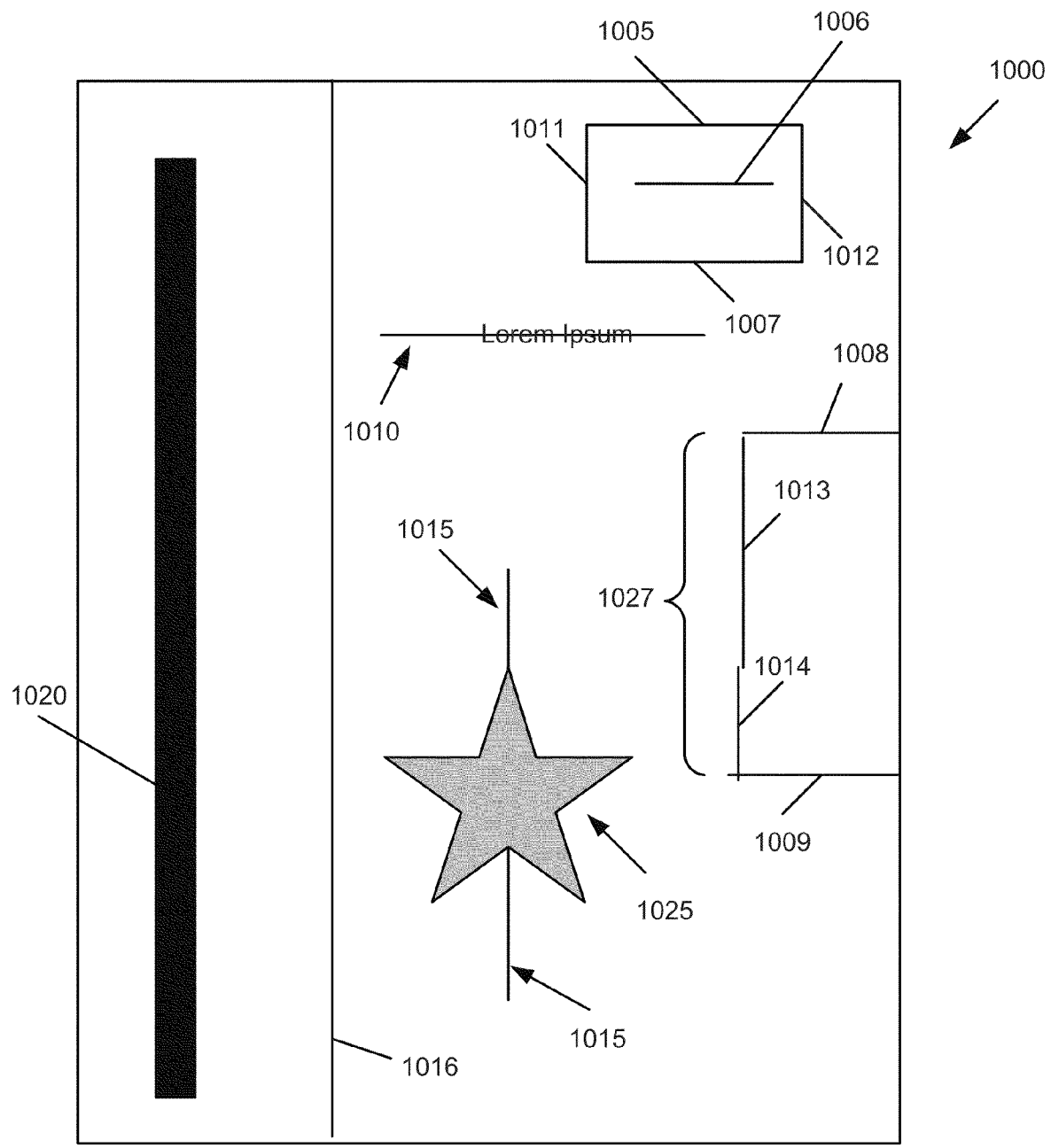
FIG. 10 illustrates a page that includes various graphics and text.

FIG. 9 conceptually illustrates a process 900 of some embodiments for identifying zone borders and intersections. Process 900 will be described in conjunction with FIG. 10. FIG. 10 illustrates a page 1000 that includes various graphics and text.

As shown in FIG. 9, the process receives (at 900) a rotation group and normalizes the group to an upright coordinate system. In some embodiments, normalizing the group to an upright coordinate system involves defining a coordinate system for the group such that all objects in the group are vertical or horizontal (e.g., text lines are horizontal in the coordinate system). The following discussion assumes that the rotation group is the upright (zero-angle) group. One of ordinary skill in the art would be able to apply the same techniques to rotation groups with non-zero angles in a coordinate system in which their content appears upright. Some embodiments remove content from other rotation groups before performing zone identification for a particular rotation group. For instance, some embodiments would remove text 610 and image 615 from page 600 in FIG. 6 before performing zone identification and analysis in the upright rectilinear coordinate system.

The process then identifies (at 910) potential zone borders. Potential zone borders, in some embodiments, include any horizontal or vertical graphic object that is sufficiently narrow. The determination of whether a particular graphic object is sufficiently narrow uses an absolute measure (e.g., when the smaller dimension of the upright bounding rectangle of the graphic object is less than $\frac{1}{24}$ of inch) in some embodiments. In other embodiments, the determination uses a relative measure (e.g., the larger dimension of the upright bounding rectangle is eight times the size of the smaller dimension), or a combination of absolute and relative measures (e.g., the narrow dimension could be allowed to be up to $\frac{1}{12}$ of an inch, but the relative measure of 8:1 applies). Some embodiments adjust the threshold in relation to the size of the page. For instance, the above examples might apply to a standard 8.5× 11 inch page, whereas a much larger page could have larger potential zone borders.

Referring to FIG. 10, page 1000 includes several lines that would be classified as potential zone borders: horizontal borders 1005-1010 and vertical borders (1011-1016). However, graphic object 1020 would generally not be considered a potential zone border, because it is too thick in the x-direction.

Some embodiments also identify all upright rectilinear shapes that have at least a threshold size and use the sides of these shapes as potential zone borders. In some embodiments, the threshold size is a particular area, whereas in other embodiments a threshold width and a threshold height must be surpassed. For instance, object 1020 might have an area large enough to qualify its edges as potential zone borders, but it is too narrow to be a separate zone. Star object 1025, on the other hand, is not an upright rectilinear shape and as such its edges would not qualify as a zone border. As such, these objects would simply be classified as content (specifically, graphic objects) that are within one zone or another. Some embodiments set the bounds of each potential zone border identified as the side of an upright rectilinear shape as the upright rectangle bounding the side, including the stroke width if stroked. Some embodiments also include the page borders as zone borders if they are upright rectilinear in the coordinate system of the rotation group.

After identifying potential zone borders, process 900 removes (at 915) borders or portions of borders that intersect with other objects on the page. For instance, potential border 1015 is obscured by star object 1025, and as such would be broken into two potential zone borders (the area above the star and the area below the star). Some embodiments also remove zone borders that intersect character bounding boxes. A character bounding box for a particular character, in some embodiments, is the smallest rectangle that completely encloses the character. For instance, potential zone border 1010 crosses the characters "Lorem Ipsum". As such, some embodiments would remove potential zone border 1010 from consideration.

Next, process 900 merges (at 920) borders. Some embodiments merge borders that are parallel and either overlapping or close to overlapping. Borders overlap when their bounds intersect. For instance, when two very narrow rectangles of different width are drawn such that one completely envelops the other, the two potential zone borders would be merged. Some embodiments slightly expand the bounds (both in width and length of the potential zone borders to test for overlap. Accordingly, borders 1013 and 1014 in FIG. 10 would be merged into one zone border 1027, with a thickness greater than that of borders 1013 and 1014.

Process 900 then determines (at 923) whether any merged borders remain unprocessed. When no borders were merged, or all merged borders have been processed, the process proceeds to 945, described below. Otherwise, the process selects (at 925) an unprocessed merged border. The process then determines (at 930) whether the merged border is too thick or includes too many zone border graphics. A merged border is too thick, in some embodiments, when its width in the narrow direction is above a particular threshold. In some embodiments, the test for thickness is the same as whether a graphic object is narrow enough to be classified as a zone border initially. When the process determines that the border is not too thick, the process proceeds to 923 which is described above. Otherwise, when the merged border is too thick, the process removes (at 935) the merged border from the potential zone border candidates and classifies it as a single graphic object, then proceeds to 923. For instance, this could happen when an image is drawn as a series of narrow rectangles or a bar graph is drawn with narrow and closely spaced bars.

Once all merged borders are examined, the process identifies (at 945) zone border intersections. As discussed above, zone border intersections are identified wherever a horizontal border intersects a vertical border. Some embodiments also identify near-intersections and classify these as intersections. To find near-intersections, borders are extended a small amount and then tested for intersection. Some embodiments extend the borders a fixed amount (e.g., one-fourth of an inch), while other embodiments extend each borders an amount that is a percentage of the length of the particular zone border. When the lengthened borders intersect, the near-intersection is classified as an intersection and the two borders are extended to fully cross the thickness of the other. As an example, borders 1027 and 1008 in FIG. 10 do not quite intersect. However, they are close enough that they would be classified as intersecting and are extended such that they intersect.

The process then eliminates (at 950) borders with less than two intersections. Once a border is removed, any borders that intersected the removed border must be retested to determine whether they still have at least two intersections. In the example page 1000, border 1006 and the two remaining portions of border 1015 would be removed, as they have no zone border intersections. Once the zone borders and intersections are identified, the process trims (at 955) the zone borders to remove any portions extending past the outermost intersections. For instance, the borders 1027 and 1009 extend past their intersection. These would be trimmed to extend only to the outermost bound of each other. After trimming the borders, the process stores (at 960) the zone border and intersection information for future use (e.g., in identifying zones). The process then ends.

Figure 11:
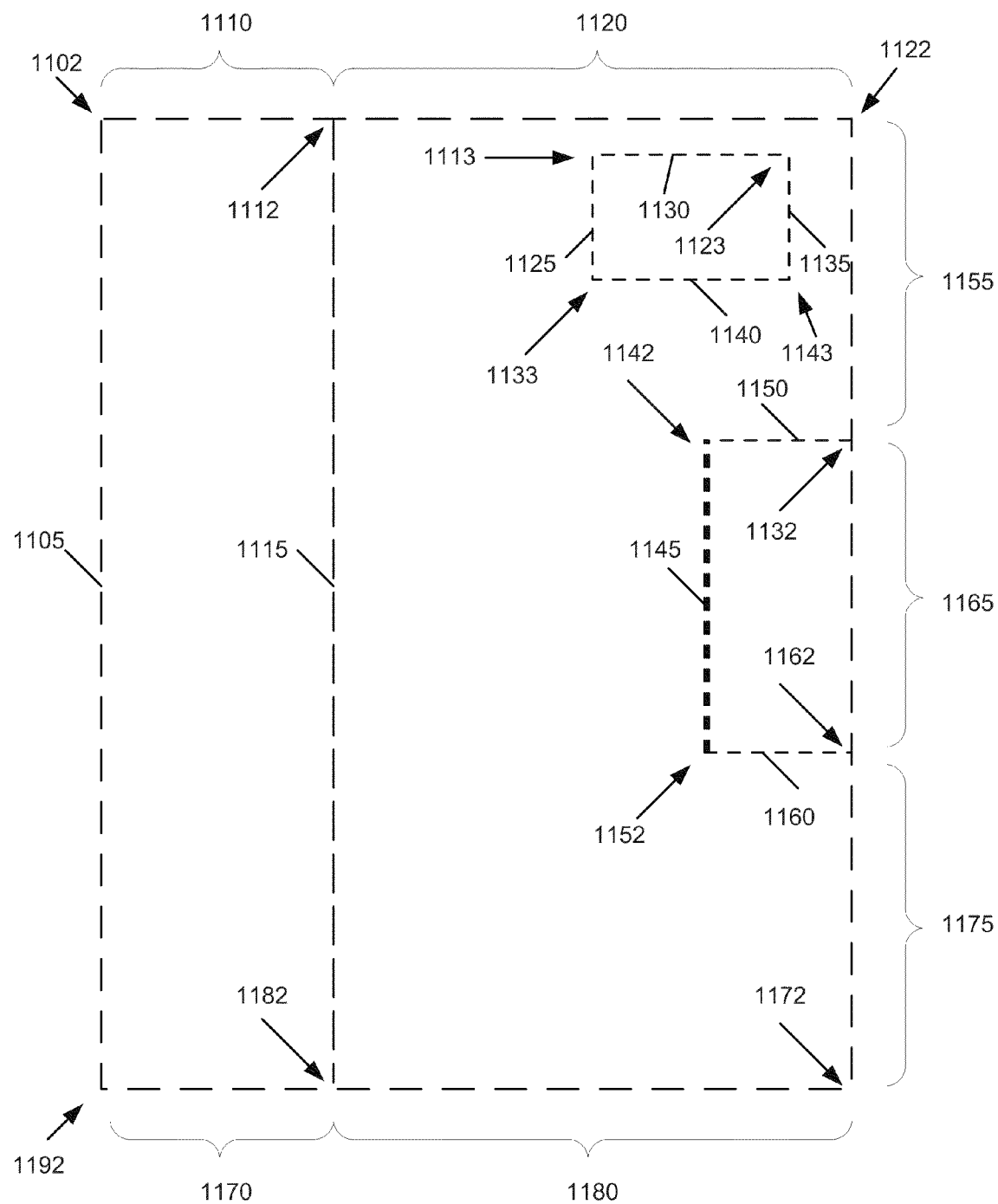
FIG. 11 illustrates the zone border intervals and intersections for the page of FIG. 10.

At this point, the zone border intervals and zone border intersections have all been determined. FIG. 11 illustrates vertical zone border intervals 1105, 1115, 1125, 1135, 1145, 1155, 1165, and 1175 as well as horizontal zone border intervals 1110, 1120, 1130, 1140, 1150, 1160, 1170, and 1180. FIG. 11 also illustrates zone border intersections 1102, 1112, 1113, 1122, 1123, 1132, 1133, 1142, 1143, 1152, 1162, 1172, 1182, and 1192.

D. Identifying Zones

Figure 12:
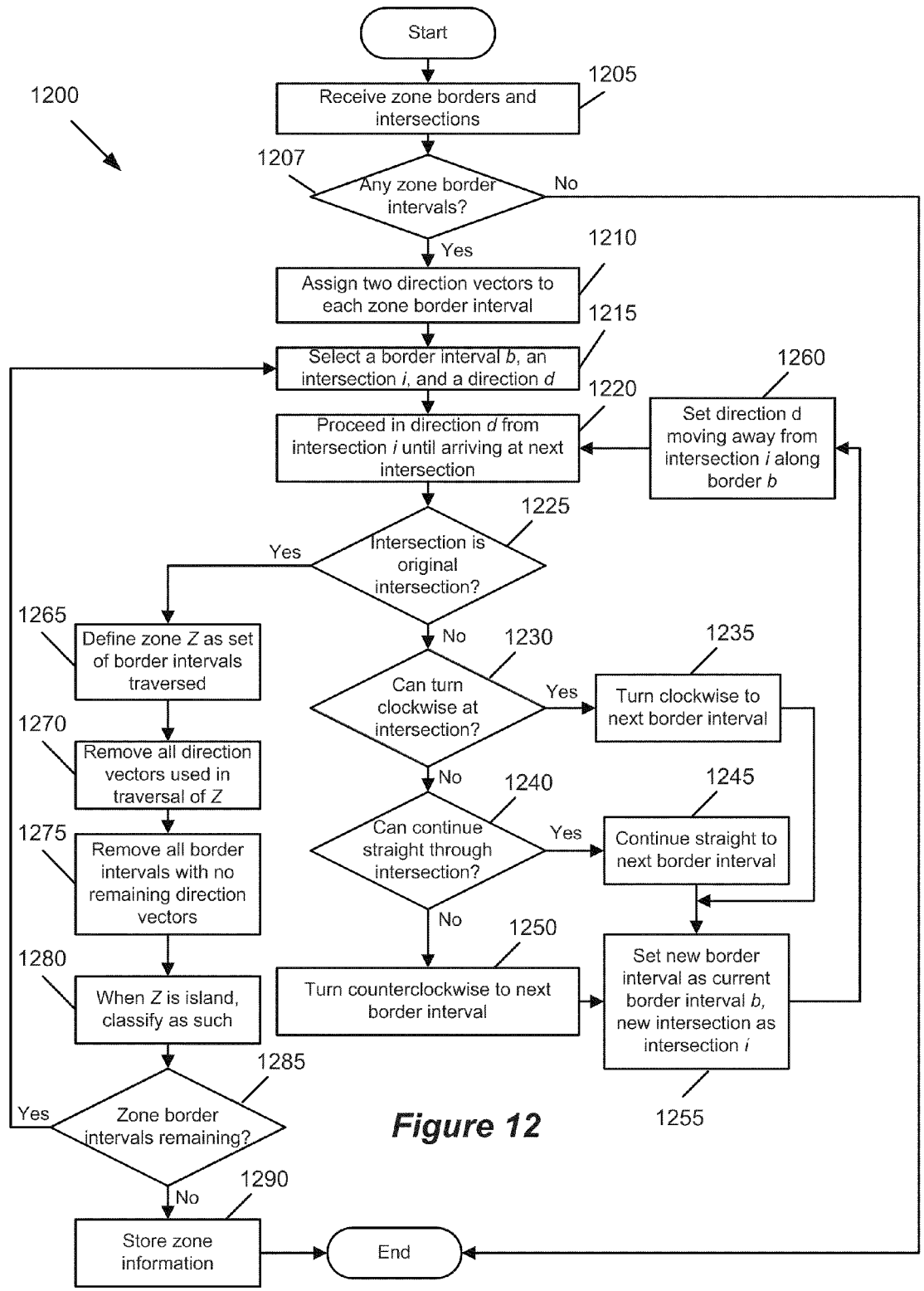
FIG. 12 conceptually illustrates a process of some embodiments for identifying zones.
Figure 13:
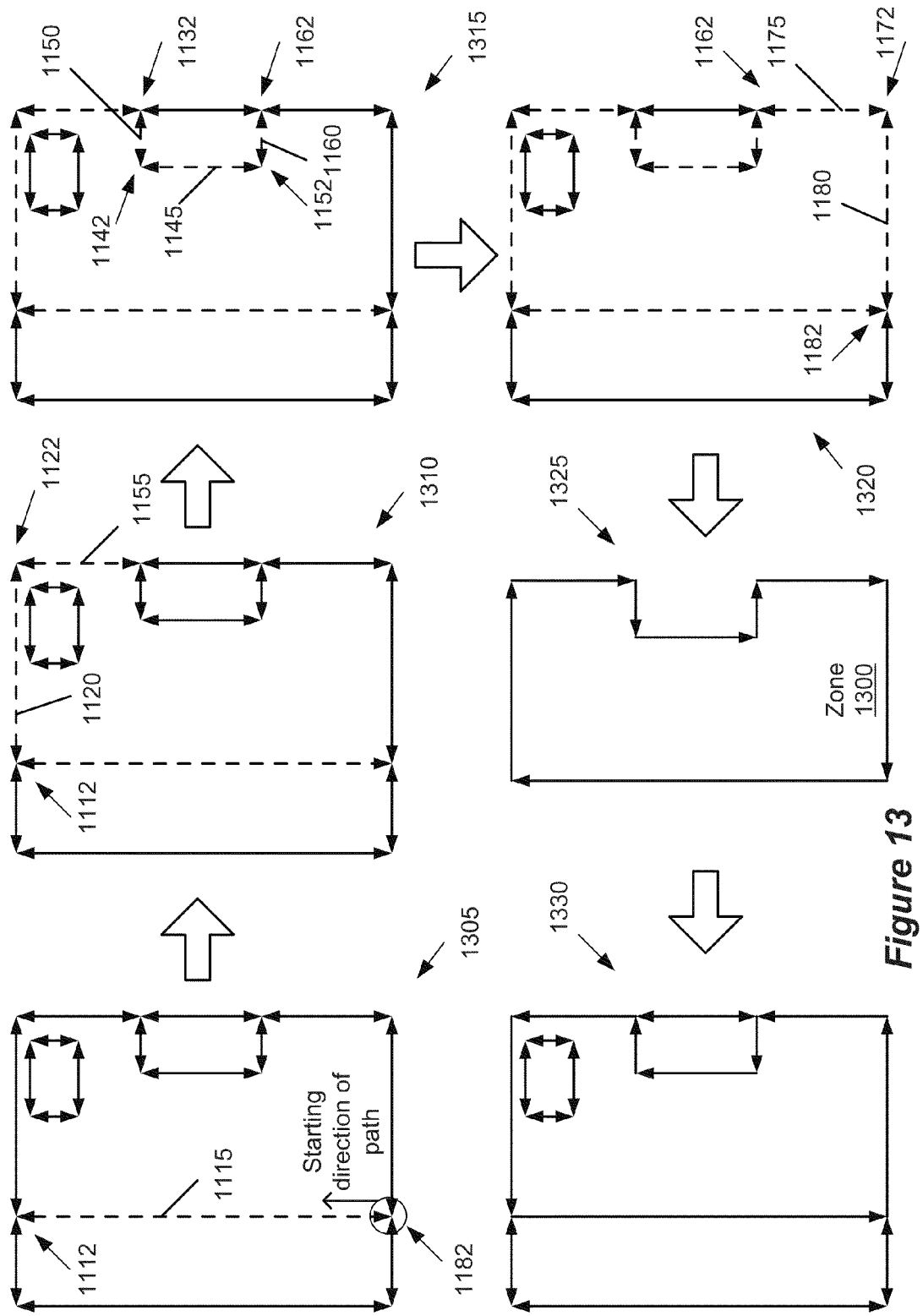
FIGS. 13 and 14 illustrates the application of the process of FIG. 12 to identify the zones of the page of FIG. 10.
Figure 14:
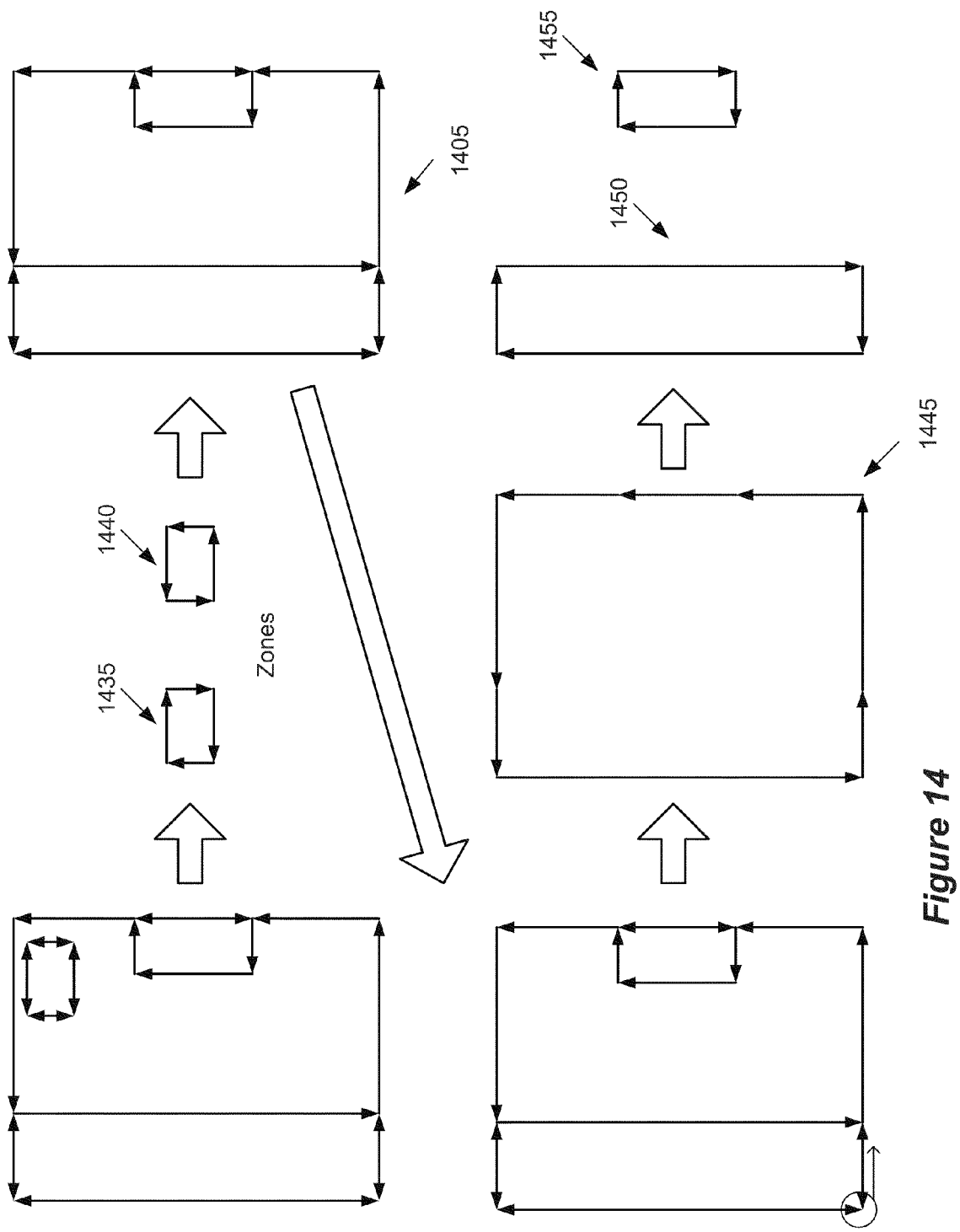

Once the zone borders and zone border intersections are identified, the zones can be identified. FIG. 12 conceptually illustrates a process 1200 of some embodiments for identifying zones. Process 1200 will be described in conjunction with FIGS. 13 and 14. FIGS. 13 and 14 illustrate the application of process 1200 to identify the zones of page 1000. Each of the figures is illustrated as a sequence. FIG. 13 illustrates a sequence 1305-1330 to identify a first zone border. Arrows in FIG. 13 illustrate direction vectors and dashed lines illustrate a path taken through the zone border intervals to define a zone. FIG. 14 illustrates the zones identified by process 1200.

As shown in FIG. 12, process 1200 receives (at 1205) zone borders and intersections for a group or page. In some embodiments, the zone borders and intersections are the output of process 900 described above. The process then determines (at 1207) whether there are any zone border intervals. When there are none, the process ends. Otherwise, the process assigns (at 1210) two direction vectors to each zone border interval (i.e., horizontal intervals have vectors pointing right and left, and vertical intervals have vectors pointing up and down). FIG. 13 illustrates (at 1305) that each of the border intervals for page 1000 starts with direction vectors in both directions.

Next, the process selects (at 1215) a border interval b, an intersection i, and a direction d. Some embodiments select the starting point randomly, whereas other embodiments use a heuristic such as the top- and left-most intersection in a particular direction. 1305 illustrates a random selection of starting at intersection 1182 moving upwards along interval 1115. Process 1200 then proceeds (at 1220) in the direction d from intersection i until arriving at the next intersection.

Once the intersection is reached, the process determines (at 1225) whether the intersection is the starting intersection selected at 1215. When the intersection is the original starting intersection, the process proceeds to 1265 which is described below. Otherwise, the process determines (at 1230) whether the path through the zone border intervals can turn clockwise at the intersection. When the path can turn clockwise, the path does so (at 1235). The process then proceeds to 1255 which is described below. When the path cannot turn clockwise, the process determines (at 1240) whether the path can continue straight through the intersection. When the path can continue straight, then the path does so (at 1245). The process then proceeds to 1255 which is described below. When the path cannot continue straight, the path turns (at 1250) counterclockwise to the next border interval. By the choices made in steps 1230 and 1240, the process 1200 exhibits a preference for a clockwise turn at each border intersection. Some embodiments will instead exhibit a preference for counterclockwise turns, which gives the same results.

The process sets (at 1255) the new border interval as the current border interval b, and the new intersection as the current intersection i. The process then sets (at 1260) the direction d moving away from intersection i along border b. The process then proceeds to 1220 which was described above.

Once the original intersection is reached, process 1200 defines (at 1265) a zone Z as the set of border intervals traversed since operation 1215. As noted above, FIG. 13 illustrates the traversal of a set of zone border intervals according to process 1200. At 1305, after selecting interval 1145 moving up from intersection 1182 to start (shown by the circle and short arrow in the figure), the path comes to intersection 1112. Turning clockwise is an option, so the path turns (at 1310) to interval 1120, then clockwise again at intersection 1122 to interval 1155. The path turns (at 1315) clockwise yet again at intersection 1132 to interval 1150, but then at intersection 1142 cannot either turn clockwise or continue straight through. Instead, the path turns counterclockwise to interval 1145, then again at intersection 1152 to interval 1160 to proceed towards intersection 1162. At intersection 1162, the path turns (at 1320) clockwise to interval 1175, then clockwise again at intersection 1172 to interval 1180. Interval 1180 returns to the path to the original intersection 1182.

FIG. 13 illustrates (at 1325) the zone 1300 defined by the traversal of intervals 1115, 1120, 1155, 1150, 1145, 1160, 1175, and 1180, as well as the direction vectors used in that traversal. Returning to process 1200, after defining (at 1265) the zone Z, the process removes (at 1270) the direction vectors used to traverse zone Z. FIG. 13 illustrates (at 1330) the zone border intervals of page 1000 with the direction vectors used to traverse zone 1300 removed.

Process 1200 next removes (at 1275) all border intervals with no remaining direction vectors. This will not occur after the first zone is identified, but can happen after any of the further zones are identified. When the zone Z is an island (i.e., a zone that shares no borders with its parent), then the process 1200 classifies (at 1280) the zone as such. In embodiments in which the preference is for clockwise turns, then a zone defined by traversing its center in a counterclockwise direction will be an island.

The process then determines (at 1285) whether any zone border intervals remain. When more zone border intervals remain, the process proceeds to 1215 which was described above. Otherwise, once all zone border intervals are used in both directions, the process has defined all the zones for the page. The process then stores (at 1290) the zone information. The process then ends.

FIG. 14 illustrates the continuation of the process 1200 applied to page 1000. For simplicity, FIG. 14 does not illustrate every move through the traversal of the zone border intervals. First, starting at any of the intersections 1113, 1123, 1133, and 1143, the two zones 1435 and 1440 are identified. These zones are duplicates of each other, as will occur in the case of islands that have no non-island children. Some embodiments remove duplicate zones. Other embodiments, however, treat the zones as two: one that is a regular zone, and the other that is an island. Next, starting at intersection 1192 results in zone 1445 (the page borders), because all possible turns off of the page borders would be counterclockwise moves. Finally, this leaves zones 1450 and 1455, which are traversed and removed. Once all the zones are traversed, there are no remaining zone border intervals.

E. Generating the Zone Tree

Figure 15A:
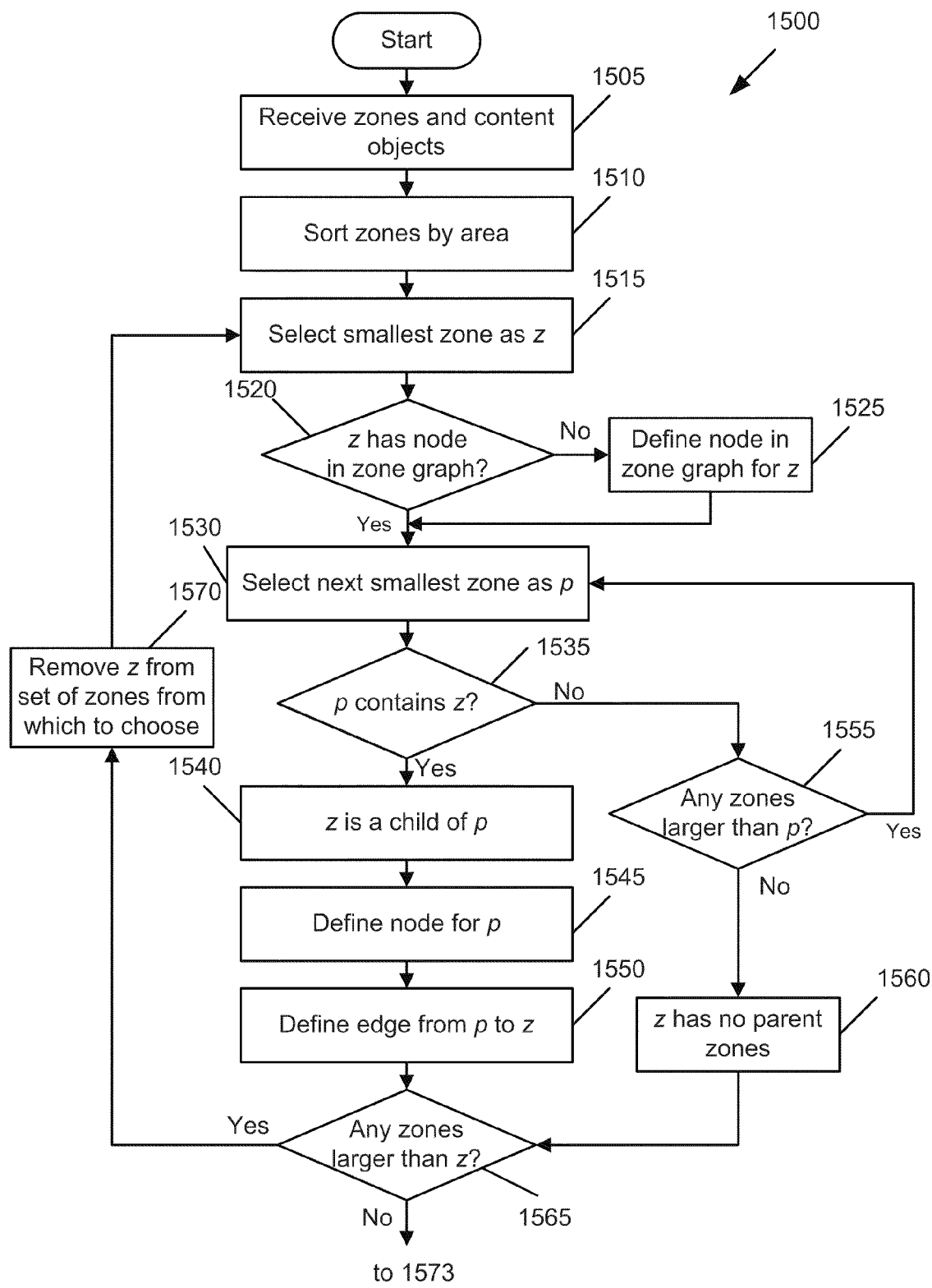
FIG. 15 conceptually illustrates a process of some embodiments for generating a zone tree.
Figure 15B:
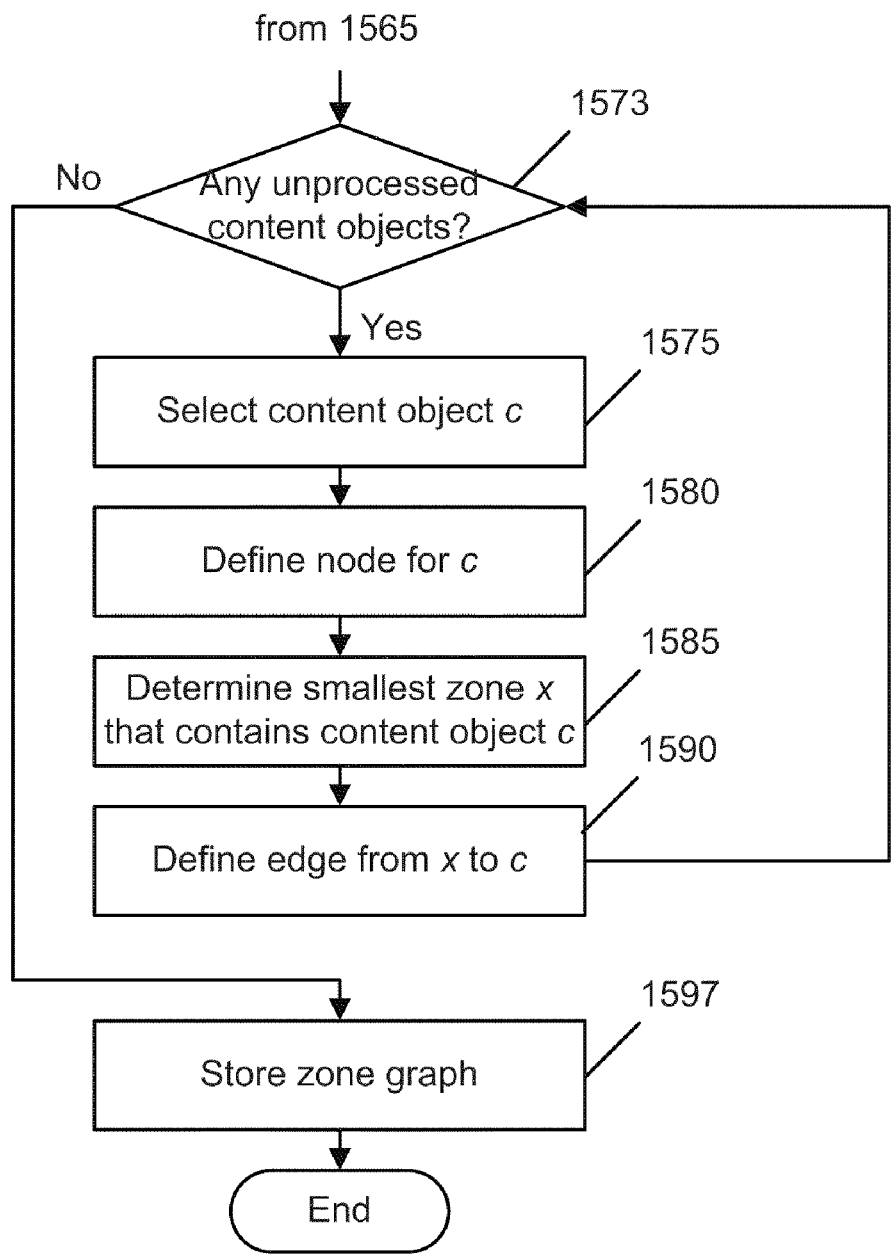

Once the zones have been identified, the zone graph (zone tree) can be generated. The zone tree is used, in some embodiments, in document reconstruction that is done on a zone-by-zone basis. FIG. 15 conceptually illustrates a process 1500 of some embodiments for generating a zone tree. As shown, the process receives (at 1505) zones and content objects. In some embodiments, these zones have been identified by a process such as process 1200. The process then sorts (at 1510) the zones by area. Some embodiments treat an island as larger than a non-island when their areas are equal for the purposes of sorting the zones.

Next, the process selects (at 1515) the smallest zone as z. The process then determines (at 1520) whether zone z has a node yet in the zone graph for the page. When z has a node, the process proceeds to 1530 which is described below. Otherwise, when z does not yet have a node, the process 1500 defines (at 1525) a node for zone z.

Next, the process selects (at 1530) the next smallest zone as zone p. The process then determines (at 1535) whether zone p contains zone z (i.e., whether the outer bounds of zone z are completely within the outer bounds of zone p). When zone p contains zone z, the process determines (at 1540) that zone z is a child of zone p. Based on this, the process defines (at 1545) a node for zone p in the node graph. The process then defines (at 1550) an edge from zone p to zone z. The process then proceeds to 1565 which is described below.

When, at 1535, the process determines that zone p does not contain zone z, the process determines (at 1555) whether there are any zones larger than the current zone p. When there are larger zones remaining, the process proceeds to 1530 and selects the next smallest zone as zone p to test whether the new zone p is a parent of zone z. Otherwise, when there are no zones larger than zone p, the process determines (at 1560) that zone z has no parent zones.

Next, the process determines (at 1565) whether there are any zones larger than zone z. When there are larger zones, the process removes (at 1570) zone z from the set of zones from which to select and proceeds to 1515 to select another zone for parent-child analysis.

Figure 16:
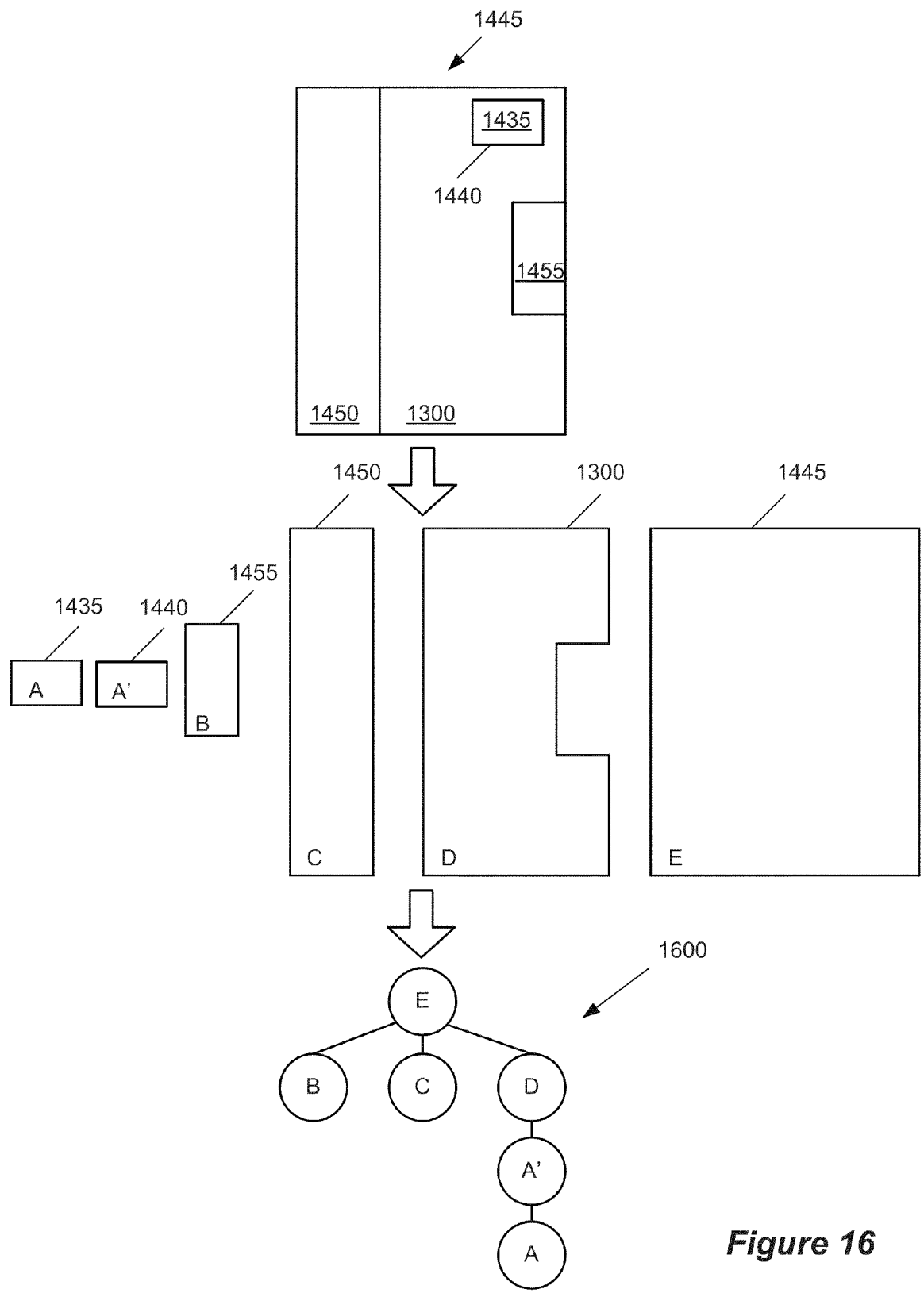
FIG. 16 illustrates the zones from the page of FIG. 10 sorted by size and placed into a node graph.

FIG. 16 illustrates the zones 1435 (A), 1440 (A'), 1455 (B), 1450 (C), 1300 (D) and 1445 (E) of page 1000 (shown in FIG. 10) sorted in size order (A' is the island for A) and placed into node graph 1600. Using process 1500, first a node for zone A (the smallest zone) would be defined, then the zones would be tested until the process determined that island zone A' was a parent of zone A, at which point zone A would be defined in the node graph, and an edge from A' to A would be defined. Next, zone D would be determined to be the parent of island zone A', and then zones B, C, and D would all be determined to be children of island zone E, which has no parents. In some embodiments, levels of zones and island zones always alternate in the zone graph. Thus, islands E and A' are at the first and third level of graph 1600, and zones B, C, D, and A are at the second and fourth level.

Once all zones have been analyzed, the process proceeds to 1573 and determines whether there are any unprocessed content objects. When there are no content objects (i.e., the document is blank except for zone borders), or all content objects have been processed, the process proceeds to 1597, described below. Otherwise, the process proceeds to 1575 and selects a content object c. The process then defines (at 1580) a node for the object c. A content object, in some embodiments, is a primitive object (e.g., a glyph, shape or image). The process then determines (at 1585) the smallest zone x that contains content object c. Once the zone x containing content object c is determined, the process defines (at 1590) an edge in the zone graph from zone x to content object c. When all objects have been added, the process stores (at 1597) the zone graph. The process then ends.

In some embodiments, the content in each zone is further analyzed (e.g., grouping text into paragraphs, identifying tables, etc.). Furthermore, as document reconstruction is performed, some embodiments update the zone graph with content subtrees for each zone, where those content subtrees include structure nodes that represent the hierarchical grouping of the primitive objects of the zone. By performing zone analysis first, one ensures that content from different zones is not inappropriately grouped in the subsequent document reconstruction steps.

In some embodiments, the identification of geometric attributes such as boundaries and the regions bordered by those boundaries (e.g., zones) sets the stage for further document reconstruction. For example, profiles may depend on zone geometry and structure elements such as tables or text boxes may be recognized from the zone geometry.

F. Software Architecture

Figure 17:
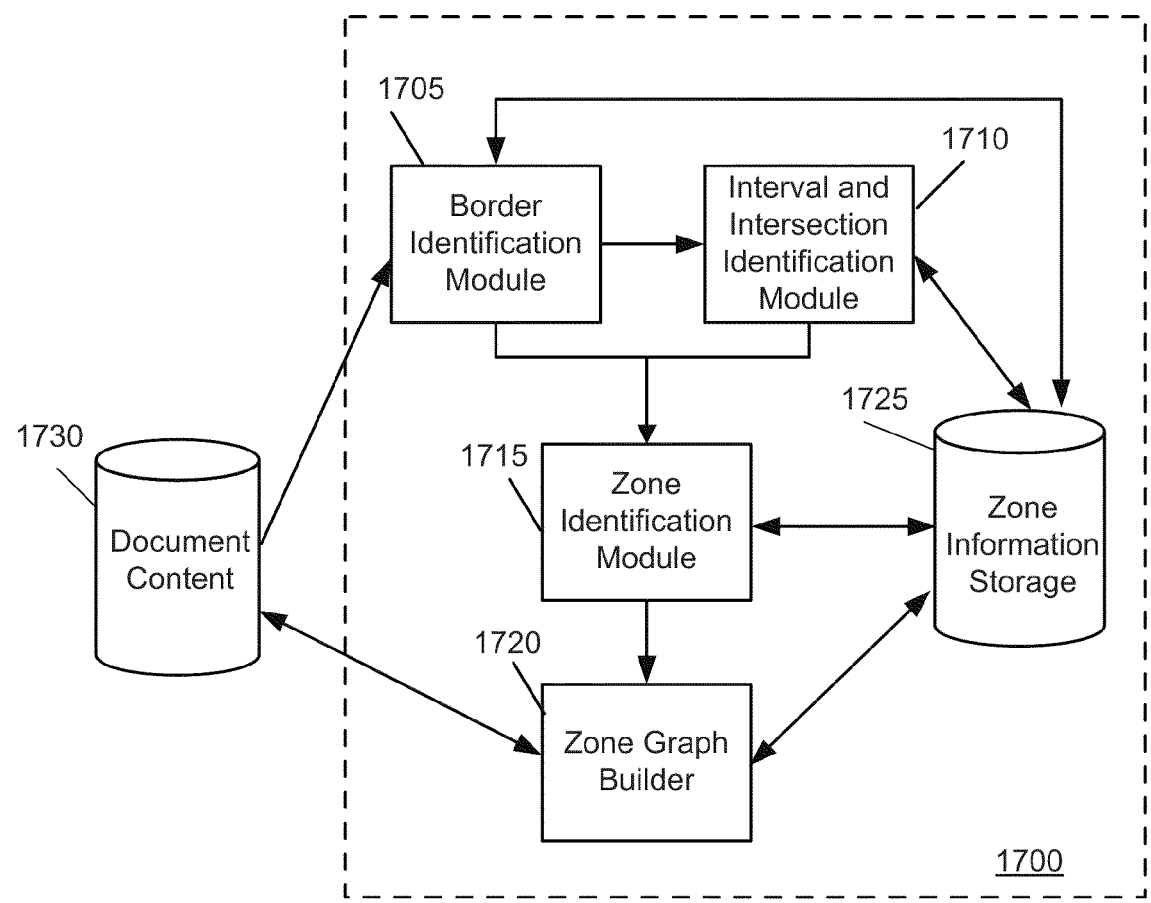
FIG. 17 conceptually illustrates the software architecture of a zone analysis application of some embodiments.

In some embodiments, the zone analysis processes described above are implemented as software running on a particular machine, such as a computer, a media player, a cell phone (e.g., an iPhone®), or other handheld or resource-limited devices (or stored in a computer readable medium). FIG. 17 conceptually illustrates the software architecture of a zone analysis application 1700 of some embodiments for performing zone analysis on a document. In some embodiments, the application is a stand-alone application or is integrated into another application (e.g., a document reconstruction application), while in other embodiments the application might be implemented within an operating system.

Zone analysis application 1700 includes a border identification module 1705, an interval and intersection identification module 1710, a zone identification module 1715, and a zone graph builder 1720, as well as zone information storage 1725.

FIG. 17 also illustrates document content 1730. Border identification module 1705 receives information from the document content 1730. In some embodiments, this information is information about all of the graphics (e.g., shapes, images, lines, etc.) in the document. The border identification module 1705 identifies potential zone borders and passes this information to the interval and intersection identification module 1710, as well as to the zone information storage 1725. In some embodiments, border identification module 1705 performs some or all of process 900.

The interval and intersection identification module 1710 receives zone border information from the border identification module 1705 and/or the zone information storage 1725. The interval and intersection identification module 1710 identifies zone border intersections and zone border intervals based on the potential zone borders identified by module 1705. The identified zone border intersections and zone border intervals are passed to the zone identification module 1715 as well as storing in zone information storage 1725. In some embodiments, interval and intersection module identification 1710 performs some or all of process 900.

The zone identification module 1715 receives zone border information from the border identification module 1705, zone border intersection and zone border interval information from the interval and intersection identification module 1710, and/or information from the zone information storage 1725. Zone identification module 1715 identifies zones based on the information from modules 1705 and 1715. The identified zones are passed to the zone graph builder as well as storing in the zone information storage 1725. In some embodiments, zone identification module 1715 performs some or all of process 1200.

The zone graph builder 1720 module receives zone information from the zone identification module 1715 and/or the zone information storage 1725, as well as content information from the document content 1730. Zone graph builder 1720 defines the zone graph for a document based on the zone information, and populates the zone graph with content information. In some embodiments, the zone graph builder 1720 populates the zone graph as content information is identified by other reconstruction processes, such as those described in the Sections below. In some embodiments, zone graph builder 1720 performs some or all of process 1500.

In some embodiments, the results of the processes performed by the above-described modules or other modules are stored in an electronic storage (e.g., as part of a document object model). The document object model can then be used for displaying the document on an electronic display device (e.g., a handheld device, computer screen, etc.) such that a user can review and/or interact with the document (e.g., via touchscreen, cursor control device, etc.).

III. Guide and Gutter Analysis

Some embodiments of the invention provide methods for identifying geometric attributes such as boundaries (e.g., alignment guides) and unfilled space (e.g., gaps of unfilled white space between groups of glyphs, called gutters) in a document or portion of a document. In some embodiments, a gutter is the white space between two alignment points (e.g., between a right-alignment point and a left-alignment point). Identification of guides and gutters is used in subsequent reconstruction procedures, such as column identification and splitting of text lines, in some embodiments. Some embodiments identify guides and gutters on a zone-by-zone or page-by-page basis.

Figure 18:
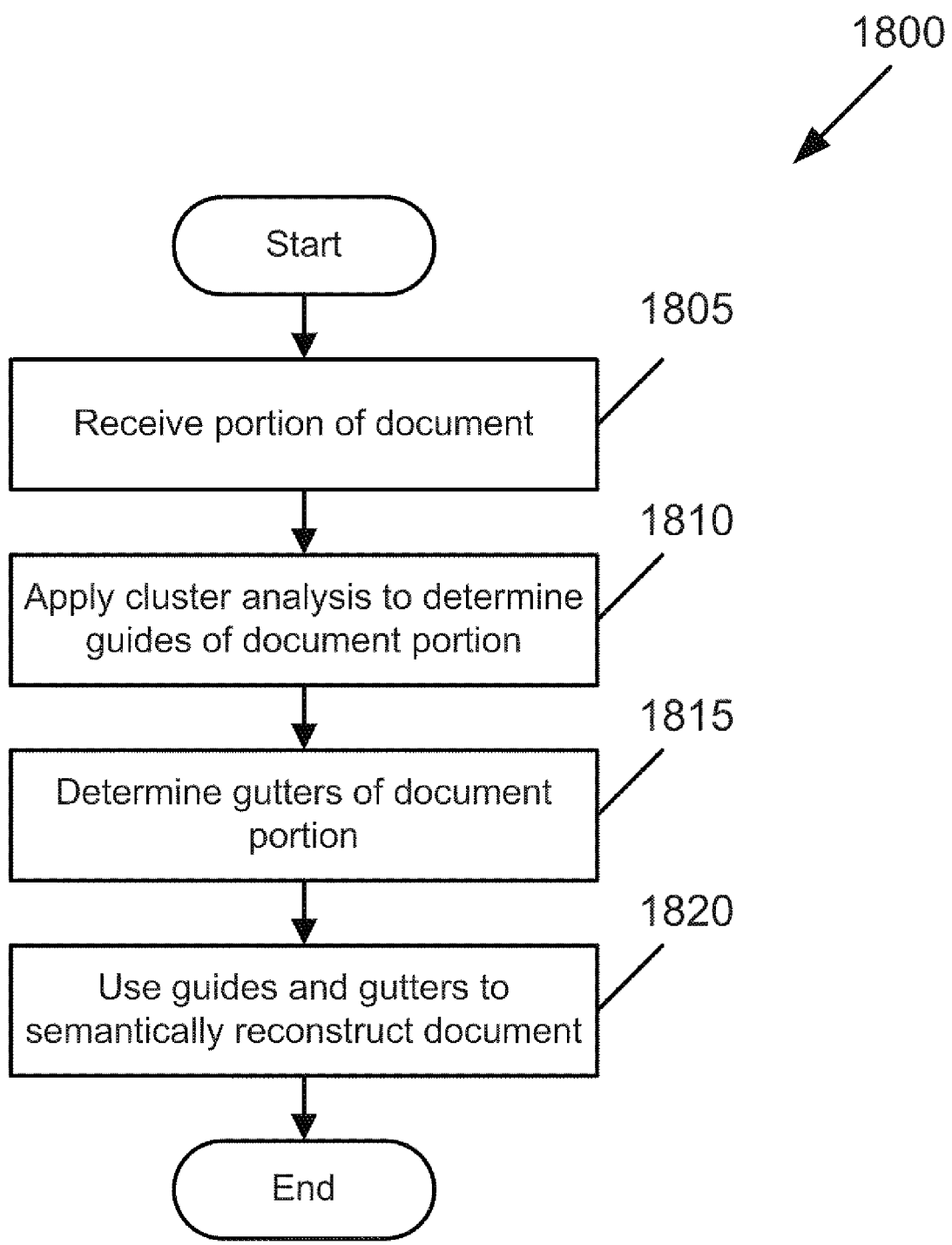
FIG. 18 illustrates an overall process of some embodiments for identifying guides and gutters in a document.

FIG. 18 illustrates an overall process 1800 of some embodiments for identifying guides and gutters in a document. Process 1800 will be described in conjunction with FIG. 19, which illustrates a page 1900 having two columns of text, and the guides and gutters identified on page 1900. As shown in FIG. 18, process 1800 receives (at 1805) a portion of a document. This portion may be multiple pages, a page, or a zone that has been identified by prior zone analysis. The portion of document may include words that have been reconstructed from glyph primitives by methods described elsewhere in this application.

Figure 19:
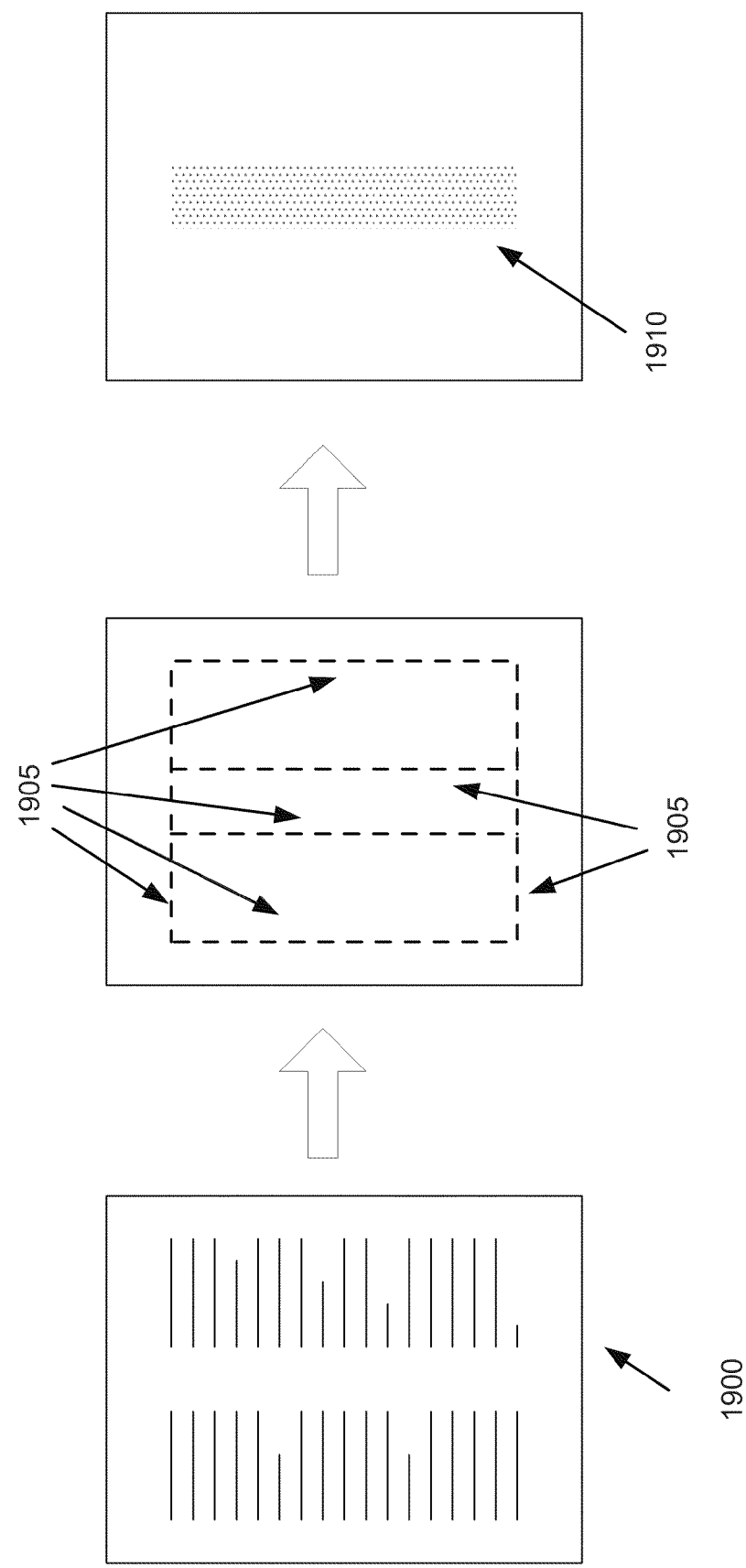
FIG. 19 illustrates a page having two columns of text, and the guides and gutters identified for the page.

The process then applies (at 1810) cluster analysis to determine guides of the received document portion. Cluster analysis enables the process to determine x-coordinates where the ends or beginnings of words are grouped together, making those x-coordinates likely alignment guides. As mentioned, FIG. 19 illustrates a page 1900 with two columns of text. Page 1900 includes as set of guides 1905. Some embodiments determine bottom and top lines of columns as guides, whereas other embodiments only determine left- and right-alignment guides. Some embodiments also identify guides for other alignments, such as center alignment or the alignment of decimal points in listings of numbers. Cluster analysis and the guide determination process are described in further detail below.

Next, the process determines (at 1815) the gutters of the document portion. Some embodiments use information from operation 1810 to determine the gutters. FIG. 19 illustrates a gutter 1910 that is determined for page 1900 between the right-alignment guide of column one and the left-alignment guide of column two. Some embodiments treat the page margins as gutters, while other embodiments do not. Once the guides and gutters are determined, the process 1800 uses (at 1820) the guides and gutters for further reconstruction of the document. The process then ends.

A. Density Clustering

Some embodiments determine right- and left-alignment guides by searching for text lines that start or end at the same or nearly the same x-coordinate on a page and determining whether sufficient evidence exists that the x-coordinate is actually an alignment point. Some embodiments use a form of cluster analysis called density clustering to determine alignment guides. The density clustering of some embodiments takes advantage of the memory and processing efficiencies described below in Section VI so that it can be performed on a resource-limited device (e.g., an iPhone®).

Density clustering is often applicable to problems in which there is a substantial amount of "noise" or random data mixed in with otherwise clearly visible clusters. When the data is a set of real numbers, the clusters are identified as subsets that optimally meet given density constraints. The constraints are generally designed to pick out subsets that are relatively denser than others. For instance, some embodiments use a minimum size of a cluster and a maximum spread of a cluster as constraints.

Figure 20:
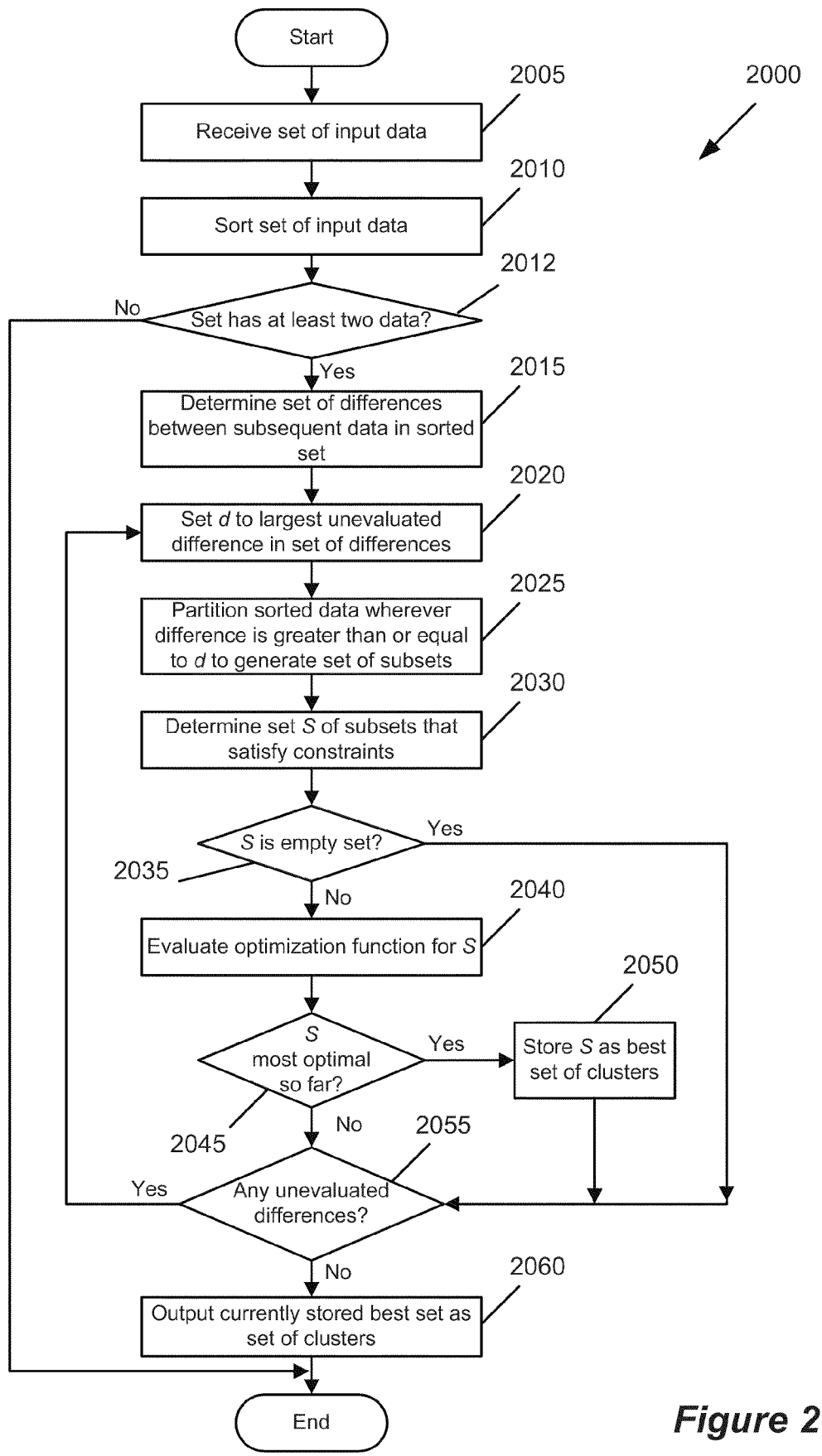
FIG. 20 conceptually illustrates a process of some embodiments for performing density clustering.

FIG. 20 conceptually illustrates a process 2000 of some embodiments for performing density clustering. As shown, the process receives (at 2005) a set of input data. In some embodiments, the input data is coordinate data of character glyphs on a page. For example, in using density clustering to find left-alignment guides, the input data is the x-coordinate of the anchor of the first letter of each word on the page.

The process then sorts (at 2010) the set of input data. Some embodiments sort the data in ascending order, while other embodiments sort the data in descending order. For instance, in the case of using density clustering to determine alignment guides, the data (x-coordinate values) is sorted from lowest to highest x-coordinate value such that if two x-coordinate values are equal they are next to each other in the sorted data (unless there are other words with the same x-coordinate value that fall in-between the two). Some embodiments create a new array for the sorted data, while some embodiments use an indirectly sorted array of indices as described below in Section VI.

Next, process 2000 determines (at 2012) whether the set has at least two pieces of data. If not, then the process ends, as there is nothing to cluster. Otherwise, the process proceeds to determine (at 2015) the set of differences between subsequent data in the sorted set. Such a set will have one less value than the set of input data. As an example, when there are three words on a page, the two values in the set of differences are the difference between the x-coordinate values of the first and second words and the difference between the x-coordinate values of the second and third words.

Next, the process sets (at 2020) a variable d to the largest unevaluated difference in the set of differences. For instance, when the differences for a set of words are 0.7 inches, 0.2 inches, 0.0 inches, and 0.4 inches, then the variable d would initially be set to 0.7 inches. The process then partitions (at 2025) the sorted data wherever the difference is greater than or equal to d to generate a set of subsets of the data. The first partition will always partition the sorted data only at differences equal to d, because d will be set to the largest difference. In the above example of five data values with differences of 0.7, 0.2, 0.0, and 0.4, the partitioning would generate two subsets (the first value in one subset and the other four in the other subset).

The process then determines (at 2030) the set S of subsets that satisfy particular constraints for the problem being solved. In some embodiments, the purpose of the constraints is to determine subsets that are relatively denser than the other subsets. Some embodiments use two density constraints: a minimum cluster size (i.e., the minimum number of values in the subset) and maximum cluster spread (i.e., the largest allowed difference between the largest and smallest values in the subset). In the case of using density clustering for determining alignment guides, some embodiments use a minimum cluster size that is a fraction of the total lines in the page or zone being evaluated, while other embodiments use a constant. Some embodiments use a maximum spread that is a fraction of the median font size of the first (for left-alignment) or last (for right-alignment) characters of words.

Once the set S of subsets that satisfy the constraints are determined, the process determines (at 2035) whether S is empty. When S is empty, the process proceeds to 2055 which is described below. When S includes at least one subset, the process evaluates (at 2040) an optimization function for S. Some embodiments use an optimization function that looks for the set S that has the largest subset that meets the constraints. Other embodiments use an optimization function tries to maximize the sum of the squares of a particular value (e.g., the size of the subset minus the minimum cluster size) over all of the subsets that meet the constraints. Yet other embodiments use one of the above-mentioned optimization functions, and then use the other in case of a tie. Other optimization functions are used by other embodiments.

Next, the process determines (at 2045) whether the set S is the most optimal so far, based on the optimization function. When S is not the most optimal, the process proceeds to 2055 which is described below. Otherwise, when S is the most optimal, the process stores (at 2050) S as the best set of clusters yet found. The first pass through (in which d is the largest difference) will always be the most optimal at that point, if S is not empty. On subsequent passes, the current S will be compared to the stored set of clusters.

The process then determines (at 2055) whether there are any unevaluated differences. Some embodiments test each possible partition to find the most optimal set of clusters. Some such embodiments use the efficiency techniques described below in Section X to enable faster and more efficient processing. When the process determines that there are unevaluated differences, the process proceeds to 2020 which was described above.

Otherwise, once all the differences have been evaluated, the process outputs (at 2060) the currently stored optimal set (or empty set if no clusters satisfying the constraints were found) as the final set of clusters. In the case of determining alignment guides, the final set of clusters would be groups of words with very close x-coordinates. The process then ends. One of ordinary skill will recognize that in addition to the density constraints and optimal measure, process 2000 imposes a consistency constraint on the clusters; namely, that intra-cluster differences between successive values in a cluster will never equal or exceed inter-cluster differences, because the data is always partitioned at all differences that are equal to or greater than a specified gap minimum.

B. Determining Alignment Guides

As mentioned above, some embodiments determine right- and left-alignment guides by searching for associated sets of glyphs (e.g., words, text lines) that start or end at the same or nearly the same x-coordinate on a page and determining whether sufficient evidence exists that the x-coordinate is actually an alignment point. Some embodiments use similar but not identical processes to find left-alignment guides and right-alignment guides.

Figure 21:
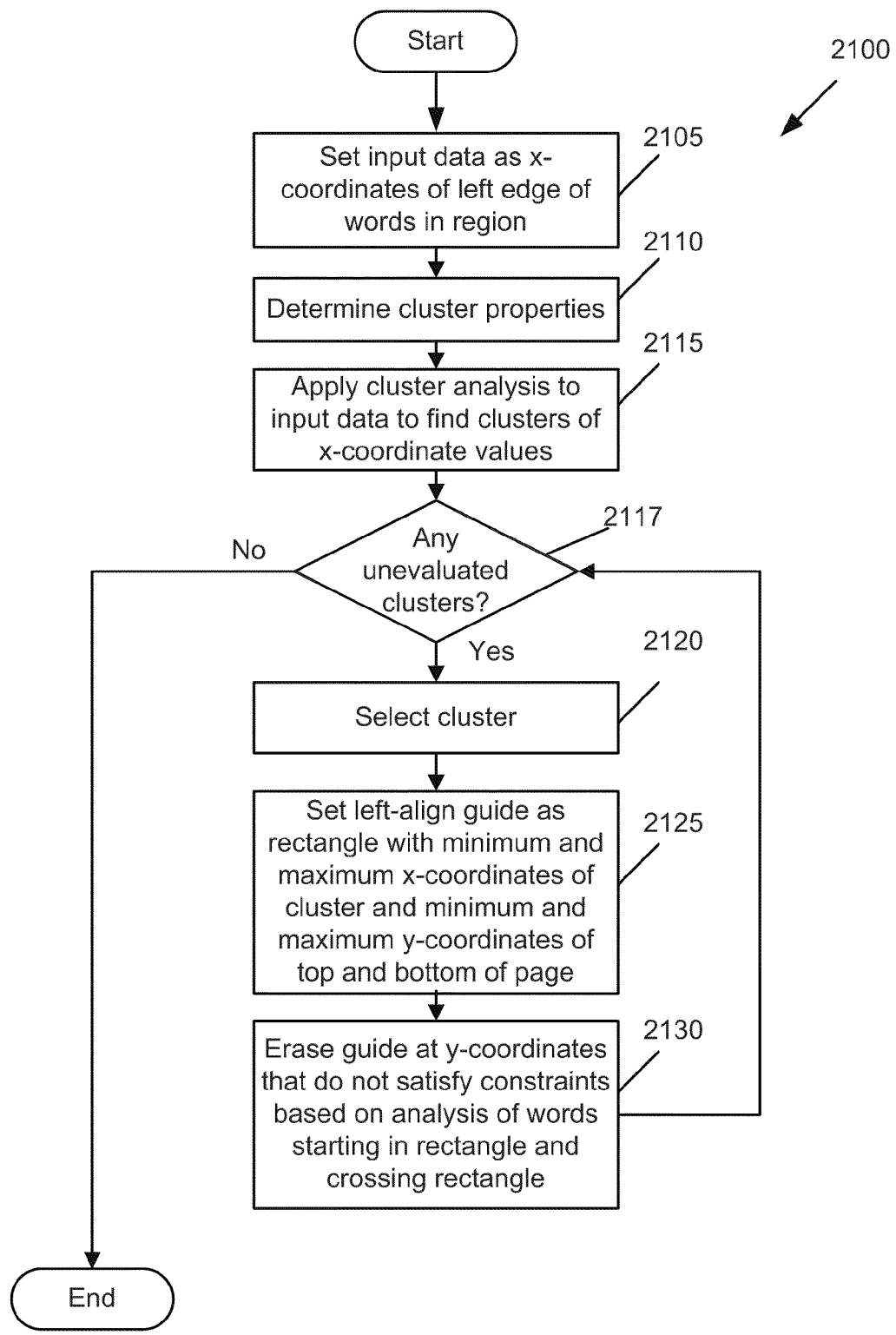
FIG. 21 conceptually illustrates a process of some embodiments for determining left-alignment guides.
Figure 22:
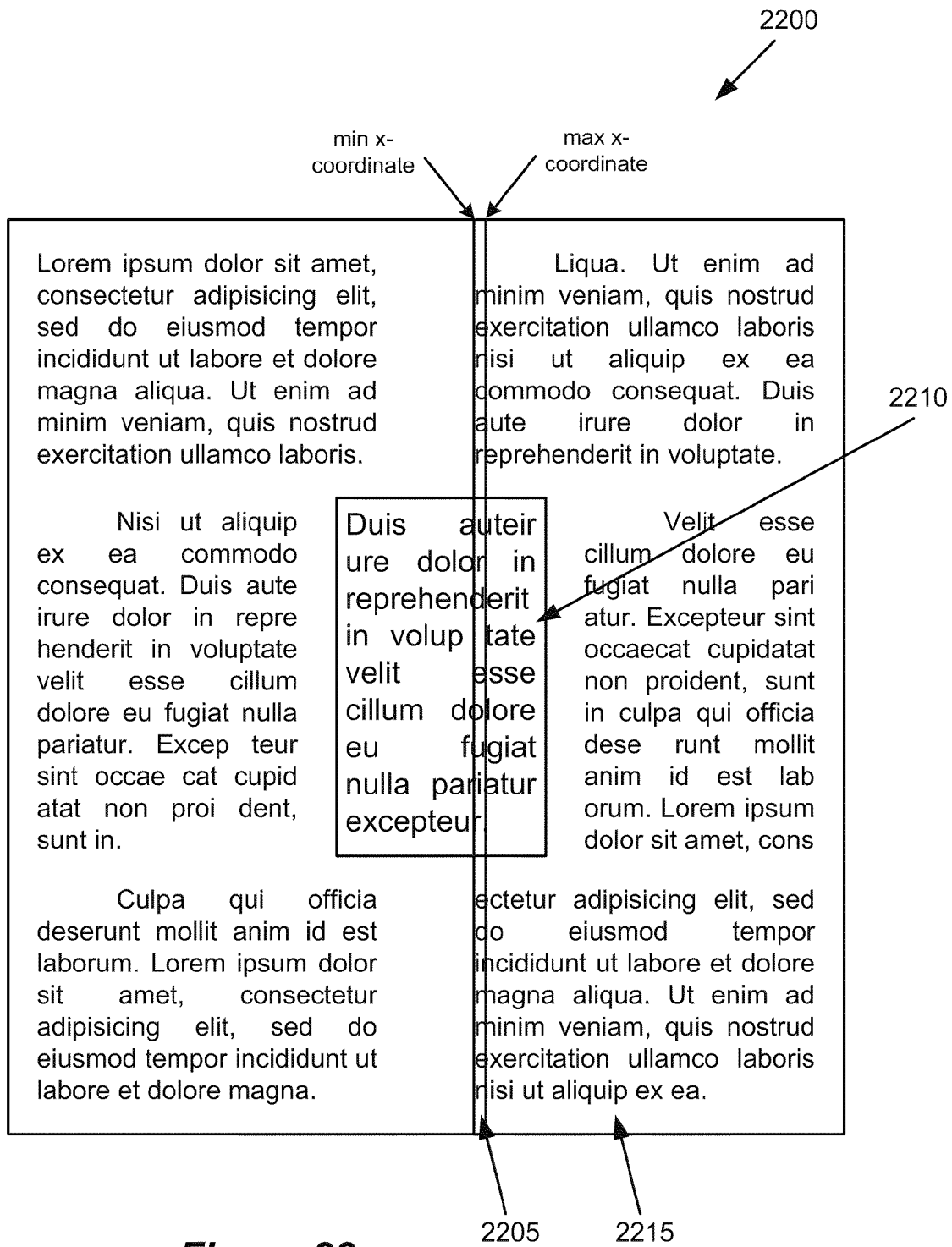
FIGS. 22-24 illustrate the identification a left-alignment guide on a page.
Figure 23:
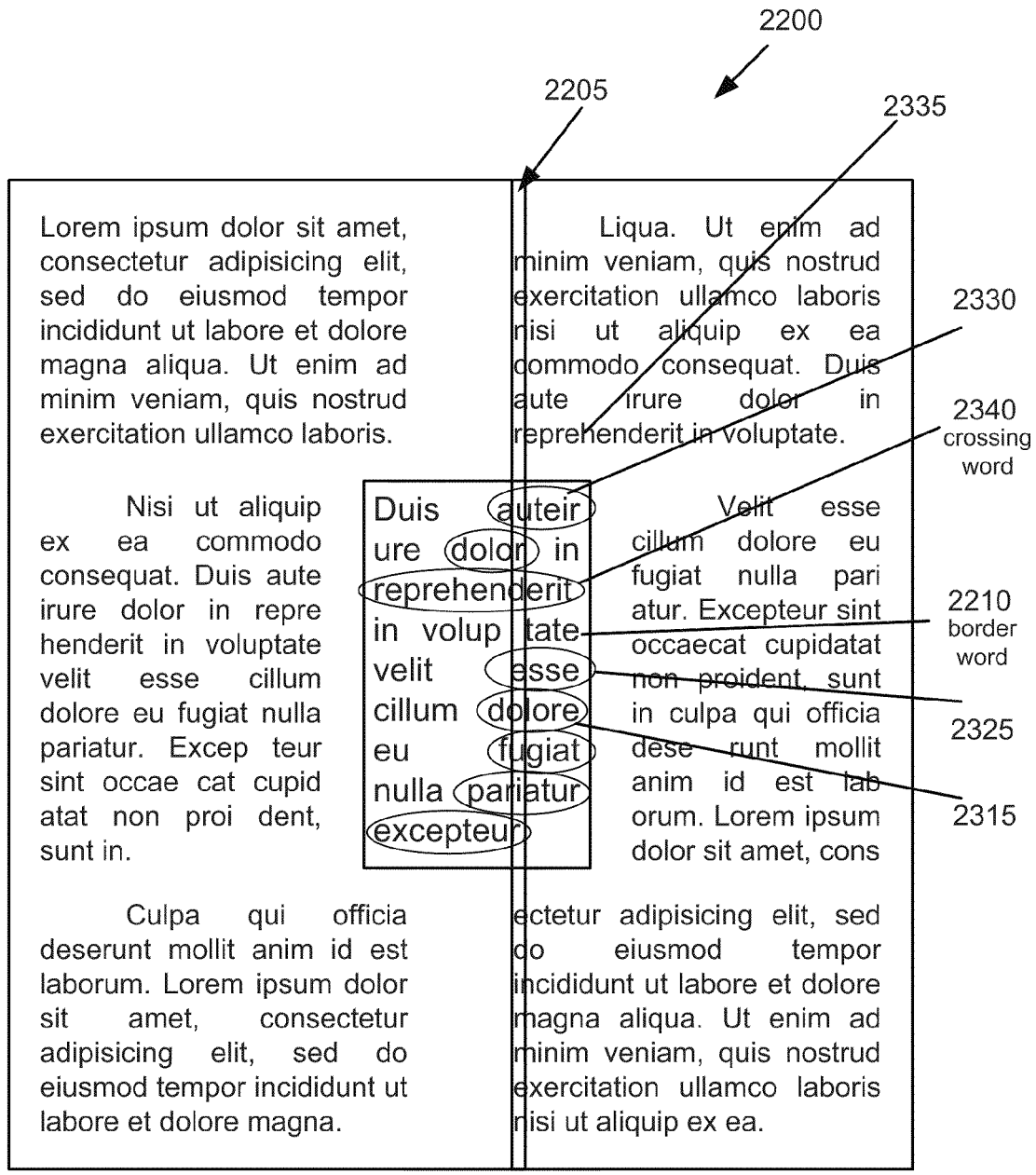
Figure 24:
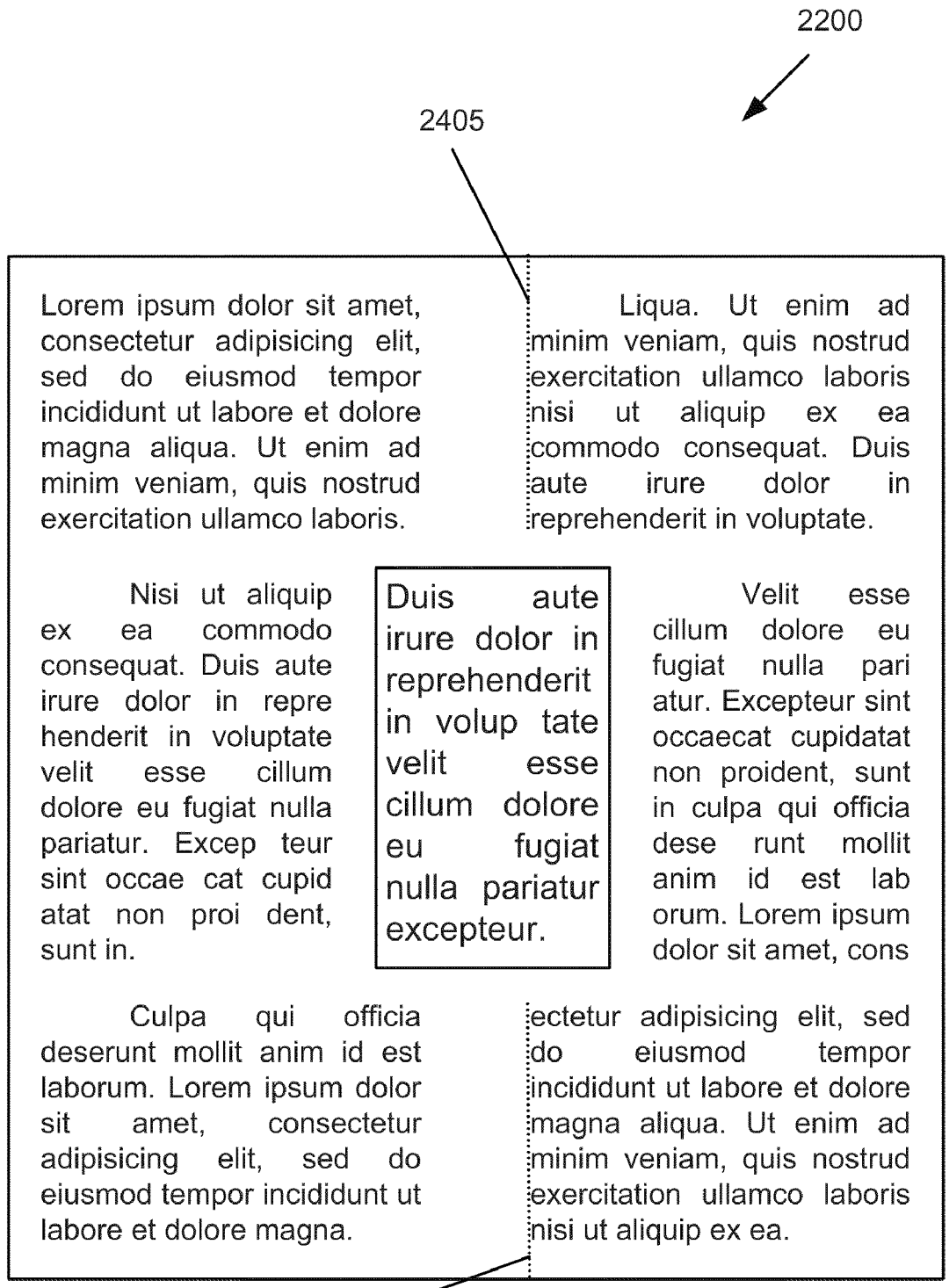

FIG. 21 conceptually illustrates a process 2100 of some embodiments for determining left-alignment guides. Portions of process 2100 will be described in conjunction with FIGS. 22-24. FIGS. 22-24 illustrate the process of identifying a left-alignment guide on a page 2200. As shown in FIG. 21, process 2100 sets (at 2105) the input data for density clustering as the x-coordinates of the left edge of words in a region of a document. The region is a page or a zone of a page in some embodiments. In some embodiments, the left edge of a particular word is the x-coordinate of the anchor of the first glyph in the particular word, adjusted to the left alignment position expected for the glyph.

The process then determines (at 2110) desired cluster properties. In some embodiments, the cluster properties are the constraints for density clustering described above. Some embodiments use two density constraints: a minimum cluster size (i.e., the minimum number of values in the subset) and maximum cluster spread (i.e., the largest allowed difference between the largest and smallest values in the subset). In the case of using density clustering for determining alignment guides, some embodiments use a minimum cluster size that is a fraction of the total lines in the page or zone being evaluated, while other embodiments use a constant. Some embodiments use a maximum spread that is a fraction of the median font size of the first (for left-alignment) or last (for right-alignment) characters of words. One example of constraints are that the minimum cluster size is 5% of the total number of text lines in the region, and the maximum spread is 10% of the median font size.

Next, the process applies (at 2115) density clustering to the input data using the determined cluster properties to determine clusters of x-coordinate values that may be alignment guides. Some embodiments use process 2000 as described above.

Process 2100 then determines (at 2117) whether there are any unevaluated clusters. When there are no clusters, or all clusters are evaluated, the process ends. Otherwise, the process selects (at 2120) a cluster (i.e., one of the clusters output from the cluster analysis). The process then sets (at 2125) a left-alignment guide as a rectangle with the minimum and maximum x-coordinates as the smallest and largest values in the cluster and the minimum and maximum y-coordinates as the top and bottom of the page. In some cases, the minimum and maximum x-coordinate will be the same, as all the x-coordinates in the cluster will have the same value. In other cases, small aberrations or words that accidentally make it into the cluster will give the rectangle a non-zero width.

FIG. 22 illustrates a page 2200 with a potential left-alignment guide 2205 in some embodiments. The minimum x-coordinate of the rectangle 2205 is set by the left edge of the right column 2215, while the maximum x-coordinate is set by the word "tate" 2210 in the middle of the page, because the start of word 2210 is close enough to the start of the words forming the left edge of the right column that it is grouped in with those words by the density clustering process.

Process 2100 then removes (at 2130) the rectangle at y-coordinates that do not satisfy constraints based on an analysis of words that start in the rectangle and words that cross the rectangle. The process then proceeds to 2117, described above. Some embodiments remove a portion of the rectangle anywhere that a word starts left of the rectangle and crosses into the rectangle. The rectangle is also removed at any y-coordinate that is between two crossing words that do not have a sufficient number of border words between them. A border word is a word that starts in or at one of the edges of the rectangle. Some embodiments use a requirement that there be at least five border words between crossing words, and at least one of those five border words must be the leftmost on its text line or separated from the previous word on its text line by more than a normal word gap. Some embodiments use processes described in United States Publication No. 2007/0250497, entitled "Semantic Reconstruction", by Mansfield, et al., which is incorporated herein by reference, to determine word gaps and larger gaps. Some embodiments use different requirements (e.g., fewer or greater than five border words between crossing words) to perform operation 2130.

FIG. 23 illustrates the page 2200 and rectangle 2205 with the crossing words for rectangle 2205 circled. The crossing words include words 2340 ("reprehenderit") and 2315 ("dolore"), among others. There are two border words 2210 ("tate") and 2325 ("esse") between crossing words 2340 and 2315; however, when the requirement for border words in between crossing words is three or larger, the rectangle would be removed through this section as well. Some embodiments remove only from the greatest ascent to the greatest descent of crossing words and non-qualifying areas in between crossing words. Other embodiments also remove areas that are likely beyond the alignment guides, such as the area from the crossing word 2330 ("auteir") to the border word 2335 ("reprehenderit") above it.

FIG. 24 illustrates left-alignment guides 2405 and 2410 for page 2200. Because of the call-out region in the center of the page, the left-alignment guides at that particular x-coordinate do not run the length of the entire page 2200.

Figure 25:
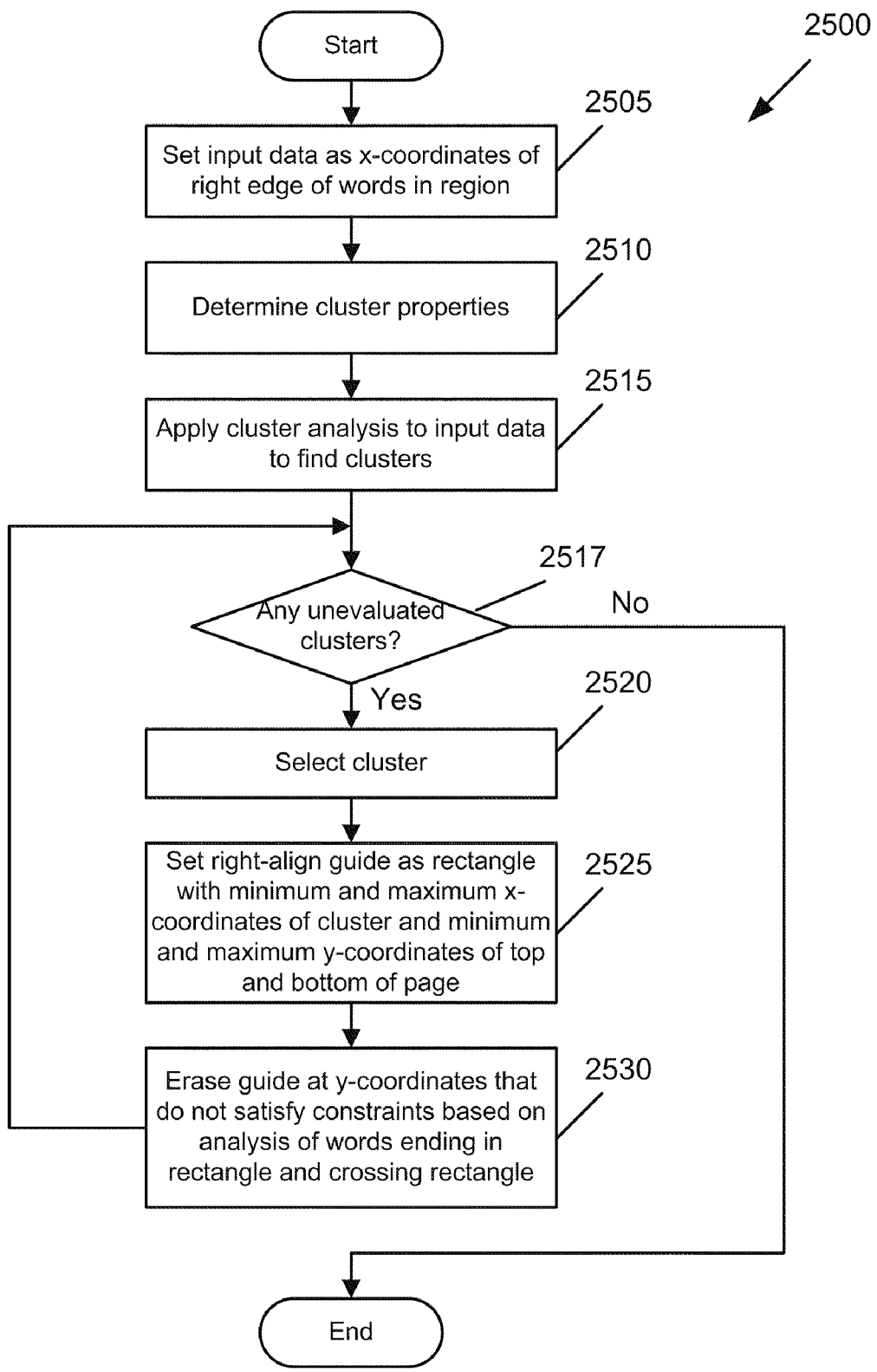
FIG. 25 conceptually illustrates a process of some embodiments for determining right-alignment guides.

As mentioned above, some embodiments use a process similar to process 2100 for determining right-alignment guides. FIG. 25 conceptually illustrates a process 2500 of some embodiments for determining right-alignment guides. As shown, the process sets (at 2505) the input data for density clustering as the x-coordinates of the right edge of words in a region of a document. The region is a page or a zone of a page in some embodiments. In some embodiments, the right edge of a particular word is the x-coordinate of the anchor of the last glyph in the particular word plus the x-coordinate of the advance vector for the last glyph in the word, adjusted to the right alignment position expected for the glyph.

The process then determines (at 2510) desired cluster properties. In some embodiments, the cluster properties are the constraints for density clustering described above. Some embodiments use two density constraints: a minimum cluster size (i.e., the minimum number of values in the subset) and maximum cluster spread (i.e., the largest allowed difference between the largest and smallest values in the subset). In the case of using density clustering for determining alignment guides, some embodiments use a minimum cluster size that is a fraction of the total lines in the page or zone being evaluated, while other embodiments use a constant. Some embodiments use a maximum spread that is a fraction of the median font size of the first (for left-alignment) or last (for right-alignment) characters of words. One example of constraints are that the minimum cluster size is 5% of the total number of text lines in the region, and the maximum spread is 10% of the median font size.

Next, the process applies (at 2515) density clustering to the input data using the determined cluster properties to determine clusters of x-coordinate values that may be alignment guides. Some embodiments use process 2000 as described above.

The process then determines (at 2517) whether there are any unprocessed clusters. When there are no clusters, or all clusters have been processed, the process ends. Otherwise, the process selects (at 2520) a cluster (i.e., one of the clusters output from the cluster analysis). The process then sets (at 2525) a right-alignment guide as a rectangle with the minimum and maximum x-coordinates as the smallest and largest values in the cluster and the minimum and maximum y-coordinates as the top and bottom of the page. In some cases, the minimum and maximum x-coordinate will be the same, as all the x-coordinates in the cluster will have the same value. In other cases, small aberrations or words that accidentally make it into the cluster will give the rectangle a non-zero width.

The process then removes (at 2530) the rectangle at y-coordinates that do not satisfy constraints based on an analysis of words that end in the rectangle and words that cross the rectangle. The process then proceeds to 2517, described above. Some embodiments remove a portion of the rectangle anywhere that a word crosses or starts in the rectangle and ends right of the rectangle. The rectangle is also removed at any y-coordinate that is between two crossing words that do not have a sufficient number of border words between them. A border word is a word that ends in or at one of the edges of the rectangle. Some embodiments use a requirement that there be at least five border words between crossing words, and at least one of those five border words must be the rightmost on its text line or separated from the next word on its text line by more than a normal word gap. Some embodiments use processes described in United States Publication No. 2007/0250497 to determine word gaps and larger gaps. Some embodiments use different requirements (e.g., fewer or greater than five border words between crossing words) to perform operation 2530.

C. Determining Gutters

After determining the guides, some embodiments then determine gutters of the region (e.g., zone, page, etc.). Some embodiments use information from the guide determination process (e.g., processes 2100 and 2500) to determine the groupings of unfilled white space between associated glyphs (e.g., gutters) of the region. Some embodiments also use other alignment points in addition to guides for determining gutters in a region.

Figure 26:
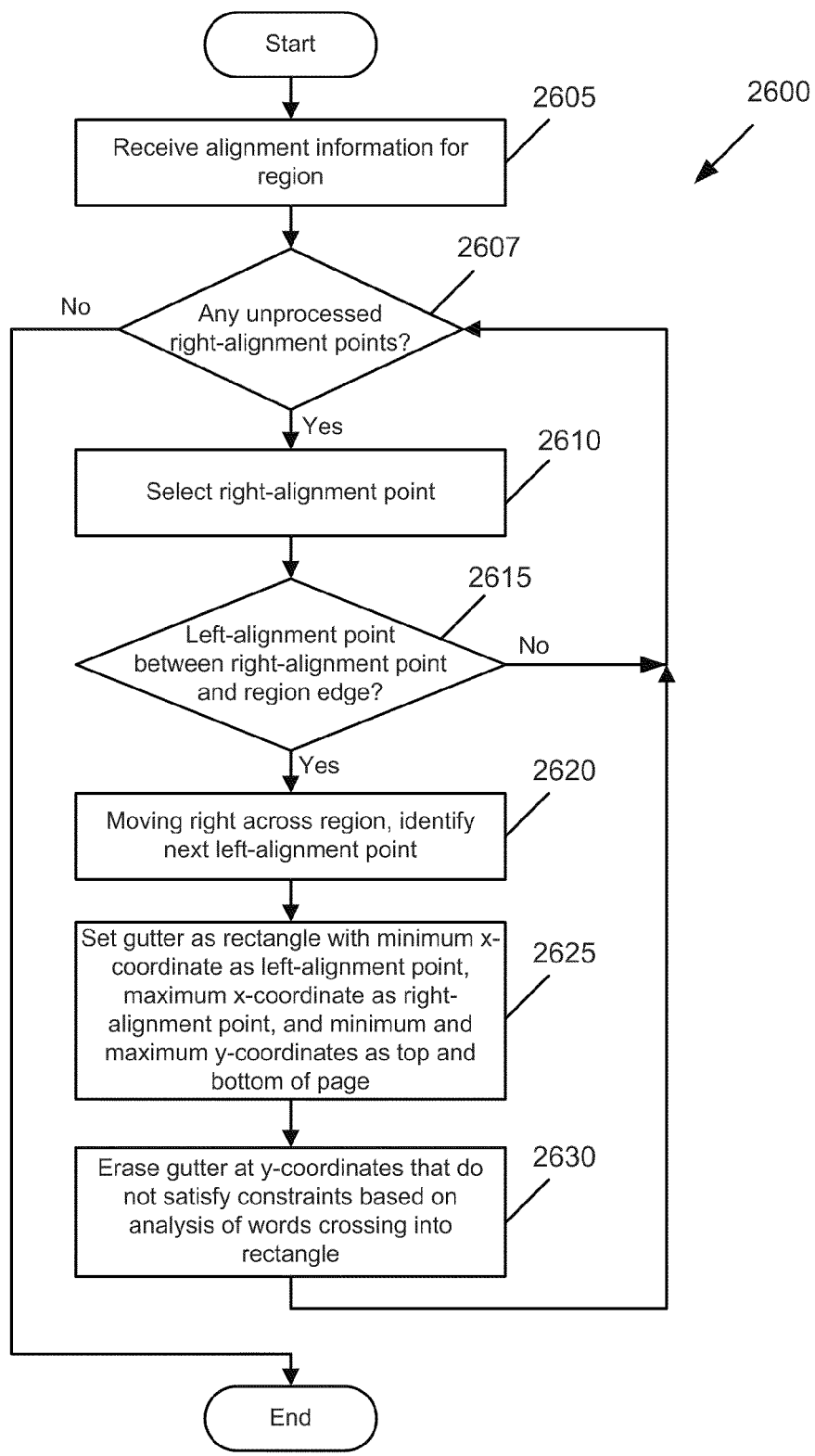
FIG. 26 conceptually illustrates a process of some embodiments for determining gutters for a region of a document.
Figure 27:
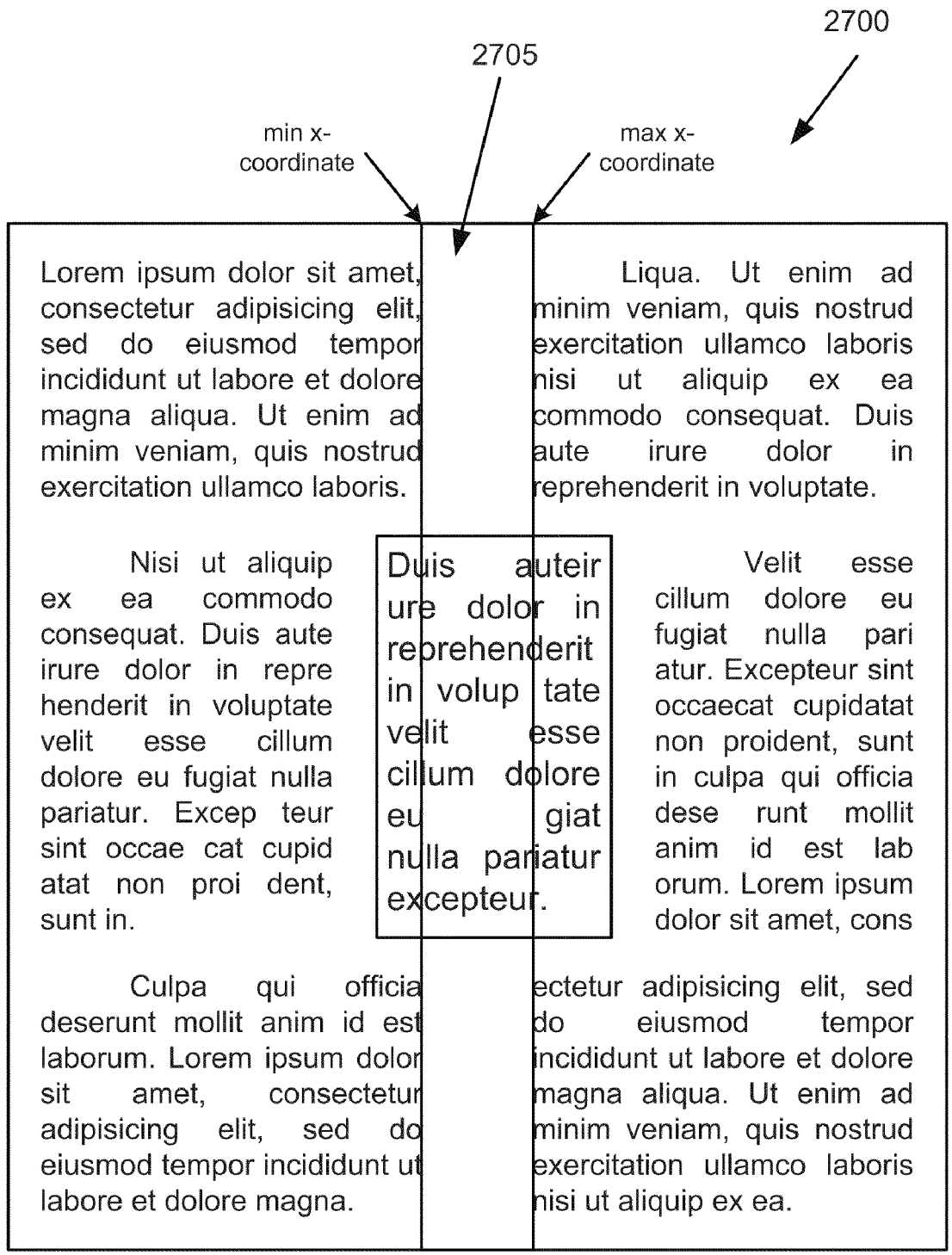
Figure 29:
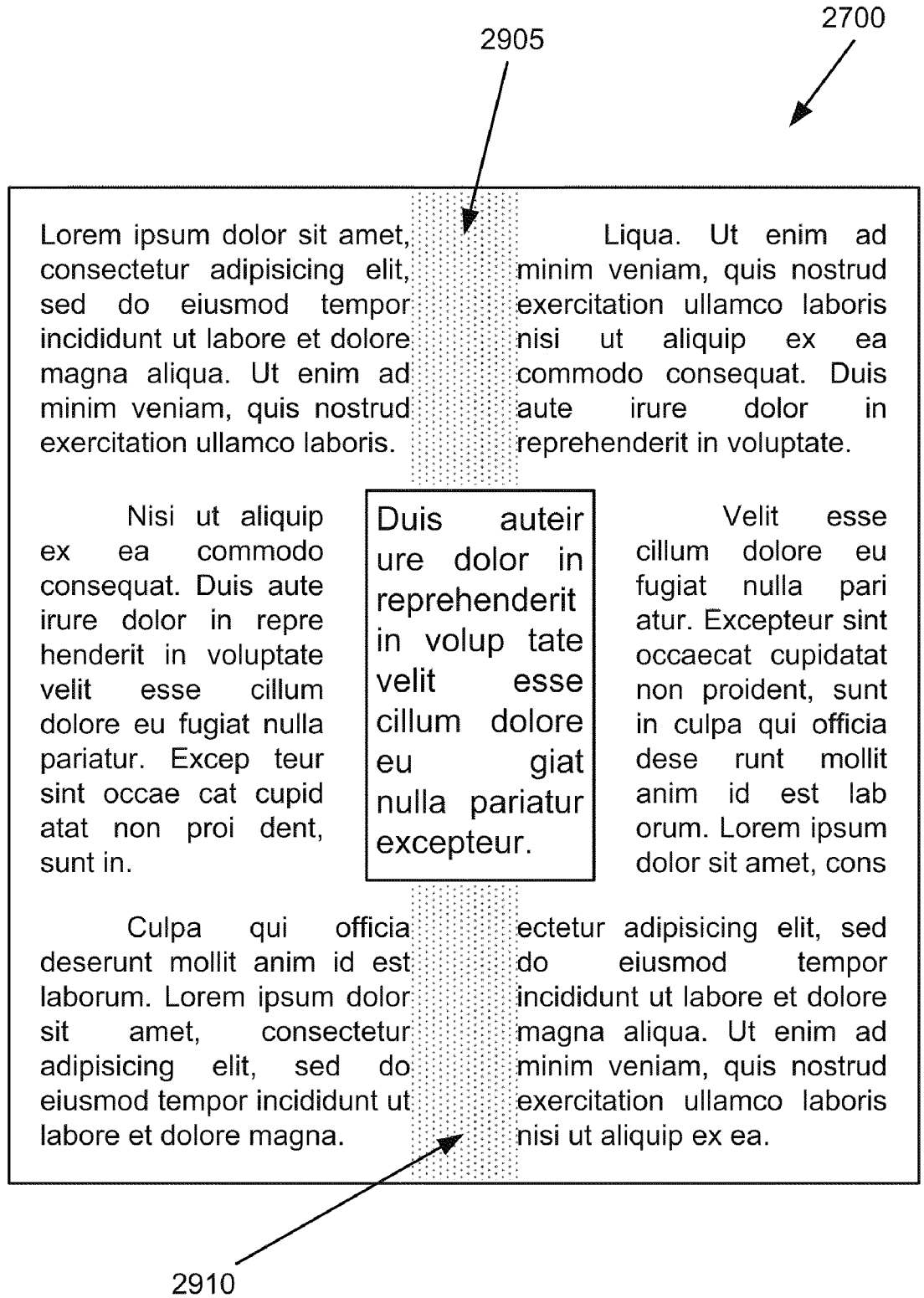

FIG. 26 conceptually illustrates a process 2600 of some embodiments for determining gutters for a region. Portions of process 2600 will be described in conjunction with FIGS. 27-29. FIGS. 27-29 illustrate the process of identifying a gutter on a page 2700.

As shown in FIG. 26, the process receives (at 2605) alignment information. In some embodiments, this information is the guides determined by processes 2100 and 2500. Some embodiments include other alignment points as well as guides. For instance, in some embodiments, the end of text lines in left-aligned (not justified) text are treated as right-alignment points. This enables gutters to be identified in column gaps even if no guide is found at the right edge of the first column. Similarly, the left edge of right-aligned text, or both edges of centered text, are considered alignment points in some embodiments.

Process 2600 then determines (at 2607) whether there are any unprocessed right-alignment points. When there are no right alignment points, or all have been processed, the process ends. Otherwise, the process selects (at 2610) a right-alignment point. In some embodiments, the process identifies the leftmost right-alignment point first, while in other embodiments it picks a random right-alignment point.

The process then determines (at 2615) whether a left-alignment point exists between the selected right-alignment point and the right edge of the region. When there are no left-alignment points, the process proceeds to 2607, which was described above. Otherwise, when there is at least one left-alignment point between the right-alignment point and the region edge, the process identifies (at 2620) the next left-alignment point moving right across the region from the selected right-alignment point. It is the area between these two points that the process tests to determine if there is a gutter.

Once the right- and left-alignment points are identified, the process sets (at 2625) a gutter as a rectangle with the right-alignment point as the minimum x-coordinate and the left-alignment point as the maximum x-coordinate. The minimum and maximum y-coordinates of the rectangle are the top and bottom of the page. FIG. 27 illustrates the page 2700 and a rectangle 2705 that is to be tested as a possible gutter. The minimum x-coordinate is the right-alignment point at the right edge of the first column, and the maximum x-coordinate is the left-alignment point at the left edge of the second column.

Next, the process removes (at 2630) the gutter at y-coordinates that do not satisfy constraints based on an analysis of words that cross into the rectangle and border the rectangle. Some embodiments remove a portion of the rectangle anywhere that a word crosses into or starts in the rectangle. The rectangle is also removed at any y-coordinate that is between two crossing words that do not have a sufficient number of border words between them. A border word for a gutter is a word that ends at the left edge of the rectangle or starts at the right edge of the rectangle. Some embodiments use a requirement that there be at least five border words between crossing words, and at least one of those five border words must be either the leftmost on its text line or separated from the previous word on its text line by more than a normal word gap or the rightmost on its text line or separated from the next word on its text line by more than a normal word gap. Some embodiments use processes described in the above mentioned United States Publication No. 2007/0250497, to determine word gaps and larger gaps. Some embodiments use different requirements (e.g., fewer or greater than five border words between crossing words) to perform operation 2630. The process then proceeds to 2607, which was described above.

FIG. 28 illustrates the page 2700 and rectangle 2705 with the crossing words for rectangle 2705 circled. The crossing words include words 2810 ("cillum") and 2815 ("nulla"), among others. There is a border word 2820 ("eu") between crossing words 2810 and 2815; however, if the requirement for border words in between crossing words is two or larger, then the rectangle would be removed through this section as well. Some embodiments remove only from the greatest ascent to the greatest descent of crossing words and non-qualifying areas in between crossing words. Other embodiments also remove areas that are likely beyond the gutters.

FIG. 29 illustrates gutters 2905 and 2910 for page 2700. Because of the call-out region in the center of the page, the gutter between the two main columns does not run the entire length of the page.

Some embodiments use the guides and gutters throughout the semantic reconstruction process. For example, gutters are used to split text lines and identify columns, processes that are described below in Section IV.

D. Software Architecture

Figure 30:
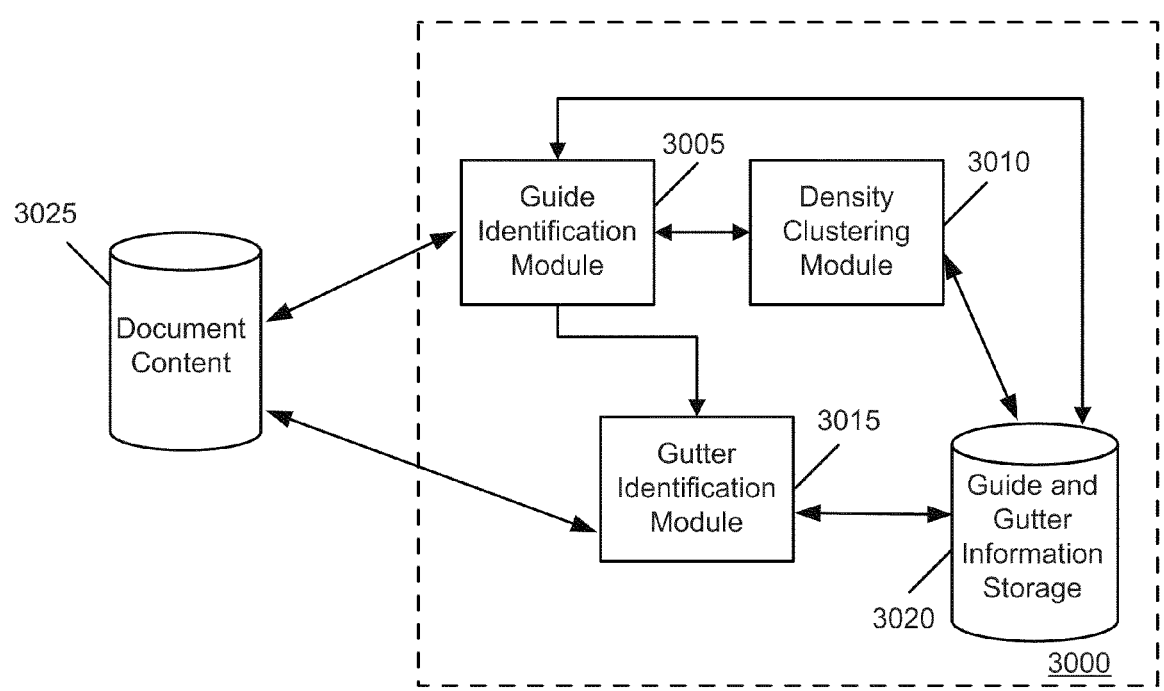
FIG. 30 conceptually illustrates the software architecture of a guide and gutter analysis application of some embodiments.

In some embodiments, the guide and gutter analysis processes described above are implemented as software running on a particular machine, such as a computer, a media player, a cell phone (e.g., an iPhone®), or other handheld or resource-limited devices (or stored in a computer readable medium). FIG. 30 conceptually illustrates the software architecture of a guide and gutter analysis application 3000 of some embodiments for identifying guides and gutters in a document. In some embodiments, the application is a stand-alone application or is integrated into another application (e.g., a document reconstruction application), while in other embodiments the application might be implemented within an operating system.

Guide and gutter analysis application 3000 includes a guide identification module 3005, a density clustering module 3010, and a gutter identification module 3015, as well as guide and gutter information storage 3020.

FIG. 30 also illustrates document content 3025. Guide identification module 3005 receives information from the document content 3025. The guide identification module 3005 analyzes the document content to identify alignment guides in the document. The identified guides are passed to gutter identification module 3015 as well as to guide and gutter information storage 3020 and to the document content 3025. In some embodiments, guide identification module 3005 performs some or all of processes 2100 and 2500.

The guide identification module 3005 also passes information to, and receives information from, the density clustering module 3010. Density clustering module 3010 receives input data from the guide identification module 3005 and/or the guide and gutter information storage 3025 and performs density clustering on the input data in order to determine potential guides. In some embodiments, density clustering module 3010 performs some or all of process 2000.

The gutter identification module 3015 receives information from the guide identification module 3005 and the document content 3025. The gutter identification module analyzes the received information to identify gutters in the document. The identified gutters are passed to the guide and gutter information storage 3020 and to the document content 3025. In some embodiments, gutter identification module 3015 performs some or all of process 2600.

In some embodiments, the results of the processes performed by the above-described modules or other modules are stored in an electronic storage (e.g., as part of a document object model). The document object model can then be used for displaying the document on an electronic display device (e.g., a handheld device, computer screen, etc.) such that a user can review and/or interact with the document (e.g., via touchscreen, cursor control device, etc.).

IV. Determining the Layout and Flow

Documents generally have an implicit structure and flow of content. Specifically, in some cases, ordered sequences of characters (and inline graphics) make up words, ordered sequences of words make up text lines (or span text lines with a hyphen), ordered sequences of text lines make up paragraphs, ordered sequences of paragraphs make up columns (or span columns), ordered sequences of columns make up layouts, and ordered sequences of layouts make up sections of a document. When this structure is not provided in the file format of an electronic document, the structure has previously been inaccessible to software. While merely viewing a document does not necessarily require document structure, applications for editing, importing, searching, styling, or otherwise repurposing a document do require knowledge of the document structure and flow in order to function properly.

Some embodiments of the invention provide methods for determining the layout and flow of a document or a region of a document. This includes determining the semantic hierarchy (e.g., the words, lines, and paragraphs of a document), as well as layout properties such as the columns and how the columns fit together for intended reading of the document. In some embodiments, the goal of the processes is to identify the order in which a human would read a document from start to finish.

Figure 31:
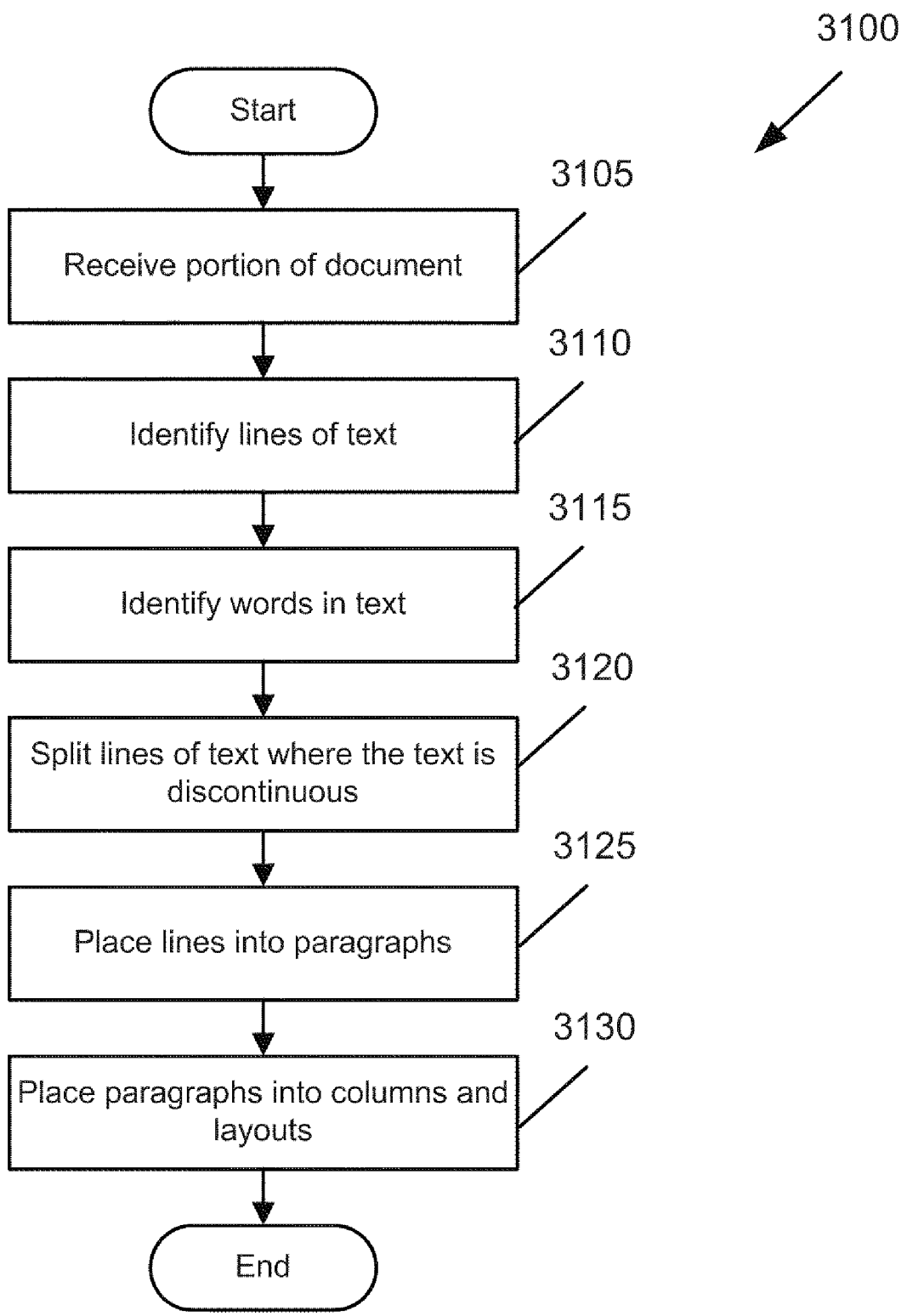
FIG. 31 conceptually illustrates a process of some embodiments for determining the layout and flow of a document.
Figure 32:
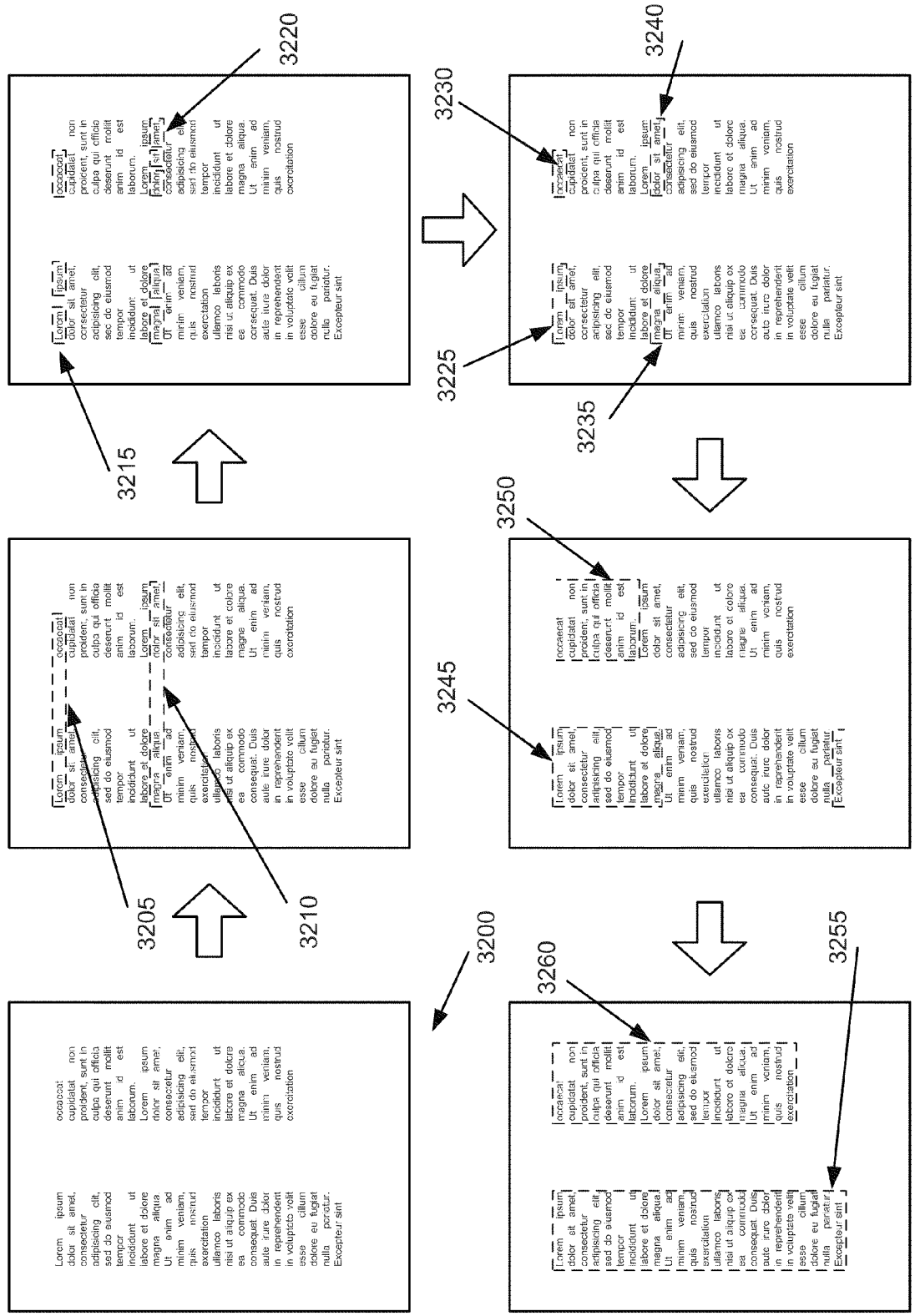
FIG. 32 illustrates a sequence of some embodiments of the determination of layout and flow information for a page of a document.

FIG. 31 conceptually illustrates a process 3100 of some embodiments for determining the layout and flow of a document. Process 3100 will be described in conjunction with FIG. 32. FIG. 32 illustrates a sequence of various layout and flow information being determined for a page 3200 of a document with two columns of text. In FIG. 32, one will recognize that the content of page 3200 is not important, but rather that the lines, paragraphs, etc. are of import. As shown in FIG. 31, process 3100 receives (at 3105) a portion of a document. In some embodiments, the portion is the entire document, or a section, page, or zone.

The process then identifies (at 3110) lines of text in the received document. This includes identifying characters that share a common baseline and merging preliminary lines together when necessary (e.g., subscripts and superscripts). FIG. 32 illustrates the identification of lines 3205 and 3210. The line identification process of some embodiments is described in further detail below in subsection A.

Next, the process identifies (at 3115) words in the text. Some embodiments use difference clustering, as described in above mentioned United States Publication No. 2007/0250497 to identify words in the text. FIG. 32 illustrates the identification of words on page 3200, including the word 3215 ("Lorcm") from line 3205 and the word 3220 ("amct") from line 3210. The word identification process is also described in further detail below in subsection B The process then splits (at 3120) the lines of text where the text is discontinuous. FIG. 32 illustrates that line 3205 is split into lines 3225 and 3230, and line 3210 is split into lines 3235 and 3240. The line splitting process of some embodiments is described in further detail below in subsection C.

After splitting the lines, the process places (at 3125) the text lines into paragraphs. FIG. 32 illustrates paragraphs 3245 and 3250 identified on page 3200. The paragraph identification process is described in further detail below in subsection D.

Lastly, the process places (at 3130) the paragraphs into columns and layouts. FIG. 32 illustrates columns 3255 and 3260 identified on page 3200. The column and layout identification process is described in further detail below in subsection E.

Some embodiments do not perform all of the operations of process 3100 at once. Instead, some perform other document reconstruction processes in between operations of process 3100. For example, some embodiments determine lines of text and the words in the text, but then identify guides and gutters prior to splitting the lines of text.

A. Initial Line Identification

As mentioned above, in some embodiments lines of text have to be identified. Because every character in a particular line of text will not necessarily always share a common baseline, some embodiments attempt to merge lines together based on evidence that the characters in the two lines are intended to be read as part of the same line of text (e.g., superscripts and subscripts).

Figure 33:
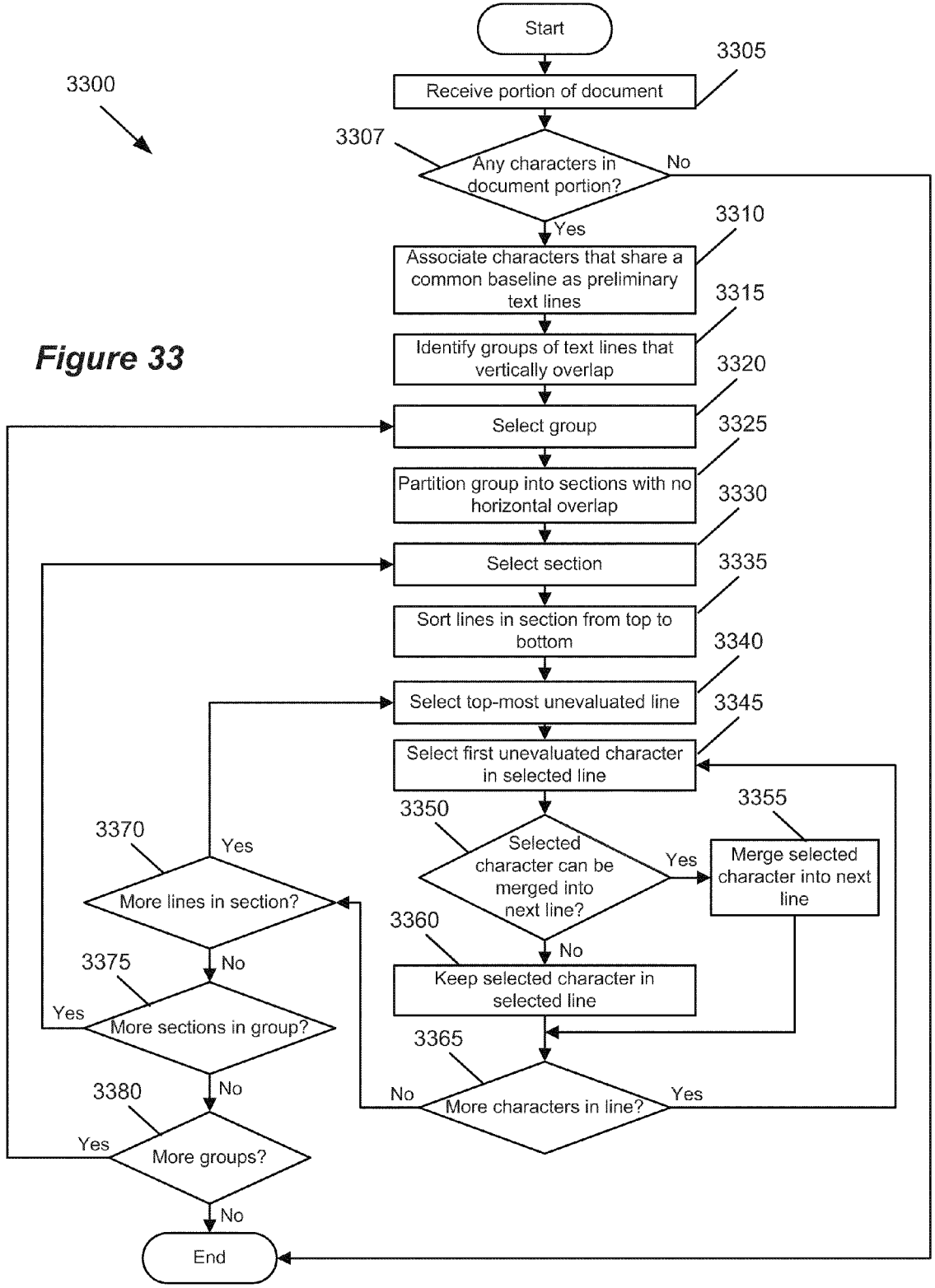
FIG. 33 conceptually illustrates a process of some embodiments for identifying and merging lines of text.
Figure 34:
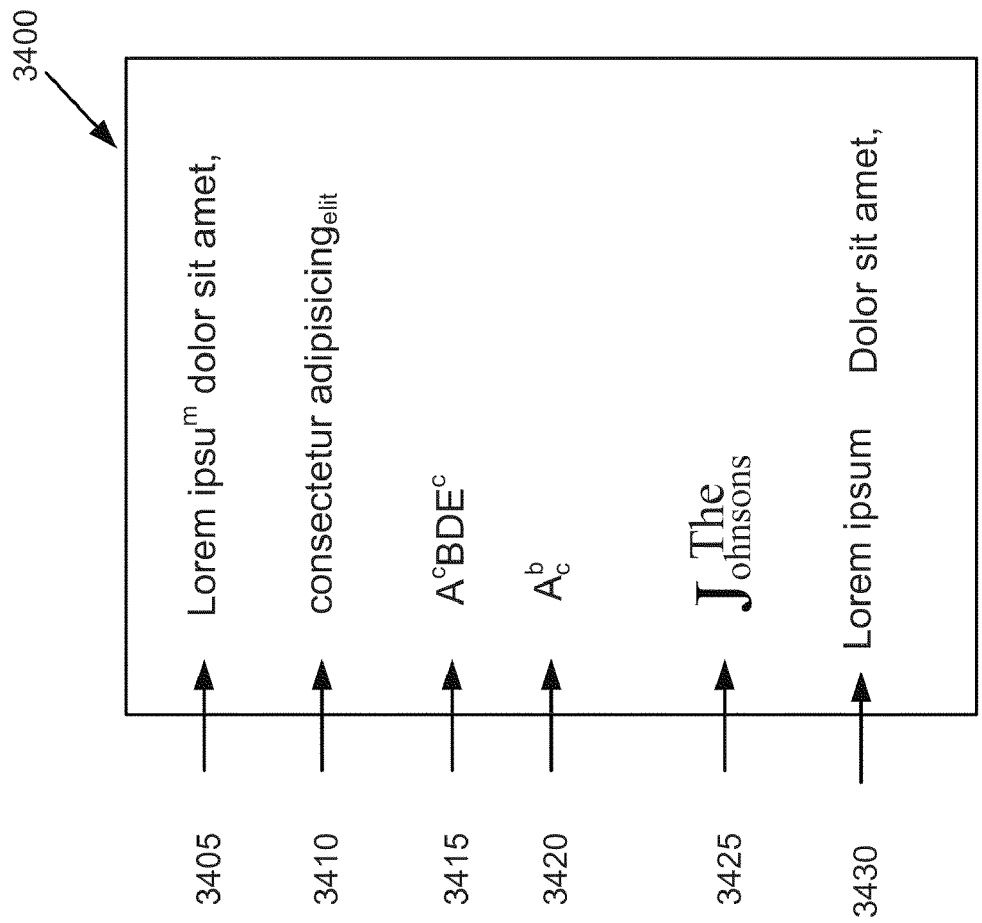
FIG. 34 illustrates a page with six groups of overlapping text lines.
Figure 35:
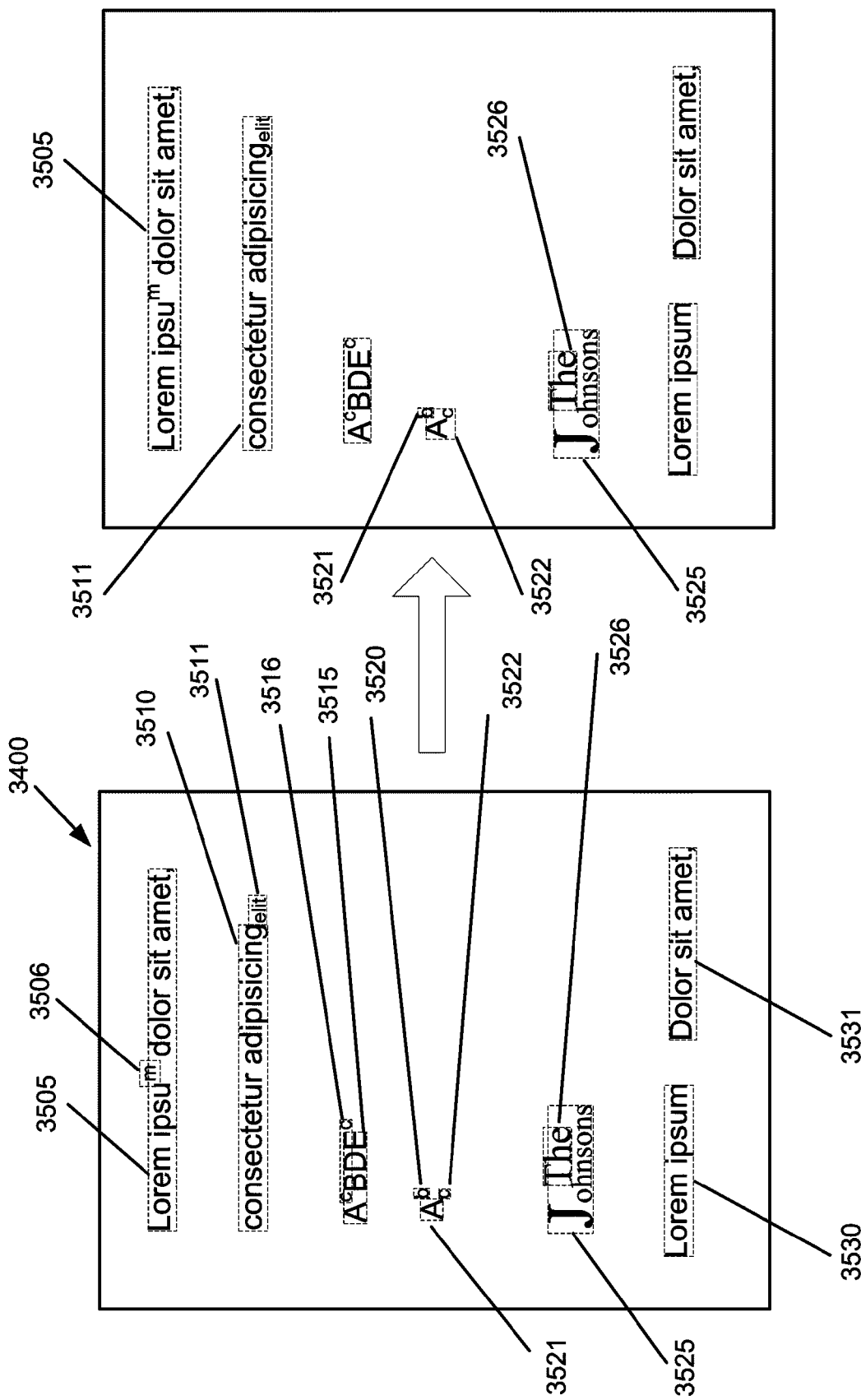
FIG. 35 illustrates the merging of the groups of text lines from FIG. 34.

FIG. 33 conceptually illustrates a process 3300 of some embodiments for identifying and merging lines of text. Process 3300 will be described in conjunction with FIGS. 34 and 35. FIG. 34 illustrates a page 3400 with six groups 3405-3430 of overlapping text lines, and FIG. 35 illustrates the merging of those groups of text lines according to some embodiments of the invention.

As shown in FIG. 33, the process receives (at 3305) a portion of a document. In some embodiments, the portion is a page of a document, or a zone of a page, etc. The process then determines (at 3307) whether there are any characters in the document portion. When there are none, the process ends. Otherwise, the process associates (at 3310) as preliminary text lines characters that share a common baseline. Characters share a common baseline in some embodiments when they have the same y-coordinate anchor point. In general, associating characters that share a common baseline will group together lines of standard text. Some embodiments use a small threshold such that the y-coordinate anchor points in a preliminary text line need not be exactly equal, but must be within the small threshold of each other.

Next, the process identifies (at 3315) groups of text lines that vertically overlap. Two lines vertically overlap in some embodiments when the bounding rectangle of the first line overlaps in y-coordinate values with the bounding rectangle of the second line. FIG. 35 illustrates the page 3400 with six groups of vertically overlapping text lines: lines 3505 and 3506, lines 3510 and 3511, lines 3515 and 3516, lines 3520, 3521, and 3522, lines 3525 and 3526, and lines 3530 and 3531. Line 3520 is associated in a group with line 3522 because both overlap with line 3521, even though they do not overlap each other. Even though there is no horizontal overlap, because lines 3530 and 3531 vertically overlap, they are initially grouped together in some embodiments.

The process then selects (at 3320) an unevaluated group and partitions (at 3325) the group into sections with no horizontal overlap between text lines of different sections. Two text lines horizontally overlap in some embodiments when the x-coordinates of the bounding box of the first text line overlap with the x-coordinates of the bounding box of the second text line. For instance, lines 3530 and 3531 are partitioned at this point because they do not horizontally overlap and thus would not be likely to be considered the same line. Some embodiments expand the measure of horizontal overlap a small distance (e.g., one half of a space character) at the beginning and end of the text lines, so that offset characters (e.g., subscripts and superscripts) at the beginning or end of a line are merged. For example, there is no horizontal overlap between lines 3510 and 3511, but they are not partitioned because the end of line 3510 is close enough to the beginning of line 3511.

After partitioning the selected group, the process selects (at 3330) an unevaluated section from the group and sorts (at 3335) the lines in the section from top to bottom. Thus, if the selected section with lines 3520-3522 is selected, the lines would be sorted with line 3520 first, line 3521 second, and line 3522 third. Various embodiments sort the lines by ascent, descent, baseline, or other measure of the vertical position of a line.

The process then selects (at 3340) the top-most unevaluated line in the section. Next, the process selects (at 3345) the first (reading from the left for left-to-right languages) unevaluated character in the selected line. The process determines (at 3350) whether the selected character can be merged into the next line. Some embodiments allow a character to be merged into the next line when the selected character does not horizontally overlap significantly with any character in the next line. Some embodiments allow some small amount of horizontal overlap between characters. For left-to-right languages, some embodiments allow less overlap on the left of the character to be merged down than on the right of the character to be merged down, in order to account for common spacing adjustments for offset characters.

Furthermore, some embodiments allow any amount of overlap when the original insertion order of the overlapping characters is adjacent. The insertion order, in some embodiments, is the order in which the characters are drawn on the page. Often (though not always), characters are drawn in the order they are meant to be read, so when two vertically and horizontally overlapping characters are adjacent in the insertion order, it is likely they are intended to be read together.

When the process determines that the selected character can be merged into the next line, the process merges (at 3355) the selected character in to the next line. The process then proceeds to 3365 which is described below. Otherwise, when the selected character cannot be merged, the process keeps (at 3360) the selected character in the selected line.

Next, the process determines (at 3365) whether the selected line includes more characters. When there are more characters in the currently selected line, the process proceeds to 3345 to select the next unevaluated character in the line. Otherwise, when all characters in the line have been evaluated, the process determines (at 3370) whether the current section includes more lines. When there are more lines in the currently selected section, the process proceeds to 3340 to select the next unevaluated line.

Otherwise, when all lines in the section have been evaluated, the process determines (at 3375) whether the selected group includes more sections. When there are more sections in the currently selected group, the process proceeds to 3330 to select another section and merge lines in that section. Otherwise, when all the sections in the group have been evaluated, the process determines (at 3380) whether there are any more groups to evaluate in the document portion. When there are more groups, the process proceeds to 3320 to select another group. Otherwise, when all groups have been evaluated, then line-merging is finished for the document portion and the process ends.

FIG. 35 illustrates the result of line merging for page 3500 in some embodiments. Line 3506 can merge down into line 3505, such that line 3505 now includes the superscript "m" from line 3506, while line 3506 is empty and is therefore removed. Although there is no horizontal overlap between lines 3510 and 3511, the end of line 3510 is close enough to the start of line 3511 that they are not partitioned, and all of line 3510 can be merged down into 3511. Both characters in line 3516 are merged down into line 3515.

Lines 3520-3522 cannot be fully merged. The character "b" in line 3520 is initially merged down into line 3521. Then, the character "A" in line 3521 is merged down into line 3522 as it does not overlap with the character "c". However, character "b" is not merged down into line 3522 because it completely overlaps with character "c". Thus, line 3521 only includes "b", line 3522 includes "A" and "c", and line 3520 is empty. As described above, some embodiments will merge "b" into line 3522 if "b" and "c" are adjacent in the insertion order.

Similarly, lines 3525 and 3526 are not merged. All of the characters in line 3526 significantly overlap one or more characters in line 3525, and therefore are not merged down into line 3525. It is unlikely that the "T" in line 3526 would be between the "h" and "n" of line 3525 in the insertion order for page 3500. Lastly, lines 3530 and 3531 are not merged because there is no horizontal overlap between the lines and thus they are partitioned at operation 3325.

After the lines are identified and merged, words are identified in some embodiments. Some embodiments use difference clustering, as described in United States Publication No. 2007/0250497 to identify words based on spacing between letters within a word and between words. In some embodiments, the difference clustering also provides information about segment gaps, column gaps, etc. Some embodiments use the memory and processing efficiency techniques described below in Section VI to perform difference clustering.

B. Identifying Words and Gaps Using Difference Clustering

Figure 36:
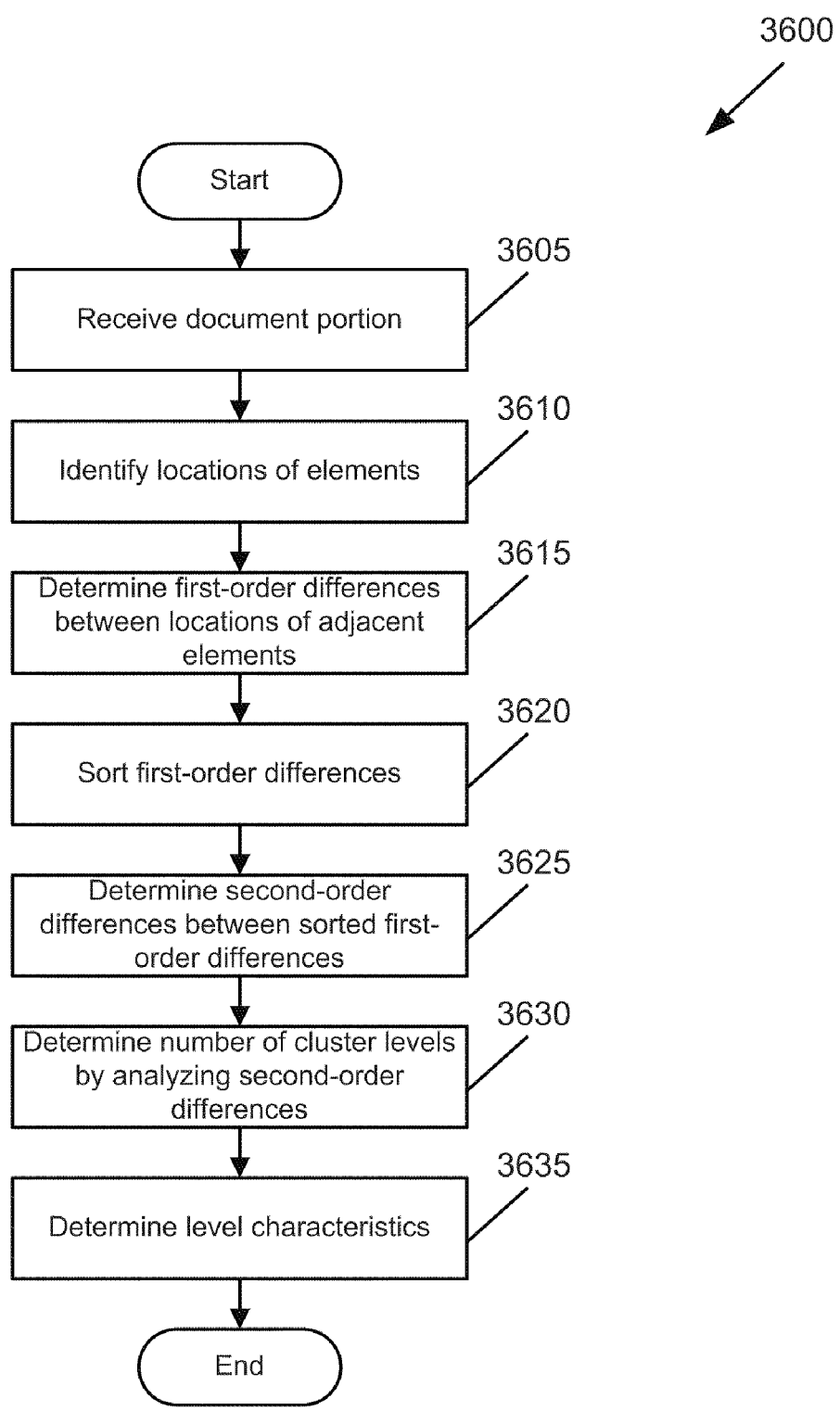
FIG. 36 conceptually illustrates a process of some embodiments for performing difference clustering.

FIG. 36 conceptually illustrates a process 3600 of some embodiments for performing difference cluster analysis. Many forms of cluster analysis require foreknowledge of the number of groups/clusters since there may exists multiple levels/hierarchies of clustering. For example, when using cluster analysis to group celestial objects, a specification of the number of clusters determines whether the cluster analysis will group objects on the level of stars, solar systems, galaxies, or superclusters. However when using cluster analysis to discover the structural relationships between elements of content, e.g., the number of groups are not known in many cases. For example, in the case of a page of text, it cannot be assumed the glyphs make up words, words combine to form lines, and groups of lines form paragraphs, because the document may have two or more columns of text such that a given initial line of text may include parts of two or more paragraphs.

In some embodiments, cluster analysis is a set of techniques that can be applied to a collection of data points to group points into clusters that are closer to each other than to the points of another cluster. In some embodiments, cluster analysis is applied to data points that represent the horizontal and vertical gaps between objects such as glyphs, words, and text lines. For example, some embodiments use k-means cluster analysis, which will now be described. Starting with a collection of numbers $(p_1, \ldots, p_N)$ representing spatial gaps, and a known value for k (the number of clusters), the technique is used to partition the numbers into k clusters $C_1, \ldots, C_k$ defined by inequalities of the form $C_j = \{p_i | a_j \leq p_i < a_j + 1\}$ where $a_1, \ldots a_{k+1}$ is an increasing sequence. Before applying the k-means technique, the differences $p_{i+1} - p_i$ are sorted by size and the k−1 largest differences are taken to be the partition points. For example, if $p_{i+1} - p_i$ is one of the k−1 largest differences, then $p_{i+1}$ is in a different cluster from $p_i$, and $p_{i-1}$ is one of the successive values $a_j$. k-means cluster analysis is then applied to repeatedly refine the clusters. The k-means technique involves taking the mean of the numbers in each cluster, then re-distributing the $p_i$ into clusters by associating them with the closest calculated mean. This is performed repeatedly until it causes no change in the clusters or their means.

In some embodiments, a technique disclosed and referred to herein as "difference clustering" is used to determine the number of levels of structural relationships that exist between content elements comprising a given source content and/or one or more hierarchical relationships between such levels, as well as one or more characteristics that can be used to determine whether a content element is related to another content in each of the determined levels. In some embodiments, difference clustering utilizes the k-means technique together with other techniques. In the example shown in FIG. 36, differences between positions of content elements (spacing) are analyzed using difference clustering analysis. In some embodiments, by analyzing the spacing between content elements, the content elements can be grouped at least in part using the grouping data of the spacing. In some embodiments, each directional component of spacing is analyzed separately. For instance, difference clustering analysis on the horizontal component is used to distinguish between character spacing, word spacing, and column spacing. Difference clustering analysis on the vertical component can be used to distinguish line spacing, paragraph spacing, and text box spacing in some embodiments. Process 3600 conceptually illustrates difference clustering analysis for a single directional component. The process may be used again to analyze one or more additional directional components. In some embodiments, the results of performing difference cluster analysis along one or more dimensions are combined together to determine the structural relationships between content elements at one or more levels.

As shown in FIG. 36, process 3600 receives (at 3605) a portion of a document. The process then identifies (at 3610) the locations of elements in the document. In some embodiments, the elements include characters, glyphs, images, lines, drawings, boxes, cells, margins, and/or various other content elements. In some embodiments, locations of the elements include determining and/or assigning one or more location coordinate components to the elements. In some embodiments, the locations of the elements are organized in an order. For example when analyzing the horizontal spacing of characters, the characters are organized in increasing horizontal coordinate order for each line of characters. In some embodiments, the location coordinate values of the elements are desired to be associated with the spacing between the elements, and the location values are compensated for the width/length of the element. For example, when determining a compensated horizontal coordinate (x-coordinate) value for an element in the n-th position of an organized order of elements, the following formula is used:

$$X'_n = X_n - \sum_{i=1}^{n-1} W_i$$

where $X'_n$ is the compensated location coordinate value, $X_n$ is the original location coordinate value, and $W_i$ is width of an element in the i-th position. In some embodiments, the width of an element is based on the character it represents, the font size, the styling of the character, etc. Some embodiments determine a compensated location coordinate value by using known anchor coordinates for each character, and adjusting those coordinates for each particular character by the width of the particular character.

Next, the process determines (at 3615) the first-order differences between locations of adjacent elements. In some embodiments, an element is adjacent to another element when the two elements with at least one same location coordinate component value are ordered next to each other in at least one other location coordinate component value. For instance, two glyphs are adjacent to each other if both of the glyphs belong to the same text line and no other glyph exists between them. In some embodiments, two elements have at least one same location coordinate component when the difference between corresponding location coordinate component values of the elements is below a limit value or within a range value. In various embodiments, an element is adjacent to another element when the two elements are next to each other in an order and/or organization associated with the identified locations of the elements. In some embodiments, the first order difference between the locations is the difference between the width/length compensated location coordinate values. For instance, when determining the difference between compensated horizontal coordinate (x-coordinate) values for the adjacent elements in the nth and n+1 position of an organized order of compensated horizontal coordinates, in some embodiments the following formula is used.

$$\Delta X_n = X'_{n+1} - X'_n$$

In some embodiments, the first order difference is associated with the gap spacing between glyphs in the content.

Next, process 3600 sorts (at 3620) the first order differences. In some embodiments, organizing the first order difference includes ordering the first order differences in an increasing order. In some embodiments, organizing the first order differences includes assigning a weight value to one or more of the first order differences and organizing the first order differences at least in part by using the weight value(s). For instance, in some embodiments, actual glyph spacing is divided by expected glyph spacing for each specific pair of glyphs given the font that is used and its font metrics including size, default letter spacing, and a table of kerning values stored with the font file. This ratio of actual to expected spacing is ordered by increasing value, and the values of this ratio are used in place of the first order differences throughout the remainder of the difference clustering method.

The process then determines (at 3625) second order differences between the sorted first order differences. For instance, when determining the second order difference between first order differences in an i-th and i+1 position of an organized order of first order differences, the following formula is used:

$$\Delta^2 X_i = \Delta X_{(i+1)} - \Delta X_{(i)}$$

where $\Delta^2 X_i$ is the i-th second order difference, $\Delta X_{(i)}$ is the first order difference in the i-th position of the sorted first order differences, and $\Delta X_{(i+1)}$ is the first order difference in the i+1 position of the same sorted first order differences. In some embodiments, the second order differences are associated with differences between the spacing of glyphs.

Next, process 3600 determines (at 3630) the number of cluster levels by analyzing the second order differences. In some embodiments, analyzing the second order differences includes organizing the determined second order differences. In some embodiments, organizing the second order difference includes ordering the second order differences in an increasing order and/or plotting the second order differences in an order of increasing second order difference values. In some embodiments, organizing the second order difference includes assigning a weight value to one or more of the second order difference. In some embodiments, organizing the second order difference includes grouping the second order differences into one or more groups. In some embodiments, the second order differences are each categorized as either an inter-group difference or an intra-group difference.

Intra-group differences are associated with relatively smaller second order difference values and can represent second order differences of first order differences within the same clustering group. An example of an intra-group difference is the relatively small variation one would expect to find in the character-width compensated spacing between letters in the same word. Inter-group differences are associated with relatively larger difference values and can represent second order differences of first order differences between different clustering groups. An example of an inter-group difference is the relatively large difference between the space between two words, on the one hand, and the space between two letters in the same word, on the other.

In some embodiments, the categorization of second-order differences into intra-group and inter-group values is achieved by applying 2-means cluster analysis to the ordered second-order difference values; specifically, taking $(p_i, \ldots, p_N)$ to be $\{\Delta^2 X_1, \ldots, \Delta^2 X_N\}$ in increasing order. Similarly, any other technique of cluster analysis that is sufficient to distinguish two clusters of data values can be applied to the ordered second-order difference values. The intra-group differences are then in the first cluster $C_1 = \{p_i | a_1 \leq p_i \leq a_2\}$, and the inter-group differences are in the second cluster $C_2 = \{p_i | a_2 \leq p_i < a_3\}$, where $a_1 < a_2 < a_3$. In some embodiments, the number of levels into which content elements are determined to be organized, based on their spatial relationships analyzed as described above, is one more than the number of inter-group differences found through difference cluster analysis. For instance, when two inter-group differences exist, the number of structural levels is three. Taking a simple example, consider characters that form words comprising a single line of text. The first order differences in the spacing between characters in the x-x-direction would yield a second order difference between character spacing and word spacing (one inter-group difference), indicating two levels of structure (words and lines). When the text had been in two columns, a further second order difference (between word spacing and column spacing) would have been detected, for a total of two inter-group differences, indicating three structural levels in the x-direction (words, lines, and columns). Repeating the analysis in the y-direction and combining results would, when applicable to the particular content, identify in some embodiments any further structural levels (e.g., paragraphs, etc.) that are manifested in the spacing between characters and groups of characters.

The process then determines (at 3635) characteristics of each cluster level. The process then ends. In some embodiments, determining the characteristics includes determining which first order difference (and/or what range of first order differences) is associated with which cluster level. In some embodiments, determining the characteristic includes computing a statistical value associated with the first order differences associated with a cluster level. For example, by determining the average, minimum, maximum of the portion of first order differences associated with a cluster level, the average, minimum, and maximum spacing between glyphs in the content can be determined.

Let L be the number of levels of clustering. In some embodiments, L is computed by counting the number of points in the second cluster of second-order differences and adding 1. Next, the groups of first-order differences corresponding to each level can be identified, and the clusters of compensated $X_n'$ values can be identified at each level, for example, in one of the following two ways.

One possibility is to perform L-means cluster analysis on the first-order differences. The resulting L clusters are the groups of first-order differences corresponding to each level. Next the number $K_m$ of clusters of $X_n'$ at level m are computed by adding the number of points in the (m+1)th, (m+2)th, . . . , and Lth clusters of first-order differences plus 1. Finally, perform $K_m$-means analysis on the compensated $X_n'$ values to produce the $K_m$ clusters at level m.

A second possibility is, when originally computing each first-order difference $\Delta X_n = X_{n+1}' - X_n'$, to store its value together with the index n that can be used to identify either one of the pair of successive X values that were subtracted to produce that difference. Store the value and the index reference in a single "first-order difference" data structure. Similarly, when originally computing each second-order difference, store its value together with an index reference that can be used to identify either one of the pair of successive "first-order difference" data whose values were subtracted to produce that difference. Now, for each second-order difference that is in the second cluster (i.e. for each inter-group difference), use its index reference to identify a partition point in the first-order differences. This means that the index identifies a pair of first-order difference values that are partitioned to be in separate clusters. Partitioning in this way produces L clusters of first-order differences corresponding to the L levels of clustering in the original data. Now, the clusters of $X_n'$ values at level n are identified as follows: for each first-order difference data in the (m+1)th, (m+2)th, . . . , and Lth cluster of first-order differences, use its index reference as a partition point in the $X_n'$ values.

Figure 37:
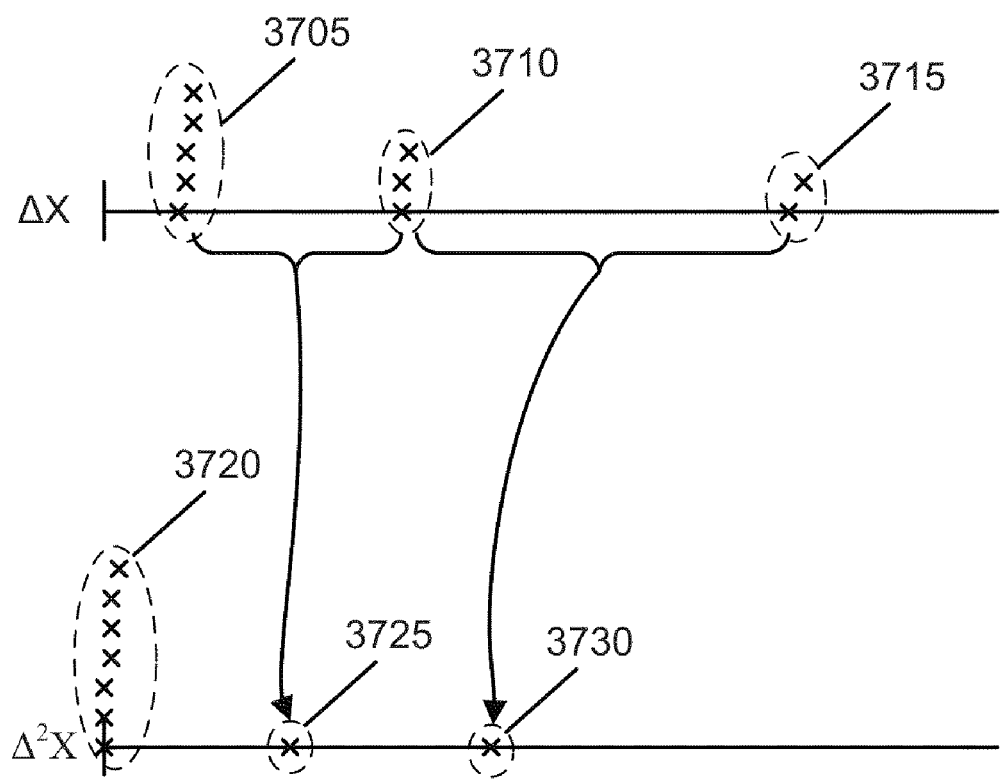
FIG. 37 illustrates an example of difference clustering.

FIG. 37 illustrates an example of difference clustering. In some embodiments, the example of FIG. 37 is associated with process 3600 of FIG. 36. Groups of first order difference values 3705, 3710, and 3715 are plotted in order from lowest value to highest value on a line associated with first order difference values. Each point is associated with a difference value, e.g., the distance from a text character or other glyph to an adjacent one, and in FIG. 37 the points are not superimposed on top of each other to illustrate the example clearly.

In the example shown, the data are associated with horizontal spacing between glyphs. By ordering the first order difference values, the example illustrates three groups of first order difference values 3705, 3710, and 3715. First order difference value group 3705 is associated with spacing between glyphs that compose words. First order difference value group 3710 is associated with spacing between words. First order difference value group 3715 is associated with spacing between columns. For each pair of adjacent first order difference values, a second order difference value (i.e., the difference between one first order difference and an adjacent first order difference) is determined and plotted in an increasing order on a line associated with second order difference values. Second order difference value group 3720, 3725, and 3730 each include one or more points associated with the second order difference values. In some embodiments, point 3725 is a member of a group of associated second order difference points comprising a second order difference value group.

In some embodiments, point 3730 is a member of a group of associated second order difference points comprising a second order difference value group. In some embodiments, 3720 is identified as one cluster and 3725 together with 3730 is identified as a second cluster. Second order difference values between the first order difference values within the same single first order difference value group (intra-group differences) are included in second order difference value group 3720. In a text document, for example, typically the character-width compensated spacing between characters within a word, or in the spacing between different pairs of words, varies only slightly. The second order difference between inter-group adjacent points in group 3705 and 3710 is included in point 3725. The second order difference between inter-group adjacent points in group 3710 and 3715 is included in point 3730. Since there exists two inter-group second order difference values in the example, there are two plus one (three) grouping levels (in this example, words, sentences or parts thereof on a line of text within a column, and columns). By determining the minimum and maximum of the first order difference values in group 3705, minimum and maximum spacing between glyphs that compose words can be determined, and similarly group 3710 and 3715 can be used to determine word spacing and column spacing respectively.

In some embodiments, the minimum and maximum spacing associated with each grouping level is used to group content elements (e.g., glyphs) accordingly, such as by identifying groups of characters that comprise words, group words into lines of text within a column, etc. By using data determined from cluster analysis, the glyphs are grouped into the determined levels of groupings. It is possible to perform the analysis quickly and automatically with respect to any arbitrary content, in part because it is not necessary to know in advance how many grouping levels there are in the structure of the content or other collection of elements being analyzed. Regardless of the number of grouping levels, the number of levels is determined in just two processing steps. By determining the average of the first order difference values in group 3705, the average spacing between glyphs that compose words can be determined. Similarly, other statistical quantities can be determined for the glyphs that compose words. Similarly, an analysis of the first order difference values in group 3710 and 3715 can be used to determine statistical quantities relevant to word spacing and column spacing.

C. Splitting Lines

Some embodiments split text lines after word and segment break information is generated. Text lines are split, for example, where the text line spans more than one column, as the text in the two (or more) sections is probably not meant to be read together. Some embodiments use guide and gutter information derived from processes described above in Section III along with information from difference clustering (e.g., segment gaps, etc.) in order to split the text lines.

Figure 38A:
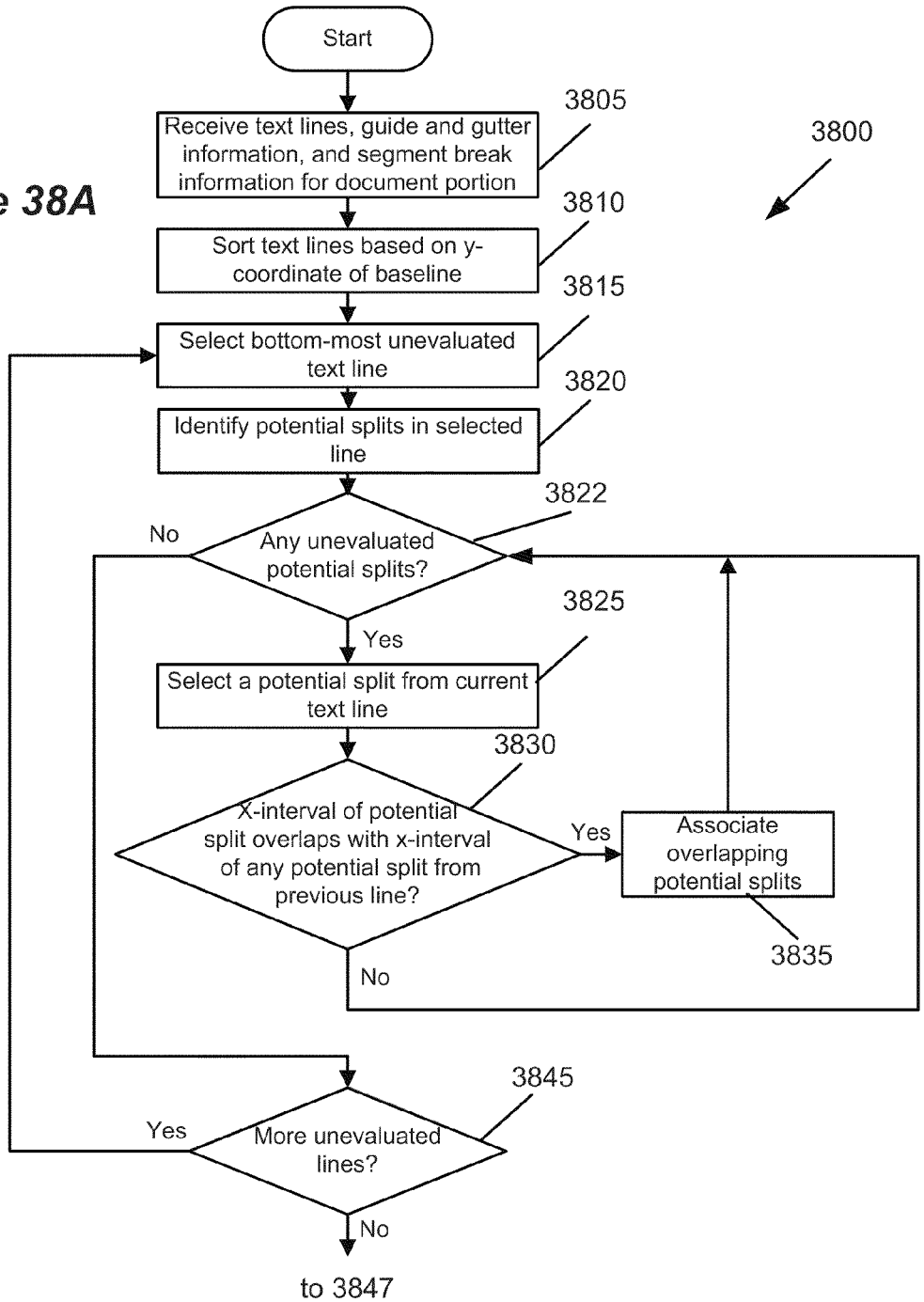
FIG. 38 conceptually illustrates a process of some embodiments for splitting lines of text.
Figure 38B:
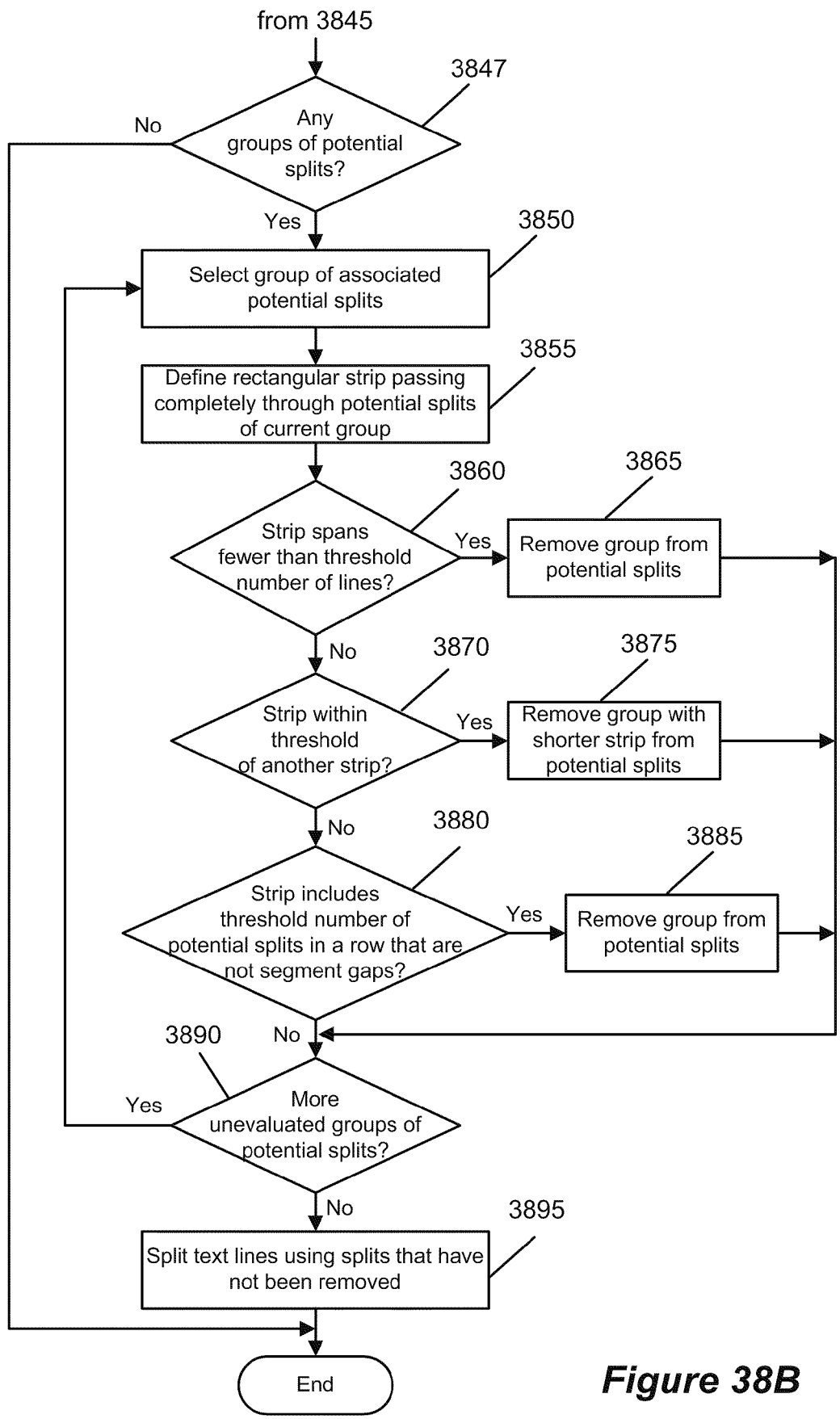

FIG. 38 conceptually illustrates a process 3800 of some embodiments for splitting lines of text. Portions of process 3800 will be described in conjunction with FIG. 39. FIG. 39 illustrates a sequence that shows the identification of where lines on a page 3900 should be split. As shown in FIG. 38, process 3800 receives (at 3805) text lines, guide and gutter information, and segment break information for a portion of a document. Text line information is the output of process 3300 in some embodiments, and guide and gutter information is the output of processes 2100, 2500, and 2600 in some embodiments. The segment break (or segment gap) information is one of the outputs of difference clustering as described in the above mentioned United States Publication No. 2007/0250497, as well as above, in some embodiments. In some embodiments, the document portion is the entire document, a section, a page, or a zone of a page.

Next, the process sorts (at 3810) the received text lines based on the y-coordinate of their baselines. Starting at the bottom of the page, the process selects (at 3815) the bottom-most unevaluated text line and identifies (at 3820) potential splits in the selected line. Some embodiments define a potential split as any gap between two words in a line either (1) is a segment gap, as defined by difference clustering, or (2) has a guide or gutter passing through it. Other embodiments only use one or the other, or different definitions, for potential splits.

The process then determines (at 3822) whether any potential splits were identified. When none were identified, the process proceeds to 3845, described below. Otherwise, the process selects (at 3825) a potential split from the currently selected text line. The process then determines (at 3830) whether the x-interval of the potential split overlaps with the x-interval of any potential split from the previous text line. The first text line evaluated will not have a previous text line, and therefore there will be no overlapping potential splits. When the x-interval of the currently selected potential split does not overlap with the x-interval of a potential split from the previous line, the process proceeds to 3822 which was described above. Otherwise, the process associates (at 3835) the overlapping potential splits. The process then proceeds to 3822 which was described above.

When there are no more unevaluated potential splits, the process determines (at 3845) whether there are more lines to evaluate. When more lines remain, the process proceeds to 3815 to identify potential splits in the next line and test them for overlap.

When all lines have been evaluated, then all the potential splits in the document portion have been identified and associated. The process then performs several operations to eliminate false positives (i.e., potential splits that should not actually split a line of text). The process determines (at 3847) whether any groups of potential splits were identified. When none were identified, the process ends. Otherwise, the process selects (at 3850) a group of associated potential splits and defines (at 3855) a rectangular strip passing completely through the potential splits of the selected group. The strip, in some embodiments, has an x-interval that is the intersection of the x-intervals of all the potential splits in the selected group (i.e., the x-interval for a strip two of whose potential splits barely overlap will be very thin).

FIG. 39 illustrates a page 3900 with several lines of text. Most of the lines of text are split between two columns. However, the baselines are the same in either column. Therefore, each line from the first column would be in the same line as a line from the second column prior to the line-splitting process. FIG. 39 also illustrates four rectangular strips 3905, 3910, 3915, and 3920 of associated potential splits.

After defining the rectangular strip for the selected group, the process determines (at 3860) whether the strip spans fewer than a threshold number of text lines. Strips that span one or only a few text lines are not likely to represent an actual split in reading, but rather may be tabs within a line or other non-breaking gaps. Sometimes segment gaps are found by difference clustering where a gap between words is very large due to justified text. When the strip spans fewer than the threshold number of lines, the process removes (at 3865) the group from the list of potential splits and will not split the text lines at those locations. The process then proceeds to 3890 which is described below. On page 3900, the potential splits making up strips 3910 and 3920 are removed because they do not have enough splits to be a likely column break. More likely, the potential splits are tabs or large word gaps.

When the strip spans at least the threshold number of lines, the process determines (at 3870) whether the current strip is within a threshold distance of another strip. Some embodiments only look to prior strips that have been tested and not yet removed when determining whether another strip is within a threshold of the current strip. When the current strip is within the threshold distance of another strip, the process removes (at 3875) the group with a vertically shorter strip (in some cases, where the lines are all the same size, this is the strip that spans fewer text lines). The process then proceeds to 3890 which is described below.

Strips 3905 and 3915 of page 3900 both qualify as spanning enough text lines to pass operation 3860. However, in some embodiments the strips are too close to each other to both be kept. Accordingly, the group of potential splits making up strip 3905 is removed because 3915 is the longer of the two strips. This process prevents list bullets or number from being split from the items they reference, in some embodiments, as well as other potentially problematic splits.

When the current strip is not too close to another strip, the process determines (at 3880) whether the strip includes a threshold number of subsequent potential splits in a row that are not segment gaps. In some embodiments, it is possible to identify a guide and/or gutter where word edges accidentally align. This is especially likely if the text is displayed in a monospace font (e.g., Courier). When the strip includes at least this threshold number of subsequent non-segment gap potential splits, the process removes (at 3885) the group from the list of potential splits and will not split the text lines at those locations.

Next, the process determines (at 3890) whether there are more groups of potential splits that have not been tested against the various threshold requirements. When more groups remain, the process proceeds to 3850 to select and evaluate the next group of potential splits. Otherwise, when all groups have been evaluated, the process splits (at 3895) the text lines using any of the splits that have not been removed. The process then ends. In the case illustrated for page 3900, the only splits that would be used are those in the center separating the two columns of text.

While process 3800 is illustrated using three specific tests (operations 3860, 3870, and 3880) to remove groups of potential splits, some embodiments employ only a subset of these, while other embodiments use other tests that are not shown in order to eliminate potential splits from consideration.

D. Paragraph Identification

Figure 40:
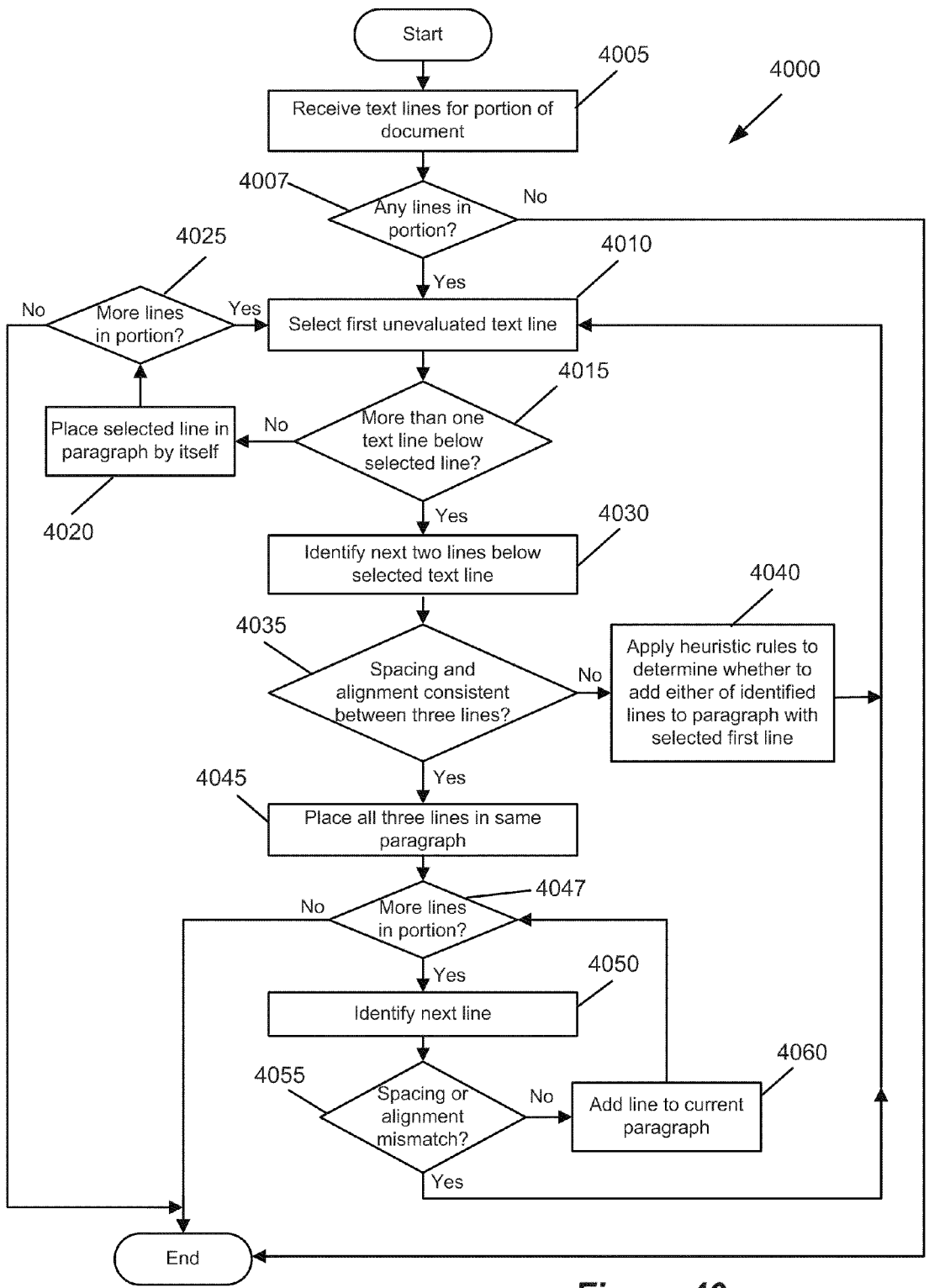
FIG. 40 conceptually illustrates a process of some embodiments for grouping text lines into paragraphs.
Figure 41:
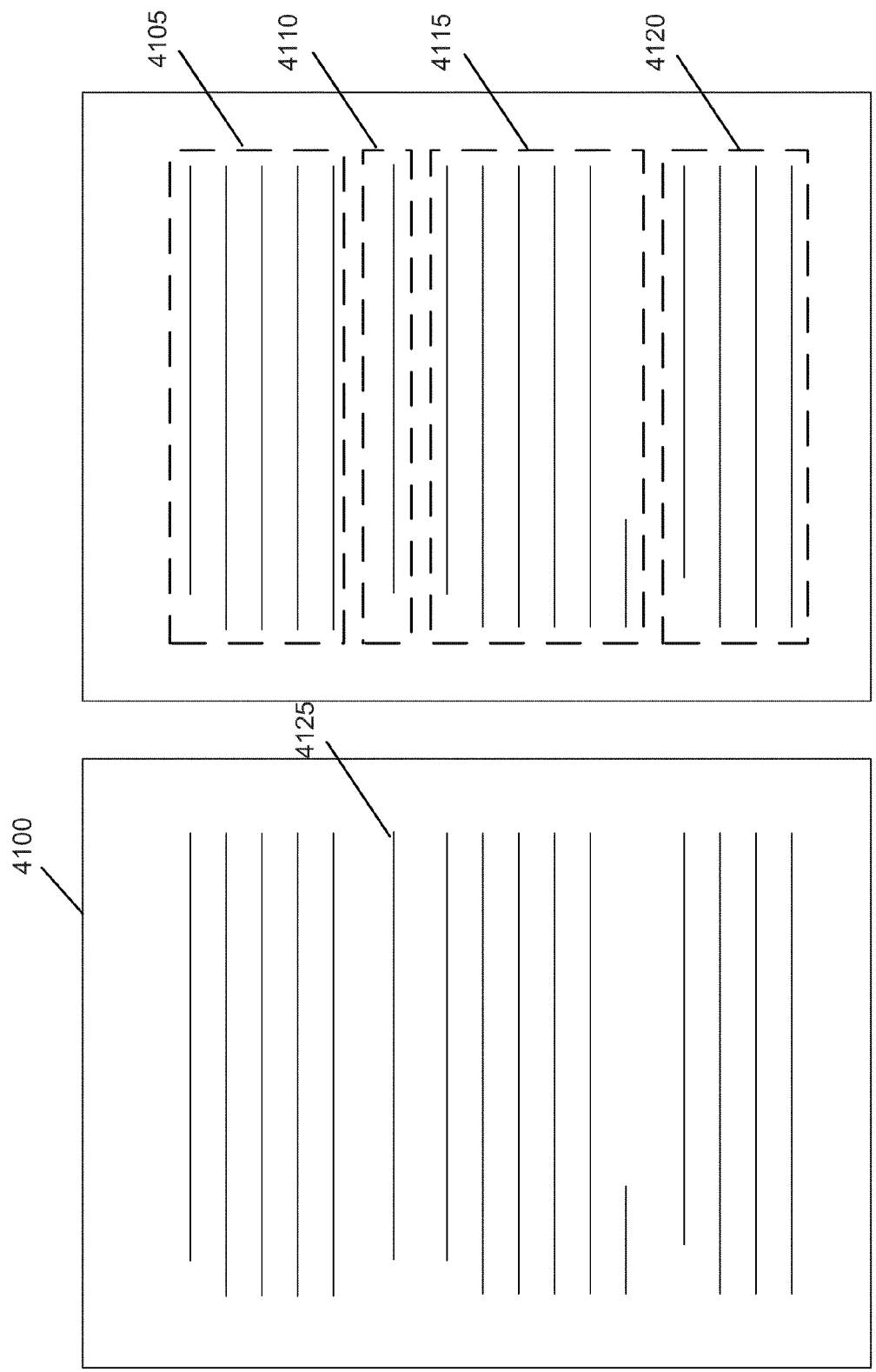
FIG. 41 illustrates the identification of paragraphs on a page.

In some embodiments, once lines of text have been merged and split, the lines are grouped into paragraphs. FIG. 40 conceptually illustrates a process 4000 of some embodiments for grouping text lines into paragraphs. Portions of process 4000 will be described in conjunction with FIG. 41. FIG. 41 illustrates the identification of paragraphs on a page 4100 of a document. As shown in FIG. 40, process 4000 receives (at 4005) text lines for a portion of a document. The text lines have already been merged (e.g., by process 3300) and split (e.g., by process 3800) in some embodiments before process 4000 is performed. In some embodiments, the document portion is an entire document, a section of a document, a page, a zone, etc.

The process determines (at 4007) whether there are any lines in the document portion. When there are none, the process ends. Otherwise, beginning at the top of the received document portion, the process selects (at 4010) the first unevaluated text line in the document portion. The process then determines (at 4015) whether there is more than one text line below the selected line. In some embodiments, the lines must be within a particular vertical distance of each other for the lower line to be considered below the selected line for the purposes of operation 4015. Some embodiments require at least three text lines to make judgments about whether the text lines belong to the same paragraph. In some embodiments, this requirement is imposed because two spacings (i.e., the spacing between the first and second text lines and between the second and third text lines) are necessary in order to make a comparison.

When there are two or more lines below the selected text line, the process proceeds to 4030 which is described below. Otherwise, when fewer than two lines are below the selected text line, the process places (at 4020) the selected line in a paragraph by itself. The process then determines (at 4025) whether there are more lines in the document portion. When there are no more lines (e.g., when there is only one line of text in the document portion), the process ends. Otherwise, when there are more lines, the process proceeds to 4010 and selects the next line of text.

When, at 4015, there are two or more lines of text below the line selected at 4010 (i.e., the first line in the current paragraph), the process identifies (at 4030) the next two lines below the selected text line. The process then determines (at 4035) whether the spacing and alignment is consistent between the three lines. In some embodiments, this determination involves examining whether the vertical distance from the first to second line is the same as the vertical distance from the second to third line. Some embodiments use the baselines of the text lines to determine the vertical spacing. Alignment differences, in some embodiments, are identified if one of the lines begins indented, or ends left of the other lines, thus signaling a likely beginning or end of a paragraph.

When the spacing and alignment is not consistent, the process applies (at 4040) heuristic rules to determine whether to add either of the identified lines to the paragraph with the selected first line. For instance, in some embodiments, when the first two lines are close together and the third line is further down, the first two lines are placed in one paragraph and the third line is the start of the next paragraph. Similarly, in some embodiments, when the first line is further from the second and third, the first paragraph is a one-line paragraph and the next paragraph starts at the second line. Similar rules are used in some embodiments for alignment differences between the lines. After applying the heuristic rules, the process proceeds to 4010 to select the next unevaluated text line (i.e., the next line that is not yet assigned to a paragraph) and start a new paragraph.

When the spacing and alignment is consistent between the three lines, the process places (at 4045) all three lines in the same paragraph. Some embodiments identify spacing and alignment properties of the paragraph as well. For instance, some embodiments identify paragraphs as left-aligned, right-aligned, justified, centered, etc. Some embodiments leave open multiple possibilities (e.g., a paragraph with an indented first line, all three lines right-aligned or very close, and the lower two lines left-aligned could possibly be any of the three of left-aligned, right-aligned, or justified).

After the initial phase of identifying the start of a new paragraph, process 4000 attempts to add lines to the paragraph. In some embodiments, the line addition is based on the spacing and alignment properties determined from the three lines making up the start of the paragraph. In other embodiments, as lines are added that do not conflict with the spacing and alignment properties for the paragraph, the spacing and alignment properties are refined based on any further evidence.

Next, the process determines (at 4047) whether there are any more lines in the document portion. When there are no more lines (i.e., the document portion has exactly three lines), the process ends. Otherwise, the process identifies (at 4050) the next text line in the document portion. The process then determines (at 4055) whether there is a spacing or alignment mismatch between the current paragraph and the identified next line. When there is a mismatch, the process ends the paragraph and proceeds to 4010, which was described above. In such a case, the recently mismatched line will be the line selected at 4010.

Otherwise, when the spacing and alignment line up, the process adds (at 4060) the line to the current paragraph. The process then proceeds to 4047, which was described above. In some embodiments, an alignment mismatch is found when the identified next text line does not fit one of the properties (e.g., justified) of the paragraph. Similarly, if the spacing between the last line in the paragraph and the next line is increased as compared to that of the paragraph, then a spacing mismatch is found in some embodiments.

Some embodiments employ other stopping conditions (e.g., conditions resulting in the identified line not being added to the paragraph). For instance, some embodiments recognize if the first word on the identified line would fit into the white space at the end of the last line of a left-aligned paragraph. When this is the case, the new line is assumed to be part of the next paragraph because if it were part of the current paragraph, then the word would be in the white space at the end of the last line rather than starting a new line. Similarly, some embodiments recognize an indent as indicating a new paragraph. A third condition of some embodiments is if the identified line is uniformly styled (e.g., all bold, or of a larger font size) and different from the styling of any character on the previous line.

Once process 4000 has completed, all of the paragraphs in the document portion are identified, and all lines of text are assigned to a paragraph. Some embodiments then use the paragraphs to identify columns and layouts.

FIG. 41 illustrates a page 4100 with four paragraphs. Applying process 4000 to this page (where the page is the document portion) results in the identification of paragraphs 4105, 4110, 4115, and 4120. The process of some embodiments would start by grouping the first three lines together, then adding the fourth and fifth lines, until the sixth line 4125 had a spacing and alignment mismatch, leaving paragraph 4105 at five lines. The process would then start with the sixth line, and notice the spacing and alignment mismatch between the two lines below. As line six is further from lines seven and eight than they are from each other, line six is the entirety of paragraph 4110 and the next paragraph 4115 starts with line seven. Paragraphs 4115 and 4120 are identified similarly.

E. Column and Layout Identification

Some embodiments place paragraphs into columns and layouts after identifying the paragraphs. In some embodiments, a column is a vertically ordered group of paragraphs in which the text reads coherently from the top to the bottom. A layout in some embodiments is a collection of non-overlapping columns and a linear layout in some embodiments is a horizontally ordered group of columns in which the text reads coherently from the top of the left-most column to the bottom of the right-most column. For example, some embodiments classify a simple page with unsegmented text lines and no headers or footers as a single linear layout with one column.

Figure 42:
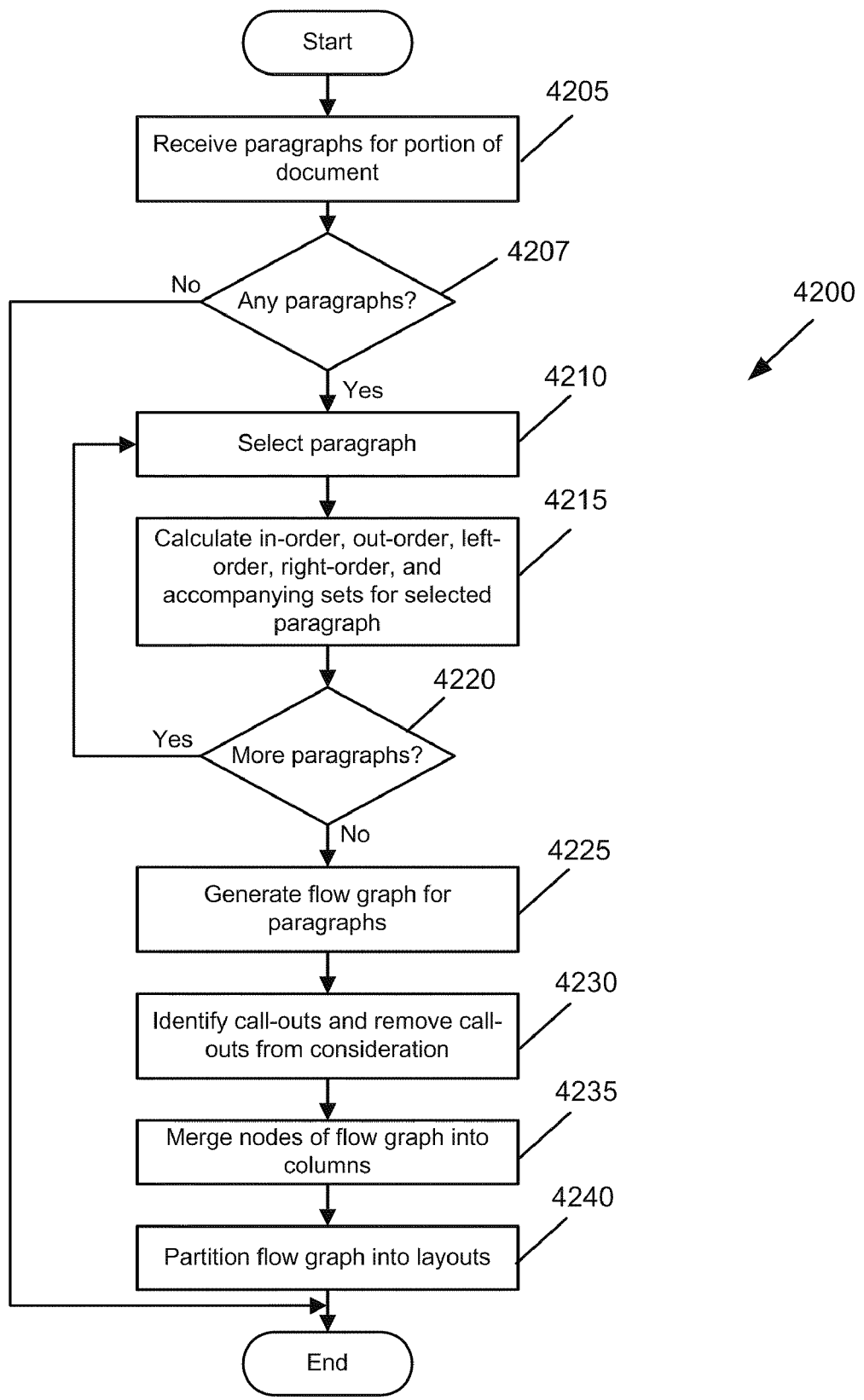
FIG. 42 conceptually illustrates a process of some embodiments for identifying columns and layouts in a portion of a document.
Figure 43:
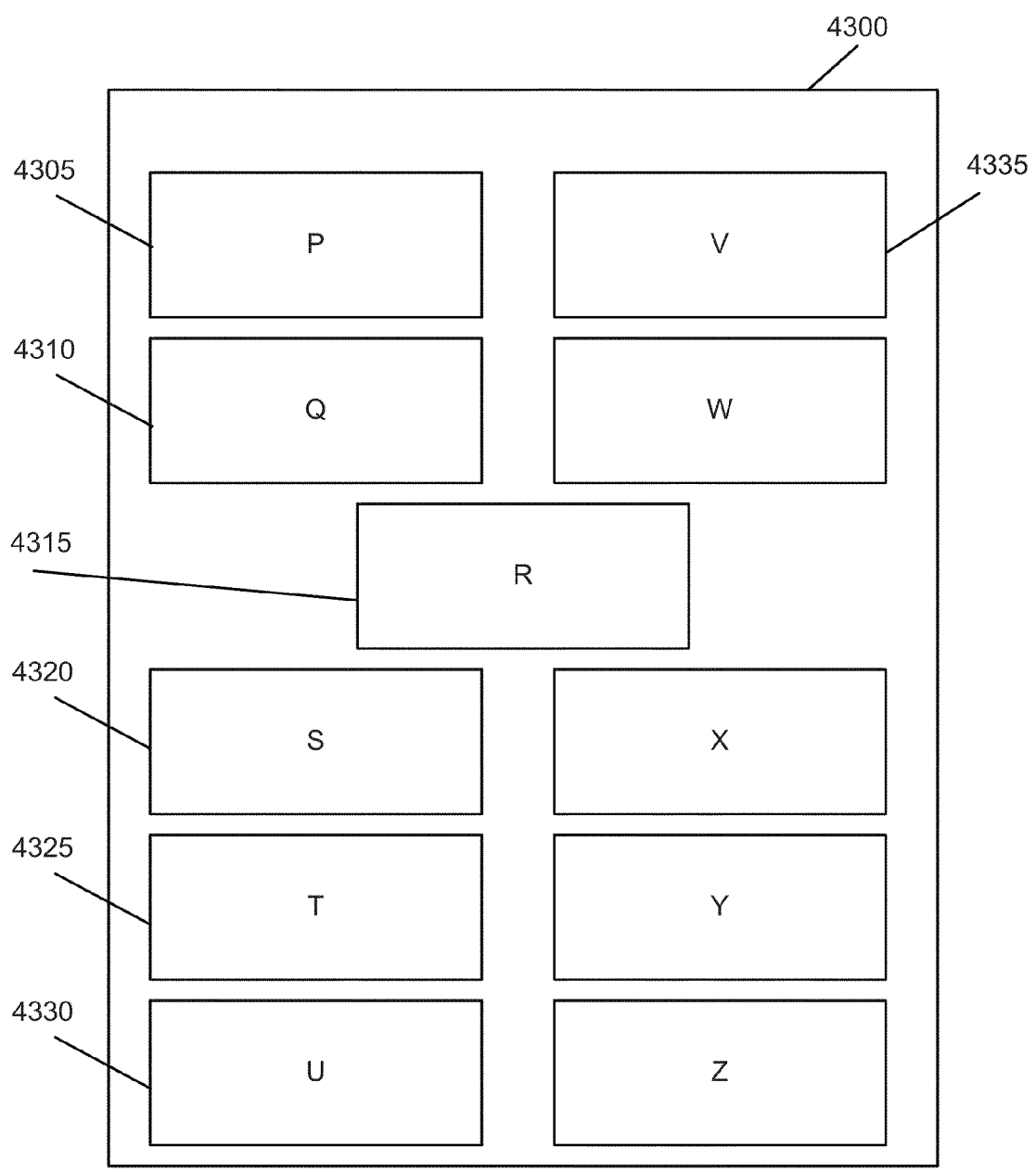
FIGS. 43 and 44 illustrate paragraphs on two different pages.
Figure 44:
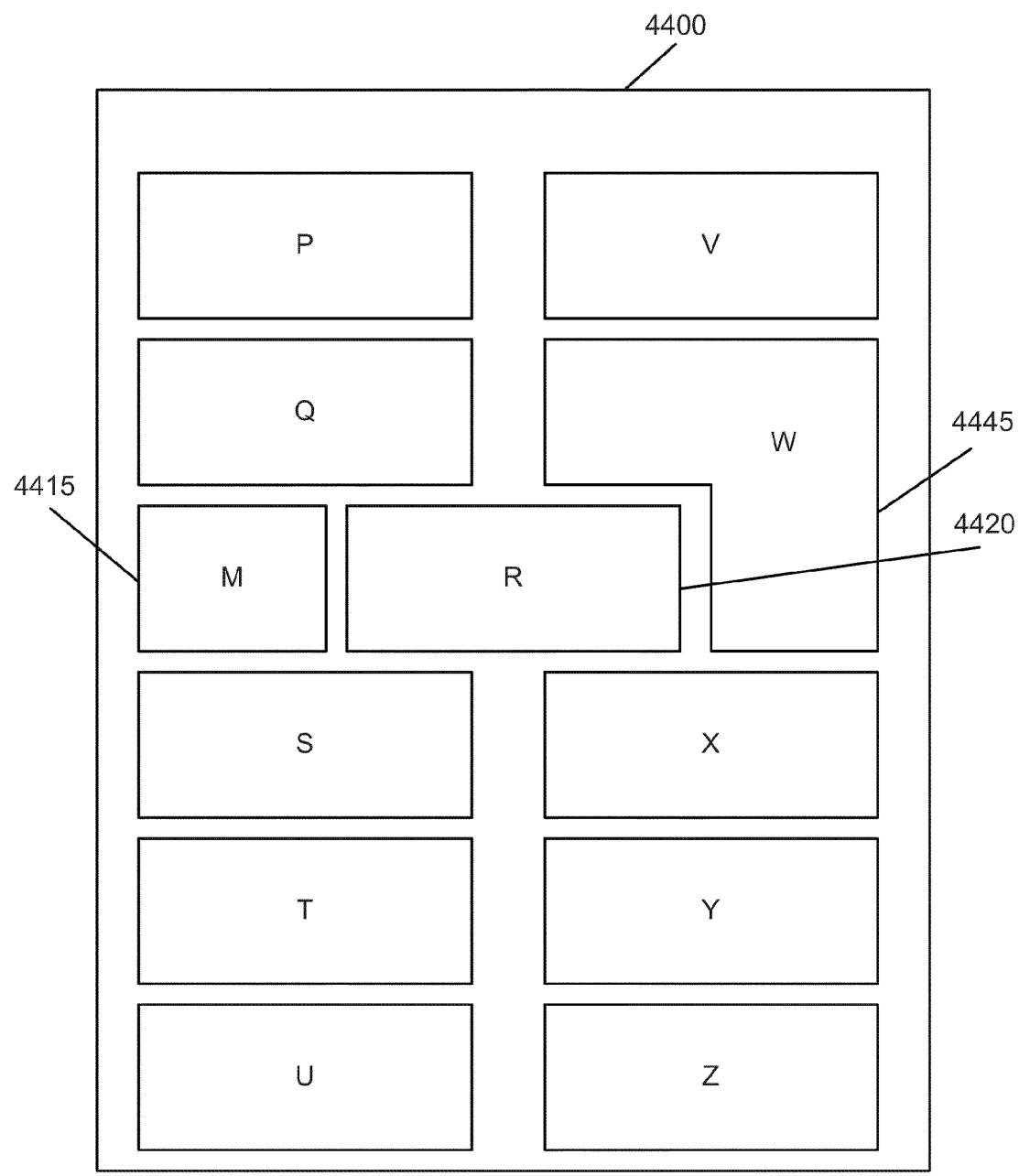
Figure 45:
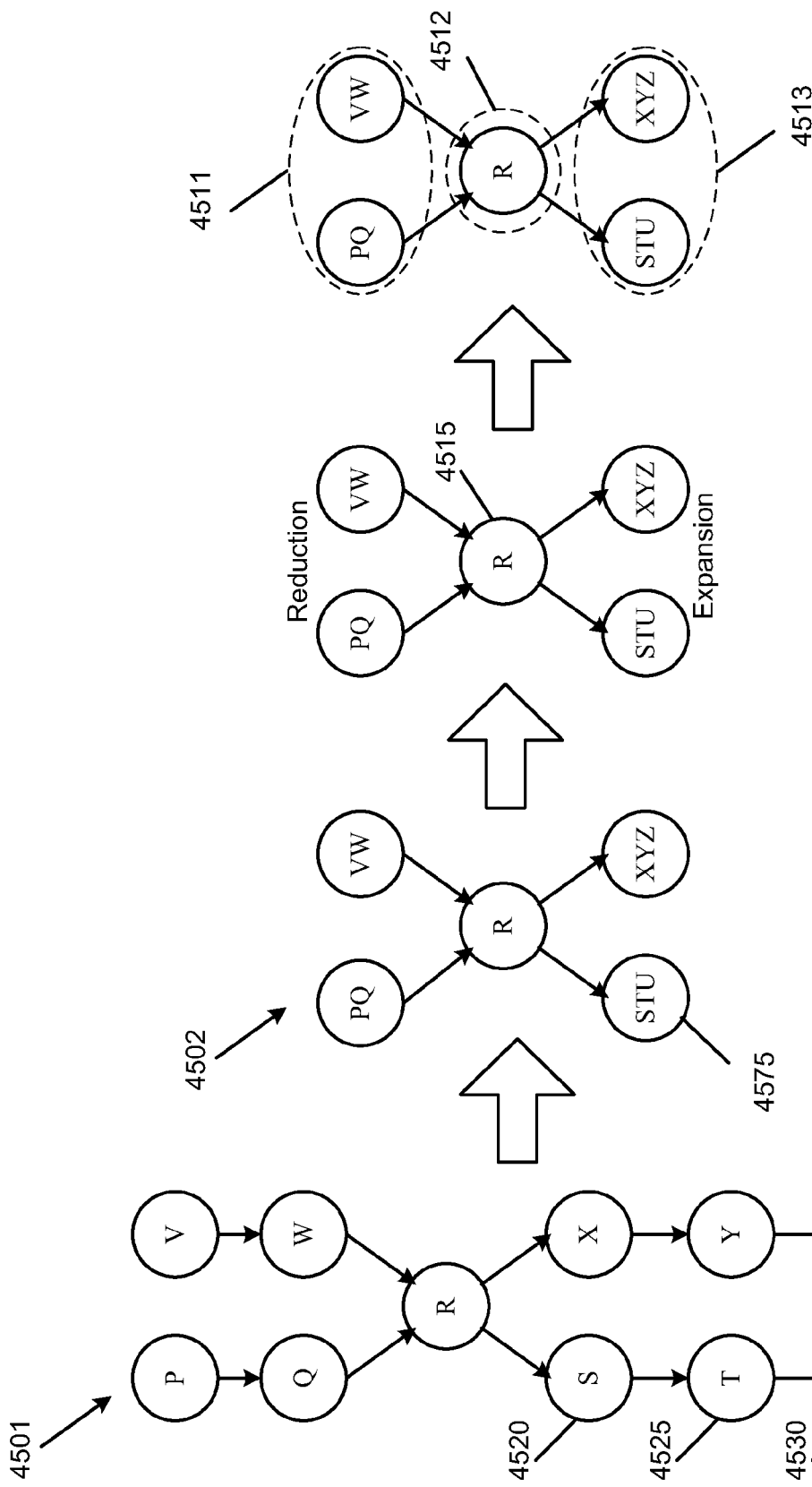
FIGS. 45 and 46 illustrate the generation of flow graphs for the pages of FIGS. 43 and 44.
Figure 46:
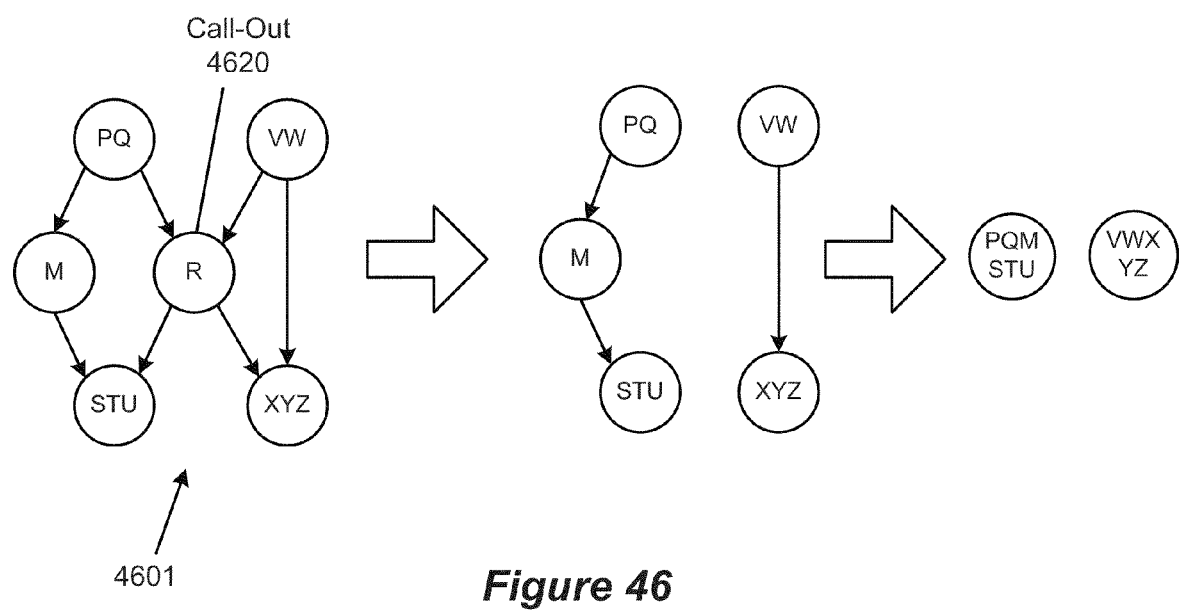

FIG. 42 conceptually illustrates a process 4200 for identifying columns and layouts in a portion of a document in some embodiments. Process 4200 will be described in conjunction with FIGS. 43-46. FIGS. 43 and 44 illustrate paragraphs on two different pages 4300 and 4400, and FIGS. 45 and 46 illustrate the generation of flow graphs for the two pages 4300 and 4400 respectively.

As shown in FIG. 42, process 4200 receives (at 4205) information for paragraphs for the portion of the document. The document portion in some embodiments is an entire document, a section of a document, a page, a zone, etc. In some embodiments the paragraph information is determined using process 4000 described above. The process then determines whether there are any paragraphs to select. When there are none, the process exits.

Otherwise, the process selects (at 4210) a paragraph. In some embodiments, the paragraphs in the document portion are selected in order, starting at the top-left, whereas in other embodiments the paragraphs are selected in a random order.

Next, the process calculates (at 4215) the in-order, out-order, left-order, and right-order, as well as sets of paragraphs that accompany each of these values. The out-order of a paragraph p is calculated in some embodiments by using a set B(p). The set B(p) is initially all paragraphs below paragraph p in the document portion that overlap p horizontally (i.e., that overlap x-coordinates). For instance, FIG. 43 illustrates a page 4300 with eleven paragraphs including paragraph P 4305. The set B(P) is initially {Q, R, S, T, U}. Next, the paragraph closest to p is identified as q, and all paragraphs that overlap paragraph q horizontally are removed from the set B(P). In the case of paragraph P 4305, paragraph Q 4310 is the closest to paragraph P, and paragraphs R 4315, S 4320, T 4325, and U 4330 are removed from the set B(P). At this point, the set B(P) is {Q}.

Some embodiments then continue onto the next closest paragraph to p that was initially in the set B(p), and remove any paragraphs from B(p) that are below and horizontally overlap this next closest paragraph. Other embodiments continue to the next closest paragraph to p that remains in the set B(p), and remove any paragraphs from B(p) that horizontally overlap this paragraph. Either way, in the example of FIG. 43, the set B(P) for paragraph P 4305 is {Q}. The out-order of p is then the cardinality (i.e., number of elements) of the set B(p). This is repeated for each paragraph in B(p). Thus, in this case the out-order of paragraph P 4305 is 1. As an example of a paragraph with an out-order greater than 1, for paragraph R 4315, the set B(R) is {S, X}, so that the out-order of paragraph R 4315 is 2.

The in-order of a paragraph p is calculated similarly to the out-order in some embodiments by using a set A(p). The set A(p) is initially all of the paragraphs in the document portion above p that overlap p horizontally. The closest paragraph to p is selected as paragraph q, and the paragraphs that overlap paragraph q horizontally are removed from A(p). This is then repeated for each of the paragraphs in A(p). In the example page 4300, the set A(P) for paragraph P 4305 is the empty set, while the set A(R) for paragraph R 4315 is {Q, W}. The in-order of a paragraph p is the cardinality (i.e., number of elements) of the set A(p).

The left-order and right-order of a paragraph p are also calculated similarly in some embodiments, using a set L(p) (paragraphs left of p and vertically overlapping p, using the same removal rules) and a set R(p) (paragraphs right of p and vertically overlapping p, using the same removal rules). Some embodiments use L(p) and R(p) for flow graphs (see below) when it has been determined (e.g., by an external means) that the language direction is top-down. For page 4300, the set R(P) for paragraph P 4305 is {V}, while the set L(V) for paragraph V 4335 is {P} . The sets L(R) and R(R) for paragraph R 4315 are both empty.

Once the in-order, out-order, left-order, and right-order are calculated for the selected paragraph, the process 4200 determines (at 4220) whether more paragraphs remain for which the various values must be calculated. If more paragraphs remain, the process proceeds to 4210 to select another paragraph.

Otherwise, once the values are calculated for all paragraphs, the process generates (at 4225) a flow graph for the paragraphs. The flow graph of some embodiments is generated such that each paragraph in the document portion being evaluated is a node. A directed edge is drawn from the node for a paragraph p to each node for the paragraphs in the set A(p). This is the same, in some embodiments, as drawing a directed edge from each node for the paragraphs in the set B(p) to the node for the paragraph p. FIG. 45 illustrates an initial flow graph 4501 for the page 4300.

Next, process 4200 identifies (at 4230) call-outs. In some embodiments, identified call-outs are removed from the flow graph. A call-out, in some embodiments, is a text element on a page that is meant to be read in an order independent from the rest of the text on the page. Some examples of call-outs include headers and footers, footnotes, margin notes, sidebars, and other blocks of text placed amongst other elements such as large-font quotes in a magazine article.

Some embodiments identify call-outs based on a combination of the geometry of the text element, its position on the page, its flow properties (in-order, out-order, left-order, and right-order), and the style properties of its elements. For instance, when a vertex v includes a one-line paragraph that is close to the top of a page, the distance from the one-line paragraph to any element in A(v) is more than one line height, $L(v) \leq 1$, $R(v) \leq 1$, and any vertices in L(v) and R(v) share these conditions, then some embodiments classify the paragraph as a header call-out. Requirements for a footer call-out are similar in some embodiments, except looking for the distance to the bottom of the page and to elements in B(v).

Some embodiments also identify sidebars that jut into columns (and are not in their own zone), randomly located text boxes, small bits of text with no obvious relationship to other text (e.g., figure captions), etc. as call-outs. Some embodiments make these determinations (as well as other determinations of flow properties) based on a purely textual analysis, whereas other embodiments incorporate images into the analysis (e.g., as further evidence for a figure caption). For example, in some embodiments, some embodiments identify single-line paragraphs distant from all elements in A(p) and B(p) as isolated small paragraphs. Captions are identified in some embodiments when a paragraph with a single text line is enclosed by the bounds of an image and is aligned in particular ways with the image bounds (e.g., centered near the bottom, centered near the top, etc.).

When the rectangular bounding boxes of two or more paragraphs intersect, some embodiments identify all but one of the paragraphs as intersection call-outs. For instance, suppose that two paragraphs p and q overlap and B(p)={q, r}. When r has an in-order of 1 or when q is in A(r), then q is an intersection call-out in some embodiments. Some embodiments classify as an intersection call-out any paragraph p whose style and/or alignment properties are not consistent with the paragraphs in A(p) or B(p). When two paragraphs intersect, and none of the above rules applies, some embodiments classify the paragraph with smaller area as a call-out.

After generating the flow graph for the paragraphs in the document portion, the process 4200 merges (at 4235) nodes of the flow graph into columns. Some embodiments merge nodes for paragraphs p and q if A(p)={q} and B(q)={p}. This indicates that paragraphs p and q are in the same column in some embodiments. In some embodiments, the new node pq will have A(pq)=A(q), B(pq)=B(p), L(pq)=L(p)+L(q), and R(pq)=R(p)+R(q). For example, in FIG. 45, the flow graph 4501 is modified such that nodes S 4520, T 4525, and U 4530 are merged into node STU 4575 in modified flow graph 4502. The other nodes are modified similarly.

FIG. 46 illustrates a flow graph 4601 for the page 4400 of FIG. 44 after the nodes have been merged initially into columns. Some embodiments identify paragraph R 4420 as a call-out because it straddles two columns and has paragraphs to both the left and right. Accordingly, some embodiments remove the node R 4620 from the flow graph 4601. This enables further merger of the nodes into columns.

Once call-outs have been identified (and, in some embodiments, removed from the flow graph), process 4200 partitions (at 4240) the flow graph into layouts. Some embodiments define labels for expansion and reduction edges as part of the partitioning process. In some embodiments, if the out-order of a paragraph p is greater than 1, and the in-order of each paragraph q in the set B(p) is 1, then the edge from p to each q in B(p) is an expansion edge. Similarly, in some embodiments, if the in-order of a paragraph p is greater than 1, and the out-order of each paragraph q in the set A(p) is 1, then the edges from each q in A(p) to p is a reduction edge. FIG. 45 illustrates that the edges leading into node R 4515 are both reduction edges, and the edges leading out of node R 4515 are both expansion edges.

The partitioning of some embodiments examines each vertex v the edges of which are all labeled. When the in-order of v is greater than 1, some embodiments define a partition the elements of which are B(v) so long as A(p)={v} for each p in B(v). Similarly, when the out-order of v is greater than 1, some embodiments define a partition the elements of which are A(v) so long as B(p)={v} for each p in A(v). When both of these partitions are possible, the vertex v is defined as a partition by itself. Based on these rules, the flow graph 4502 is partitioned into three partitions 4511, 4512, and 4513.

Some embodiments place any remaining nodes into one or more partitions such that the smallest number of partitions is defined without any geometric overlap between the partitions. Due to complex page structure, some embodiments use more relaxed partitioning rules than those described above. For instance, when a partition could be created from a node v, except that the out-order of v is greater than 1, then elements of A(v) that are far from v and narrow relative to v are eliminated in some embodiments. When only one element remains in A(v), the edges from v to the removed vertices are removed, and partitioning is continued. Once partitioning is complete, the process 4200 ends.

In some embodiments, each partition corresponds to a linear layout, and each of the final (merged) nodes corresponds to a column. Once partitions are defined, some embodiments calculate properties of the document portion such as gutter width, margins, in-line or floating images, etc.

Furthermore, layout and flow information (including word, line, paragraph, and column data) is used prominently in the display of the document and enabling more robust user interaction with the document, as described in further detail in the concurrently filed U.S. patent application Ser. No. 12/479,849, now published as U.S. Patent Publication 2010-0174979, entitled "Identification, Selection, and Display of a Region of Interest in a Document", which is incorporated herein by reference. For instance, in some embodiments, a user might wish to view a complex document that includes several columns of text, images, call-outs, captions, etc., and be able to copy and paste the entire text of the document into a text editor. In order for this to be accomplished, a reading order is assigned to each of the elements in the document that attempts to identify the order in which a human would read through the elements of the document.

For instance, some embodiments assign reading orders to columns, such that the reading order follows the expected order in which a human would read the columns from the start to end of the document or page. Other embodiments assign reading orders to other structural elements (e.g., paragraphs, words, etc.). In some embodiments, when the user copies and pastes the entire text of such a document into another application, the text appears in the application in the order that a human would read it. This is in contrast to copying and pasting from a standard PDF file that orders all text in a strict top-down configuration.

Some embodiments also insert images and shapes into the reading order. For instance, some embodiments will identify a particular image as associated with a particular column of text and insert the image either before or after (depending on the evidence in the document) the column of text. As an example, some embodiments identify that an image is associated with the caption for the image and insert the image into the reading order immediately prior to its caption.

Some embodiments also define links between structural elements. For instance, some embodiments use the reading order to define links between a paragraph at the end of a column and a paragraph at the beginning of the next column that are actually one paragraph. In some embodiments, to maintain the hierarchy that has each paragraph assigned to one particular column, a separate paragraph bridging the columns is not defined. Instead, a link between the two paragraphs is defined indicating that they are, in fact, one paragraph. Some embodiments use tests similar to those for adding lines to a paragraph in order to determine whether the top paragraph from a second column is actually a continuation of the paragraph at the end of a first column (i.e., examining spacing, alignment, font stylings, etc.). The link can then be used, e.g., if a user performs a selection operation (e.g., a triple-click) intended to select a paragraph within either of the defined paragraphs, the entire actual paragraph will be selected based on the link.

Some embodiments also define links between layouts (e.g., linking across pages) or zones. For instance, some embodiments can recognize continuation text (e.g., text in a newspaper indicating that a story continues on a different page) and can link the text in the layout with the continuation text to the layout where the text continues. Some embodiments only attempt such linking when a profile has been matched indicating that linking should be performed. For instance, if a document has been identified as a newspaper, then some embodiments will search for continuation text.

E. Software Architecture

Figure 47:
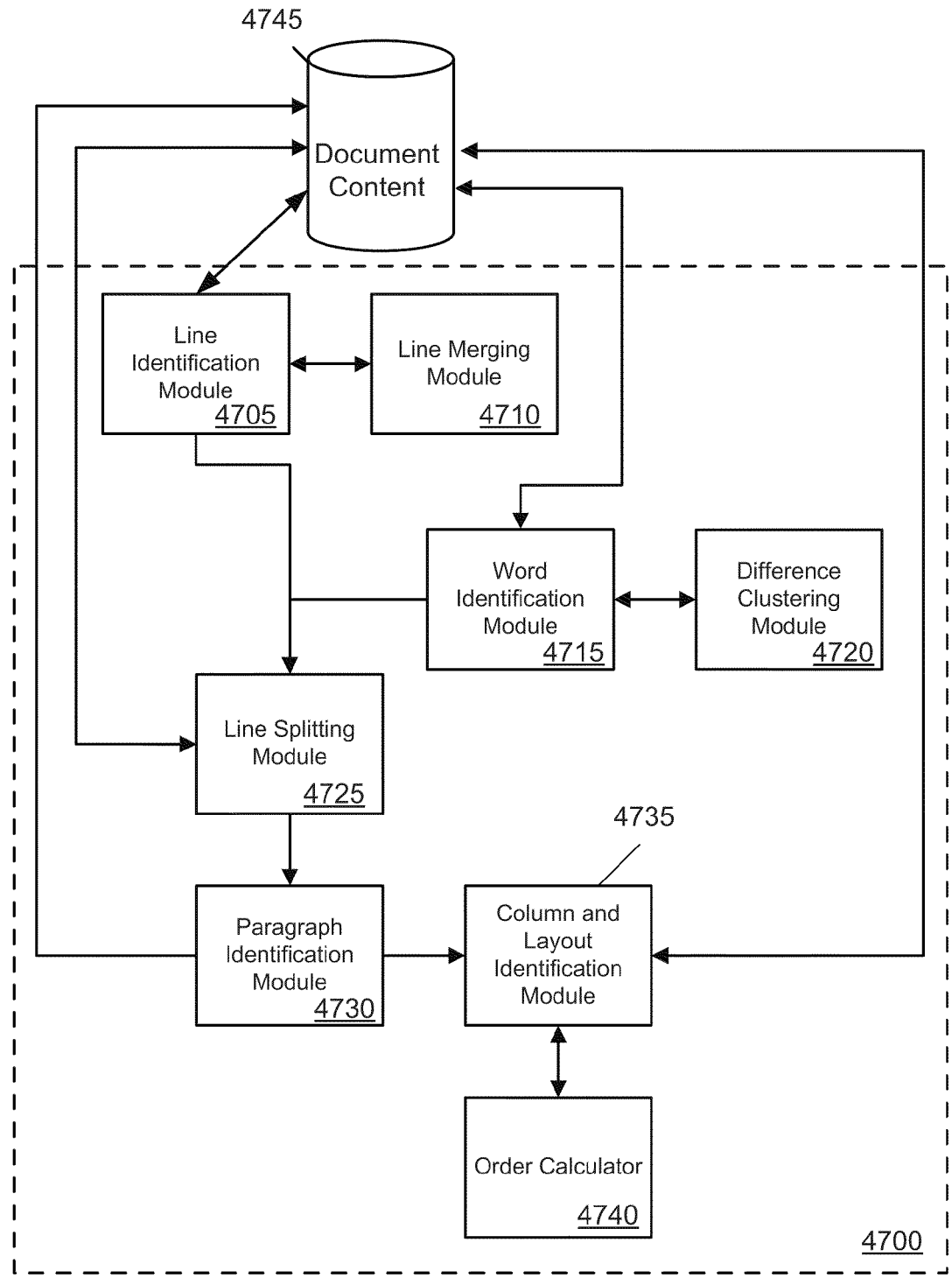
FIG. 47 conceptually illustrates the software architecture of a layout and flow analysis application of some embodiments.

In some embodiments, the layout and flow analysis processes described above are implemented as software running on a particular machine, such as a computer, a media player, a cell phone (e.g., an iPhone®), or other handheld or resource-limited devices (or stored in a computer readable medium). FIG. 47 conceptually illustrates the software architecture of a layout and flow analysis application 4700 of some embodiments for identifying layout and flow characteristics of a document. In some embodiments, the application is a stand-alone application or is integrated into another application (e.g., a document reconstruction application), while in other embodiments the application might be implemented within an operating system.

Layout and flow analysis application 4700 includes a line identification module 4705, a line-merging module 4710, a word identification module 4715, a difference clustering module 4720, a line splitting module 4725, a paragraph identification module 4730, a column and layout identification module 4735, and an order calculator 4740.

FIG. 47 also illustrates document content 4745. Line identification module 4705 receives information from the document content 4730. In some embodiments, this information is information about the position of characters in the document. Line identification module 4705 identifies characters with a common baseline on a page and assigns them to a line. The line identification module passes information to, and receives information from, line merging module 4710. The line merging module identifies groups of lines that overlap vertically and determines whether the lines should be merged. In some embodiments, line merging module 4710 performs some or all of process 3300 described above. The line merging module 4710 passes this information back to line identification module 4705, which identifies the final text lines. Line identification module 4705 passes the line information back to the document content 4745, as well as to line splitting module 4725.

Word identification module 4715 also receives information from the document content 4745. In some embodiments, this information is information about the position of characters in the document. The word identification module 4715 identifies characters that should be grouped together as words. Word identification module 4715 passes information to, and receives information from, the difference clustering module 4720. Difference clustering module 4720 performs difference clustering on the document characters to return different levels of gaps between characters (e.g., word gaps, segment gaps, etc.). The word identification module 4715 uses the difference clustering results to identify the words. Word identification module 4715 passes its results (as well as other difference clustering results such as segment gaps) to the document content 4745, as well as to line splitting module 4725.

Line splitting module 4725 receives line information from the line identification module and gap information from the word identification module, as well as other information (e.g., gutter information) from the document content 4745. Line splitting module 4725 identifies where lines should be split and outputs new line information based on the splits. The new line information is passed to document content 4745 as well as paragraph identification module 4745. In some embodiments, line splitting module 4725 performs some or all of process 3800.

Paragraph identification module 4730 receives line information from line splitting module 4725 as well as other information (e.g., alignment information) from document content 4745. Paragraph identification module 4730 identifies which lines should be grouped into paragraphs and outputs the result information. The paragraph information is passed to document content 4745 as well as to the column and layout identification module 4735. In some embodiments, paragraph identification module 4730 performs some or all of process 4000.

Column and layout identification module 4735 receives paragraph information from paragraph identification module 4730, as well as other information (e.g., zone information) from document content 4745. Column and layout identification module 4735 groups paragraphs into columns and groups columns into layouts. Column and layout information module 4735 passes information to, and receives information from, order calculator 4740. The order calculator 4740 receives paragraph information from the module 4735, and calculates the in-order, out-order, left-order, and right-order (as well as the corresponding sets A, B, L, and R) for the paragraphs. This information is then returned to the module 4735 for use in generating a flow graph. The results from column and layout identification module 4735 are passed to the document content 4745. In some embodiments, column and layout identification module 4745 performs some or all of process 4200 described above.

In some embodiments, the results of the processes performed by the above-described modules or other modules are stored in an electronic storage (e.g., as part of a document object model). The document object model can then be used for displaying the document on an electronic display device (e.g., a handheld device, computer screen, etc.) such that a user can review and/or interact with the document (e.g., via touchscreen, cursor control device, etc.).

V. Joining Graphs

In some embodiments, unstructured document will include primitive elements (e.g., shapes and images) that are intended to be treated as a single element but are not defined as such in the document. When such primitive elements occupy a compact and isolated area of a document, they can be associated using a novel cluster analysis technique referred to as bounds clustering. The objective of bounds clustering, in some embodiments, is to minimize the spread of a cluster, where the spread is calculated from the bounds of the collection of primitive elements (e.g., shapes) in the cluster, while simultaneously maximizing the number of primitive elements in the cluster. The bounds, in some embodiments, are based on the bounding boxes for a shape or collection of shapes.

Some embodiments of the invention provide methods for identifying graphs (i.e., graphic objects) of a region that should be joined. These joined graphs can then be treated as one object for the purposes of further reconstruction. Furthermore, they can be treated as one object when viewed, selected, zoomed, copied, moved, edited, etc. Some embodiments treat joined graphs as one object for use in selection, display, and navigation processes described in further detail in the concurrently filed U.S. patent application Ser. No. 12/479,850, now published as U.S. Patent Publication 2010/0174980, entitled "Identification of Regions of a Document", which is incorporated herein by reference.

Figure 48:
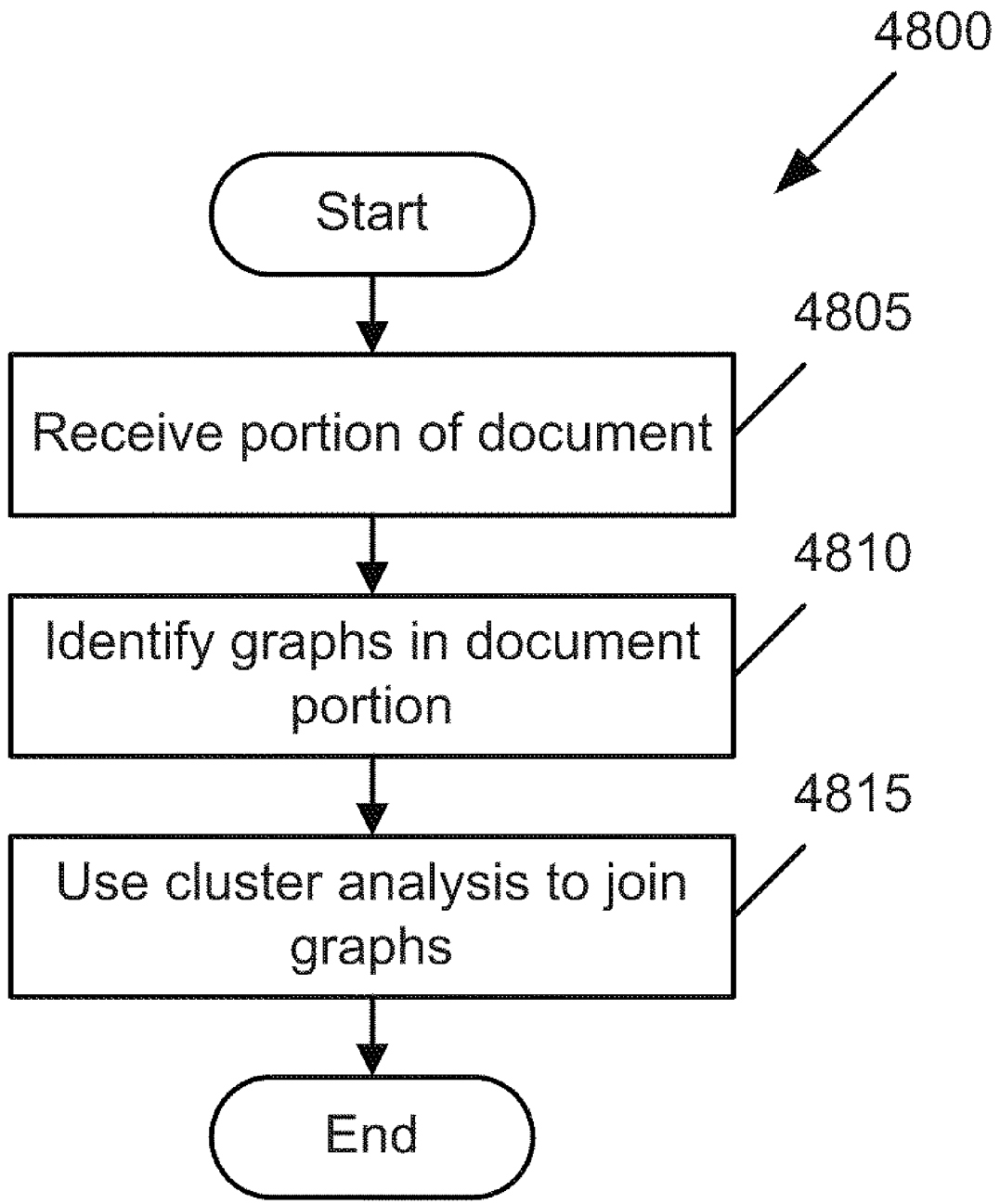
FIG. 48 conceptually illustrates a process of some embodiments for joining individual graphs into joined graphs.
Figure 49:
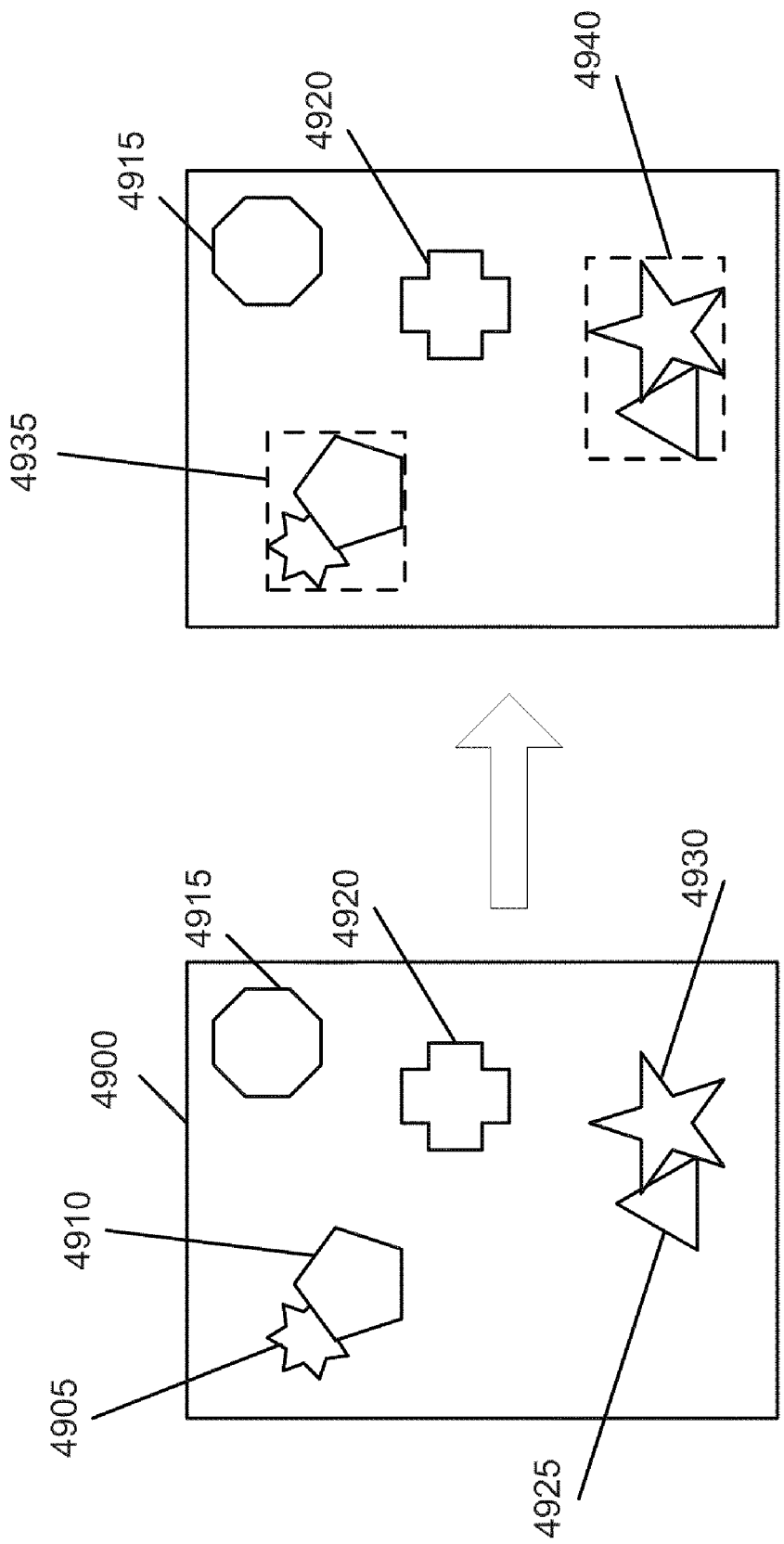
FIG. 49 illustrates the joining of graphs on a page.

FIG. 48 conceptually illustrates a process 4800 of some embodiments for joining individual graphs into joined graphs. Process 4800 will be described in conjunction with FIG. 49. FIG. 49 illustrates the joining of some, though not all, of several graphs on a page 4900. As shown in FIG. 48, process 4800 receives (at 4805) a portion of a document. The document portion is an entire document, a section of a document, a page, or a zone in some embodiments. Some embodiments perform the graph joining process for the entire document at once, while some embodiments perform the process on a zone-by-zone or page-by-page basis.

The process identifies (at 4810) graphs in the document portion. FIG. 49 illustrates a page 4900 that includes six graphs: a seven-pointed star 4905, a pentagon 4910, an octagon 4915, a cross 4920, a triangle 4925, and a five-pointed star 4930.

The process then uses cluster analysis to join (at 4815) some of the identified graphs. The process then ends. Some embodiments use a form of cluster analysis called bounds clustering that is described in detail below by reference to process 5000. Some embodiments apply efficiency techniques described below in Section VI to perform the cluster analysis. Some embodiments only join graphs when they are close together and do not take up too large a portion of a page or zone. FIG. 49 illustrates that seven-pointed star 4905 and pentagon 4910 are joined into a single graph 4935, and triangle 4925 and five-pointed star 4930 are joined into a single graph 4940. Because they are isolated on page 4900, octagon 4915 and cross 4920 are not joined either to each other or to any other graphs.

A. Bounds Clustering

Figure 50:
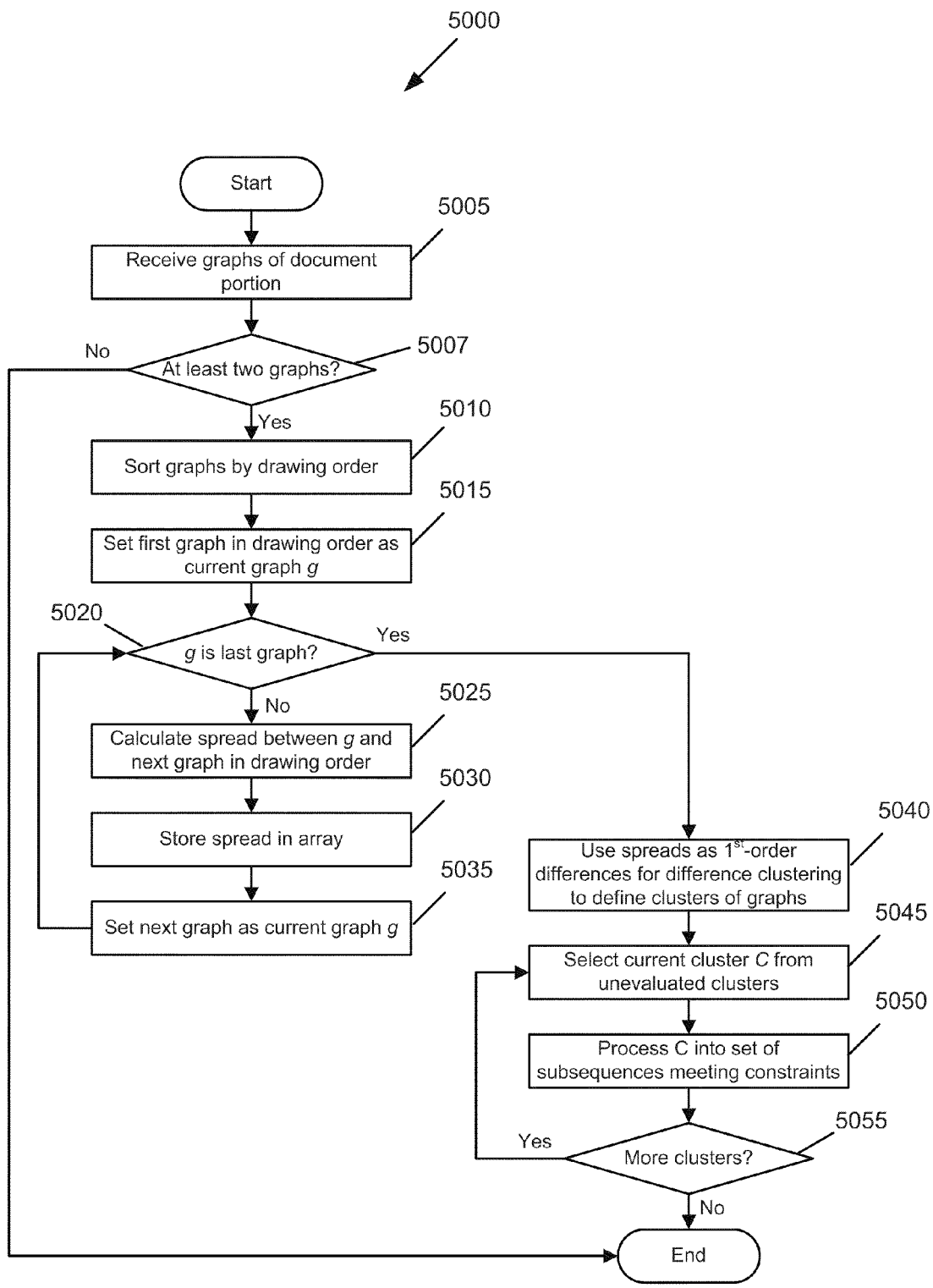
FIG. 50 conceptually illustrates a process of some embodiments for performing bounds clustering to identify graphs that should be joined and joining those graphs.

FIG. 50 conceptually illustrates a process 5000 of some embodiments for performing bounds clustering to identify graphs that should be joined and joining those graphs. In some embodiments, process 5000 takes advantage of memory and processing efficiencies described below in Section VI (e.g., indirectly sorted arrays, quick partitioning, etc.). As shown, the process receives (at 5005) graphs for a document portion. The document portion is an entire document, a section of a document, a page, or a zone in some embodiments.

The process then determines (at 5007) whether there are at least two graphs in the document portion. When there are one or zero graphs, there is no reason to perform clustering to attempt to join graphs, therefore the process ends. Otherwise, the process sorts (at 5010) the graphs by drawing order. The drawing order, in some embodiments, is the sequence in which objects are drawn on a page. Often, when multiple objects are intended to be treated as a single object, they will be drawn in sequence. Some embodiments, however, sort based on other heuristics, such as the location of the object on the page.

Next the process sets (at 5015) the first graph in the drawing order as the current graph g. The process then determines (at 5020) whether g is the last graph in the document portion. When g is the last graph, then no spread between graph g and a next graph can be calculated, so the process proceeds to 5040 which is described below.

Otherwise, when the graph g is not the last graph, the process calculates (at 5025) a spread between the graph g and the next graph in the drawing order, and stores (at 5030) the calculated spread in an array. A spread, in some embodiments, is a measure of how close together two objects are to each other. Some embodiments use the bounding boxes of the two objects to calculate the spread. For example, some embodiments calculate the spread of a set of graphic objects is as the sum of the width and the height of the smallest upright bounding box into which the set of objects fits, divided by the sum of the width and height of the page.

Figure 51:
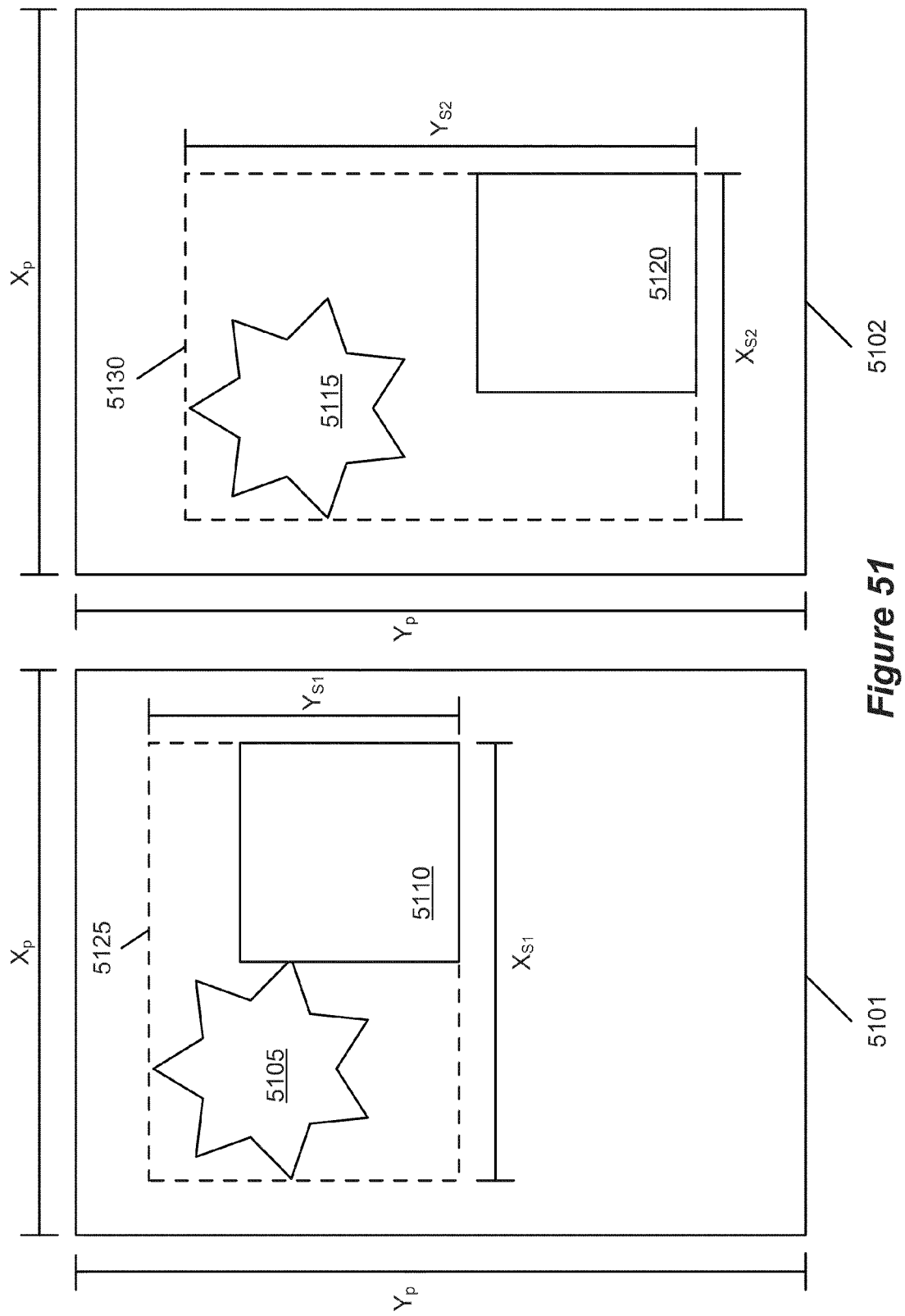
FIG. 51 illustrates two pages, each having two graphic objects for which the spread is calculated.

FIG. 51 illustrates two pages 5101 and 5102, each having two graphic objects for which the spread is calculated. Page 5101 includes two graphic objects 5105 and 5110, while page 5102 also includes two graphic objects 5115 and 5120 having the same shapes and sizes as objects 5105 and 5110, but located at different places on the page. FIG. 51 also illustrates the smallest bounding box 5125 for objects 5105 and 5110 and the smallest bounding box 5130 for objects 5115 and 5120. Using the metric to calculate spread mentioned above, the spread for objects 5105 and 5110 is $(X_{S1}+Y_{S1})/(X_p+X_p)$, while the spread for objects 5115 and 5120 is $(X_{S2}+Y_{S2})/(X_p+X_p)$. Some embodiments instead calculate the spread as the area of the bounding box for the collection of objects divided by the area of the page. Some embodiments use metrics that do not relate to the page size such as the size of the bounding box for the collection of objects compared to the individual bounding boxes of the objects themselves.

Next, the process (at 5035) sets the next graph as the current graph g. The process then proceeds to 5020 which was described above. Once all the spreads have been calculated, the process uses (at 5040) the spreads as first-order differences for difference clustering in order to define clusters of graphs. Some embodiments perform difference clustering as described in the above mentioned United States Publication No. 2007/0250497. As difference clustering of some embodiments only requires the differences between the input values, and does not require the actual values of the inputs, the spreads can be used as the first-order differences despite not arising as actual differences. Clusters that result from difference clustering will, in some embodiments, have relatively small spreads between consecutive graphs in the same cluster as compared to the spreads between graphs in different clusters.

One of ordinary skill in the art would recognize that the spread, and thus the concept of bounds clustering, is not limited to graphic objects on a page. For example, spreads can be calculated among three-dimensional objects (by using volumes rather than areas or by summing over the bounding boxes in three dimensions rather than two), and thus be used to cluster three-dimensional objects (e.g., in a three-dimensional media-editing application such as a video compositing application).

After difference clustering is used, with the spreads as first-order differences, clusters of graphics are defined. Process 5000 selects (at 5045) a cluster C from the unevaluated clusters. The process then processes (at 5050) C into a set of subsequences of graphs that meet certain constraints. Different embodiments use different constraints to define the joined graphs.

Some embodiments impose the requirement that the objects in a subsequence must be consecutive in drawing order. Some embodiments require that the objects in a sequence be mutually overlapping in that there is no way to partition the cluster into two nonempty subsequences, each of which is consecutive in drawing order, such that the upright bounds of the group of objects in the first partition is disjoint from the upright bounds of the group of objects in the second partition. A third requirement imposed by some embodiments is that each subsequence meets density constraints, which ensure that each subsequence includes a sufficient number of graphs (e.g., two) with a sufficiently small total spread.

Some embodiments use modified versions of the above conditions. For example, instead of the upright rectangular bounds, some embodiments use tighter bounds such as a path around the non-transparent pixels of an image. In some embodiments, the collection of objects in each of these subsequences is joined as a single graph.

Process 5000 next determines (at 5055) whether there are more clusters to evaluate. When more clusters remain, the process proceeds to 5045 to select another cluster and process that cluster into subsequences. Otherwise, when all clusters have been processed, the process ends. Now that the graphs are joined, they can be treated as one object when viewed, selected, zoomed, copied, moved, edited, etc. Some embodiments treat joined graphs as one object for use in selection, display, and navigation processes such as described in detail in the concurrently filed U.S. patent application Ser. No. 12/479,845, now published as U.S. Patent Publication 2010/0174983 entitled "Selection of Text in an Unstructured Document", which is incorporated herein by reference.

B. Processing Clusters into Subsequences

Figure 52:
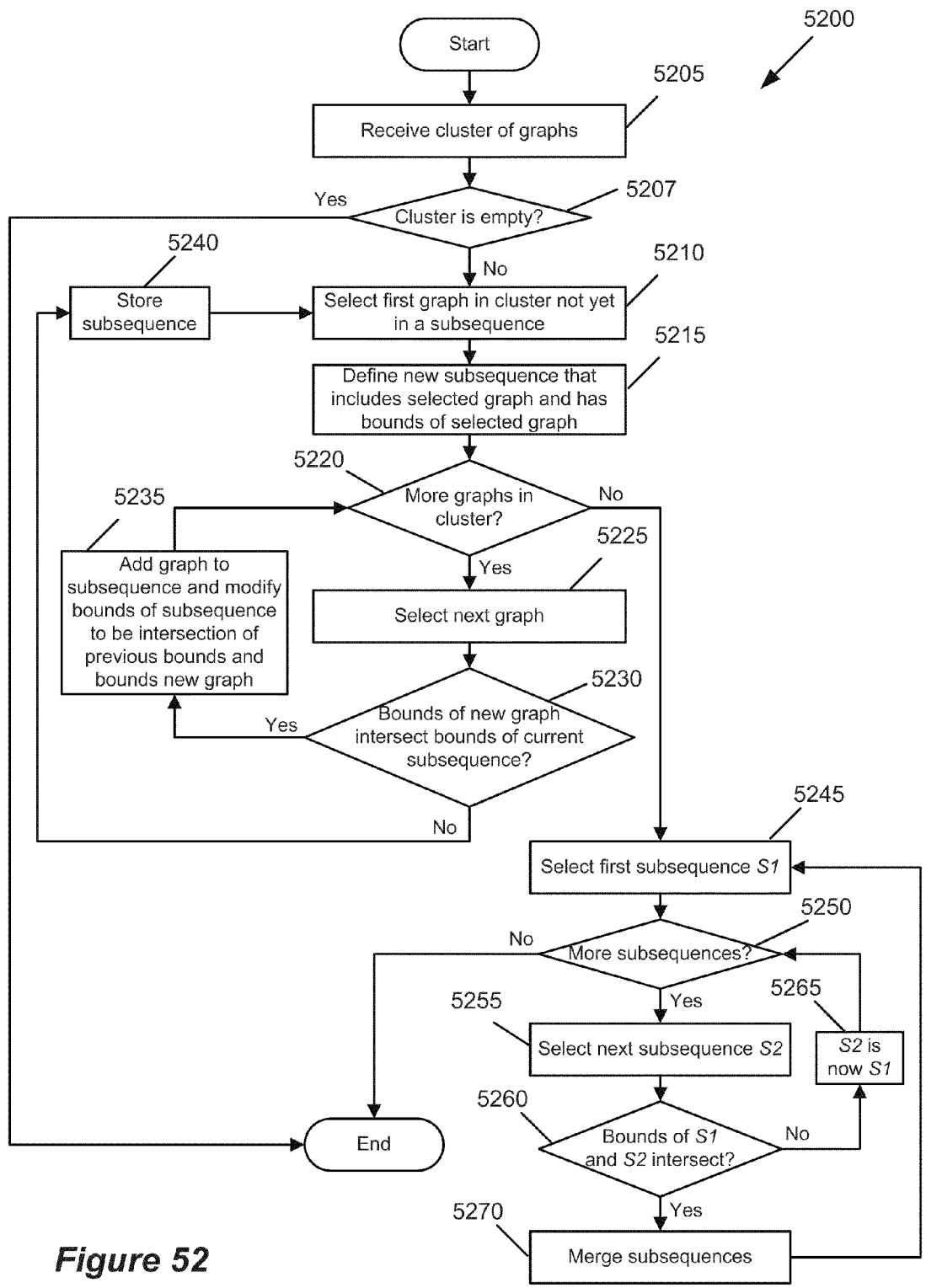
FIG. 52 illustrates a process of some embodiments for processing a cluster into subsequences.

As noted above, after clusters of graphs have been identified, some embodiments process each cluster into subsequences to identify the final joined graphs (and then associate the primitive elements that make up each joined graph). FIG. 52 illustrates a process 5200 of some embodiments for processing a cluster into subsequences. In some embodiments, process 5200 is performed at operation 5050 of process 5000, for each cluster.

As shown, process 5200 receives (at 5205) a cluster of graphs. As noted, in some embodiments, this cluster is the output of bounds clustering that uses spreads as the first order differences for graphs that are ordered by drawing order. The process then determines (at 5207) whether the cluster is empty (i.e., does not include any graphs). When the cluster is empty, the process ends. Otherwise, the process selects (at 5210) the first graph in the cluster that is not yet in a subsequence. In some embodiments, the cluster is ordered by drawing order, such that the first time through operation 5210 the selected graph is the first graph in the cluster that is drawn in the document that includes the graphs.

The process then defines (at 5215) a new subsequence that includes the selected graph (at this point, the selected graph is the only graph in the subsequence). The new subsequence has the bounds of the selected graph. In some embodiments, the bounds of the selected graph is the smallest upright bounding box that includes the graph. Other embodiments define the bounds of the graph differently, e.g. using the smallest-area path that completely encloses all of the non-transparent pixels of the graph.

Next, process 5200 determines (at 5220) whether there are more graphs in the cluster. When there are no more graphs in the cluster, the process proceeds to 5245, which is described below. Otherwise, the process selects (at 5225) the next graph in the cluster. In some embodiments, the next graph in the cluster is the next graph in the drawing order that is in the cluster.

The process determines (at 5230) whether the bounds of the new graph (i.e., the graph selected at 5225) intersect with the bounds of the current subsequence. As noted above, different embodiments define the bounds of a graph differently. The bounds of a subsequence that includes multiple graphs is described below. When the bounds of the new graph do not intersect the bounds of the current subsequence, process stores (at 5240) the current subsequence (e.g., in a list of subsequences) and proceeds to 5210, which is described above, to begin the next subsequence. The next subsequence begins with the graph recently tested at 5230, because this is the first graph in the cluster that is not yet in a subsequence.

When the bounds of the new graph (selected at 5225) intersect the bounds of the current subsequence, the process adds (at 5235) the new graph to the subsequence and modifies the bounds of the subsequence to be the intersection of the previous subsequence bounds and the bounds of the newly added graph. The process then proceeds to 5220, described above, to continue attempting to add graphs to the subsequence.

In some embodiments, the bounds of a subsequence including multiple graphs is the smallest upright bounding box that includes all of the graphs. In other embodiments, the bounds is the union of all of the upright bounding boxes for the graphs in the subsequence (in such embodiments, the bounds of the subsequence will not necessarily be rectangular). In some embodiments that define the bounds of a graph as the smallest-area path including all of the non-transparent pixels of the graph, the bounds might be such a path around all of the graphs in the subsequence or could be the union of such paths for each graph in the subsequence.

Once all graphs in the cluster have been placed in initial subsequences, the process selects (at 5245) a first subsequence S1. In some embodiments, each subsequence includes graphs that are contiguous in the drawing order and the subsequences are arranged based on the drawing order such that the first subsequence is that with the first graphs in the drawing order.

The process then determines (at 5250) whether there are more subsequences (i.e., the first time through the process determines whether there is only one subsequence or not). When there are no more subsequences, the process ends. Otherwise, the process selects (at 5255) a next subsequence S2.

Next, process 5200 determines (at 5260) whether the bounds of S1 and S2 intersect. As described above, the bounds of the subsequences are defined differently in different embodiments (i.e., they are based on upright bounding boxes in some embodiments, paths around the non-transparent pixels in other embodiments, etc.). When the bounds of S1 and S2 do not intersect, the process defines (at 5265) S2 to be S1 and proceeds to 5250 to test the next subsequence against the original S2.

When the bounds do intersect, the process merges (at 5270) the two subsequences and proceeds to 5245 to select the first subsequence as S1. Some embodiments return to the first subsequence and do not finish processing until a set of subsequences that cannot be merged in any way is run through from the beginning. Other embodiments save processing time, however, by selecting the subsequence prior to the recently merged subsequence as S1 upon returning to 5245 and proceeding from that point rather than starting over at the first subsequence.

Once the clusters have been processed into subsequences, the subsequences can be tested against constraints such as the density constraints described above. Some embodiments require a particular minimum number of graphs in a subsequence for the graphs to be associated in a joined graph (e.g., two, five, etc.). Some embodiments required that the spread (calculated as described above) be less than a particular number (e.g., 0.4, 0.5, etc.).

C. Software Architecture

Figure 53:
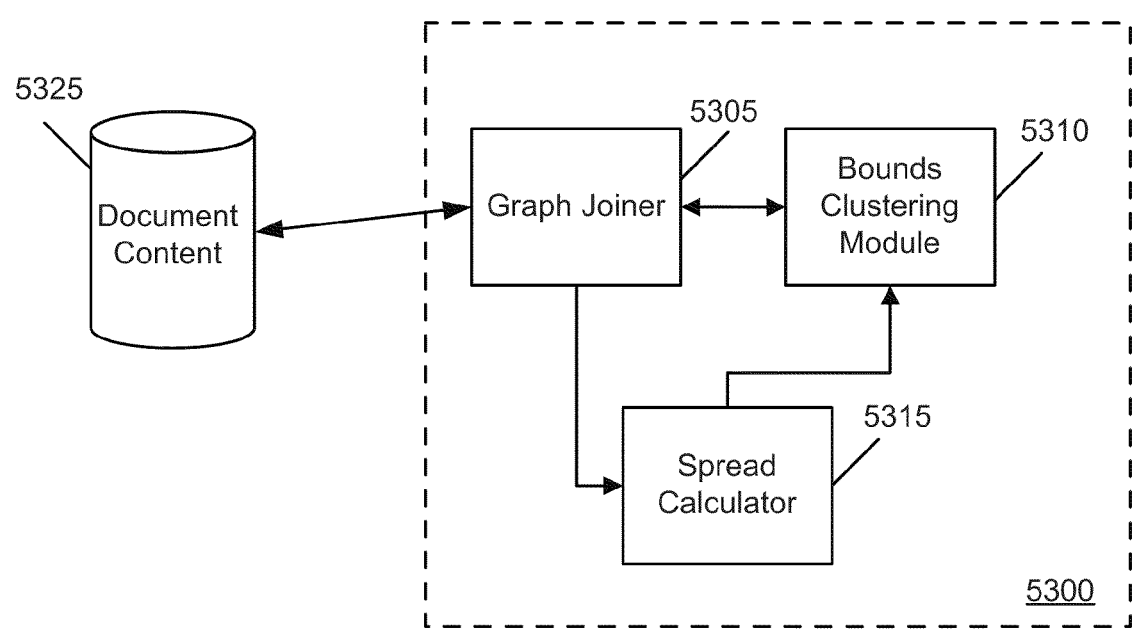
FIG. 53 conceptually illustrates a graph joining application of some embodiments for identifying graphs that should be joined and associating the graphs as one graphic.

In some embodiments, the graph joining processes described above are implemented as software running on a particular machine, such as a computer, a media player, a cell phone (e.g., an iPhone®), or other handheld or resource-limited devices (or stored in a computer readable medium). FIG. 53 conceptually illustrates a graph joining application 5300 of some embodiments for identifying graphs that should be joined and associating the graphs as one graphic. In some embodiments, the application is a stand-alone application or is integrated into another application (e.g., a document reconstruction application), while in other embodiments the application might be implemented within an operating system.

FIG. 53 illustrates a graph joiner 5305, a bounds clustering module 5310, and a spread calculator 5315, as well as document content 5325. Graph joiner module receives information from the document content 5325. In some embodiments, the information is information about the location of each graph and the drawing order of the graphs.

The graph joiner 5305 passes information (e.g., locations of graphs and the position of the graphs in the drawing order) to the spread calculator 5315. The spread calculator 5315 of some embodiments calculates the spread for each successive pair of graphs, and passes this information to bounds clustering module 5310.

Bounds clustering module 5310 receives information from the graph joiner 5305 and the spread calculator 5315 (e.g., an array of spreads to be treated as first order differences) and performs bounds clustering on the received information. The results of the bounds clustering are passed back to the graph joiner. In some embodiments, the graph joiner 5305 performs further processing of the clusters received from the bounds clustering module to identify whether particular clusters of graphs should be associated as single graphs, and returns the associations to the document content 5325.

In some embodiments, the results of the processes performed by the above-described modules or other modules are stored in an electronic storage (e.g., as part of a document object model). The document object model can then be used for displaying the document on an electronic display device (e.g., a handheld device, computer screen, etc.) such that a user can review and/or interact with the document (e.g., via touchscreen, cursor control device, etc.).

VI. Efficient Cluster Analysis

As noted in various sections above, some embodiments of the invention utilize cluster analysis to perform document reconstruction. For instance, alignment guides are identified with the use of density clustering, joined graphs are identified with the use of bounds clustering, and gaps between characters are used to identify words and segment gaps with the use of difference clustering. However, cluster analysis can be very memory-intensive, such that it can be difficult for a resource-limited device, such as a cell-phone or media player, to perform cluster analysis.

Accordingly, some embodiments of the invention provide methods for performing efficient cluster analysis. In some embodiments, the efficient cluster analysis allows cluster analysis to be performed on a resource-limited device (e.g., a handheld device). Resource-limited devices can be limited in terms of available memory, processing power, both, or other computing resources.

In some embodiments, the cluster analysis uses indirectly sorted arrays that stores indices of an unsorted array. Some embodiments use indirectly sorted arrays to partition data at multiple different distance scales concurrently, so as to more quickly find an optimal partition of the data, as opposed to repeating cluster analysis at each different distance scale and comparing the results.

Figure 54:
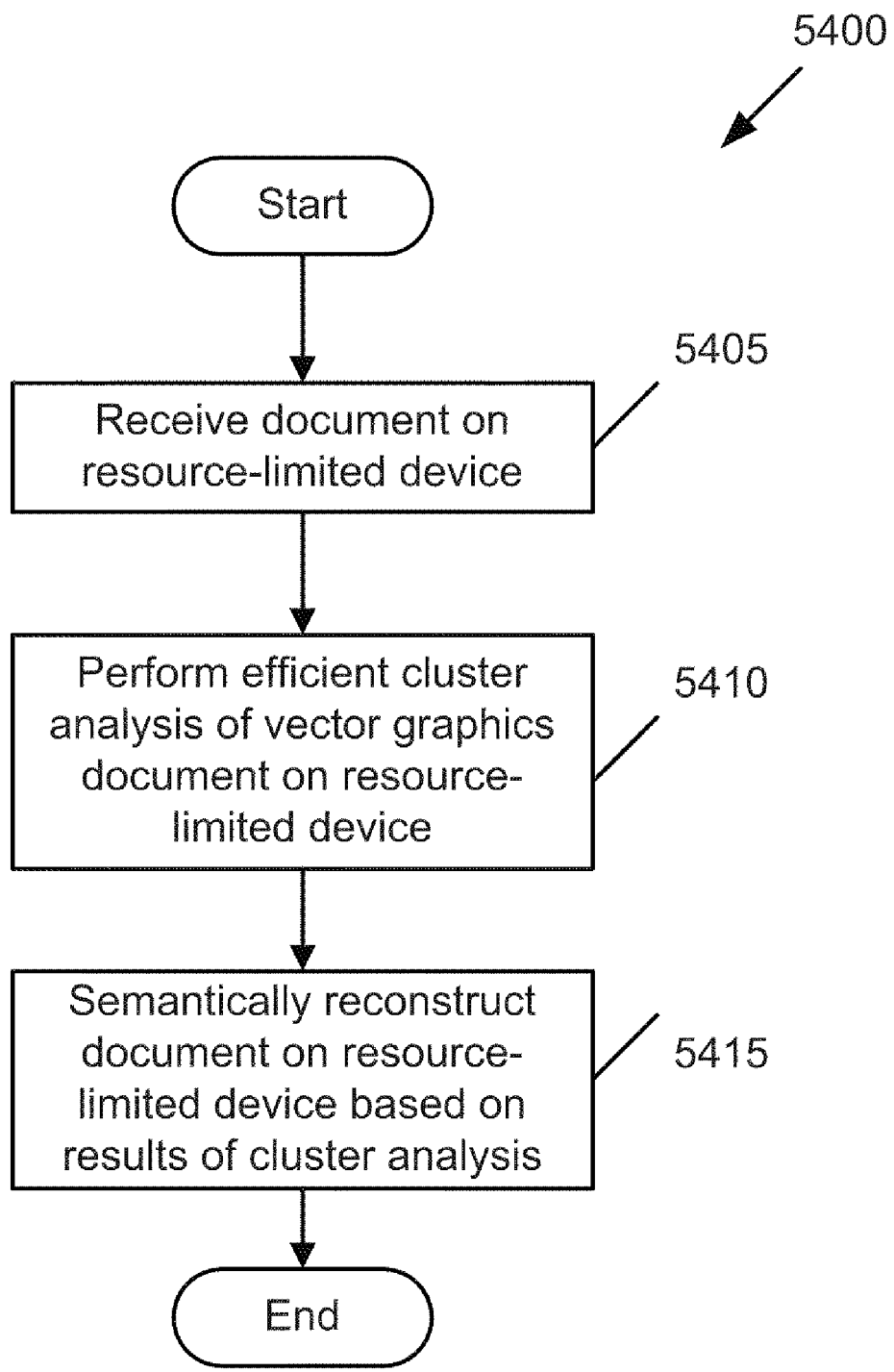
FIG. 54 conceptually illustrates a process of some embodiments for semantically reconstructing a document on a limited-resource device using cluster analysis.

FIG. 54 conceptually illustrates a process 5400 of some embodiments for semantically reconstructing a document using cluster analysis. As shown, process 5400 receives (at 5405) a document on a resource-limited device. In some embodiments, the device is a media player, a cell phone (e.g., an iPhone®), or other handheld device. The document is a vector graphics document in some embodiments that includes no structural information.

The process then performs (at 5410) efficient cluster analysis on the document data on the resource-limited device. For instance, some embodiments perform difference clustering to identify words and segment gaps, density clustering to identify alignment guides, and bounds clustering to identify compound graphics.

Figure 55:
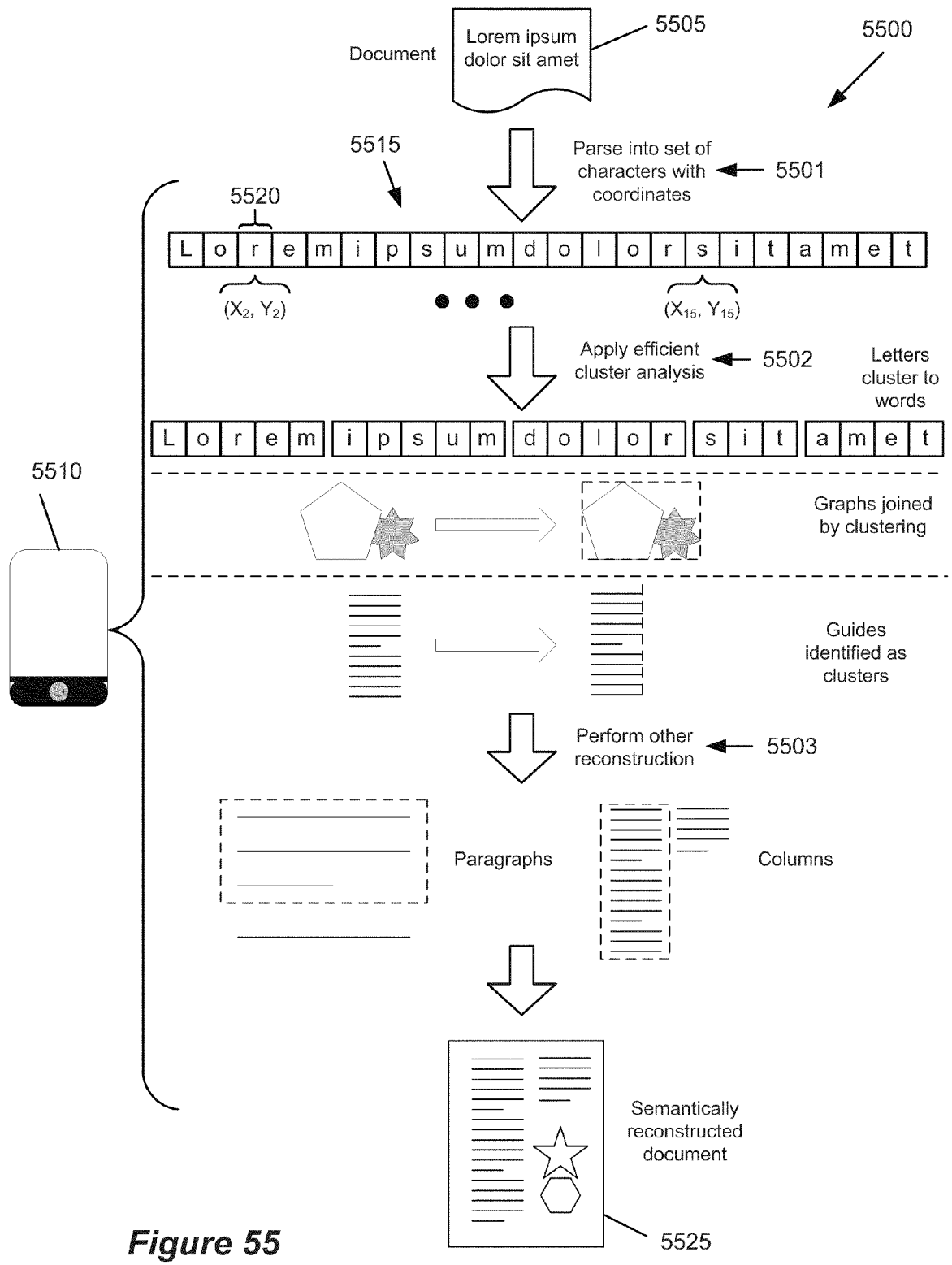
FIG. 55 illustrates a sequence of some embodiments by which a document is semantically reconstructed.

Finally, the process semantically reconstructs (at 5415) the document on the resource-limited device based on the results of the cluster analysis. The process then ends. FIG. 55 illustrates a sequence 5500 of some embodiments by which a document 5505 is semantically reconstructed on a resource-limited device 5510. The document 5505 is initially parsed (at 5501) into a set 5515 of characters with coordinates. For instance, character 5520 ("r") has coordinates $\{X_2, Y_2\}$. Some embodiments also parse graphic objects (e.g., images, shapes, etc.)

Next, efficient cluster analysis is applied (at 5502) to the document data. In some embodiments, this includes using difference clustering to identify words, density clustering to identify guides, and bounds clustering to identify graphs to join. Other reconstruction processes are also performed (at 5503). For instance, paragraphs and columns are identified in some embodiments. One of ordinary skill will recognize that in some embodiments, the cluster analysis processes and other reconstruction processes are not necessarily segregated as far as the order they are performed. The result of the efficient cluster analysis and other reconstruction processes is a semantically reconstructed document 5525 that can be displayed, navigated, etc.

A. Cluster Analysis as a Set of Operators

Some embodiments perform cluster analysis (whether it be difference clustering, density clustering, or bounds clustering) based on several operators that are applied to sequences of real numbers $(r_1, r_2, \ldots, r_N)$. Some embodiments include the following operators:

A differencing operator $D((r_1, r_2, \ldots, r_N))=(r_2-r_1, r_3-r_2, \ldots, r_N-r_{N-1})$. The differencing operator D, in some embodiments, defines a pairwise grouping of the elements $r_N$ (i.e., defines values for the pairs $\{r_2, r_1\}$, $\{r_3, r_2\}$, etc.

A sorting operator $S((r_1, r_2, \ldots, r_N))=(s_1, s_2, \ldots, s_N)$, where $(s_1, s_2, \ldots, s_N)$ is a permutation of $(r_1, r_2, \ldots, r_N)$ such that $s_1 \leqq s_2 \leqq \ldots \leqq s_N$.

A partitioning operator $P(g, (r_1, r_2, \ldots, r_N))=((r_1, \ldots, r_{K1}), (r_{K1+1}, \ldots, r_{K2}), \ldots, (r_{Kp+1}, \ldots, r_{KM}), (r_{KM+1}, \ldots, r_N))$, where $r_{J+1}-r_J \geqq g$ if and only if J is in the set $\{K_1, \ldots K_M\}$. In some embodiments, the variable g is called a gap minimum, and the operator P partitions the sequence $(r_1, r_2, \ldots, r_N)$ into non-overlapping subsequences everywhere that the difference between two subsequent values exceeds the gap minimum.

A coalescing operator C that operates recursively on a partitioned sequence (such as the output of the operator P) to join neighboring pairs of subsequences into a single subsequence any number of times. In some embodiments, the tests to determine when to join neighboring pairs are domain-independent.

A filtering operator F that operates on a partitioned sequence to remove some of the clusters based on tests that are domain independent. The density constraints discussed above in Section III are an example of the use of F.

Some embodiments of difference clustering are performed in terms of the above operators. Similarly, because bounds clustering uses difference clustering with spread values substituted for first-order differences, some embodiments of bounds clustering are performed in terms of the above operators.

For instance, some embodiments apply the sorting operator S to input data, followed by the difference operator D to generate first-order differences. S and D are then applied to the result data to generate second-order differences (the differences between the differences). The second-order differences are sorted with S, and the second-order differences are then split into two disjoint subsequences (the intra-level differences and the larger inter-level differences).

In some embodiments, the splitting includes further application of D to the second-order differences to obtain third-order differences, followed by S to order the third differences. The split in second-order differences generally occurs where there is one third-order difference substantially larger than the rest. Some embodiments evaluate domain-specific factors as well.

Once the split is established, some embodiments apply P using a gap minimum equal to the smallest inter-level second difference to partition the ordered first differences, such that each partition represents a level of clustering. Some embodiments apply C to this partition, while some may not. To partition the data into clusters at a particular level, some embodiments apply P to the (sorted) input data using a gap minimum equal to the smallest difference at the particular level. Some embodiments apply C at this point as well, though often with different criteria for coalescing the cluster partition than for the level partitions. Lastly, some embodiments apply F to disqualify some of the clusters.

Some embodiments of density clustering are also performed in terms of the above operators. For example, some embodiments apply S followed by D to the input data to generate first-order differences, and apply S to sort the differences. For each of the differences d, some embodiments partition the ordered input data with the operator P using a gap minimum d, then filter the partitions using density constraints. Each of the post-filtering partitions is measured by an optimization metric and the optimal partition is selected as the final clustering. Some embodiments loop through the first-order differences (as gap minimums) starting with the largest and moving to successively smaller values in the sorted sequence.

In some embodiments, the loop can be ended early for efficiency if there is enough information. Specifically, some embodiments recognize that each successive partition will be the previous partition with one of the clusters split into two clusters. Some embodiments also recognize that clusters that do not meet a minimum size density constraint will never meet such a constraint in the future, so these clusters can be discarded. Once all clusters in a partition have fallen below the minimum size, then the loop is ended prematurely in some embodiments.

B. Efficient Data Structures for Cluster Analysis

Some embodiments perform efficient cluster analysis by using efficient data structures that allow for memory and processing savings. For instance, when sorting data (e.g., applying the operator S to input data), rather than generating a new array for the data, some embodiments define an array of indices into the array of unsorted data, with the indices sorted in order of the values they reference. This is referred to as an indirectly sorted array in some embodiments. One of ordinary skill in the art will understand that while the examples use arrays, any other suitable data structure may be used as well.

Figure 56:
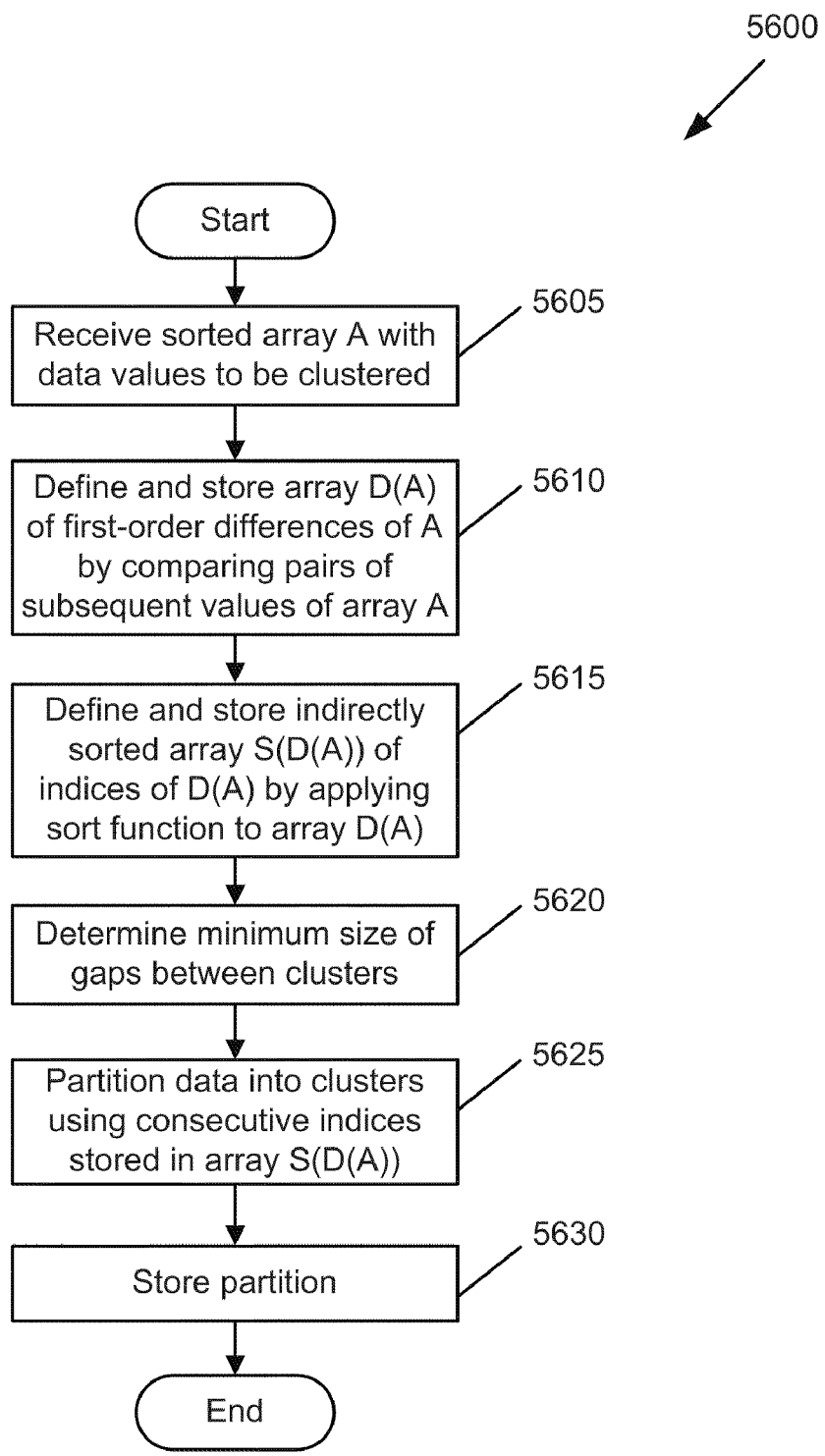
FIG. 56 conceptually illustrates a process of some embodiments for partitioning a data set by using indirectly sorted arrays.
Figure 57:
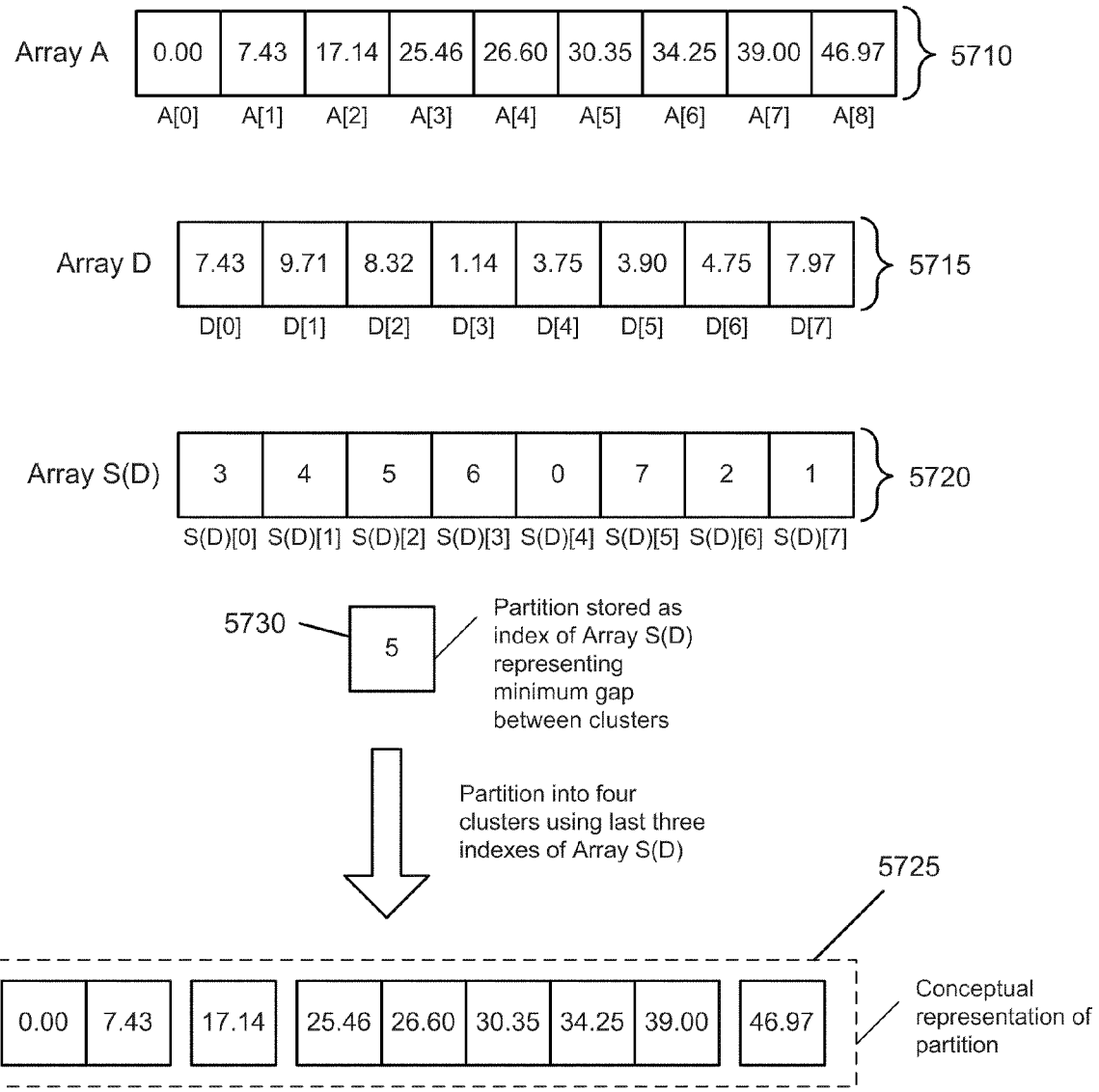
FIG. 57 illustrates the partitioning of a data set with nine data items.

FIG. 56 conceptually illustrates a process 5600 of some embodiments for partitioning a data set by using indirectly sorted arrays. Process 5600 will be described in conjunction with FIG. 57. FIG. 57 illustrates the partitioning of a data set with nine data items (0.00, 7.43, 17.14, 25.46, 26.60, 30.35, 34.25, 39, and 46.97). As shown in FIG. 56, process 5600 receives (at 5605) a sorted array A with data values to be clustered. In some embodiments, the data is character location data for identifying words in a document or identifying alignment guides. Referring to FIG. 57, the data set is stored in a sorted array A 5710, with indices A[0]-A[8].

Next, process 5600 next defines and stores (at 5610) an array D(A) of first-order differences of the array A by comparing pairs of subsequent values of array A. In some embodiments, the array D(A) is generated by use of the operator D that is described above in subsection A. FIG. 57 illustrates the array D 5715 that stores the first-order differences between the data. For instance, the value in index D[3] is the value in index A[3] subtracted from the value in index A[4] of array A 5710.

Next, the process defines and stores (at 5615) an indirectly sorted array S(D(A)) of the indices of D(A) by applying a sort function to the array D(A). In some embodiments, the sort function is the operator S that is described above in subsection A. FIG. 57 illustrates the indirectly sorted array S(D) 5720 that sorts the values of array D 5715. The first value in the array 5720 ("3") references index 3 of array D 5715, which is the smallest of the first-order differences ("1.14"). The second value in the array 5720 references index 4 of array D 5715, which is the second smallest first-order difference, and so on.

The process then determines (at 5620) the minimum size of the gaps between clusters to be used in partitioning the data. In some embodiments, this is the gap minimum g for use with the partitioning operator P described above in subsection A. The minimum gap size is specified by a user in some embodiments, or is a value inherent to the problem being solved in others. Some embodiments use multiple partitions (e.g., in the case of density clustering) such that different gap minimums based on the data are used.

Next, process 5600 partitions (at 5625) the data into clusters using consecutive indices stored in the array S(D(A)). The process then stores (at 5630) the partition. The process then ends. Some embodiments use the indices stored in the indirectly sorted array to partition the data. In some embodiments, the index stored in S(D(A)) corresponding to the smallest first-order difference that is larger than the gap minimum (i.e., the effective gap minimum) will correspond to the index in the sorted array of data after which the data should be split. All indices stored in the array S(D(A)) after the effective gap minimum will also indicate where to split the sorted data, because they represent gaps larger than the gap minimum.

FIG. 57 illustrates that the effective gap minimum is 7.97 in this example, which is in index 7 in array D 5715. Thus, the partition 5725 of data has four clusters, because it is split in three places (after indexes 7, 2, and 1). Some embodiments store the partition as a single index of the array S(D(A)). The partition 5725 is stored as index 5730, which has a value of 5. This indicates that the index corresponding to the effective gap minimum is stored at index 5 of array 5720, and therefore the indices for partitioning the data are stored at indices 5 and up of array 5720.

The above process 5600 enables multiple processing and memory efficiencies for cluster analysis. First, storing the indices (which are integers) rather than the decimal values of the actual data in the sorted array of differences saves memory space. Second, instead of actually storing the partition as multiple separate arrays, it is stored as a single integer value referencing an index of the indirectly sorted array, which can bring about substantial memory savings when there are numerous partitions being evaluated for large arrays of data. Third, the indices at which to partition the data can be read off quickly from the indirectly sorted array, which substantially saves processing time.

Figure 58:
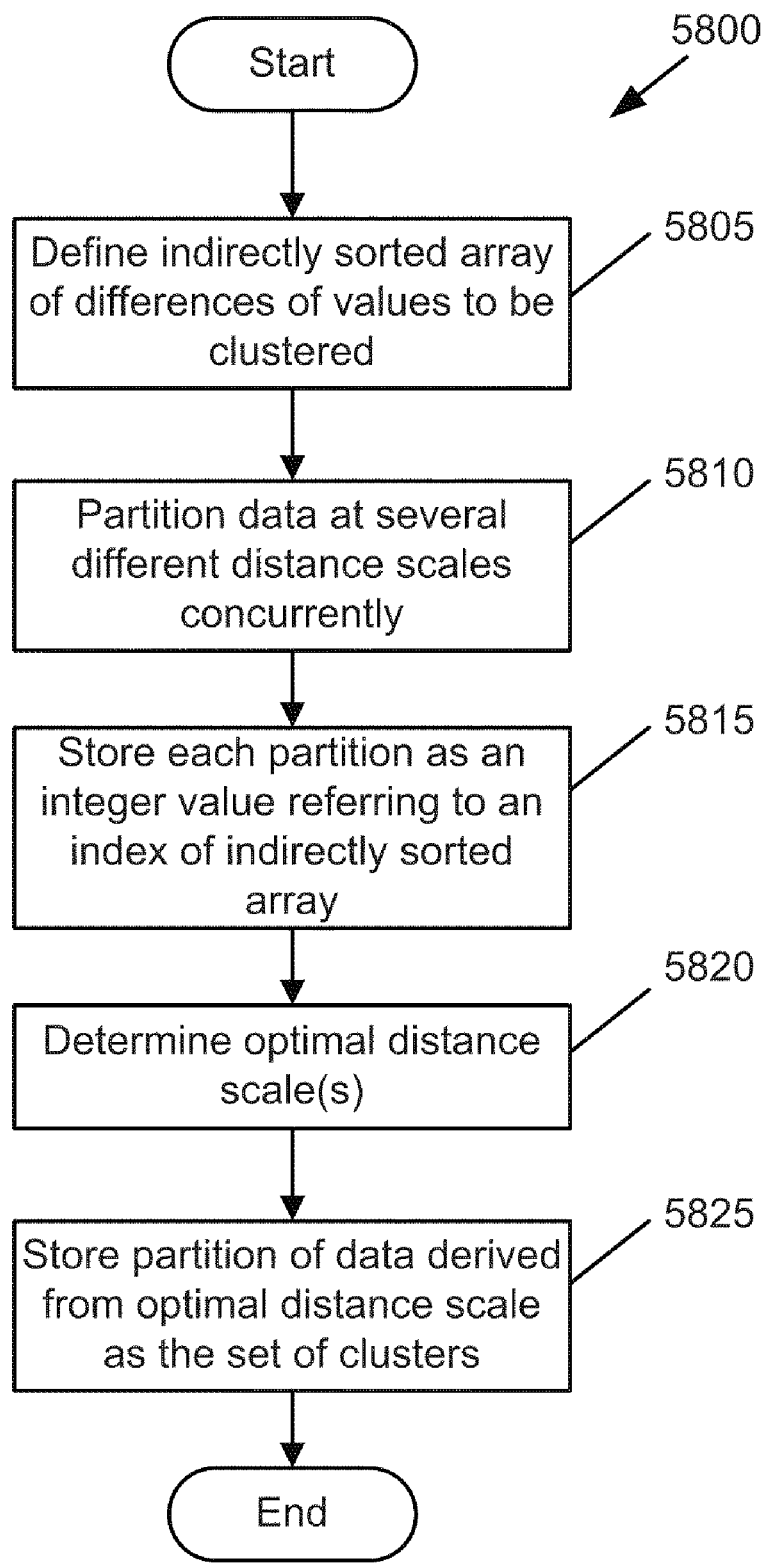
FIG. 58 conceptually illustrates a process of some embodiments for performing cluster analysis at multiple distance scales concurrently.

These efficiencies can be leveraged in numerous ways to perform cluster analysis. FIG. 58 conceptually illustrates a process 5800 of some embodiments for performing cluster analysis at multiple distance scales concurrently. In some embodiments, process 5800 takes advantage of the efficiencies offered by process 5600. As shown, process 5800 defines (at 5805) an indirectly sorted array of differences of data values to be clustered. This is an array such as array 5720 of FIG. 57, and is arrived at in some embodiments by sorting the input data values, taking the first-order differences, and then sorting those.

Process 5800 then partitions (at 5810) the data values at several different distance scales concurrently. In some embodiments, this means that multiple partitions are generated for the data using different gap minimums. For instance, in the case of density clustering, each possible partition is generated in some embodiments. In some embodiments, because the first-order differences are sorted with an indirectly sorted array, the partitioning locations for the data can be quickly read off as the indices stored in the indirectly sorted array.

Next, the process stores (at 5815) each partition as an integer value referring to an index of the indirectly sorted array. Integer value 5730 of FIG. 57 is an example of storing a partition as a single integer value. The process then determines (at 5820) the optimal distance scale (and thus the optimal partition). For example, some embodiments use an optimization measure such as is described for density clustering above in Section III. Furthermore, some embodiments eliminate some of the clusters in a partition by using constraints before testing the partition against the optimization measure.

Finally, once the optimal distance scale is determined, the process stores (at 5825) the partition of data derived from the optimal distance scale as the set of clusters for the problem being solved. The process then ends. In some embodiments, the set of clusters is stored as a new array once it is determined that it is the optimal set.

While the above descriptions indicate the efficiencies gained for repeated use of the partitioning operator, the memory and processing efficiencies from indirectly sorted arrays and storing a partition as a single value are applicable to other aspects of cluster analysis as well. For instance, the coalescing operator can take advantage of the same efficiencies in some embodiments.

As noted above, the coalescing operator C of some embodiments joins neighboring clusters in a partition, possibly repeatedly. The joining of neighboring clusters can be represented as removing a split in a partition. Because each of these splits corresponds to one of the consecutive indices in an indirectly sorted array, coalescing clusters can be defined as disqualifying particular indices from the sequence. As such, the results of applying the coalescing operator to a partition can be a sequence (e.g., an array) of qualifying indices (i.e., indices at which the new partition is split). Storing such a subsequence is much faster in some embodiments than directly moving around the data in the clusters being coalesced.

Furthermore, coalescing clusters of differences (which is effectively a combination of levels of differences) does not adversely affect the efficiency with which the data clusters (as opposed to the difference clusters) can be quickly read off for a particular chosen level. Even after coalescing the clusters of differences, the indices in the L-th indirectly sorted cluster of differences and above are the split points for the data clusters at level L. The change due to coalescing is that there will be fewer indirectly sorted second differences that determine where each indirectly sorted first difference cluster starts.

Because the filtering operator (which eliminates clusters of data based on constraints) is only applied to clusters of data (not to clusters of differences), the data clusters have already been determined when the filtering operator is applied, and thus it does not interfere with the efficiencies gained through the above implementations of the partitioning and coalescing operators.

Efficiencies can also be gained in the splitting of second differences into intra-level and inter-level second differences that is performed in difference clustering, as described above in Section IV. In some embodiments, the conditions used to determine a split point may depend on the clustering of first differences and the data that would result. Thus, the evaluation of these conditions benefits directly from the efficiencies in determining partitions of differences (and thus partitions of data).

For instance, in the case of difference clustering as applied to document reconstruction, the splitting of second differences is used to determine word breaks and segment breaks (e.g., column, tab, etc. gaps) on a text line, which correspond to first order differences and greater than first order differences respectively. In some embodiments, the goal is to split the second differences such that the minimum of the second cluster of first differences is not much smaller than the expected space character width for the applicable font. Furthermore, a secondary goal would be that the data clusters (each of which is a word) have an average size typical for words in the applicable language. Potential split points can be assessed comparatively lower depending on how far the resulting clusters of first differences and the clusters of data would differ from these expectations. Such assessments can be combined in some embodiments with other measures applied directly to the second differences (e.g., the relative size of the split, the percentile of the split position, and the percentage increase at the split) in a formula that determines the optimal split point. The repeated testing of different splits in the second differences can be made significantly more efficient by the processes described above.

One of ordinary skill in the art will recognize that while cluster analysis and the specific efficiency techniques described above have primarily been described with respect to its use in document reconstruction, they are applicable to any problem in which there is a set, a distance function on pairs of elements of the set, and a need to identify subsets of elements separated by distances that are small in terms relative to the set. For instance, cluster analysis can be applied to analyzing user interaction with an application, web page, or video, by clustering position data acquired by measuring eye movements, mouse movements, or touch screen interactions. As another example, a raster image (i.e., bitmap) can be compressed by reducing the number of colors used to encode it. Cluster analysis can be used on the original set of colors to select a reduced set of colors, such that each cluster of colors is replaced by a single color (often equal to an average of its members). Still another example is that some image recognition techniques (e.g., biometrics, optical character recognition, currency validation, etc.) and vectorization of raster images depend on clustering of pixels in a metric space defined by spatial and color coordinate axes. As a final example, patterns in experimental data (e.g., scientific or business data) are often found by plotting data points in a space the axes of which are the parameters of interest. Cluster analysis can be applied to this data, noting that all points in a given cluster have approximately the same values of all parameters of interest.

C. Software Architecture

Figure 59:
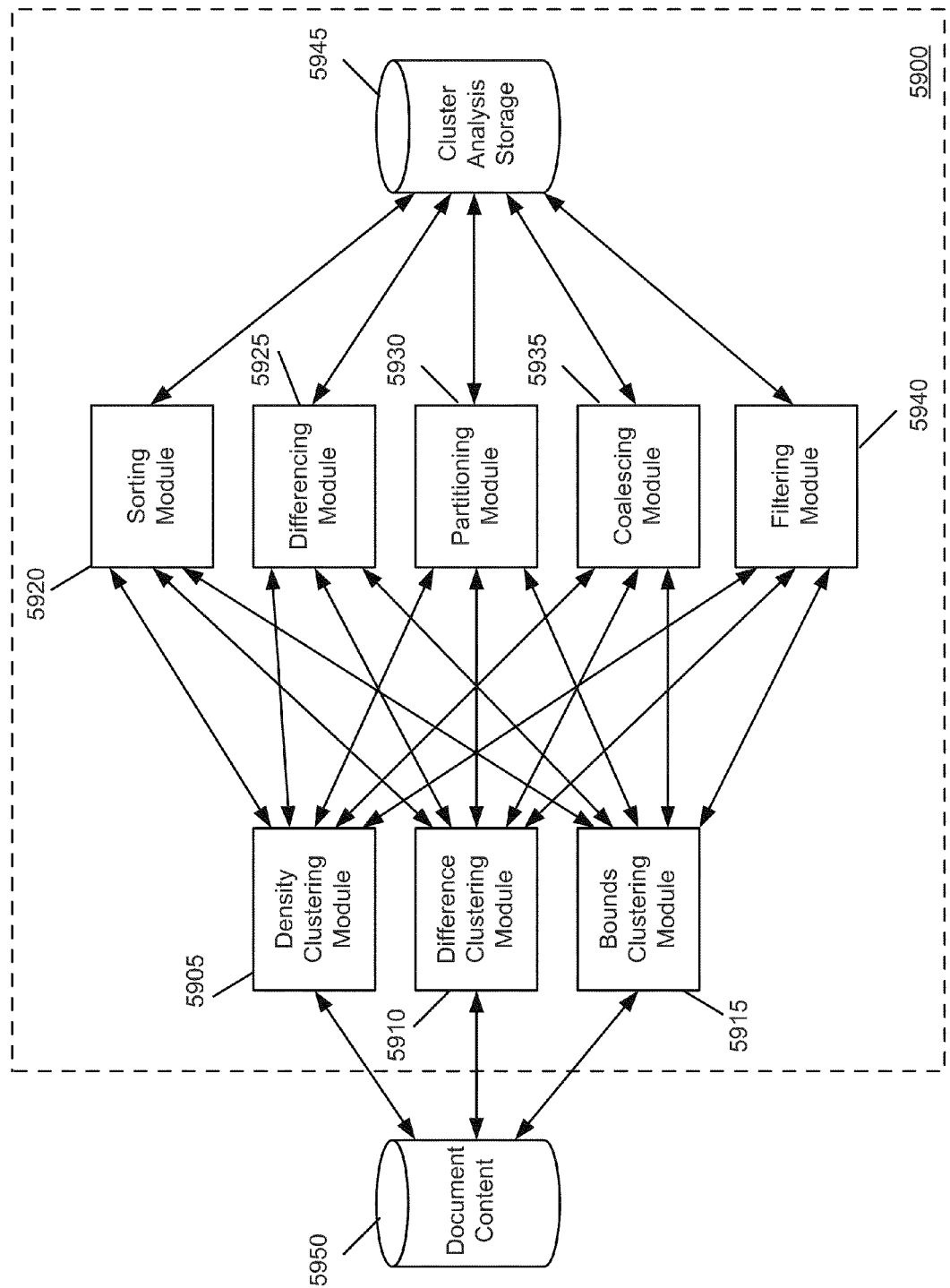
FIG. 59 conceptually illustrates the software architecture of a cluster analysis application of some embodiments for performing cluster analysis.

In some embodiments, the cluster analysis described above is implemented as software running on a particular machine, such as a computer, a media player, a cell phone (e.g., an iPhone®), or other handheld or resource-limited devices (or stored in a computer readable medium). FIG. 59 conceptually illustrates the software architecture of a cluster analysis application 5900 of some embodiments for performing cluster analysis. In some embodiments, the application is a stand-alone application or is integrated into another application (e.g., a document reconstruction application), while in other embodiments the application might be implemented within an operating system.

Cluster analysis application 5900 includes density clustering module 5905, difference clustering module 5910, and bounds clustering module 5915. The application also includes sorting module 5920, differencing module 5925, partitioning module 5930, coalescing module 5935, and filtering module 5940, as well as cluster analysis storage 5945.

FIG. 59 also illustrates document content 5950. One of ordinary skill will recognize that cluster analysis application 5900 could be used for other processes that use cluster analysis that are not related to document reconstruction. Density clustering module 5905, difference clustering module 5910, and bounds clustering module 5915 all receive information (e.g., primitive element position data) from document content 5950. Density clustering module 5905 performs density clustering as described above in Section III, in part by using the modules 5920-5940. Difference clustering module 5910 performs difference clustering as described above in Section IV, in part by using the modules 5920-5940. Bounds clustering module 5915 performs bounds clustering as described above in Section V, in part by using the modules 5920-5940. The output of modules 5905-5915 is returned to the document content 5950.

In some embodiments, the five modules 5920-5940 perform operations associated with the five operators described above in subsection A. The sorting module 5920 of some embodiments receives data from one of the modules 5905-5915 and orders the data (e.g., from lowest value to highest value). The differencing module 5925 of some embodiments receives data from one of the modules 5905-5915 and determines the differences between adjacent pieces of data. The partitioning module 5935 of some embodiments receives data from one of the modules 5905-5915 and partitions the data into multiple subsets. The coalescing module 5935 of some embodiments receives data as multiple subsets from one of the modules 5905-5915 and joins adjacent subsets according to various conditions. The filtering module 5940 of some embodiments receives a partitioned sequence of data in some embodiments and filters out partitions based on various constraints.

The modules 5920-5940 store data in cluster analysis storage 5945, as well as pass the data back to the modules 5905-5915. In some embodiments, the sorting module 5920 stores its results in cluster analysis storage 5945 as a sorted array of indices (i.e., an indirectly sorted array). The partitioning module, in some embodiments, stores partitions in the cluster analysis storage 5945 as a single integer value referencing an index of an indirectly sorted array.

VII. Efficient Data Structures for Parsing and Analyzing A Document

Some embodiments of the invention provide novel methods and data structures that enable more efficient parsing and analysis of a document. Some embodiments provide an application programming interface (API) that minimizes redundant copies of data as the data is manipulated. An API, in some embodiments, is a set of functions, procedures, methods, classes, or protocols that an operating system, library, service, or framework provides to support requests made by computer programs. In some embodiments, the API is statically linked, while in other embodiments an API is dynamically linked.

Typically, APIs return copies of internal data or give read-only access to internal data which must then be copied before being manipulated in any way. This creates many layers of redundant data, which slows processing and consumes excess memory. Some embodiments solve this problem by decoupling objects from their data so that object APIs can be made optimal for a programmer at the same time that the data structures are made optimal with respect to performance and memory consumption. Some embodiments use such an API for reconstructing a document as described above in Sections II-VI as well as in the concurrently filed U.S. patent application Ser. No. 12/479,850, now published as U.S. Patent Publication 2010/0174980, entitled "Identification of Regions of a Document", which is incorporated herein by reference. However, one of ordinary skill in the art will recognize that such an API can be used for any sort of analysis of parsed input data.

Some embodiments provide an API that appears to a user (e.g., a programmer or a software application using the API) as if the user has their own independent, modifiable copy of the class members of the API with no explicit restrictions. In other words, it appears to the user as though any object returned through the API is completely modifiable by the user. However, in some embodiments, the objects will actually only copy themselves when absolutely necessary, and in most cases will manage memory in such a way as to minimize the amount of memory actually used. The memory management of some embodiments is done by using a sorted array of pointers that has a shared memory object which keeps track of the use of the pointers by other objects. In some embodiments, numerous objects can all reference the same pointer array through the shared memory object, enabling substantial memory savings as compared to making copies of the data at every stage of analysis. One of ordinary skill in the art will recognize that while pointers are used to describe certain features below, any sort of referential data structure could be used.

A. Document Reconstruction with Shared Pointers

Figure 60:
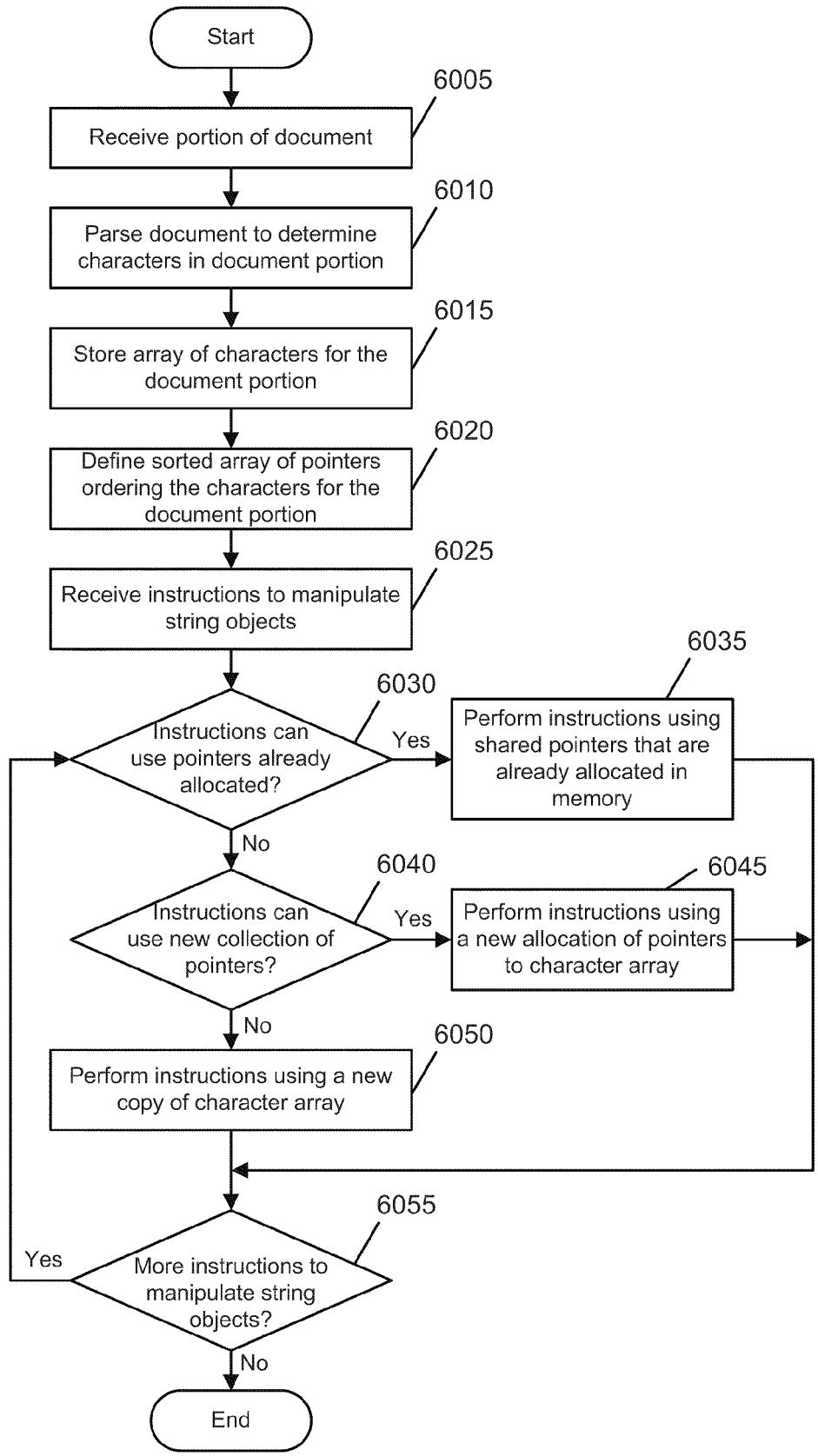
FIG. 60 conceptually illustrates a process of some embodiments for reconstructing a document efficiently.
Figure 61:
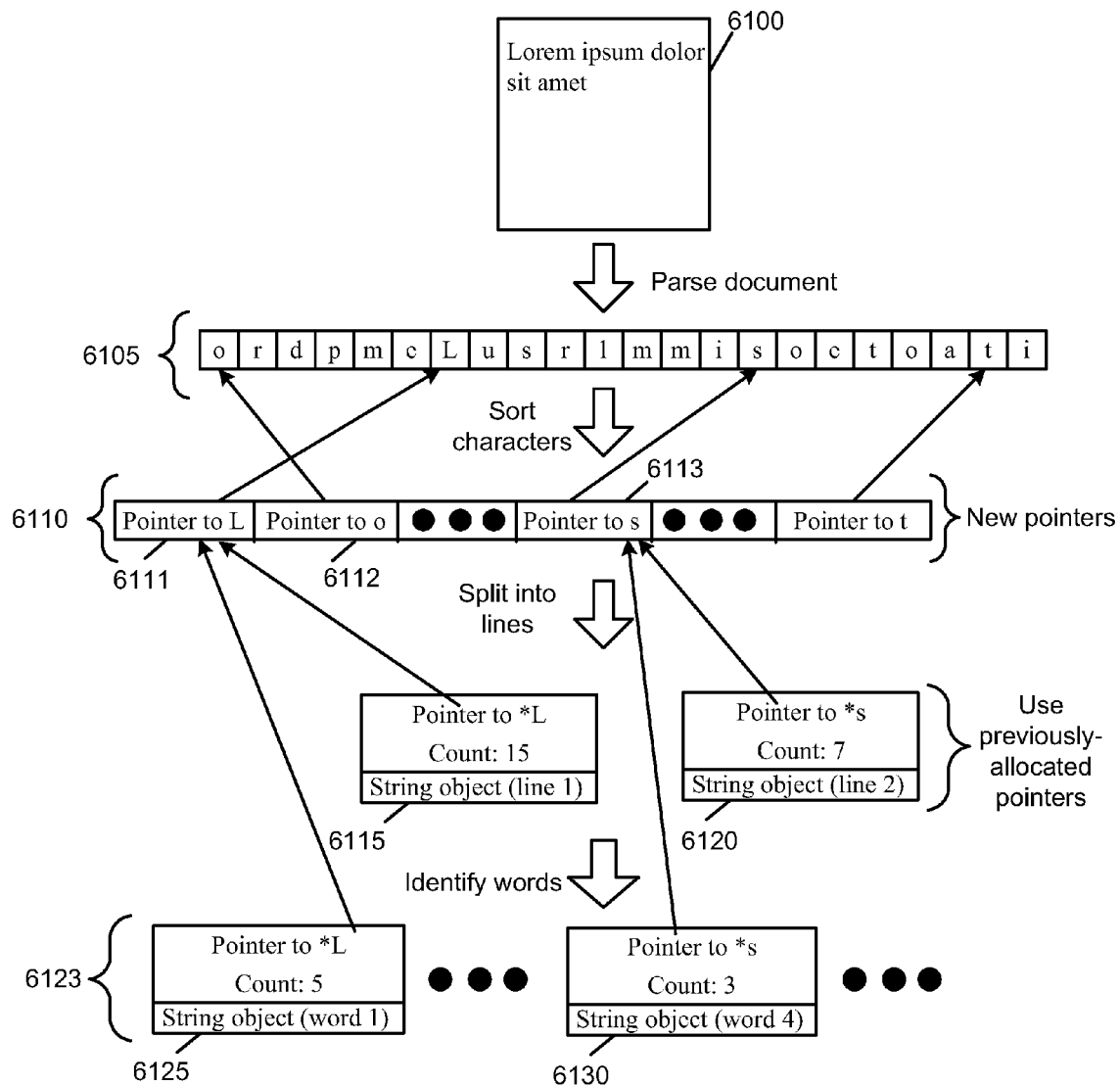
FIG. 61 illustrates a sequence by which a document is parsed and analyzed according to the process of FIG. 60.

Some embodiments use an API such as is described above to reconstruct a document. FIG. 60 conceptually illustrates a process 6000 of some embodiments for reconstructing a document efficiently. Process 6000 will be described in conjunction with FIG. 61. FIG. 61 illustrates a sequence by which a document 6100 is parsed and analyzed according to process 6000.

As shown in FIG. 60, process 6000 receives (at 6005) a portion of a document. In some embodiments, the document portion is a page, and the process operates on a page-by-page basis. In other embodiments, the document portion is an entire document, a section of a document, or a zone on a page. The process then parses (at 6010) the document to determine the characters in the document portion, and stores (at 6015) an array of characters for the parsed data.

FIG. 61 illustrates that the document 6100 is parsed into a randomly-ordered array 662 of characters. While these examples use arrays, one of ordinary skill will understand that any other suitable data structured may be used. In some embodiments, parsing the document involves reading a stream of bytes representing the document and turning that stream into a usable representation (such as the character array) of the information in the stream. The characters in the stream are read in a random order in some embodiments, which is why the order of the array 662 is random. The characters of some embodiments have coordinates and/or page numbers. In some embodiments, each character is stored as an object that includes the associated coordinate or page number values.

Process 6000 defines (at 6020) a sorted array of pointer that orders the characters for the document portion. In some embodiments, the characters for a page are sorted with a primary sort of top to bottom and a secondary sort of left to right. Some embodiments that store multiple pages in a character array sort by page first. FIG. 61 illustrates an array of pointers 6110 that is defined for the sorted characters. The first pointer 6111 points to the letter "L" in the array 662, the second pointer 6112 to the letter "o", and so on. Defining an array of pointers to the initial character array rather than defining and storing a separate new array saves memory in some embodiments.

The process next receives (at 6025) instructions to manipulate string objects. Some embodiments define a string object as a pointer to a location in the sorted array of pointers and a count of how many characters are in the string. For instance, a string object for the entire page would point to the first pointer in the sorted pointer array (the top-leftmost character), and give a count of the number of characters on the page.

In some embodiments, the instructions include splitting strings, joining strings, adding characters, removing characters, and re-ordering characters. These operations, in some embodiments, are invoked as part of the process of reconstructing a document and using the reconstructed document as described above in Sections II-VI as well as in the concurrently filed U.S. patent application Ser. No. 12/479,850, now published as U.S. Patent Publication 2010/0174980, entitled "Identification of Regions of a Document", which is incorporated herein by reference. For instance, in some cases when lines are merged, the order of characters must be modified. When zones are defined, some embodiments define strings for each zone, which in many cases involves splitting strings, joining strings, or both.

After receiving the instructions, the process determines (at 6030) whether the instructions can be performed using only pointers that are already allocated (e.g., the sorted pointer array defined at 6020). In some embodiments, splitting strings involves only the use of pointers that are already allocated. In the case of document reconstruction, some processes only involve the splitting of strings (e.g., line identification, line splitting, etc.). Furthermore, joining strings that are next to each other in the sorted array of pointers will involve only the use of already-allocated pointers in some embodiments.

FIG. 61 illustrates how identifying the two lines in document 6100 results in two string objects 6115 and 6120 that reference the already-allocated pointers in the array 6110. The first line is defined by a string object 6115 that points to the pointer to L 6111 and has a count of 15 (the number of characters on the first line). The second line is defined by a string object 6120 that points to the pointer to s 6113 and has a count of 7 (the number of characters on the second line). In order to define these lines, no new pointers need to be allocated. Over the hundreds or thousands of operations that may be involved in reconstructing a document, this can introduce large memory and processing time (because no arrays need to be searched) efficiencies.

The same pointers 6110 can then be used when words are identified. For example, string objects 6125 and 6130 define two of the words in document 6100. These words point to the same start pointers as string objects 6115 and 6120, but have different counts because the words are shorter than the lines. However, no new pointers need to be allocated to define these words, only new string objects. For a full document, hundreds or thousands of different string objects may all reference the same pointer array (such as pointers 6110), introducing large memory savings over repeatedly allocating memory for new pointer arrays.

When the received instructions can be performed using only pointers that are already allocated, process 6000 performs (at 6035) the instructions using the shared pointers that are already allocated in memory. The process then proceeds to 6055, which is described below. Otherwise, the process determines (at 6040) whether the instructions can be performed using a new collection of pointers.

Some embodiments allocate new pointers when instructions cannot be performed with only pointers that are already allocated, but the instructions do not require direct data manipulation of the character array. In some embodiments, joining strings that are not next to each other in a shared array of pointers requires a new allocation of pointers, because a string object for the joined strings cannot be represented by pointing to one pointer in the sorted array and moving forward in that array. For instance, referring to FIG. 61, if an operation called for appending the first line to the end of the second line, then string object for the appended lines could not point to array 6110. Instead, a new array of pointers would have to be allocated in the required order.

When the received instructions can be performed using a new allocation of pointers, the process performs (at 6045) the instructions by using a new allocation of pointers to the character array. The process then and proceeds to 6055, which is described below. Otherwise, the process performs (at 6050) the instructions by using a new copy of a portion or the entire character array. Directly editing the document data (i.e., a user adding a word to the document) is an example of instructions that could not be performed without manipulating the actual array of characters in some embodiments. However, a user adding a word to the document would not require a completely new copy, but instead could be handled by adding characters to the array and then defining a new array of pointers to the characters. Similarly, merging text lines often requires a new array of pointers, because a character from one text line may be inserted into the next text line, thereby altering the order of the characters relative to each other.

Next, the process determines (at 6055) whether more instructions to manipulate the string objects have been received. When more instructions have been received, the process proceeds to 6030, which is described above, to determine the most efficient way of performing the instructions. Otherwise, the process ends. This process illustrates the hierarchy of memory and processing savings that are introduced by using the shared data. The original data is shared among various pointer arrays, and each pointer array is shared among many string objects. For each set of instructions received (e.g., each call into an API), the most efficient way of performing the instructions is used. Ideally, the instructions will not require the creation of any new pointers, and only new string objects need be created. If this is not possible, then memory savings may still be gained by creating new pointers that share the original data as opposed to creating a new character array.

Although process 6000 has been described with reference to string objects and specifically string objects for document reconstruction, one of ordinary skill in the art will recognize that the efficiencies gained by exhibiting a preference for using already-allocated pointers and then for allocating new pointers as opposed to copying data, are applicable to a wide range of problems where memory and processing time are at a premium.

B. Shared Memory Objects

In some embodiments, each array of pointers has a shared memory object that manages the use of the pointers in the array. In some embodiments, the shared memory object for a particular pointer array keeps track of the data objects (e.g., string objects) that reference the particular array. In some embodiments, the shared memory object also keeps track of where in memory the pointer array starts as well.

Figure 62:
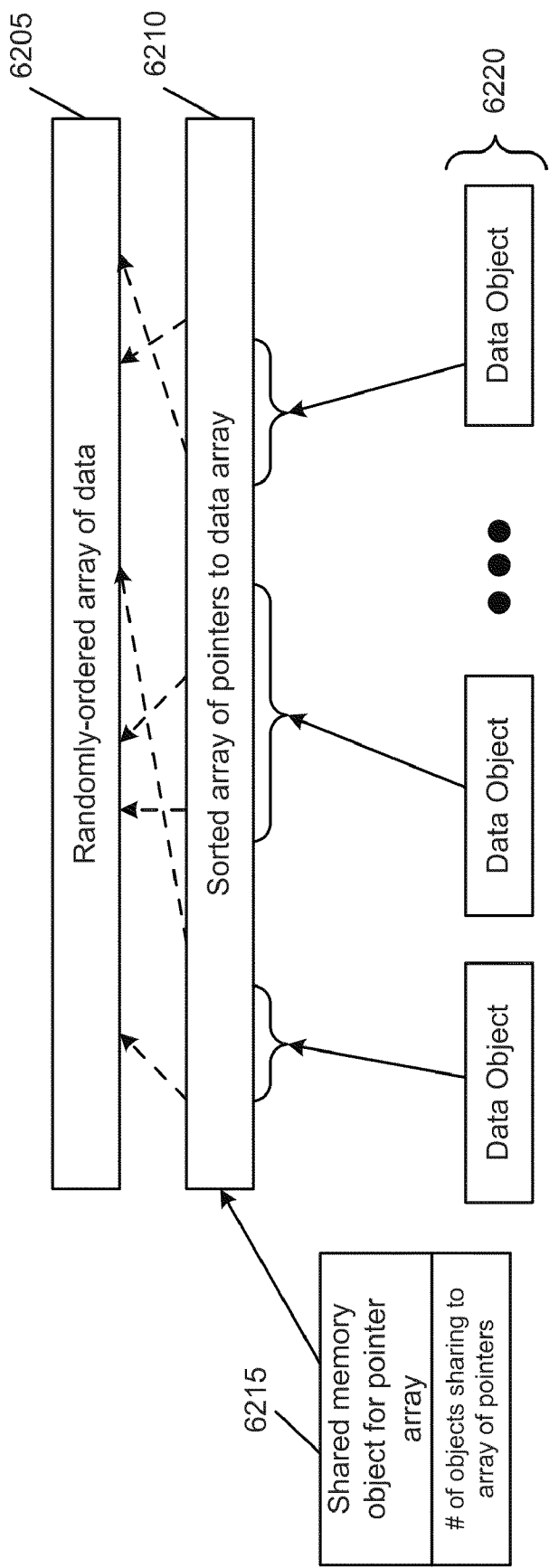
FIG. 62 illustrates the manner in which data is stored according to some embodiments of the invention.

FIG. 62 illustrates the manner in which data is stored according to some embodiments of the invention. FIG. 62 illustrates an array of data 6205, a sorted array of pointers 6210, a shared memory object 6215, and data objects 6220. The data array 6205 is randomly-ordered parsed data in some embodiments (e.g., character data from a parsed document).

The sorted array of pointers 6210 is an array of pointers to the data array 6205. Each pointer points to a data item in the array 6205 in some embodiments. The pointers are arranged in an order based upon a sort of the data. For instance, in the case of a document, the pointers are arranged in the reading order of the characters to which they point in some embodiments.

Each of the data objects 6220 includes a reference to a location in the pointer array 6210 and a count. The location in the pointer array 6210 for a particular data object is the pointer that points to the first piece of data that the data object references. For instance, when the data object is a string object for the word "Array", the data object would specify the location in the pointer array where the pointer that points to the "A" is found. The data object would also include a count of 5.

FIG. 62 also illustrates a shared memory object 6215. In some embodiments, the shared memory object manages the use of the sorted array 6210 by the data objects 6220. The shared memory object 6215 keeps a count of the number of data objects 6220 that reference the array 6210.

Some embodiments do not define the shared memory object 6215 when a first data object (that points to the start of the array and has a count of the entire array) is defined. However, once a second data object points to the array, the array is now shared, and the shared memory object 6215 is defined to keep track of how many data objects share the array and where the start of the array is, as each individual object does not have this information. Accordingly, in some embodiments, the data objects 6220 can call a function to instantiate a shared memory object for a pointer array if none exists when the data object is set to point to the pointer array. When the number of objects 6220 drops to zero, the shared memory object 6215 deallocates the pointers 6210 and is then itself removed from memory.

In some embodiments, each individual data object 6220 sharing the pointer array 6210 does not have any knowledge that other objects 6220 are also using the pointers in array 6210. Furthermore, the objects 6220 do not have any knowledge of the start or end of array 6210, merely referencing some point in the array 6210. However, the shared memory object 6220 of some embodiments knows where the start of the array is in memory.

C. Software Architecture

Figure 63:
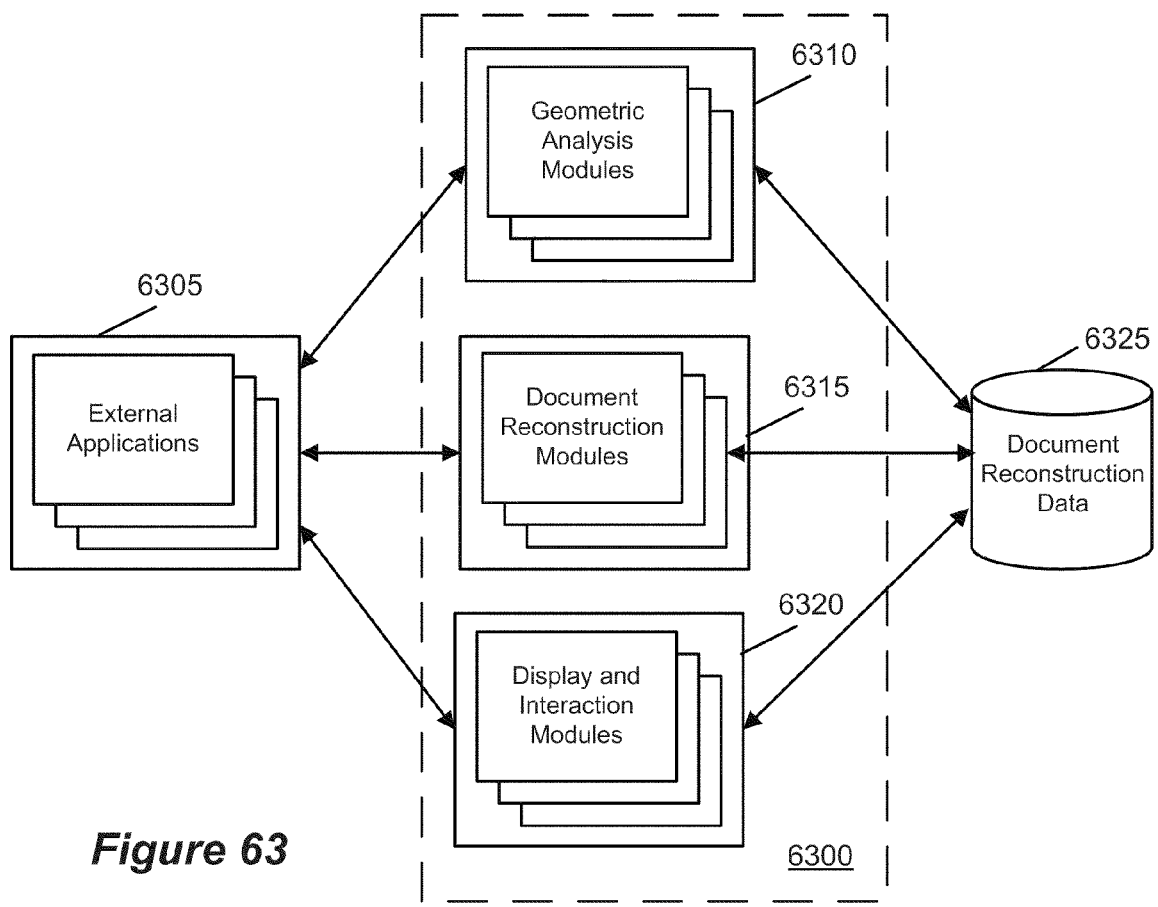
FIG. 63 conceptually illustrates an API that performs document reconstruction processes while using efficient memory management techniques.

In some embodiments, the API described above are implemented as software running on a particular machine, such as a computer, a media player, a cell phone (e.g., an iPhone®), or other handheld or resource-limited devices (or stored in a computer readable medium). FIG. 63 conceptually illustrates an API 6300 that performs document reconstruction processes while using the efficiency techniques described above in subsections A and B.

API 6300 includes geometric analysis modules 6310, document reconstruction modules 6315, and display and interaction modules 6320. The API 6300 is, in some embodiments, the set of functions, procedures, methods, classes, and/or protocols that is provided for use by external applications 6305.

The API 6300 receives requests (e.g., function calls) to the public methods by external applications 6305. In some embodiments, there are numerous external applications. For instance, in the case where an API is provided on a handheld device (e.g., an iPhone®), the external applications might be a PDF viewer (e.g., an e-book reader), a word processor (e.g., Microsoft Word, Apple Pages, etc.), a web browser (e.g., Microsoft Internet Explorer, Apple Safari, Mozilla Firefox, etc.), etc.

The various public methods provided by API 6300 call various private methods that perform the geometric analysis and document reconstruction, access the document object model, etc. The data (e.g., the primitive elements that are initially identified by a parser) is stored in the document reconstruction data 6325. Although it may appear to the external applications that they can access the data (e.g., while manipulating characters to identify words, text lines, etc.), in fact the class members that are manipulated by the external applications through the API are divorced from the actual data by defining the class members to only store references to the data, as described above in subsections A and B.

VIII. Overall Software Architecture

Figure 64:
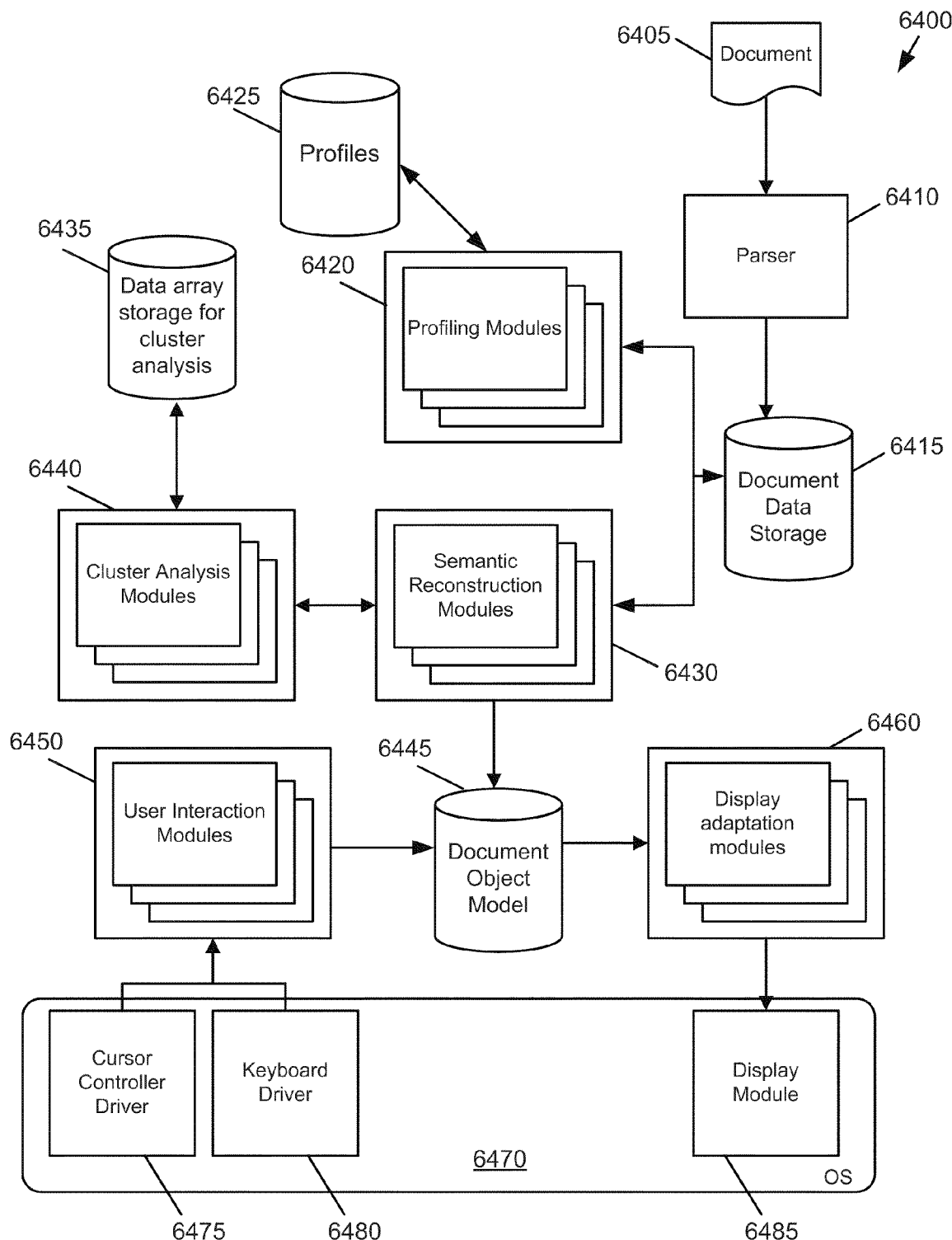
FIG. 64 conceptually illustrates the software architecture of an application of some embodiments for reconstructing, displaying, and interacting with a document.

In some embodiments, the processes described above are implemented as software running on a particular machine, such as a computer, a media player, a cell phone (e.g., an iPhone®), or other handheld or resource-limited devices (or stored in a computer readable medium). FIG. 64 conceptually illustrates the software architecture of an application 6400 of some embodiments for reconstructing, displaying, and interacting with a document. In some embodiments, the application is a stand-alone application or is integrated into another application, while in other embodiments the application might be implemented within an operating system. In still other embodiments the modules illustrated in FIG. 64 are split among multiple applications. For instance, in some embodiments, one application generates the document object model, while another application displays the document and interacts with the document object model (see full description below).

Application 6400 includes a parser 6410, profiling modules 6420, semantic reconstruction modules 6430, cluster analysis modules 6440, user interaction modules 6450, and display adaptation modules 6460. The application 6400 also includes document data storage 6415, profile storage 6425, cluster analysis storage 6435, and document object module storage 6445. FIG. 64 also illustrates an operating system 6470 that includes cursor controller driver 6475, keyboard drive 6480, and display module 6485. In some embodiments, as illustrated, the cursor controller driver 6475, keyboard driver 6480, and/or display module 6485 are part of operating system 6470 even when the compositing application is a stand-alone application separate from the operating system.

As shown, the parser 6410 receives a document 6405. In some embodiments, the document is an unformatted document that includes vector graphics (e.g., a PDF). The parser 6410 parses the document information and stores the parsed data in the document data storage 6415. In some embodiments, the parsed text data is stored as an array of characters as described in Section XI of the concurrently filed U.S. patent application Ser. No. 12/479,842, now published as U.S. Patent Publication 2010/0174976, entitled "Efficient Data Structures for Parsing and Analyzing a Document, which is incorporated herein by reference.

The semantic reconstruction modules 6430 reconstruct the document to generate the document object model 6445 from the document data 6415. Semantic reconstruction modules 6430 perform such processes as zone analysis, guide and gutter identification, layout and flow identification, table identification, and joined graph identification.

The output of the semantic reconstruction modules also is sent to the profiling modules 6420. Profiling modules 6420 include a profile matching engine that matches hierarchical profiles and inform the semantic reconstruction modules how to go about performing reconstruction, as described Section VII of the concurrently filed U.S. patent application Ser. No. 12/479,852, now published as U.S. Patent Publication 2010/0174732, entitled "Content Profiling to Dynamically Configure Content Processing", which is incorporated herein by reference.

The semantic reconstruction modules 6410 also pass information to the cluster analysis modules 6440. Cluster analysis modules 6440 perform density clustering for guide identification, difference clustering for word and segment gap information, and bounds clustering for identifying graphs that should be joined, in some embodiments. The cluster analysis modules use the cluster analysis storage 6435 to store arrays and indices as described in Section VI. The results of the cluster analysis are then passed back to the semantic reconstruction modules 6430.

Once the semantic reconstruction modules 6430 have reconstructed the document, they store the document object model 6445. Document object model 6445 stores all information about the semantically reconstructed document, such as the zone graph populated with content that is described above in Section II.

Display adaptation modules 6460 use the document object model 6445 to determine how to display the document. For instance, display adaptation modules of some embodiments perform processes for displaying the document on a small-screen device, which are described in detail in concurrently filed U.S. patent application Ser. No. 12/479,849, now published as U.S. Patent Publication 2010/0174979, entitled "Identification, Selection, and Display of a Region of Interest in a Document", which is incorporated herein by reference. Display adaptation modules 6460 pass the display information to the display module 6485, which governs the actual display on the screen.

User interaction modules 6450 receive input information from the cursor controller driver 6475 and keyboard driver 6480. The input information directs the user interaction modules 6450 to perform operations on the document, such as selections as described detail in the concurrently filed U.S. patent application Ser. No. 12/479,845, now published as U.S. Patent Publication 2010/0174983, entitled "Selection of Text in an Unstructured Document", which is incorporated herein by reference, as well as editing of the document. If the document is edited, then the document object model 6445 must be modified to reflect the edits.

In some embodiments, the results of the processes performed by some of the above-described modules or other modules are stored in an electronic storage (e.g., as part of a document object model). The document object model can then be used for displaying the document on an electronic display device (e.g., a handheld device, computer screen, etc.) such that a user can review and/or interact with the document (e.g., via touchscreen, cursor control device, etc.).

Figure 65:
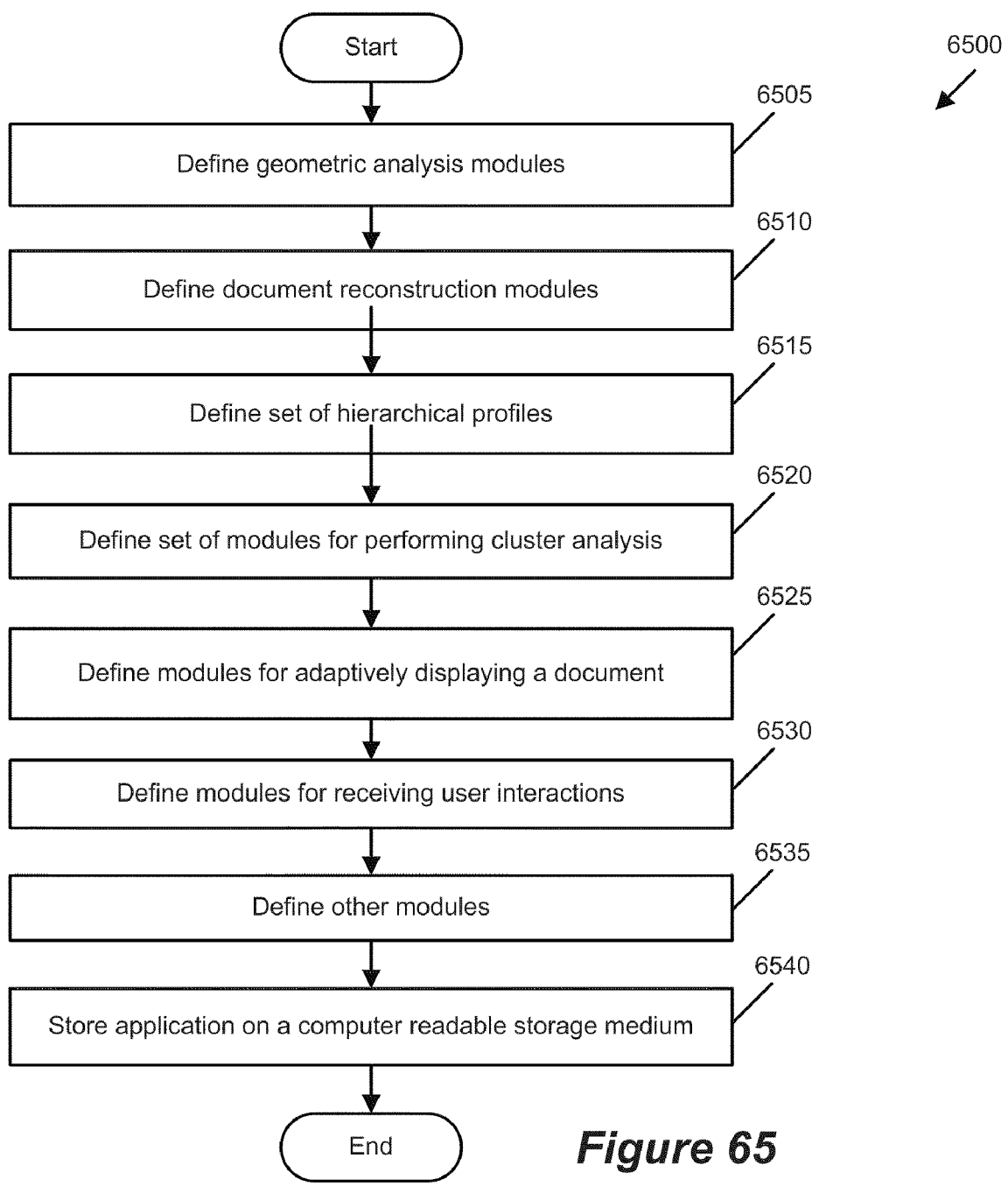
FIG. 65 conceptually illustrates a process of some embodiments for manufacturing a computer readable medium that stores a computer program such as the application described in FIG. 64.

FIG. 65 conceptually illustrates a process 6500 of some embodiments for manufacturing a computer readable medium that stores a computer program such as the application 6400 described above. In some embodiments, the computer readable medium is a distributable non-volatile electronic storage medium (e.g., CD-ROM, hard disk, device firmware, etc.).

As shown, process 6500 begins by defining (at 6505) geometric analysis modules, such as modules 110 of FIG. 1. The process then defines (at 6510) document reconstruction modules such as modules 120 of FIG. 1. More detailed examples of such modules include graph joiner 5305 and spread calculator 5315 of FIG. 53. These modules, in some embodiments, receive an unstructured document that has several primitive graphic elements defined as single objects and has a drawing order that indicates the order in which the primitive graphic elements are drawn when the document is displayed, identify positional relationships between successive primitive graphic elements in the drawing order, and define single structural graphic elements from several primitive graphic elements based on the positional relationships. In some embodiments, the modules calculate values that relate to a size of the primitive graphic elements in a pair for each pair of successive primitive graphic elements in the drawing order, define clusters of successive primitive graphic elements based on the calculated values, identify sub-clusters that satisfy particular constraints, and define each sub-cluster as a structural graphic element that includes the primitive graphic elements in the sub-cluster. In some embodiments, semantic reconstruction modules 6430 of FIG. 64 include both geometric analysis modules and document reconstruction modules, though other embodiments only include one or the other.

Process 6500 then defines (at 6515) a set of hierarchical profiles, such as profiles 6425. Next, the process defines (at 6520) a set of modules for performing cluster analysis. The cluster analysis modules 6440 are an example of such modules. More detailed examples of such modules include bounds clustering module 5310 of FIG. 53, or the sorting module 5920, differencing module 5925, partitioning module 5930, coalescing module 5935, and filtering module 5940 of FIG. 59. In some embodiments, these modules define clusters of successive primitive graphic elements based on calculated spread values, among other functions.

The process then defines (at 6525) modules for adaptively displaying a document, such as display adaptation modules 6460. Next, process 6500 defines (at 6530) modules for receiving user interactions with a document, such as modules 6450. The process also defines (at 6535) other modules. For instance, some embodiments include modules for parsing an incoming document (e.g., a document received by the application) or for efficiently using memory and processing time when performing various document reconstruction operations.

Process 6500 then stores (at 6540) the application on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium. The medium may be firmware of a handheld device (e.g., an iphone) in some embodiments.

One of ordinary skill in the art will recognize that the various elements defined by process 6500 are not exhaustive of the modules, rules, and processes that could be defined and stored on a computer readable storage medium for an application incorporating some embodiments of the invention. Furthermore, it is equally possible that some embodiments will include only a subset of the elements defined by process 6500 rather than all of them.

In addition, the process 6500 is a conceptual process, and the actual implementations may vary. For example, different embodiments may define the various elements in a different order, may define several elements in one operation, may decompose the definition of a single element into multiple operations, etc. Furthermore, the process 6500 may be implemented as several sub-processes or combined with other operations in a macro-process.

VIII. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 66:
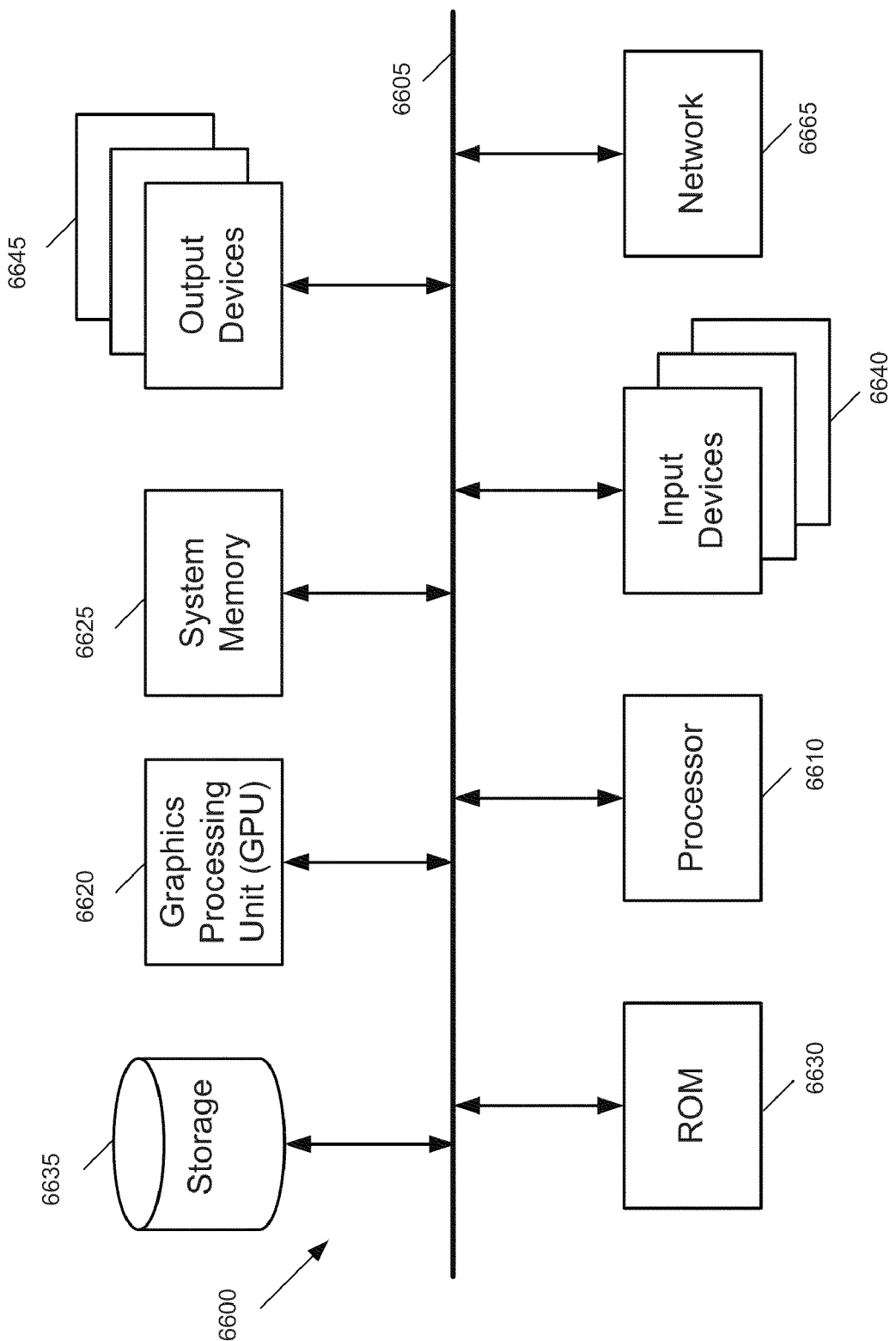
FIG. 66 conceptually illustrates a computer system with which some embodiments of the invention are implemented.

FIG. 66 illustrates a computer system with which some embodiments of the invention are implemented. Such a computer system includes various types of computer readable media and interfaces for various other types of computer readable media. Computer system 6600 includes a bus 6605, a processor 6610, a graphics processing unit (GPU) 6620, a system memory 6625, a read-only memory 6630, a permanent storage device 6635, input devices 6640, and output devices 6645.

The bus 6605 collectively represents all system, peripheral, and chipset buses that communicatively connect the numerous internal devices of the computer system 6600. For instance, the bus 6605 communicatively connects the processor 6610 with the read-only memory 6630, the GPU 6620, the system memory 6625, and the permanent storage device 6635.

From these various memory units, the processor 6610 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 6620. The GPU 6620 can offload various computations or complement the image processing provided by the processor 6610. In some embodiments, such functionality can be provided using CoreImage's kernel shading language.

The read-only-memory (ROM) 6630 stores static data and instructions that are needed by the processor 6610 and other modules of the computer system. The permanent storage device 6635, on the other hand, is a read-and-write memory device. This device is a non-volatile memory unit that stores instructions and data even when the computer system 6600 is off. Some embodiments of the invention use a mass-storage device (such as a magnetic or optical disk and its corresponding disk drive) as the permanent storage device 6635.

Other embodiments use a removable storage device (such as a floppy disk, flash drive, or ZIP® disk, and its corresponding disk drive) as the permanent storage device. Like the permanent storage device 6635, the system memory 6625 is a read-and-write memory device. However, unlike storage device 6635, the system memory is a volatile read-and-write memory, such a random access memory. The system memory stores some of the instructions and data that the processor needs at runtime. In some embodiments, the invention's processes are stored in the system memory 6625, the permanent storage device 6635, and/or the read-only memory 6630. For example, the various memory units include instructions for processing multimedia items in accordance with some embodiments. From these various memory units, the processor 6610 retrieves instructions to execute and data to process in order to execute the processes of some embodiments.

The bus 6605 also connects to the input and output devices 6640 and 6645. The input devices enable the user to communicate information and select commands to the computer system. The input devices 6640 include alphanumeric keyboards and pointing devices (also called "cursor control devices"). The output devices 6645 display images generated by the computer system. The output devices include printers and display devices, such as cathode ray tubes (CRT) or liquid crystal displays (LCD).

Finally, as shown in FIG. 66, bus 6605 also couples computer 6600 to a network 6665 through a network adapter (not shown). In this manner, the computer can be a part of a network of computers (such as a local area network ("LAN"), a wide area network ("WAN"), or an Intranet, or a network of networks, such as the internet Any or all components of computer system 6600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For example, some embodiments receive a document in which each page is defined as a single image. However, some embodiments can perform optical character recognition on the document to recognize glyphs, and in some cases shapes (e.g., lines, rectangles, etc.), after which point the document can be reconstructed. Also, some embodiments have been described above as performing particular geometric analysis and document reconstruction operations on particular primitive elements. However, one of ordinary skill would recognize that the operations could be applied to other sorts of primitive elements. For instance, guide identification is described as involving the use of density clustering to identify associations of (i.e., to associate, or to define associations of) glyphs forming a vertical boundary. However, similar operations could be applied to look for clusters of primitive shapes that form boundaries (e.g., dashed lines).

Furthermore, a number of the figures (including FIGS. 3, 8, 9, 12, 15, 18, 20, 21, 25, 26, 31, 33, 36, 38, 40, 42, 48, 50, 52, 54, 56, 58, 60 and 64) conceptually illustrate processes. The specific operations of these processes may not be performed in the exact order shown and described the specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A computer readable medium storing a computer program which when executed by at least one processor analyzes a document, the computer program comprising sets of instructions for:

receiving a document that comprises a plurality of primitive graphic elements, each primitive graphic element defined as a single object in the document, the document having a drawing order that indicates the order in which the primitive graphic elements are drawn when the document is displayed;

calculating, for a first primitive graphic element and a second primitive graphic element that is subsequent to the first in the drawing order, a size of a single element that comprises the first and second primitive graphic elements; and based on the size of the single element compared to a plurality of different size calculations for additional primitive graphic elements that are subsequent in the drawing order, defining a single structural graphic element within the document from the first and second primitive graphic elements.

2. The computer readable medium of claim 1, wherein the document further comprises a plurality of glyphs, wherein the drawing order does not indicate the order in which the glyphs are drawn on the page.

3. The computer readable medium of claim 1, wherein the document is an unstructured document.

4. The computer readable medium of claim 1, wherein the document is a vector graphics document, wherein the primitive graphic elements are vector graphics.

5. The computer readable medium of claim 1, wherein the document is a portable document format (PDF) document.

6. The computer readable medium of claim 1, wherein the size is proportional to the area of an upright bounding box that envelops the first and second primitive graphic elements.

7. The computer readable medium of claim 1, wherein the size is proportional to the sum of the length and height of an upright bounding box that envelops the first and second primitive graphic elements.

8. The computer readable medium of claim 1, wherein the single element is a first single element, wherein the set of instructions for calculating a size of the first single element that comprises the first and second primitive graphic elements is further for calculating, for the second primitive graphic element and a third primitive graphic element that is subsequent to the second in the drawing order, a size of a second single element that comprises the second and third primitive graphic elements, wherein the computer program further comprises a set of instructions for comparing the size of the first single element comprising the first and second primitive graphic elements to the size of the second single element comprising the second and third graphic elements.

9. The computer readable medium of claim 1, wherein the set of instructions for calculating a size of a single element that comprises the first and second primitive graphic elements comprises sets of instructions for calculating a spread value for the first and second primitive graphic elements.

10. The computer readable medium of claim 9, wherein the spread value describes the size and proximity of the two primitive graphic elements.

11. The computer readable medium of claim 9, wherein the set of instructions for defining a single structural graphic element within the document from the first and second primitive graphic elements comprises sets of instructions for:
- identifying a cluster of primitive graphic elements that are near each other based on the calculated spread values, wherein within the cluster all of the primitive graphic elements are consecutive in the drawing order;
- identifying sub-groups of consecutive primitive graphic elements in the cluster that satisfy a particular set of constraints; and
- for each sub-group, defining a structural graphic element comprising all of the primitive graphic elements in the sub-group.

12. The computer readable medium of claim 11, wherein the set of instructions for identifying the cluster of primitive graphic elements comprises a set of instructions for performing difference clustering on the primitive graphic elements with the calculated spread values as first-order differences.

13. The computer readable medium of claim 11, wherein the particular set of constraints comprises a requirement that bounds for each particular primitive element in the sub-group intersect collective bounds for all primitive elements in the sub-group previous to the particular primitive element in the drawing order.

14. The computer readable medium of claim 13, wherein the bounds for each primitive element is a smallest upright bounding box that includes the primitive element.

15. The computer readable medium of claim 13, wherein the bounds for each primitive element is a smallest-area path that completely encloses the primitive element.

16. The computer readable medium of claim 1, wherein the set of instructions for defining the single structural graphic element within the document from the first and second primitive graphic elements comprises a set of instructions for creating at least one association between the first and second primitive graphic elements that are used to define the structural graphic element.

17. The computer readable medium of claim 1, wherein the computer program further comprises a set of instructions for defining a structured document based on the structural graphic element.

18. The computer readable medium of claim 17, wherein the structured document comprises a hierarchical model of the document comprising a plurality of nodes, wherein one of the nodes is populated by the structural graphic element.

19. A method for analyzing a document and generating structural elements that define structure in the document based on the analysis, the method comprising:
- calculating relative positional values for successive primitive graphic elements in a drawing order of a document that comprises a plurality of primitive graphic elements, each primitive graphic element defined as a single object in the document, the drawing order indicating the order in which the primitive graphic elements are drawn when the document is displayed;
- identifying groups of the calculated relative positional values by ordering the relative positional values and calculating differences between the ordered values; and
- based on the identified groups of relative positional values, defining clusters of primitive graphic elements to associate as structural graphic elements, wherein the relative positional values for pairs of elements within the same cluster of primitive graphic elements are relatively smaller than the relative positional values between pairs of primitive graphic elements in different clusters.

20. The method of claim 19 further comprising defining a structured document that includes the structural graphic elements.

21. The method of claim 20, wherein the structured document comprises a hierarchical model of the document comprising a plurality of nodes, wherein one of the nodes is populated by a particular structural graphic element.

22. A computer readable medium storing a computer program which when executed by at least one processor analyzes a document, the computer program comprising sets of instructions for:
- receiving the document that comprises a plurality of primitive graphic elements, each primitive graphic element defined as a single object in the document, the document having a drawing order that indicates the order in which the primitive graphic elements are drawn when the unstructured document is displayed;
- calculating relative positional values for each pair of successive primitive graphic elements in the drawing order, wherein the calculated relative positional values relate to a size of the primitive graphic elements in the pair;
- based on the calculated relative positional values, defining a cluster of successive primitive graphic elements;
- identifying a set of sub-clusters of primitive graphic elements in the cluster that satisfy particular constraints; and
- defining each particular sub-cluster as a single structural graphic element within the document comprising the primitive graphic elements in the particular sub-cluster.

23. The computer readable medium of claim 22, wherein the calculated relative positional values further relate to the proximity to each other of the primitive graphic elements in the pair.

24. The computer readable medium of claim 22, wherein the document is an unstructured document.

25. The computer readable medium of claim 22, wherein the particular constraints require that the primitive graphic elements of the identified sub-clusters intersect.

26. The computer readable medium of claim 25, wherein two primitive graphic elements intersect when smallest upright bounding boxes of the two primitive graphic elements overlap.

27. The computer readable medium of claim 22, wherein the particular constraints require that the primitive graphic elements of an identified sub-cluster meet density constraints.

28. The computer readable medium of claim 1, wherein the single structural graphic element is a first single structural graphic element, the set of instructions for defining the first single structural graphic element is further for defining a second single structural graphic element from a third and a fourth primitive graphic element, and the first and second single structural graphic elements are defined as separate objects within the document.

29. A method for analyzing a document, the method comprising:
- receiving a document that comprises a plurality of primitive graphic elements, each primitive graphic element defined as a single object in the document, the document having a drawing order that indicates the order in which the primitive graphic elements are drawn when the document is displayed;
- calculating, for a first primitive graphic element and a second primitive graphic element that is subsequent to the first in the drawing order, a size of a single element that comprises the first and second primitive graphic elements; and
- based on the size of the single element compared to a plurality of different size calculations for additional primitive graphic elements that are subsequent in the drawing order, defining a single structural graphic element within the document from the first and second primitive graphic elements.

30. The method of claim 29, wherein the size is proportional to the area of an upright bounding box that envelops the first and second primitive graphic elements.

31. The method of claim 29, wherein calculating a size of a single element that comprises the first and second primitive graphic elements comprises calculating a spread value for the first and second primitive graphic elements.

32. The method of claim 29, wherein defining the single structural graphic element within the document from the first and second primitive graphic elements comprises creating at least one association between the first and second primitive graphic elements that are used to define the structural graphic element.

33. A method for analyzing a document, the method comprising:
- receiving the document that comprises a plurality of primitive graphic elements, each primitive graphic element defined as a single object in the document, the document having a drawing order that indicates the order in which the primitive graphic elements are drawn when the unstructured document is displayed;
- calculating relative positional values for each pair of successive primitive graphic elements in the drawing order, wherein the calculated relative positional values relate to a size of the primitive graphic elements in the pair;
- based on the calculated relative positional values, defining a cluster of successive primitive graphic elements;
- identifying a set of sub-clusters of primitive graphic elements in the cluster that satisfy particular constraints; and
- defining each particular sub-cluster as a single structural graphic element within the document comprising the primitive graphic elements in the particular sub-cluster.

34. The method of claim 33, wherein the calculated relative positional values further relate to the proximity to each other of the primitive graphic elements in the pair.

35. The method of claim 33, wherein the particular constraints require that the primitive graphic elements of the identified sub-clusters intersect.

36. The method of claim 33, wherein the particular constraints require that the primitive graphic elements of an identified sub-cluster meet density constraints.

37. A machine readable medium storing a program which when executed by at least one processing unit analyzes a document and generates structural elements that define structure in the document based on the analysis, the program comprising sets of instructions for:
- calculating relative positional values for successive primitive graphic elements in a drawing order of a document that comprises a plurality of primitive graphic elements, each primitive graphic element defined as a single object in the document, the drawing order indicating the order in which the primitive graphic elements are drawn when the document is displayed;
- identifying groups of the calculated relative positional values by ordering the relative positional values and calculating differences between the ordered values; and
- based on the identified groups of relative positional values, defining clusters of primitive graphic elements to associate as structural graphic elements, wherein the relative positional values for pairs of elements within the same cluster of primitive graphic elements are relatively smaller than the relative positional values between pairs of primitive graphic elements in different clusters.

38. The machine readable medium of claim 37, wherein the program further comprises a set of instructions for defining a structured document that includes the structural graphic elements.

39. The machine readable medium of claim 20, wherein the structured document comprises a hierarchical model of the document comprising a plurality of nodes, wherein one of the nodes is populated by a particular structural graphic element.

* * * * *